US010380573B2

(12) United States Patent
Lin et al.

(10) Patent No.: US 10,380,573 B2
(45) Date of Patent: Aug. 13, 2019

(54) PEER-TO-PEER FINANCIAL TRANSACTION DEVICES AND METHODS

(75) Inventors: Gloria Lin, San Ramon, CA (US); Amir Mahmood Mikhak, Cambridge, MA (US); Taido Lantz Nakajima, Cupertino, CA (US); Sean Anthony Mayo, Dover, NH (US); Michael Rosenblatt, Campbell, CA (US)

(73) Assignee: Apple Inc., Cupertino, CA (US)

( * ) Notice: Subject to any disclaimer, the term of this patent is extended or adjusted under 35 U.S.C. 154(b) by 950 days.

(21) Appl. No.: 12/286,488

(22) Filed: Sep. 30, 2008

(65) Prior Publication Data

US 2010/0082481 A1 Apr. 1, 2010

(51) Int. Cl.
*G06Q 20/40* (2012.01)
*G06Q 40/00* (2012.01)
(Continued)

(52) U.S. Cl.
CPC ......... *G06Q 20/223* (2013.01); *G06Q 20/042* (2013.01); *G06Q 20/105* (2013.01); *G06Q 20/32* (2013.01); *G06Q 20/322* (2013.01); *G06Q 20/3278* (2013.01); *G06Q 20/40* (2013.01); *G06Q 40/00* (2013.01); *H04L 63/0492* (2013.01); *H04L 63/0853* (2013.01)

(58) Field of Classification Search
CPC ......................... G06Q 40/00–08; G06Q 20/40
USPC ..................................................... 705/35–41
See application file for complete search history.

(56) References Cited

U.S. PATENT DOCUMENTS 4,701,601 A 10/1987 Francini et al.
4,868,376 A 9/1989 Lessin et al.
(Continued)

FOREIGN PATENT DOCUMENTS

CN 1363184 8/2002
CN 101171604 4/2008
(Continued)

OTHER PUBLICATIONS

Balaban, Dan; "The Brave New World of Contactless Mobile Credit" Nov. 2005, Card Technology vol. 10, Iss 11 p. 20, 6 pgs.*
(Continued)

*Primary Examiner* — Narayanswamy Subramanian
(74) *Attorney, Agent, or Firm* — Dentons US LLP

(57) ABSTRACT

Various techniques are provided for carrying out peer-to-peer financial transactions using one or more electronic devices. In one embodiment, a request for payment is transmitted from a first device to a second device using a near field communication (NFC) interface. In response to the request, the second device may transmit payment information to the first device. The first device may select a crediting account and, using a suitable communication protocol, may communicate the received payment information and selected crediting account to one or more external financial servers configured to process and determine whether the payment may be authorized. If the payment is authorized, a payment may be credited to the selected crediting account. In a further embodiment, a device may include a camera configured to obtain an image of a payment instrument. The device may further include an application to extract payment information from the acquired image.

36 Claims, 78 Drawing Sheets

(51) Int. Cl.

| | |
|---|---|
| ***G06Q 20/22*** | (2012.01) |
| ***G06Q 20/04*** | (2012.01) |
| ***G06Q 20/10*** | (2012.01) |
| ***G06Q 20/32*** | (2012.01) |
| ***H04L 29/06*** | (2006.01) |

(56) References Cited

U.S. PATENT DOCUMENTS 4,929,819 A 5/1990 Collins, Jr.
5,239,167 A 8/1993 Kipp
5,276,311 A 1/1994 Hennige
5,540,301 A 7/1996 Dumont
5,677,955 A 10/1997 Doggett et al.
5,917,913 A 6/1999 Wang
6,175,922 B1 1/2001 Wang
6,212,548 B1 4/2001 DeSimone et al.
6,400,270 B1 6/2002 Person
6,684,269 B2 1/2004 Wagner
6,694,387 B2 2/2004 Wagner
6,910,697 B2 9/2005 Varatharajah et al.
6,957,339 B2 * 10/2005 Shinzaki ........................ 713/186
7,042,993 B2 5/2006 Benini et al.
7,089,214 B2 8/2006 Wang
7,128,274 B2 10/2006 Kelley et al.
7,240,036 B1 7/2007 Mamdani et al.
7,334,728 B2 2/2008 Williams
7,376,591 B2 5/2008 Owens
7,464,050 B1 12/2008 Deaton et al.
7,496,527 B2 2/2009 Silverstein et al.
7,630,937 B1 12/2009 Mo et al.
7,783,564 B2 * 8/2010 Mullen .................. G06Q 20/04 705/38
7,784,684 B2 * 8/2010 Labrou .................. G06Q 20/32 235/375
7,886,962 B2 2/2011 Vawter
7,908,175 B2 3/2011 Chang et al.
8,180,705 B2 * 5/2012 Kowalchyk ............ G06Q 20/02 705/35
8,224,700 B2 7/2012 Silver
8,924,259 B2 12/2014 Neighman et al.
9,305,310 B2 4/2016 Radhakrishnan et al.
9,509,686 B2 * 11/2016 Anantha ............... H04L 9/0897
9,767,329 B2 * 9/2017 Forster ............... G06K 7/10128
10,095,276 B2 * 10/2018 Faith ..................... G06F 1/1694
10,223,743 B2 * 3/2019 Walker ............... G06Q 20/3278
10,296,889 B2 * 5/2019 Lin ........................ G06Q 20/32
2002/0082931 A1 6/2002 Siegel et al.
2002/0178088 A1 11/2002 Lurie et al.
2003/0110097 A1 6/2003 Lei
2003/0169881 A1 9/2003 Niedermeyer
2004/0061913 A1 4/2004 Takiguchi
2004/0143547 A1 7/2004 Mersky
2004/0202297 A1 10/2004 Benini et al.
2004/0203352 A1 10/2004 Hall et al.
2005/0043996 A1 2/2005 Silver
2005/0116027 A1 6/2005 Aigiene et al.
2005/0125343 A1 6/2005 Mendelovich
2005/0131871 A1 6/2005 Howard et al.
2005/0193054 A1 9/2005 Wilson et al.
2005/0210394 A1 9/2005 Crandall et al.
2005/0222961 A1 10/2005 Staib et al.
2005/0261968 A1 * 11/2005 Randall ................ G06Q 20/102 705/16
2006/0053079 A1 3/2006 Edmonson et al.
2006/0243609 A1 3/2006 Cole et al.
2006/0111944 A1 5/2006 Sirmans et al.
2006/0213972 A1 9/2006 Kelley et al.
2006/0229984 A1 10/2006 Miyuki
2006/0235795 A1 10/2006 Johnson et al.
2006/0235796 A1 10/2006 Johnson et al.
2006/0266822 A1 11/2006 Kelley et al.
2006/0287004 A1 12/2006 Fuqua
2007/0022058 A1 1/2007 Labrou et al.
2007/0150369 A1 6/2007 Zivin
2007/0190939 A1 8/2007 Abel
2007/0205275 A1 9/2007 Nicola et al.
2007/0206743 A1 9/2007 Chang
2007/0228179 A1 10/2007 Atkinson
2007/0235539 A1 10/2007 Sevanto et al.
2007/0254712 A1 11/2007 Chitti
2007/0255652 A1 11/2007 Tumminaro et al.
2007/0265033 A1 11/2007 Brostrom
2007/0278290 A1 12/2007 Messerges et al.
2008/0004964 A1 1/2008 Messa et al.
2008/0005195 A1 1/2008 Li
2008/0010215 A1 1/2008 Rackley III et al.
2008/0011825 A1 * 1/2008 Giordano et al. ............ 235/380
2008/0041936 A1 * 2/2008 Vawter .......................... 235/380
2008/0052091 A1 * 2/2008 Vawter ................... G06Q 20/10 705/39
2008/0052243 A1 2/2008 Narayanaswami et al.
2008/0059323 A1 3/2008 Chang et al.
2008/0113614 A1 5/2008 Rosenblatt
2008/0147561 A1 6/2008 Euchner et al.
2008/0154734 A1 6/2008 Fernandez et al.
2008/0167988 A1 7/2008 Sun
2008/0208742 A1 * 8/2008 Arthur ................. G06Q 20/105 705/41
2008/0208743 A1 * 8/2008 Arthur ................. G06Q 20/105 705/41
2008/0259829 A1 10/2008 Rosenblatt
2008/0261528 A1 10/2008 Rosenblatt
2008/0261529 A1 10/2008 Rosenblatt
2009/0005011 A1 1/2009 Christie et al.
2009/0037286 A1 2/2009 Foster
2009/0089193 A1 4/2009 Paintin
2009/0099961 A1 * 4/2009 Ogilvy ................... G06Q 20/10 705/39
2009/0106160 A1 * 4/2009 Skowronek .......... G06Q 20/045 705/75
2009/0119678 A1 5/2009 Shih et al.
2009/0182634 A1 7/2009 Park et al.
2009/0192937 A1 * 7/2009 Griffin ................... G06Q 20/10 705/42
2010/0008535 A1 * 1/2010 Abulafia et al. .............. 382/100
2010/0023449 A1 * 1/2010 Skowronek et al. ........... 705/39
2010/0049619 A1 * 2/2010 Beck .................... G06Q 20/102 705/26.1
2010/0051689 A1 * 3/2010 Diamond ...................... 235/380
2010/0057624 A1 * 3/2010 Hurt ....................... G06Q 20/20 705/76
2010/0078471 A1 4/2010 Lin et al.
2010/0078472 A1 4/2010 Lin et al.
2010/0174647 A1 * 7/2010 Kowalchyk ............ G06Q 20/02 705/44
2010/0217808 A1 8/2010 Benninger
2012/0078788 A1 3/2012 Gandhi
2012/0150750 A1 6/2012 Law et al.
2012/0209748 A1 8/2012 Small
2012/0245986 A1 9/2012 Regan et al.
2012/0290472 A1 11/2012 Mullen et al.
2013/0144706 A1 6/2013 Qawami et al.
2014/0095225 A1 4/2014 Williams et al.
2014/0138435 A1 5/2014 Khalid
2014/0181747 A1 6/2014 Son
2014/0207659 A1 7/2014 Erez et al.
2014/0207680 A1 7/2014 Rephlo
2014/0215361 A1 7/2014 Hwang et al.
2014/0236840 A1 8/2014 Islam
2014/0379341 A1 12/2014 Seo et al.
2015/0005039 A1 1/2015 Liu et al.
2015/0178878 A1 6/2015 Huang
2015/0278814 A1 10/2015 Jaffe
2015/0302493 A1 10/2015 Batstone et al.
2015/0302510 A1 10/2015 Godsey et al.
2015/0348001 A1 12/2015 Van Os et al.
2016/0005028 A1 1/2016 Mayblum et al.
2016/0011768 A1 1/2016 Yim et al.
2016/0104228 A1 4/2016 Sundaresan
2016/0156574 A1 6/2016 Hum et al.
2016/0171481 A1 6/2016 McElmurry et al.
2016/0267447 A1 9/2016 Davis et al.
2016/0275475 A1 9/2016 Lin et al.

(56) References Cited

U.S. PATENT DOCUMENTS

| | | | |
|---|---|---|---|
| 2016/0277342 | A1 | 9/2016 | Shi |
| 2016/0364715 | A1 | 12/2016 | Cho et al. |
| 2016/0378186 | A1 | 12/2016 | Kim |
| 2017/0046111 | A1 | 2/2017 | Chu et al. |
| 2017/0123498 | A1 | 5/2017 | Dillon et al. |
| 2017/0357972 | A1 | 12/2017 | Van Os et al. |

FOREIGN PATENT DOCUMENTS

| | | | |
|---|---|---|---|
| EP | 1331561 | A2 | 7/2003 |
| EP | 2980741 | A1 | 2/2016 |
| JP | 2011-503541 | | 3/1999 |
| JP | 2008-107874 | | 5/2008 |
| KR | 10-2002-0052156 | A | 7/2002 |
| KR | 2002-0052156 | | 7/2002 |
| KR | 2002-0063350 | | 8/2002 |
| KR | 1020020063350 | A | 8/2002 |
| KR | 10-2003-0075062 | A | 9/2003 |
| KR | 10-0475654 | B1 | 3/2005 |
| KR | 2006-0005821 | | 8/2006 |
| KR | 10-2006-0129825 | | 12/2006 |
| KR | 1020060129825 | A | 12/2006 |
| KR | 10-2007-0013048 | A | 1/2007 |
| KR | 10-2007-0087498 | A | 8/2007 |
| KR | 10-2008-0084875 | A | 9/2008 |
| WO | 2002/008863 | A2 | 1/2002 |
| WO | 2003/038698 | A1 | 5/2003 |
| WO | 2006/095212 | A1 | 9/2006 |
| WO | 2008/112497 | A1 | 9/2008 |
| WO | 2009/0018255 | A2 | 2/2009 |
| WO | 2010/077960 | A2 | 7/2010 |
| WO | 2017/030642 | A1 | 2/2017 |
| WO | 2017/072589 | A2 | 5/2017 |

OTHER PUBLICATIONS

"Quicken 2003 for MAC User Guide", 2002, Intuit Inc., pp. 57-89 and 108-118.*

"FeliCa", Jan. 2007, Wikipedia available at: http://en.wikipedia.org/w/index.php?title=FeliCa&oldid=97721667.*

"Handheld", MacMillian Publishers, Available at http://www.macmillandictionary.com/dictionary/american/handheld.*

"File:Sony PaSoRi RC-S320.jpeg", Jan. 2007, Wikipedia Available at http://en.wikipedia.org/wiki/File:Sony_PaSoRi_RC-S320.jpeg.*

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire, United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker Thomas; Nokia's 6212 with Bluetooth NFC: Let the Pairing revolution being!; http://www.engadget.com/2008/04/15/nokias-6212-with-bluetooth-nfc-let-the-pairing-revolution-begi/; Engadget; 2008.

NFC trial in NYC enables merchant and transit payment via cell phones; http://www.contactlessnews.com/2006/12/14/nfc-trial-in-nyc-enables-merchant-and-transit-payments-via-cell-phones; Citi/ATT/MasterCard/Nokia run trial in NYC with MTA et al.; Contactless News; 2008.

Port Authority, NJ Transit to test contactless cards; http://www.contactlessnews.com/2008/02/25/port-authority-nj-transit-to-test-contactless-cards/; Port Authority/NJ Transit run compatible trial with NYC; Contactless News 2008.

Bart NFC trial first to use mobile phones to pay for fares, food; http://www.contactlessnews.com/2008/01/29/bart-nfc-trial-first-to-use-mobile-phones-to-pay-for-fares-food/; Bart et al. run trial for automated food and transit payments; Contactless News 2008.

New NFC trial launched in Spokane; U.S. Bank/MasterCard run trial in Spokane, WA; http://www.contactlessnews.com/2008/01/28/new-nfc-trial-launched-in-spokane/; Contactless News 2008.

Search Report for Korean Application No. 10-2011-7009993 dated Apr. 29, 2011, 7 pgs.

XP007905525 ISSN 0170-9291, Notice from the European Patent Office dated Oct. 1, 2007 Concerning Business Methods, pp. 592-593.

Advisory Action received for U.S. Appl. No. 12/286,410, dated Jun. 25, 2012, 2 pages.

Extended European Search Report (includes Supplementary European Search Report and Search Opinion) received for European Patent Application No. 09818165.4, dated Jun. 22, 2012, 5 pages.

Final Office Action received for U.S. Appl. No. 12/286,410, dated Apr. 9, 2012, 15 pages.

Final Office Action received for U.S. Appl. No. 12/286,410, dated Jun. 12, 2014, 16 pages.

Final Office Action received for U.S. Appl. No. 12/286,494, dated Dec. 27, 2013, 21 pages.

Final Office Action received for U.S. Appl. No. 12/286,494, dated Feb. 3, 2016, 19 pages.

Final Office Action received for U.S. Appl. No. 12/286,494, dated Mar. 9, 2012, 20 pages.

International Preliminary Report on Patentability received for PCT Patent Application No. PCT/US2009/053441, dated Apr. 14, 2011, 6 pages.

International Search Report and Written Opinion received for PCT Patent Application No. PCT/US2009/053441, dated May 25, 2010, 7 pages.

International Search Report and Written Opinion received for PCT Patent Application No. PCT/US2017/031748, dated Aug. 29, 2017, 14 pages.

Invitation to Pay Additional Fee received for PCT Patent Application No. PCT/US2017/031748, dated Jun. 21, 2017, 2 pages.

Non-Final Office Action received for U.S. Appl. No. 12/286,410, dated Dec. 11, 2012, 17 pages.

Non-Final Office Action received for U.S. Appl. No. 12/286,410, dated May 15, 2013, 15 pages.

Non-Final Office Action received for U.S. Appl. No. 12/286,410, dated Oct. 11, 2013, 17 pages.

Non-Final Office Action received for U.S. Appl. No. 12/286,410, dated Oct. 27, 2011, 12 pages.

Non-Final Office Action received for U.S. Appl. No. 12/286,494, dated Aug. 20, 2015, 16 pages.

Non-Final Office Action received for U.S. Appl. No. 12/286,494, dated Jan. 9, 2015, 13 pages.

Non-Final Office Action received for U.S. Appl. No. 12/286,494, dated Jul. 29, 2013, 21 pages.

Non-Final Office Action received for U.S. Appl. No. 12/286,494, dated Jun. 3, 2014, 13 pages.

Non-Final Office Action received for U.S. Appl. No. 12/286,494, dated Sep. 13, 2011, 17 pages.

Office Action received for Australian Patent Application No. 2017100558, dated Feb. 27, 2018, 3 pages.

Office Action received for Australian Patent Application No. 2017100558, dated Sep. 1, 2017, 5 pages.

Office Action received for Japanese Patent Application No. 2011-529046, dated Sep. 27, 2013, 6 pages. (3 pages of English translation and 3 pages of official copy).

(56) References Cited

OTHER PUBLICATIONS

Office Action received for Chinese Patent Application No. 200980144797.X, dated Oct. 28, 2013, 10 pages (6 page of English Summary and 4 pages of Official Copy).
Office Action received for European Patent Application No. 09818165.4, dated Aug. 3, 2016, 7 pages.
Non-Final Office Action received for U.S. Appl. No. 15/145,633, dated Jun. 14, 2018, 19 pages.

* cited by examiner

PEER-TO-PEER FINANCIAL TRANSACTION DEVICES AND METHODS

BACKGROUND

1. Technical Field

Embodiments of the present disclosure relate generally to peer-to-peer transactions and, more particularly, to various systems, methods, and electronic devices configured to initiate and process such transactions.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many payment instruments currently exist and may be used to carry out financial exchanges between two or more parties. For instance, payments may be made using credit cards, debit cards, checks, electronic checks, and cash. In recent years, the growth of electronic commerce has at least partially attributed to the popularity of credit cards, debit cards, and other non-currency based payment instruments. Further, because a consumer may not always have a precise amount of cash on hand to pay an outstanding invoice or bill, such as to a vendor or retailer, it may, at times, be more convenient to charge the owed amount to the consumer's credit card.

As we move to a more mobile and fast-paced society, the use of cash or currency is being increasingly replaced by electronic transactions using credit cards, debit cards, etc. Accordingly, it is not uncommon for consumers to hold multiple non-currency accounts concurrently (e.g., multiple credit cards or debits cards corresponding to a respective banking provider), each of which may be dedicated for a particular type of purchase or financial exchange. For example, a consumer may concurrently hold a credit card account that may be dedicated for gas or automotive purchases, a credit card account specifically for travel-related purchases, a general purpose credit card account for miscellaneous purchases, as well as one or more loyalty credit card accounts that may be used only with specific retailers or vendors. In addition, the consumer may also hold, concurrently, one or more debit card accounts associated with respective banking providers.

As can be appreciated, the consumer may make payments or participate in financial exchanges using any of the above-discussed accounts by way of a payment instrument representing the account, such as a credit card. As the number of payment accounts held by the consumer increases, however, it may become increasingly inconvenient to carry such a large number of credit/debit cards. Further, while payments made using the above-discussed accounts may be readily compatible with retailer and vendor businesses, including those established online on the Internet, payments made from these accounts may not always be readily accepted by other consumers or "peers."

SUMMARY

Certain aspects of embodiments disclosed herein by way of example are summarized below. It should be understood that these aspects are presented merely to provide the reader with a brief summary of the various techniques disclosed and/or claimed herein might take and that these aspects are not intended to limit the scope of any technique disclosed and/or claimed herein. Indeed, any technique disclosed and/or claimed herein may encompass a variety of aspects that may not be set forth below.

The present disclosure generally relates to various techniques for performing peer-to-peer transactions using a portable device. In accordance with one disclosed embodiment, a portable electronic device may be configured to store information representing one or more accounts held by a user. For instance, the stored information may represent one or more credit card accounts held by the user. As used in the present disclosure, the term "credit card" shall be understood to encompass any type of card, including those in conformance with the ISO 7810 standard, such as credit cards, debit cards, charge cards, gift cards, or the like. In one embodiment, a credit card may store a user's account information using a magnetic stripe encoded on the card (e.g., ISO 7813 standard). In other embodiments, as will be described below, a credit card may include a storage device (e.g., in addition to the above-mentioned magnetic stripe) configured to store the user's account information. The portable device may also be configured to store information relating to one or more bank accounts held by the user.

The portable device may also be provided one or more communication interfaces configured to send or transmit information stored on the device. For example, based on inputs or commands received from the user, the portable device may be configured to initiate payments (e.g., as a payor) by transmitting payment information corresponding to a credit account stored on the device, for example, to an external device (e.g., as a payee). In one embodiment, the receiving device may be a similar portable electronic device. Additionally, the device may be configured to receive payment information from the external device and to initiate a transaction request in order to process the received payment information, such that a corresponding payment is credited to an appropriate account stored on the device (e.g., a bank account). For instance, the transaction request may include communicating with one or more external servers configured to provide an authorization for the requested transaction.

The electronic device may further include one or more input device, such as a camera device, as well as a plurality of communication interfaces, which may include a near field communication (NFC) interface. In accordance with one embodiment, the device may initiate the sending and receiving of payment information with the external device using the NFC interface by way of an NFC handshake operation. Additionally, the electronic device also may use a device identification networking protocol to establish a communication link with the external device in order to receive or send payment information.

In a further embodiment, the electronic device may include an image processing application for processing an image to extract information. For instance, using the camera input device discussed above, an image of a payor's payment instrument, which may include a credit card, check, etc., may be acquired. The acquired image may be processed in order to extract and determine information relating to the payment account represented by the payment instrument. Thus, the electronic device may transmit a request including the extracted payment account information to one or more financial servers for the authorization of a payment using the extracted information. Accordingly, the presently described techniques, which may include methods, systems, and devices, may provide for a convenient method and system for performing peer-to-peer financial exchanges, as well as provide for a single transaction point for the sending and receiving payments, thus reducing or eliminating the need for the user to carry each physical payment instruments (e.g., multiple credit/debit cards).

The presently described techniques may also provide one or more systems for performing a group transaction including a plurality of group transaction members may be provided. In one embodiment, the group transaction members may include an initiator operating the electronic device. The initiator may initiate a primary transaction to pay the entirety of a group invoice containing amounts owed by each of the group transaction members. Thereafter, the initiator may perform one or more secondary transactions with each of the remaining group transaction members to collect the respective amounts owed. As can be appreciated, the collection of the outstanding payments may be performed using one or more of the communication or image processing techniques briefly explained above. Also, in a further embodiment, the initiator may be the originator of the invoice and directly collect payments corresponding to amounts owed by the group transaction members (e.g., without the above-discussed primary transaction).

The electronic device may further be provided an application, such as a computer program stored on one or more machine-readable media, adapted to provide the functions discussed above. In one embodiment, the device may include a display and the application may provide for a graphical user interface viewable on the display. By way of the graphical interface, the user may operate the device to perform one or more of the above-mentioned functions, which will be described in further detail below.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. These described embodiments are only exemplary of the presently disclosed techniques. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to various techniques for conducting peer-to-peer financial exchanges using a handheld, portable electronic device. The handheld electronic device, in accordance with aspects of the present disclosure, may integrate several functionalities for performing peer-to-peer transactions, including the storing information representation a user's payment accounts and crediting accounts, acquiring and sending payment information, and obtaining payment authorization. One or more input devices, such as a camera or near field communication (NFC) device may be provided for the acquisition of payment information. For example, the NFC device may be used to initiate an NFC connection with an external device for acquiring or sending payment information data. Additionally, the camera device may be utilized in cooperation with an image processing application to extract payment information data from an image of a payment instrument provided by a payor. The electronic device may also be configured to communicate with one or more external servers to acquire an authorization for a payment through a selected communication channel, such as a wide area network (WAN), local area network (LAN), personal area network (PAN), or near field communication channel. Thus, the various functions provided by an electronic device in accordance with embodiments of the present disclosure, as will be described in further detail below, may provide a convenient technique for performing peer-to-peer financial exchanges, include group exchanges involving more than two members. Indeed, as will be discussed in further detail below, certain aspects of the below-described techniques may be particular useful in person-to-person transactions conduct between individuals.

Figure 1:
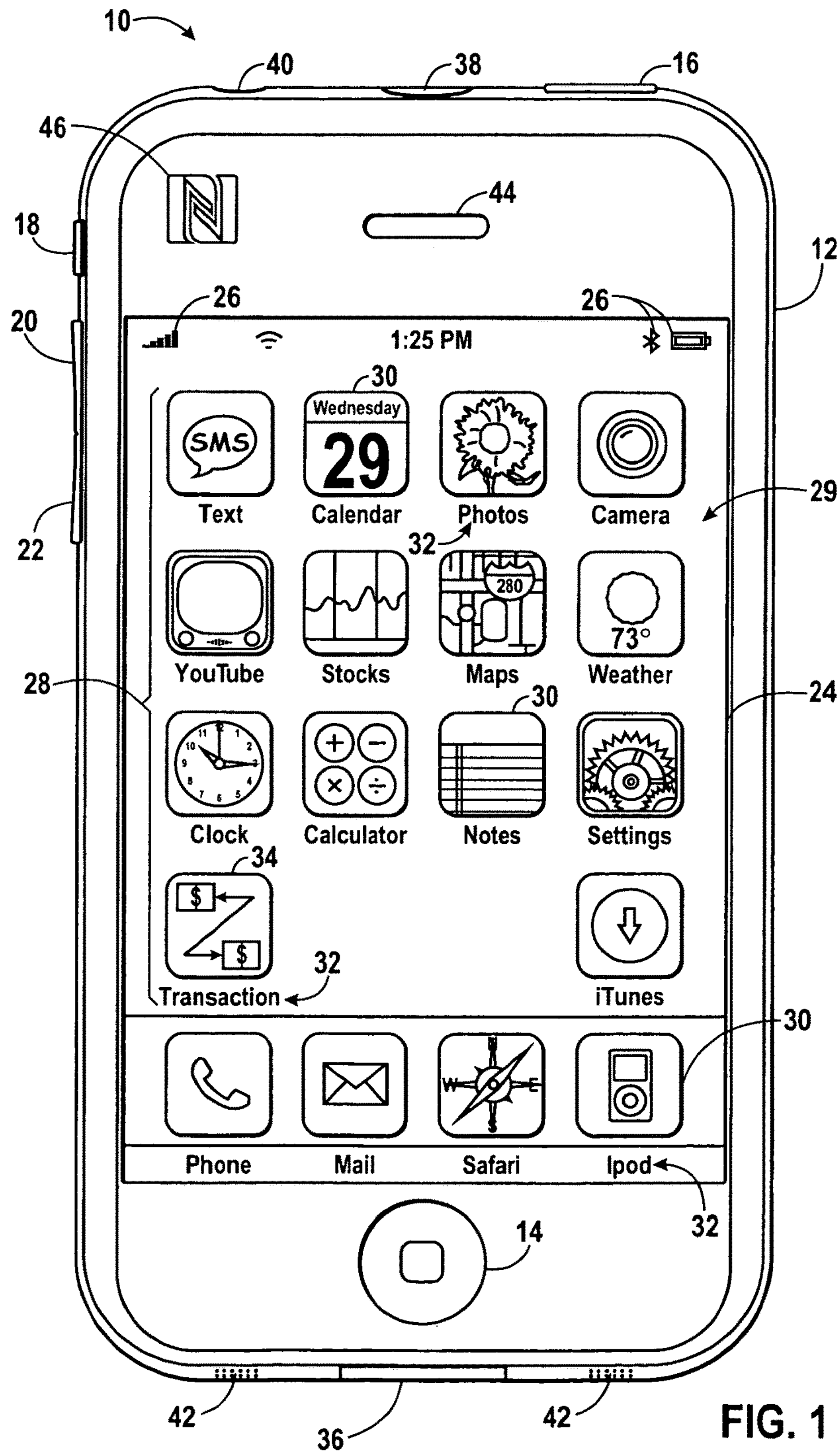
FIG. 1 is a front view of an electronic device in accordance with one embodiment.

Turning now to the drawings and referring initially to FIG. 1, an electronic device that may include one or more transaction applications for providing the transaction related techniques and capabilities briefly mentioned above is illustrated and generally referred to by reference numeral 10. In accordance with the illustrated embodiment, the electronic device 10 may be a handheld device incorporating the functionality of one or more portable devices, such as a media player, a cellular phone, a personal data organizer, and so forth. Thus, depending on the functionalities provided by the electronic device 10, a user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connection protocols, such as Bluetooth and near field communication (NFC). By way of example only, the electronic device 10 may be a model of an iPhone®, available from Apple Inc. of Cupertino, Calif.

As shown in the illustrated embodiment, the device 10 may be enclosed by an enclosure or housing 12. The enclosure 12 may serve to protect the internal components of the device 10 from physical damage. In addition, the enclosure 12 may also provide the device 10 and its internal components shielding from electromagnetic interference. As will be appreciated by those skilled in the art, the enclosure 12 may be formed and/or constructed from any suitable material such as plastic, metal, or a composite material and may allow certain frequencies of electromagnetic radiation to pass through to wireless communication circuitry within the device 10 for facilitation of wireless communications.

The enclosure 12 may further provide for access to various user input structures, depicted in FIG. 1 by reference numerals 14, 16, 18, 20, and 22. By way of these user input structures, a user may interface with the device 10, wherein each user input structure 14, 16, 18, 20, and 22 may be configured to control one or more device functions when pressed or actuated. By way of example, the input structure 14 may include a button that when pressed or actuated causes a home screen or menu to be displayed on the device. The input structure 16 may include a button for toggling the device 10 between one or more modes of operation, such as a sleep mode, a wake mode, or a powered on/off mode, for example. The input structure 18 may include a dual-position sliding structure that may mute or silence a ringer in embodiments where the device 10 includes a cell phone application. Further, the input structures 20 and 22 may include buttons for increasing and decreasing the volume output of the device 10. It should be understood that the illustrated input structures 14, 16, 18, 20, and 22 are merely exemplary, and that the electronic device 10 may include any number of user input structures existing in various forms including buttons, switches, control pads, keys, knobs, scroll wheels, and so forth, depending on specific implementation requirements.

The electronic device 10 may further include a display 24 configured to display various images generated by the device 10. By way of example, the display 24 may be configured to display photos, movies, album art, and/or data, such as text documents, spreadsheets, text messages, and e-mail, among other things. The display 24 may also display various system indicators 26 that provide feedback to a user, such as power status, signal strength, call status, external device connections, or the like. The display 24 may be any type of display such as a liquid crystal display (LCD), a light emitting diode (LED) display, an organic light emitting diode (OLED) display, or other suitable display. In certain embodiments, the device 10 may include a touch sensitive element, such as a touch screen interface (not shown in FIG. 1) disposed adjacent to the display 24 that may function as an additional user input structure (e.g., in addition to structures 14, 16, 18, 20, and 22). By way of this touch screen interface, a user may select elements displayed on the display 24 such as, for example, by touching certain elements using the user's finger or a stylus.

As further shown in the present embodiment, the display 24 may be configured to display a graphical user interface ("GUI") 28 that allows a user to interact with the device 10. The GUI 28 may include various graphical layers, windows, screens, templates, elements, or other components that may be displayed on all or a portion of the display 24. For instance, the GUI 28 may display a plurality of graphical elements, depicted here generally as icons 30. By default, such as when the device 10 is first powered on, the GUI 28 may be configured to display the illustrated icons 30 as a "home screen," represented herein by the reference numeral 29. In certain embodiments, the user input structures 14, 16, 18, 20, and 22, may be used to navigate through the GUI 28 and, accordingly, away from the home screen 29. For example, one or more of the user input structures may include a wheel structure that may allow a user to select various icons 30 displayed by the GUI 28. Additionally, the icons 30 may also be selected via the touch screen interface.

As will be appreciated, the icons 30 may represent various layers, windows, screens, templates, elements, or other components that may be displayed in some or all of the areas of the display 24 upon selection by the user. Furthermore, the selection of an icon 30 may lead to or initiate a hierarchical screen navigation process. For instance, the selection of an icon 30 may cause the display 24 to display another screen that includes one or more additional icons 30 or other GUI elements. Also, as shown in the present embodiment, each graphical element 30 may have one or more textual indicators 32 associated therewith, which may be displayed on or near its respective graphical element 30 to facilitate user interpretation of each graphical element 30. For example, the icon 34 may be associated with the textual indicator "Transactions." It should be appreciated that the GUI 28 may include various components arranged in hierarchical and/or non-hierarchical structures.

When an icon 30 is selected, the device 10 may be configured to initiate, open, or run an application associated with the selected icon 30 and to display a corresponding screen. For example, when the transaction icon 34 is selected, the device 10 may open a transaction program and display a transactions menu displaying the various tools, features available in the transaction program. Thus, for each application provided on the device 10, one or more respective screen or screens may be displayed on the display 24 that may include various user interface elements corresponding to a respective application.

The electronic device 10 may also include various input/output (I/O) ports, such as the illustrated I/O ports 36, 38, and 40. These I/O ports may allow a user to connect the device 10 to or interface the device 10 with one or more external devices. For example, the input/output port 36 may include a proprietary connection port for transmitting and receiving data files, such as media files. The input/output port 38 may include a connection slot for receiving a subscriber identify module (SIM) card, for instance, where the device 10 includes cell phone functionality. The input/output port 40 may be an audio jack that provides for connection of audio headphones or speakers. As will appreciated, the device 10 may include any number of input/output ports configured to connect to a variety of external devices, such as to a power source, a printer, and a computer, or an external storage device, just to name a few. As will appreciated, the I/O ports may include any suitable interface type such as a universal serial bus (USB) port, serial connection port, FireWire port (IEEE-1394), or AC/DC power connection port.

Further, in some embodiments, certain I/O ports may be configured to provide for more than one function. For instance, in one embodiment, the I/O port 36 may be configured to not only transmit and receive data files, as described above, but may be further configured to couple the device to a power charging interface, such as an power adaptor designed to provide power from a electrical wall outlet, or an interface cable configured to draw power from another electrical device, such as a desktop computer. Thus, the I/O port 36 may be configured to function dually as both a data transfer port and an AC/DC power connection port depending, for example, on the external component being coupled to the device 10 through the I/O port 36.

The electronic device 10 may also include various audio input and output elements. For example, the audio input/output elements, depicted generally by reference numeral 42, may include an input receiver, which may be provided one or more microphones. For instance, where the electronic device 10 includes cell phone functionality, the input receivers may be configured to receive user audio input such as a user's voice. Additionally, the audio input/output elements 42 may include one or more output transmitters. Thus, where the device 10 includes a media player application, the output transmitters of the audio input/output elements 42 may include one or more speakers for transmitting audio signals to a user, such as playing back music files, for example.

Further, where the electronic device 10 includes a cell phone application, an additional audio output transmitter 44 may be provided, as shown in FIG. 1. Like the output transmitter of the audio input/output elements 42, the output transmitter 44 may also include one or more speakers configured to transmit audio signals to a user, such as voice data received during a telephone call. Thus, the input receivers and the output transmitters of the audio input/output elements 42 and the output transmitter 44 may operate in conjunction to function as the audio receiving and transmitting elements of a telephone.

In the illustrated embodiment, the electronic device 10 further includes a near field communication (NFC) device 46. The NFC device 46 may be located within the enclosure 12, and a mark or symbol on the exterior of the enclosure 12 may identify its location within the enclosure 12. The NFC device 46 may include an antenna that may generally be positioned along the circumference of the housing 12, and may allow for close range communication at relatively low data rates (e.g., 424 kb/s), and may comply with standards such as ISO 18092 or ISO 21481. In some embodiments, the NFC device 46 may also allow for close range communication at relatively high data rates (e.g., 560 Mbps), and may comply with the TransferJet® protocol. As used herein, it should be understood that the term "NFC device" refers to both an NFC communication device 46, as well as the above-mentioned antenna.

In certain embodiments, the communication using the NFC device 46 may occur within a range of approximately 2 to 4 cm. As will be appreciated by those skilled in the art, close range communication using the NFC device 46 may take place via magnetic field induction, thus allowing the NFC device 46 to communicate with other NFC-enabled devices or to retrieve information from tags having radio frequency identification (RFID) circuitry. Additionally, magnetic field induction may also allow the NFC device 46 to "wake" or induce another NFC-enabled device that is in a passive or sleep mode into an active mode. As will discussed in further detail below, the NFC device 46 may be utilized in conjunction with the transaction application described above (e.g., represented by graphical element 34) to provide for the acquisition and transmission of payment and crediting information, as well as communication with one or more external servers for processing and authorization of a transaction as well as the verification of payment and crediting accounts.

Figure 2:
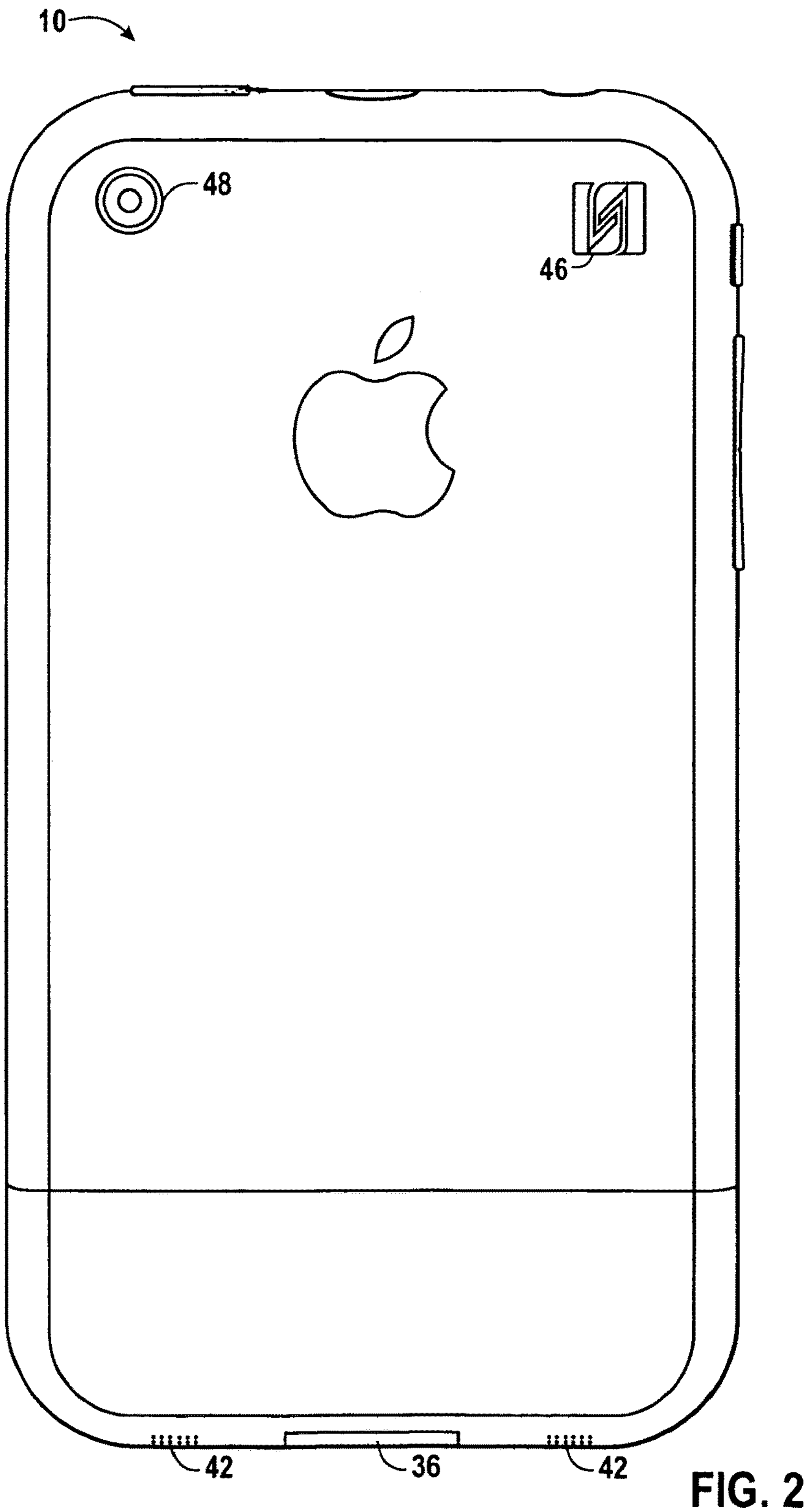
FIG. 2 is a rear view of the electronic device illustrated in FIG. 1.

Continuing now to FIG. 2, a rear view of the electronic device 10 depicted in FIG. 1 is illustrated. As shown in FIG. 2, the device 10 may include a camera 48. The camera 48 may be used to acquire digital still or moving images, such as digital photographs or movies. As will be discussed in further detail below, the camera 48 may be utilized in conjunction with the aforementioned transaction application, depicted by the graphical element 34, in order to acquire images of various types of payment instruments, such as checks or credit cards. As will be known by those skilled in the art, various image processing techniques, such as optical character recognition (OCR), may be applied to the processing of the acquired photographic images of payment instruments in order to extract information corresponding to account holder identify and account information associated with a particular payment instrument.

Figure 3:
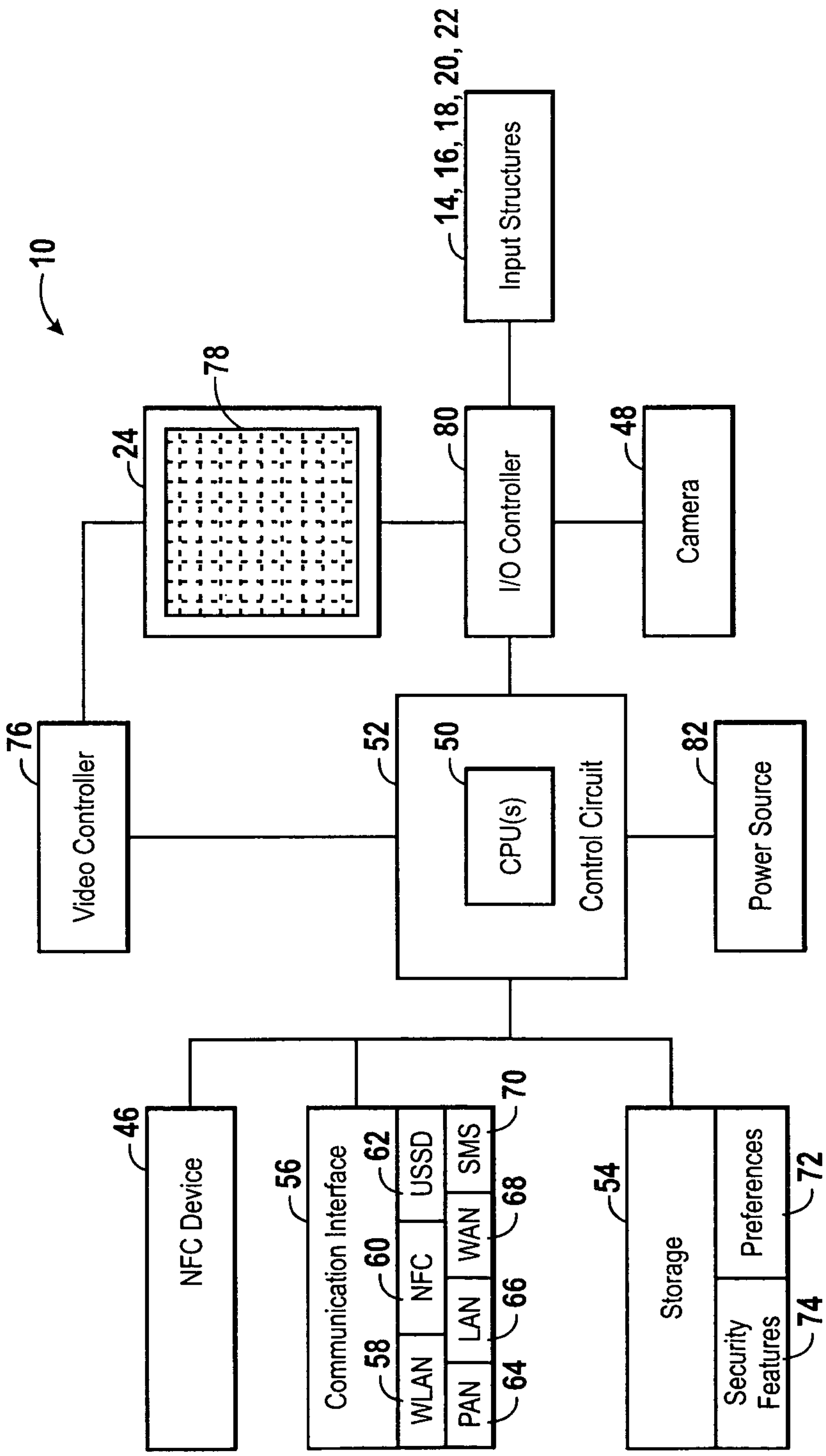
FIG. 3 is a simplified block diagram depicting components which may be used in the electronic device illustrated in FIG. 1.

Additional details of the illustrative device 10 may be better understood through reference to FIG. 3, which is a block diagram illustrating various components and features of the device 10 in accordance with one embodiment of the present disclosure. As shown in FIG. 3, the device 10 may include the above discussed display 24, the NFC device 46, and the camera 48, as well as a CPU 50, control circuitry 52, a storage device 54, a plurality of communication interfaces 56, a video controller 76, a touch screen interface 78, an I/O controller 80, and a power source 80.

The operation of the device 10 may be generally controlled by the central processing unit (CPU) 50 and the control circuit 52. In cooperation, these elements may provide the processing capability required to execute an operating system, application programs, the GUI 28, and any other functions provided on the device 10. The CPU 50 may include a single processor or, in other embodiments, it may include a plurality of processors. By way of example, the CPU 50 may include "general purpose" microprocessors, a combination of general and application-specific microprocessors, instruction set processors, graphics processors, video processors, as well as related chips sets and/or special purpose microprocessors. The control circuit 52 may include one or more data buses for transferring data and instructions between components of the device 10. The control circuit 52 also may further include on board memory (RAM) for caching purposes. Additionally, although not illustrated in FIG. 3, the device 10 may include a standalone random access memory (RAM) in communication with the CPU 50 by way of one or more memory controllers, which may be integrated within the control circuit 52.

Information used by the CPU 50 may be stored within a long-term storage device, represented by reference numeral 54. The storage device 54 of the electronic device 10 may be utilized for storing data required for the operation of the CPU 50, data to be processed or executed by the CPU 50, as well as other data required by the device 10, such as application and program data. By way of example, the storage device 54 may be configured to store the firmware for the electronic device 10 that is used by the CPU 50. The firmware may include an operating system, as well as other programs or drivers that enable various functions of the electronic device 10, GUI functions, and/or processor functions. The storage device 54 may also store components for the GUI 28, such as graphical elements, screens, and templates. Additionally, the storage device 54 may store data files such as media (e.g., music and video files), image data, application software, preference information (e.g., media playback preferences, general user preferences), wireless connection information (e.g., information that may enable the device 10 to establish a wireless connection, such as a telephone or Internet connection), subscription information (e.g., information that maintains a record of podcasts, television shows or other media to which a user subscribes), telephone information (e.g., telephone numbers), and any other suitable data required by the device 10.

The long term storage 54 may be non-volatile memory such as read only memory, flash or solid state memory, a hard disk drive, or any other suitable optical, magnetic, or solid-state computer readable media, as well as a combination thereof. Thus, although the long term storage 54 is depicted as a single device for purposes of clarity, it should understood that the long term storage 54 may include one or more of a combination of the above-listed storage devices operating in conjunction with the CPU 50.

Further, in certain embodiments, the storage device 54 may include an image processing application configured to perform extraction of textual or encoded information from image data, such as an image acquired using the camera device 48. The image processing application may employ one or more OCR techniques, as briefly described above. For example, the image processing application may be used to extract credit card information from an acquired image of the credit card, or banking information from an acquired image of a check. These features and applications will be described in further detail below.

The device 10 may further include one or more communication interfaces, illustrated in FIG. 3 by reference numeral 56, for providing additional connectivity channels for receiving and transmitting information. For example, communication interface 56 may represent one or more network interface cards (NIC) and/or a network controller as well as various associated communication protocols. The communication interface 56 may include several types of communication interfaces, including but not limited to, a wireless local area network (WLAN) interface 58, an NFC interface 60, an unstructured supplementary service data (USSD) interface 62, a personal area network (PAN) interface 64, a local area network (LAN) interface 66, a wide area network (WAN) interface 68, and a short message service (SMS) interface 70.

The PAN interface 64 may provide capabilities to network with, for example, a Bluetooth® network, an IEEE 802.15.4 (e.g., ZigBee) network, or an ultra wideband network (UWB). As will be appreciated, the networks accessible by the PAN interface 64 may, but do not necessarily, represent low power, low bandwidth, or close range wireless connections. The PAN interface 64 may permit one electronic device 10 to connect to another local electronic device, such as a computer or portable media player, via an ad-hoc or peer-to-peer connection. However, the connection may be disrupted if the physical distance between the two electronic devices exceeds the effective range of the PAN interface 64.

The LAN interface 66 and WLAN interface 58 may provide longer-range communication channels, generally exceeding the range available via the PAN interface 64. The LAN interface 66 may represent, for example, an interface to a wired Ethernet-based network providing a connection to an Intranet or the Internet, and the WLAN interface 58 may represent an interface for connecting to a wireless LAN, such as an IEEE 802.11x wireless network. Additionally, in many cases, a connection between two electronic devices via the LAN interface 66 may involve communication through one or more network routers, switches, gateways, or some other intermediary device.

Connection to a wide area network (WAN) may be provided by way of the WAN interface 68. The WAN interface 68 may permit a private and/or secure connection to a cellular data network, such as the Enhanced Data rates for GSM Evolution (EDGE) network or the 3G network (e.g., based on the IMT-2000 standard). When connected via the WAN interface 68, the electronic device 10 may remain connected to the Internet and, in some embodiments, to one or more additional electronic devices, despite changes in location that might otherwise disrupt a connection through the PAN interface 64, LAN interface 66, or the WLAN interface 58.

In certain embodiments, the electronic device 10 may also include a service discovery networking protocol to establish a connection with an external device through a network interface. For example, both the device 10 and the external device may broadcast identification information using internet protocol standards (IP). In some embodiments, the external device may additionally broadcast information relating to the available services the external device is capable of providing (e.g., printing services for a networked printer). The devices may then use the identification information to establish a network connection, such as a PAN connection or a WLAN connection, between the devices. By way of example, a device identification protocol may be provided by Bonjour®, developed by Apple Inc.

Small size communications may be sent using the USSD interface 62 and the SMS interface 70. The SMS interface 70 may allow transmission of text messages of 140 bytes or less. In certain embodiments, larger size messages may be sent using concatenated SMS. The USSD interface 62 may facilitate the transmission of real time text messages over GSM signaling channels. By way of example, the USSD interface 62 may be used to query for locations and addresses, movie showing times, stock quotes, or the like.

The device 10 may be further provided with close range communication capabilities by way of the NFC interface 60. The NFC interface 60 may operate in conjunction with the above-described NFC device 46 to provide for close range communications between the device 10 and an external device. The NFC interface 60 may exist as a separate component, may be integrated into another chipset, or may be integrated into the NFC device 46 itself, for example, as part of a system-on-chip (SoC) circuit. The NFC interface 60 may include one or more protocols, such as the Near Field Communication Interface and Protocols (NFCIP-1), for communicating with another NFC-enabled device. The protocols may be used to adapt the communication speed and to designate one of the connected devices as an initiating device that controls and/or initiates the NFC connection. In certain embodiments, the NFC interface 60 may be used to receive information, such as a service set identifier (SSID), channel, and/or encryption key that may be required to permit a connection through another communication interface, such as the WLAN interface 58, the PAN interface 64, the LAN interface 66, or the WAN interface 68.

In certain embodiments, the NFC interface 60 may enable the electronic device 10 to communicate in a peer-to-peer mode for exchanging data, such as payment and crediting information, with another NFC-enabled device in the context of carrying out or initiating the processing of a financial transaction, as will be discussed in further detail below. The NFC interface 60 also may be configured to switch the NFC device 46 between a "host" or active mode in which the NFC device 46 generates its own RF field, as well as a passive mode or "wake-on-NFC" mode in which the NFC device 46 may be induced into an active state for performing the transfer or receiving of data upon detection of an RF field generated by another device. As will be appreciated, operation of the NFC device 46 and interface 60 in the passive mode may prolong the battery life of the device 10. In additional embodiments, the NFC device 46 may be controlled based on user or manufacturer preferences, represented herein by reference number 72, which may be preconfigured by a manufacturer or vendor, or subsequently configured by a user based on the user's preferences. These preferences, whether pre-configured or later configured, may be stored in the storage device 54.

In embodiments where the electronic device 10 is configured to provide for the initiation of peer-to-peer transactions, including financial transactions, between an external device, as will be discussed in further detail below, the preferences 72 may include a user-specified preferred or default payment account or source, as well as user-specified preferred or default crediting account. As used herein, the term "payment account" or the like shall be understood to refer to an account from which a payment is to be debited or charged. Additionally, the term "crediting account" or the like shall be understood to refer to an account from which a payment is to be deposited or credited. Thus, a default payment account may be an account that is automatically selected for providing a payment when a transaction is initiated on the device 10. Similarly, a default crediting account may be an account that is automatically selected for the crediting or deposit of a received payment. The preferences 72 may also include a preferred e-mail address at which a user prefers to receive electronic receipt records or confirmation messages with regard to payments made or received via operating the electronic device 10.

In certain embodiments, the preferences 72 may further determine properties of the above-mentioned communication interfaces 56 (e.g., including 58, 60, 62, 64, 66, 68, and 70). For instance, the preferences 72 may include a list of networks that the device 10 may connect to and may further govern the order or priority between the communication interfaces 56. By way of example, the device 10 may be configured to communicate through the NFC interface 60 if the communication is with regard to receiving payment information from or sending payment information to an external device. Similarly, the device 10 may be configured to communicate through the WLAN 58 or LAN 66 interfaces if the communication is with regard to verifying received payment information with an external and/or remote financial server, for example. Still further, the device 10 may be configured to initiate or take part in a group transaction, in which communication with a plurality of external devices is achieved through a combination of the provided communication interfaces 56. For instance, in one embodiment, the device 10 may receive payment information from one or more of a plurality of external devices through the NFC interface 60, while simultaneously communicating an updated invoice or bill to each of the external devices through an ad-hoc network established through one of the WLAN 58, PAN 64, or LAN 66 interfaces.

As will be further appreciated, the communication preferences associated with the preferences 72 may be further dependent upon security features 74 available for each respective communication interface 58, 60, 62, 64, 66, 68, and 70. The security features 74 may be stored in the storage device 54 and may include one or more cryptographic protocols, such as a secure sockets layer (SSL) protocol or a transport layer security (TLS) protocol, for establishing secure communications between the device 10 and an external device. The security features 74 may also include one or more encryption applications for encrypting information sent from the device 10. These features may be particularly useful when transmitting information of a sensitive nature, such as payment and/or crediting account information, which may generally include credit card and bank account information, for example.

The security features 74 may also include a secure access-restricted storage area (e.g., within the storage device 54) to limit access to the data that may be required by the certain aspects of the security features 74, such as encryption keys, passcodes and passwords, digital certificates, or the like. Additionally, the secure storage area may be adapted to store sensitive data, such as information pertaining to a user's financial accounts, including credit card accounts and banking accounts. The secure storage area may also store information regarding accounts of a non-financial nature. As used herein, the term "non-cash account," "non-financial account," or the like shall be understood to refer to accounts which may contain non-monetary assets that may nevertheless be used as a medium of exchange with at least one party, such as the institution holding or maintaining the non-cash account. To provide one example, a non-financial or non-cash account may be a user's online music/media subscription or purchase account, such as an iTunes® account available through the iTunes® online digital media store, developed and operated by Apple Inc. An iTunes® account may include a number of "credits" by which a user may redeem or exchange at the iTunes® online media store for media files, such as music files, movie files, audiobooks, podcasts, or the like. Thus, these non-cash accounts may be stored alongside financial accounts (e.g., banking and credit card accounts) within the secure storage area provided by the security features 74. In certain embodiments, the secure storage area may include a microcontroller embedded within the electronic device 10. Additionally, in some embodiments, the secure storage area, in addition to storing the above-mentioned sensitive data, may be further protected by its own respective password or authorization "personal identification number" (PIN), for example, in order to prevent unauthorized access to the information stored therein.

In accordance with further embodiments, the security features 74 may further allow a user to lock or temporarily disable all (e.g., lock on power-up) or only certain functions on the device 10, such as the functionalities which may be provided by transaction application (e.g., represented by the icon 34) described above. By way of example, when locked, the peer-to-peer transaction features briefly discussed above may be disabled or inaccessible by users until a user-specified PIN or password is provided. Further, the security features 74 may additionally include requiring that the PIN be provided prior to the sending or transmissions of payment account information to external devices. As can be appreciated, the security features 74 described herein may aid to prevent the device 10 from being used to make payments by unauthorized persons.

As discussed above, the device 10 may also include the video controller 76, which may be operatively coupled to the display 24 and configured to receive image data and to send voltage signals corresponding to the pixel values of the image data to the display 24. The displayed image data may be representative of information received through the communication interface 56, as well as information contained in the storage device 54. As will be understood by those skilled in the art, pixel values may be numerical assignments corresponding to respective pixel intensities. Thus, the display 24 may receive the voltage signals from the video controller 76 as an input and produce an image corresponding to the voltage signals. For instance, an image produced by the signals provided by the video controller 76 may represent a screen of the GUI 28 described above with reference to FIG. 1.

As further noted above, a user operating the device 10 may select various graphical elements which may represent applications or information that may be displayed through the GUI 28. As shown in FIG. 3, a touch screen interface 78 may be positioned in front of or behind the display 24 and may provide a user the ability to select graphical elements, such as the icons 30 displayed by the GUI 28 described above in FIG. 1. The touch screen interface 78 may be configured to receive inputs based on a physical contact (e.g., touching the display 24) either by the user or an object (e.g., stylus) being controlled or manipulated by the user, and to send "touch event" information to the CPU 50. The CPU 50 may then process the detected touch event information and perform a corresponding action. For instance, referring briefly back to FIG. 1, the "touching" of the icon 34 may be processed by the CPU 50 as an instruction to execute or initiate the corresponding transaction application. The touch screen interface 78 may employ any suitable type of touch screen technology such as resistive, capacitive, infrared, surface acoustic wave, electromagnetic, or near field imaging. Furthermore, the touch screen interface 78 may employ single point or multipoint sensing.

The I/O controller 80 depicted in FIG. 3 may provide an infrastructure for allowing a user to communicate with the CPU 50 through various input structures provided on the device 10, such as the input structures represented by the reference numerals 14, 16, 18, 20, and 22 in FIG. 1. The user input structures 14, 16, 18, 20, and 22 may be used in conjunction with, or independently of, the touch screen interface 76 to provide input information to the device 10.

The power source 82 of the device 10 may include the capability to power the device 10 in both non-portable and portable settings. For example, in a portable setting, in order to facilitate transport and ease of motion, the device 10 may include an integrated power source 82 for powering the device 10. The power source 82 may include one or more batteries, such as a Li-Ion battery, which may be user-removable or secured to the enclosure 12. In certain embodiments, the proprietary connection I/O port 36 may be used to connect the device 10 to a power source for recharging the battery. In other embodiments, the one or more batteries may be non-integrated and may include one or more rechargeable or replaceable batteries. Further, in a non-portable setting, the power source 82 may include AC power, such as provided by an electrical outlet.

Figure 4:
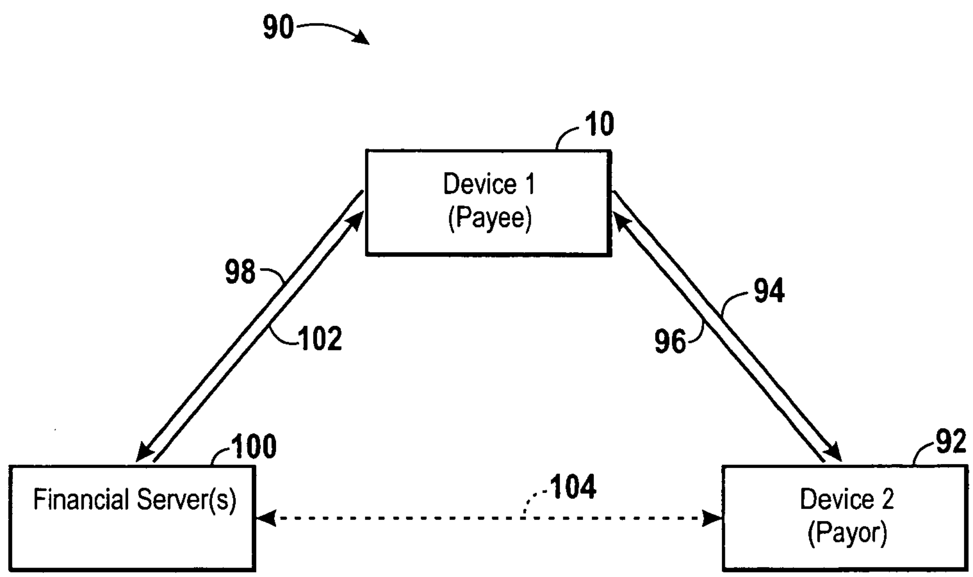
FIG. 4 is a block diagram illustrating the processing of a peer-to-peer transaction between the device of FIG. 1 and an external device in communication with the device of FIG. 1, wherein the device of FIG. 1 acts as a payee device, and wherein the external device acts as a payor device in the accordance with one embodiment.

As described above, the device 10 may include a transaction application (e.g., represented by icon 34) providing the device 10 the ability to initiate and receive transactions (e.g., payments and credits) from an external device. Referring now to FIG. 4, a system, generally designated by reference numeral 90, for conducting a peer-to-peer transaction between a first device 10 being operated by a "payee" and a second device 92 operated by a "payor" is illustrated. The second device 92 may be a portable device that is substantially identical to the first device 10 or, in other embodiments, may be a non-portable device, such as a desktop computer or a payment terminal, for example. As used herein, the term "payee" shall be understood to refer to one party in a transaction that is receiving a payment, and the term "payor" shall be understood to refer to another party in the transaction that is making the payment." Accordingly, the terms "payee device" and "payor device" shall be understood to refer to devices (e.g., the devices 10 and 92) being operated by a payee and a payor, respectively.

As shown in FIG. 4, the device 10 acts as the payee device of the transaction, and the second device 92 acts as the payor device. Initially, the payee device 10 may transmit a payment request, illustrated herein by reference numeral 94, to the payor device 92. The payment request information 94 may include information relating to the amount of a payment being requested by the payee device 10. The payment request information 94 may also include information indicating the identity of the payee, which may include text data corresponding to the name of the payee, an e-mail address belonging to and/or identifying the payee, or any other type of suitable identification information. Additionally, the payment request 94 may further include information indicating the purpose of the payment request. For example, the payment request 94 may be in response to a specific outstanding debt or balance owed to the payee by the payor.

In one embodiment, the payee device 10 and the payor device 92 may both be NFC-enabled devices each having a respective NFC device 46 and NFC interface 60, as described above. Initially, both the payee 10 and payor 92 devices may be in a passive mode of operation. Just prior to transmitting the payment request 94 to the payor device 92, the NFC device 46 of the payee device 10 may be powered on, thus transitioning the payee device 10 to an active mode in which an RF field is generated by the NFC device 46 of the payee device 10. Thus, when the payee device 10 and the payor device 92 are placed within a close enough proximity or distance to facilitate the establishment of an NFC connection (e.g., typically 2-4 cm), the RF field generated by the payee device 10 may induce the NFC device 46 of the payor device 92 to transition to an active mode of operation, thus establishing an NFC connection between the two devices, as discussed above. Accordingly, by way of this established NFC connection, the payment request information 94 may be transmitted to and received by the payor device 92.

Upon receiving the payment request information 94 from the payee device 10, the payor device 92 may display the received payment request information 94 on a display, such as the display 24 described above. Thus, the payor may review the payment request information 94 for accuracy and select a payment method to be used in providing the requested payment to the payor. The payment method may be, for example, a credit card account or a bank account belonging to payee. As discussed above, account information pertaining to the selected payment account may be stored on the payor device 92, such as in a secure storage area with the storage device 54 described above in FIG. 3. Thus, information pertaining to the selected payment method (e.g., credit card or bank account) may be stored in and retrieved from the secured storage area for transmission to the payee device 10 upon selection of a particular account by the payor.

Accordingly, once the desired payment account is selected, the payment account information, represented here by reference numeral 96, may be transmitted to the payee device 10. For example, like the transmission of the payment request information 94, the payment account information 96 may similarly be transmitted from the payor device 92 to the payee device 10 by way of the previously established NFC connection through each device's respective NFC interface 60, or by initiating a new separate NFC connection session if the previous NFC connection has already terminated (e.g., the distance between the devices exceeds the 2-4 cm range). In certain embodiments, the payee device 92 may also include security features 74 discussed above and may permit the transmission of the payment information 96 only if a password, PIN, or some other suitable form of authentication is first provided. Before continuing, it should be noted that the NFC-based exchange of payment information between the payee device 10 and the payor device 92 is provided merely by way example. Indeed, in other embodiments, any type of suitable communication interface, such as those described above with reference to the communication interface components 56 in FIG. 3, may be utilized.

Upon receiving the payment information 96 from the payor device 92, the payee may view the payment information 96 on the display 24 of the payee device 10. Thereafter, the payee may select a desired crediting account, which may be stored on the payee device 10, to which the payment represented by the payment account information 96 is to be credited or deposited. Once the crediting account is selected on the payee device 10, the requested payment amount, the payment account information 96, and the selected crediting account, collectively referred to as the "transaction information" and represented by reference numeral 98, may be transmitted by the payee device 10 to one or more financial servers 100 for verification of the account information and the subsequent authorization and processing of the requested payment. As will be appreciated, communication with the financial servers 100 may be accomplished through one or more of the communication interfaces described above. For instance, if the payee device 10 is a portable device having WLAN or WAN capabilities, the payee device 10 may communicate with the financial servers 100 via a wireless connection. If the device 10 is a non-portable device, then a LAN connection may be provided for communication with the financial servers 100. Regardless of the type of connection established between the device 10 and the financial servers 100, it should be understood that one or more of the data encryption techniques and security protocols (e.g., SSL or TSL protocols) discussed above with regard to the security features 74 of FIG. 3 may be further utilized in order to facilitate the secure transmission of the transaction data 98 to the financial servers 100.

As can be appreciated by those skilled in the art, the type or types of financial servers 100 to which in the transaction data 98 is transmitted may depend on the type of payment account selected by the payor and/or the type of crediting account selected by the payee. For instance, if the payment account selected by the payor is a credit card account and if the crediting account specified on the payee device 10 is a bank account, then the financial servers 100 may include both a bank server as well as a credit card verification server. By way of example, the transaction information 98 may first be transmitted to a bank server associated with a banking institution at which the specified crediting account is held for verification of whether the specified crediting account is a valid account and capable of receiving a credit card payment. As will be understood, the receipt of credit card payments to a bank account may constitute a special service that may require enrollment, subscription, or additional payment of fees by the payee. Thus, if the crediting account is not authorized to receive payments made using a credit card account, then the payee may be notified to select a different crediting account.

If it is determined that the selected crediting account is authorized to receive payments from a credit card account, then the transaction data 98 may be further transmitted to a credit card verification server in the form of an authorization request. The credit card verification server may be associated with a credit card company which maintains the payor's selected credit card account, such as American Express® or MasterCard®. The credit card verification server may process the transaction information 98 to determine whether a charge to the payor's credit card account in the amount specified in the payment request may be authorized. By way of example, the credit card verification server may first verify whether the credit card account information provided in the transaction information 98 corresponds to a valid credit card account belonging to the specified payor. The credit card verification server may further determine whether the line of credit associated with the credit card account is sufficient to satisfy the requested payment amount. If the credit card verification server determines that the specified credit card account is valid and is authorized to make the requested payment, then the credit card verification server may authorize a payment to the crediting account selected by the payee by charging the payor's credit card. The credit card verification server may then transmit an authorization message to the bank server indicating that the requested payment has been authorized and that the requested payment has been charged to the payor's credit card account and credited or deposited to the payee's crediting account (e.g., bank account).

The above-discussed interactions between the credit card verification server and the bank server are intended to illustrate just one possible scenario with regard to processing a transaction initiated by the payee device 10 or the payor device 92. Thus, it should be understood that various other types of scenarios may exist in which one or more types of financial servers are utilized for the processing of a peer-to-peer transaction in accordance with embodiments of the present disclosure. For instance, instead of a credit card verification server, a transaction may be processed by multiple bank servers in a scenario in which the specified crediting account and payment account are both bank accounts held at different respective banking institutions. It should be further understood that the communication between the various financial servers 100 described above may be provided by any suitable communication interface available on the payee device 10 and payor device 92, such as a WAN 68, LAN 66, or WLAN interface 58 to name just a few, and may include one or more security protocols, such as SSL or TSL, as well as one or more data encryption techniques for protecting the security and integrity of the transaction information 98.

As further illustrated in FIG. 4, once the transaction is processed, a completion message 102 may transmitted to the payee device 10. The completion message 102 may be received by the WAN, WLAN, LAN interfaces, as described above or, or in some embodiments may be transmitted through e-mail or by way of an SMS text message (e.g., via the SMS interface 70). The completion message 102 may indicate whether or not the requested transaction has been successfully processed. If the transaction is successful, then the completion message 102 may include a confirmation indicating to the payee that the requested payment 94 has been credited to the specified crediting account. Alternatively, if the transaction is unsuccessful for one or more reasons (e.g., the provided credit card account lacks sufficient funds or credit), then the completion message 102 may indicate that the transaction was unsuccessful and/or advise the payee to pursue an alternate method of payment.

In one embodiment, the payee device 10 may have multiple crediting accounts stored thereon, and payee may specify, such as via the user preferences 72, an order of priority with regard to the crediting accounts. For instance, the selected crediting account may automatically be selected as the crediting account having the highest priority ranking. Thus, if the reason that the transaction is unsuccessful is due to the currently selected crediting account (e.g., the account may not be configured to receive credit card payments), the transaction application may be configured to automatically initiate a subsequent transaction request to the financial servers 100 using the crediting account having the next highest priority setting. Additionally, the financial servers 100 or the payee device 10 may also transmit a confirmation message in the form of an electronic receipt, represented herein by reference numeral 104, to the payor device 92 if the transaction is processed successfully. The electronic receipt 104 may serve as acknowledgment that the requested payment has been satisfied by the payor and received by the payee.

While the one or more financial servers 100 in the examples provided above refer to multiple servers (e.g., bank servers and credit card verification servers), in certain scenarios, the one or more financial servers 100 may include a single financial server, such as in situations where the specified payment account and crediting account are held by the same financial institution (e.g., the same bank). In this scenario, the transaction authorization process described above may be performed by a single server associated with the common financial institution. Thus, it should be understood that the phrase "single server" may refer to more than one computing device in different locations, but that each of the computing devices are owned, operated, or otherwise associated with the same financial institution. Additionally, the one or more financial servers 100 need not necessarily be limited to financial servers configured to manage monetary assets. For instance, where a transaction involves non-cash assets, such as credits stored in an iTunes® account, as discussed above, the financial servers 100 may include a server managed by the iTunes® online server. Indeed, these additional embodiments with regard to the interactions of various financial servers 100 are also envisioned within the scope of the present disclosure and will be described in further detail below.

Continuing with the present disclosure, FIGS. 5A-10B illustrate, by way of a plurality of screen images, various methods and techniques for configuring the electronic device 10 for use with the above-described transaction application 34. The depicted screen images may be generated by the GUI 28 and displayed on the display 24. For instance, these screen images may be generated as the user interacts with the device 10, such as via the input structures 14, 16, 18, 20, and 22, and/or the touch screen interface 78. Specifically, these figures illustrate techniques and methods for storing payment account and crediting account information into the device 10, as well as for configuring one or more of the user preferences 72 and security features 74 described above with regard to FIG. 3, in accordance with embodiments of the present disclosure.

As discussed above, the GUI 28, depending on the inputs and selections made by a user, may display various screens including icons (e.g., 30) and graphical elements. These elements may represent graphical and virtual elements or "buttons" which may be selected by the user by physically touching their respective location on the display 24 using the touch screen interface 76, for example. Accordingly, it should be understood that the term "button," "virtual button," "graphical button," "graphical elements," or the like, as used in the following description of screen images below, is meant to refer to the graphical representations of buttons or icons represented by the graphical elements provided on the display 24. Further, it should also be understood that the functionalities set forth and described in the subsequent figures may be achieved using a wide variety graphical elements and visual schemes. Therefore, the present disclosure is not intended to be limited to the precise user interface conventions depicted herein. Rather, embodiments of the present disclosure may include a wide variety of user interface styles.

Figure 5A:
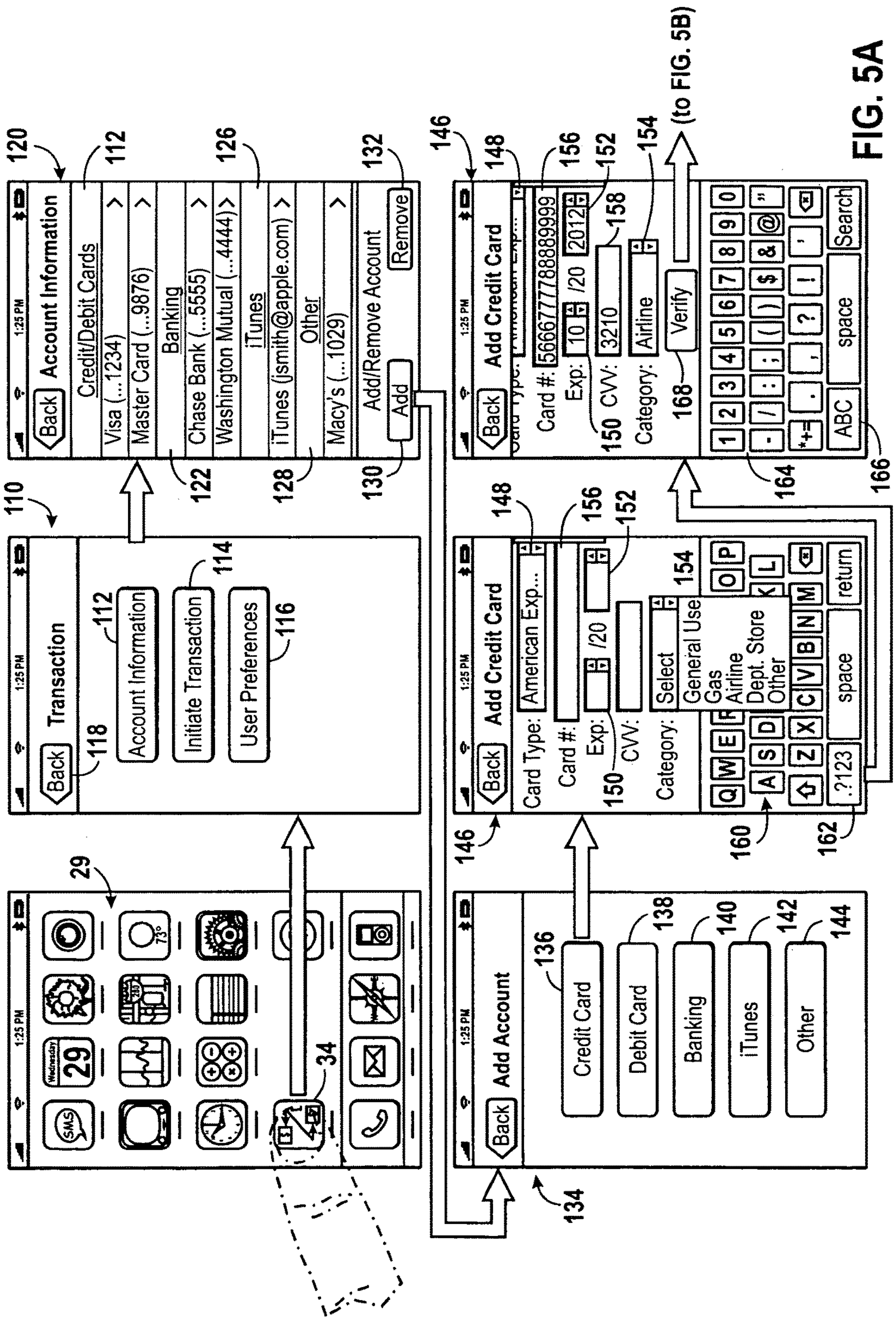
FIG. 5A shows a plurality of screens that may be displayed on the device of FIG. 1 illustrating a method for storing credit card information into the device of FIG. 1.
Figure 5B:
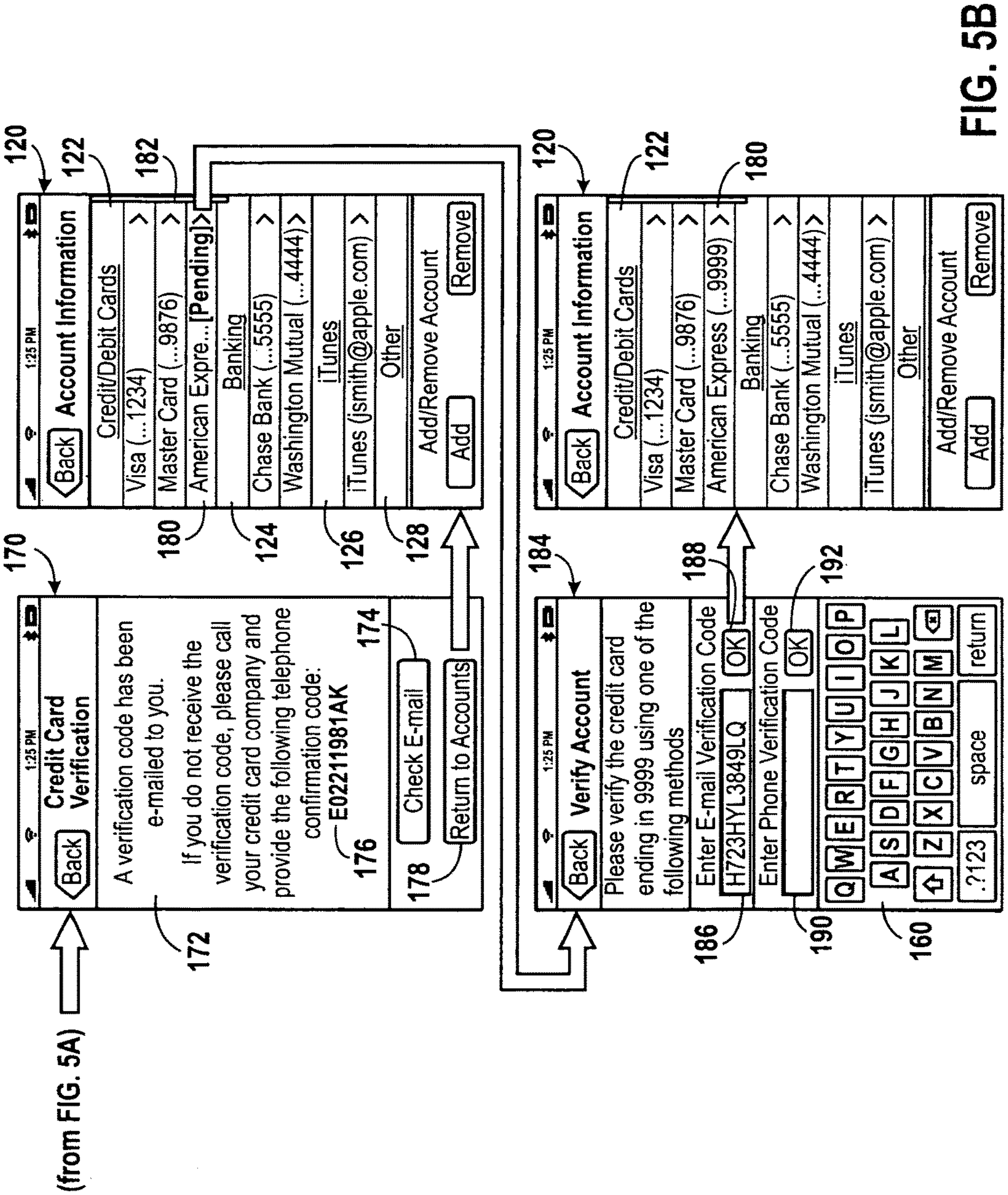
FIG. 5B shows a plurality of screens that may be displayed on the device of FIG. 1 illustrating a method for verifying the credit card information entered in FIG. 5A.

Referring first to FIGS. 5A and 5B, these figures collectively illustrate screen images that may be displayed on the device 10 when information representing a credit card account is entered and stored into the device 10 by a user. The stored credit card information may then be used as a payment account in conjunction with the transaction application described above. As shown in FIG. 5A, a user may initiate the transaction application by selecting the icon 34 displayed on the home screen 29 of the device 10. Upon selection of the icon 34, the transaction application may be initiated, such as via the CPU 50, and the user may be advanced to the screen 110, which may represent a "home" or "main" screen for the transaction application.

The screen 110 may include a plurality of graphical elements, represented by the reference numerals 112, 114, and 116. Each of the graphical elements 112, 114, and 116 may be displayed in the form of a button or key, and may include a brief description of a corresponding function or action associated therewith. For instance, the graphical button 112 may represent a function by which a user may view and modify account information stored on the device 10. The graphical button 114 may represent a function by which the user may initiate a peer-to-peer transaction, such as the transaction described above in FIG. 4. Further, the graphical button 116 may represent a function by which the user may view and modify a variety of user preferences, such as the user preferences 72 described above with reference to FIG. 3. The functionalities provided by the graphical button 116 may also allow the user to modify or access one or more of the security features 74 discussed above.

The present discussion will initially begin with a description of the functionalities provided by the graphical button 112. However, it should be kept in mind that the additional functionalities provided by the graphical buttons 114 and 116 will be discussed in further detail below. Additionally, as shown in FIG. 5A, the screen 110 may include the graphical button 118. The graphical button 118 may represent an action returning a user to a previous screen. For instance, if the user were to select the button 118 displayed on the screen 110 in FIG. 5A, the user would be returned to the home screen 29.

In order to enter and store a new credit card account into the device 10, the user may select the graphical button 112 to access the screen 120, which may display a listing of all accounts presently stored on the device 10. As illustrated by the screen 120, the presently stored accounts may be organized and displayed in accordance with certain categories. For instance, the account information screen 120 may display a first listing 122 of presently stored credit card accounts, a second listing 124 of presently stored banking accounts, a third listing 126 of presently stored non-cash accounts, as well as additional listings 128 of other accounts, which may include charge cards or loyalty cards associated with a specific vendor or retailer. Additionally, the account information screen 120 may include additional graphical elements representing the functions of adding additional accounts to or removing existing accounts from the device 10, as represented by the graphical buttons 130 and 132, respectively. Thus, to add a new account to the device 10, the user may select the graphical button 130. Further, if the user desires to remove a previously stored account displayed on one or more of the listings 122, 124, 126, or 128, the user may do so by selecting the graphical button 132.

As shown in FIG. 5A, upon selecting the graphical button 130, the user may be advanced to the screen 134. The screen 134 may include a plurality of graphical buttons 136, 138, 140, 142, and 144, each of which may represent categories of various types of accounts which may be stored onto the device 10. By way of example, the user may initiate the process of entering and storing a new credit card account by selecting the graphical button 136. This selection may advance the user to the screen 146. It should be understood, however, that if the user may chooses to select any of the other graphical buttons 138, 140, 142, or 144, for the entering of different account types, and that the selection of any of these other graphical buttons will advance the user to a respective appropriate screen.

Referring now to the screen 146, several drop-down style selection fields, illustrated by reference numerals 148, 150, 152, and 154 may be displayed. For instance, the drop-down selection field 148 may provide a listing of credit card brands corresponding to various credit card providers, upon which the user may make an appropriate selection based upon the particular credit card which the user desires to store in the device 10. Additionally, the drop-down fields 150 and 152 may provide the user with a selection of the month and year, respectively, corresponding to the expiration date associated with the new credit card account. As will be appreciated, the drop-down fields, when actuated or selected by a user, the drop-down fields may display a list of available options that may be selected to populate the respective drop-down field. For instance, referring to the drop-down field 154, which may represent the selection of a category corresponding to the type of credit card account being entered, the user may select a category from a listing of available categories generally describing various credit card account types. By way of example, the credit card may be generally used with regard to gas purchases, airline or travel purchases, or may be a general use card for a variety of purchases.

In accordance with one aspect of the present disclosure, one or more business methods may be provided in which agreements with one or more credit card providers may be reached in which the manufacturer of the device 10 may pre-configure the device 10 such that a particular credit card brand may be initially selected as a default selection. For instance, as shown in FIG. 5A, the drop-down field 148 may initially display the default credit card brand associated with a particular credit card provider (e.g., American Express®). Thus, if a user continues through the process depicted in FIGS. 5A and 5B and completes the steps of adding a credit card type of the default selection to the device 10, the manufacturer of the device 10 and the credit card provider may enter into an agreement in which the manufacturer of the device 10 receives a commission or fee each time a credit card account maintained by that credit card provider is stored onto a device sold and/or manufactured by the manufacturer. Additionally, the manufacturer of the device 10 may also reach an agreement with the credit card provider such that the manufacturer of the device 10 may receive a percentage of the credit card transaction fee paid to the credit card provider if the credit card transaction is performed using the device 10.

Continuing now with the description of FIG. 5A, the screen 146 may also further include several text fields, as depicted herein by the reference numerals 156 and 158. The field 156 may allow the user to enter the account number corresponding to the new credit card account. Additionally, the form field 158 may be provided to allow the user to enter a card verification value (CVV) code corresponding to the selected credit card. As will be appreciated, CVV codes are generally printed on the front or back of a credit card, and may also be encoded on the magnetic stripe on the credit card, and may serve as an additional security feature in credit card transactions, thus providing increased protection against credit card fraud. In an alternate embodiment, the CVV code may not be required when entering a new account and, instead, may be required by the device 10 each time the newly added credit card account is used in a transaction.

In order to input data into the fields 156 and 158, the screen 146 may include a graphical text input keyboard interface 160. The text input keyboard interface 160 may include a plurality of graphical buttons representing letters of the alphabet, for example, as well as buttons representing the standard "spacebar" and "backspace" functions on a keyboard. Accordingly, the user may use the text keyboard interface 160 to input text data into any text fields that may be displayed on the display 24 of the device 10. The text input keyboard 160 may also include a graphical button 162 that may allow the user to toggle between the text input keyboard 160 and a numerical keyboard 164. As shown in FIG. 5A, the numerical keyboard 164 may include a plurality of buttons representing the numbers 0-9, as well as several commonly used punctuation marks. The numerical keyboard 164 may also include the graphical button 166 by which the user may select to return to the text keyboard 160. By way of example, the user may switch from the text keyboard 160 to the numerical keyboard 164 in order to input the credit card account number and the CVV code into the form fields 156 and 158. Additionally, if the need arises to return to the text keyboard 160, the user may do so by selecting the graphical button 166 on the numerical keyboard 164. In additional embodiments, the numerical and text input features may be integrated into a single graphical keyboard interface.

Once all the credit card information required by the drop-down fields 148, 150, 152, and 154, and the text fields 156 and 158 has been provided by the user, the user may select the graphical button 168 to begin a credit card verification process. This verification process may generally serve the purpose of verifying that the user performing the steps of entering the credit card account into the device 10 is either the credit card account holder or an authorized user. For instance, during the verification process, the credit card information entered in the screen 146 may be transmitted to the corresponding credit card provider. As discussed above, the transmission of the credit card information may be accomplished through one or more of the above-described communication interfaces and be protected by one or more of the above-described encryption and security methods.

Referring now to FIG. 5B, once the credit card provider has verified that the credit card information provided by the device 10 is valid, the credit card provider may confirm the identify of the user by transmitting one or more verification codes to the device 10. For instance, referring to the screen 170, a notification message 172 may be displayed informing the user that a verification code for activating the credit card to be used on the device 10 has been provided, such as by e-mail, for example. As will be appreciated, the e-mail address to which the verification code is sent may be the e-mail address associated with the credit card account and contained in records maintained by the credit card provider. Thus, this ensures that only the authorized user or users will receive the verification code. Accordingly, the credit card verification screen 170 may include a graphical button 144, which may execute an e-mail program through which the user may retrieve e-mail messages to obtain the verification code.

Additionally, by selecting the graphical button 178, the user may return to the screen 120, which may be updated to include the new credit card account 180 entered by the user via the screen 146, as discussed above. The screen 120, at this point in the process, may indicate that the newly entered credit card account 180 may not be used to make payments from the device 10 until an authorization or activation action, such as providing the above-described verification code, is performed. Once the user has obtained the e-mailed verification code discussed above with reference to the screen 170, the user may proceed to the screen 184 to enter the verification code, and thus activate the credit card account 180 for use on the device 10. For example, as illustrated in FIG. 5B, the user may select the location of the new credit card account 180 on the screen 120 to proceed to the screen 184.

As illustrated in the screen 184, the user may be provided with a text field 186 for entering the e-mail verification code described above. The verification code may be entered using the text input keyboard 160 and/or the numerical keyboard 164, which may be accessed by selecting the graphical button 162. Once the e-mail verification code is entered, the user may select the graphical button 188, thereby completing the verification process and returning the user to the screen 120. If the verification code provided by the user in the text field 186 matches the verification code provided by the credit card provider, as discussed above, newly entered credit card account 180 will be authorized and ready for use in conjunction with the transaction application 34, as shown in the final updated screen 120 of FIG. 5B.

In the event that the e-mail verification code is not received for some reason, the user may alternatively provide a phone verification code in the text field 190 to activate the credit card account 180. For instance, referring back to the screen 170, a telephone confirmation code 176 is also provided in the notification message 172. In one embodiment, in order to obtain the phone verification code, the user must provide the telephone confirmation code 176 to the credit card provider, such by way of a telephone call, in order to receive a corresponding telephone verification code which may differ from the e-mail verification code, but will permit the use of the newly entered credit card 180 by the transaction application 34 if correctly entered. Thus, the user may enter the telephone verification code into the text field 190 and select the graphical button 192 as an alternate method for authorizing the newly entered credit card account 180 for use with the transaction application 34.

Figure 6A:
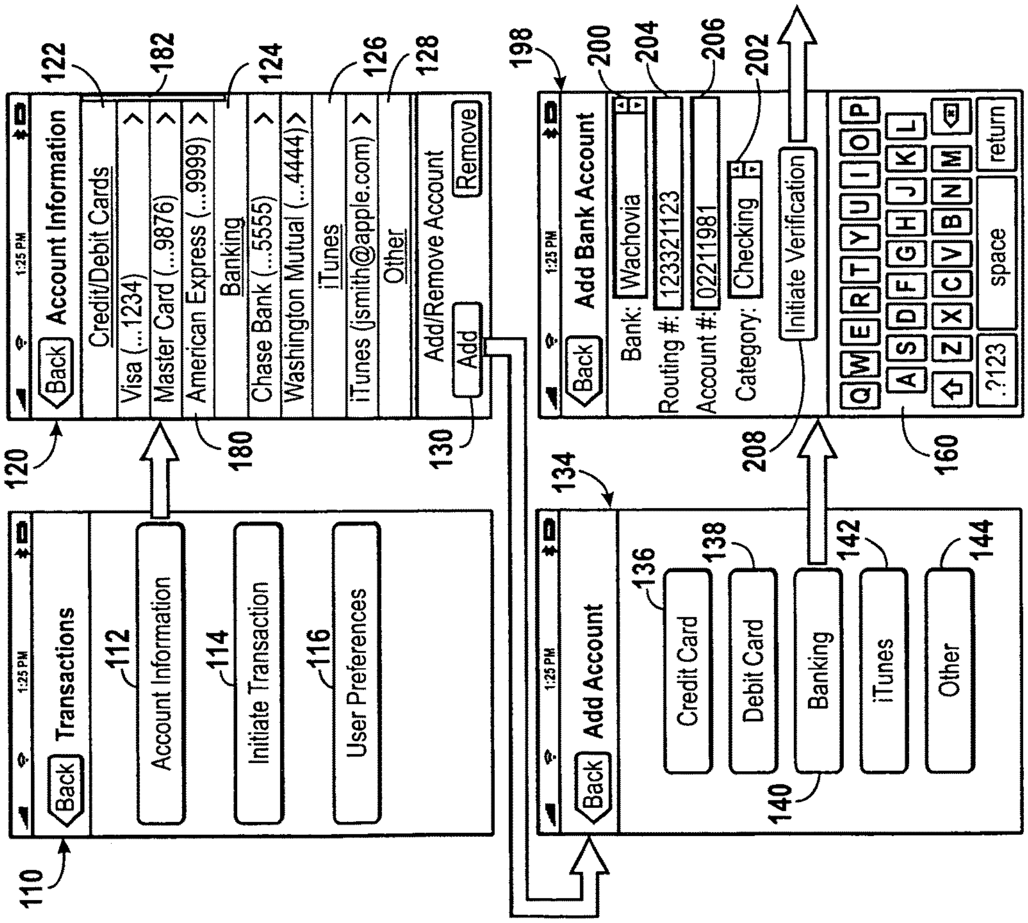
FIG. 6A shows a plurality of screens that may be displayed on the device of FIG. 1 illustrating a method of storing banking information into the device of FIG. 1.
Figure 6B:
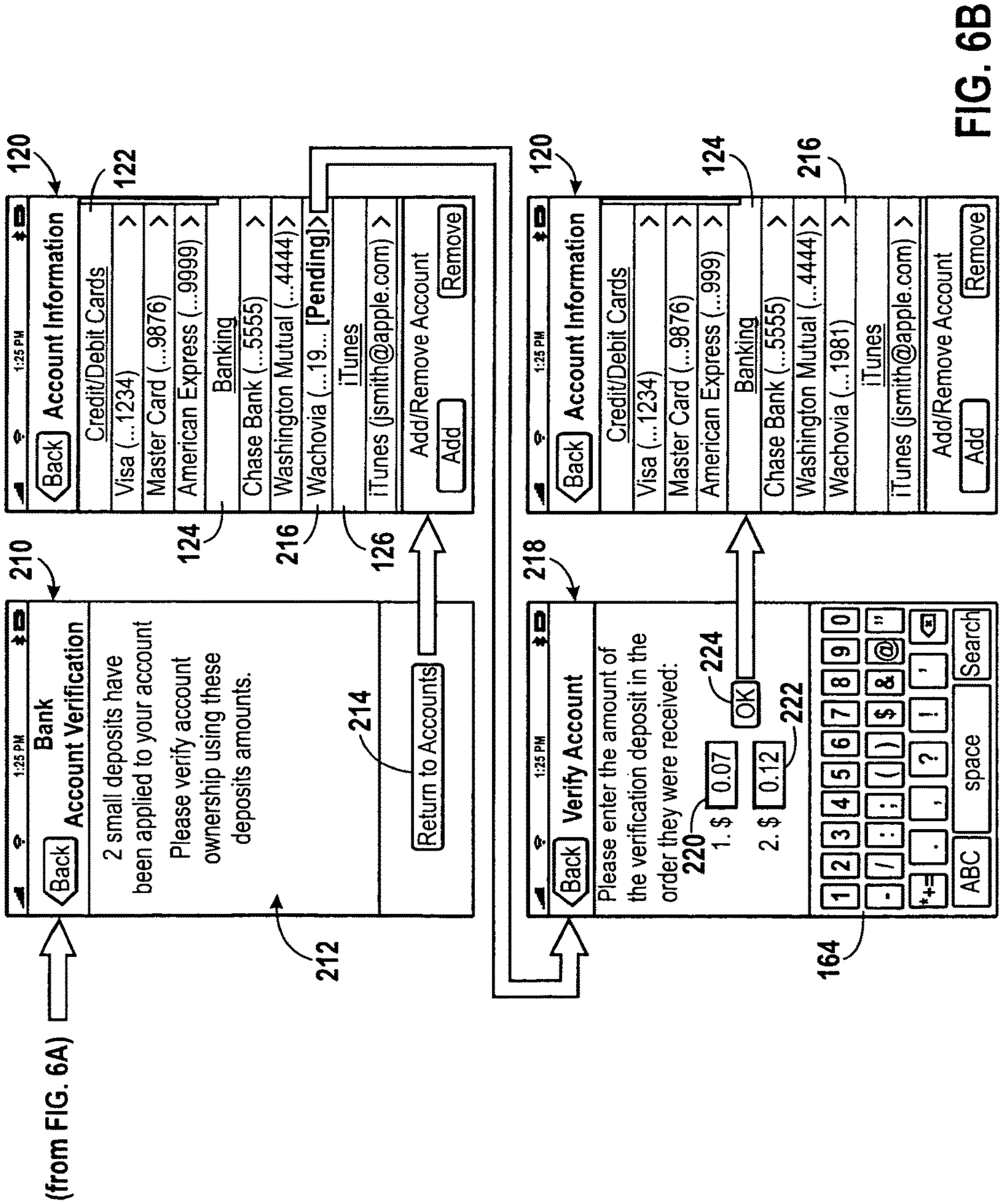
FIG. 6B shows a plurality of screens that may be displayed on the device of FIG. 1 illustrating a method for verifying the banking information stored in FIG. 6A.

Continuing now to FIGS. 6A and 6B, these figures depict, by way of screen images, a method for entering and storing a bank account onto the electronic device 10. As will be appreciated, several aspects of the process illustrated by FIGS. 6A and 6B may be similar, if not identical, to the steps discussed above with reference to FIGS. 5A and 5B. Beginning with FIG. 6A, a user may select the graphical button 112 on the screen 110 to access the screen 120 which as discussed above, may display a listing of all accounts presently stored on the device. As illustrated in FIG. 6A, the credit card account 180 that was entered by the user in FIGS. 5A and 5B is included in the listing 122 of stored credit card accounts.

Next, the user may select the graphical button 130 on the screen 120 to advance to the screen 134. As discussed above, the screen 134 may display the graphical buttons 136, 138, 140, 142, and 144, each of which may represent categories of various types of accounts which may be stored onto the device 10. Accordingly, to enter and store a new bank account, the user may select the graphical button 140 to proceed to the screen 198. As shown in FIG. 6A, the screen 198 may be similar to the screen 146 discussed above in that a plurality of drop-down fields (e.g., 200, 202) and text fields (e.g., 204, 206) may be provided. By way of these fields, the user may enter the required bank account information onto the device 10. For instance, the drop-down fields 200 may allow the user to select the identity of the banking provider associated with the new bank account. The drop-down field 202 may also provide for the selection of the type of banking account being stored which may be, for example, a checking account, a savings account, a money market account, and so forth. Further, the text fields 204 and 206 may allow the user to enter a routing number for the banking provider and the account number associated with the bank account, respectively. The text keyboard 160 may be provided on the screen 198 for entry of data into the fields 204 and 206. Additionally, as discussed above, a numerical keyboard 164 may be accessed via selection of the graphical button 162 when the input of numerical data, such as the above-mentioned routing and bank account numbers, is required.

Once the required bank account information is entered into the drop-down fields 200 and 202 and the text fields 204 and 206, the user may select the graphical button 208 to initiate the process of verifying and authorizing the entered bank account for use with the transaction application 34 on the device 10. As can be appreciated, certain aspects of the verification process with respect to the entered bank account may be similar to the credit card verification process described above with respect to FIG. 5B. For instance, during the verification process, the bank account information entered in the screen 198 may be transmitted to banking provider selected in the drop-down field 200. As discussed above, the transmission of the bank account information may be accomplished through one or more of the above-described communication interfaces (e.g., the interfaces 58, 60, 62, 64, 66, 68, and 70) and be protected by one or more of the above-described encryption and security methods.

Continuing now to FIG. 6B, once the banking provider has verified that the bank account information transmitted by the device 10 represents a valid bank account, the banking provider may confirm the identify of the user using any suitable type of authentication technique. For example, in the illustrated embodiment, the banking provider may initiate one or more verification deposits into the bank account. As will be appreciated by those skilled in the art, verification deposits are usually relatively small amounts (e.g., less then $1.00 USD) and may be used to confirm the identity of the account holder. For instance, the banking provider may require that the account holder provide the exact values of the verification deposit amounts before the newly entered bank account may be authorized for use with the transaction application 34. By way of example, referring now to the screen 210 in FIG. 6B, once the banking provider has verified the validity of the bank account entered in the screen 198, the notification message 212 may be displayed. In the illustrated embodiment, the notification message 212 may inform the user that two verification deposits have been credited to the newly entered bank account, although it should be understood that any number of verification deposits may be used in the confirmation process.

The user may select the graphical button 214 to return to the screen 120, in which the listing 124 may be updated to include the newly entered bank account, as indicated by the reference numeral 216. Like the screen 120 depicted in FIG. 5B, the screen 120 of FIG. 6B may indicate that the new bank account 216 may not be used to make payments using the device 10 until the above-discussed verification deposit amounts have been confirmed with the banking provider. Accordingly, the user may be required to determine the amounts of the verification deposits, such as by viewing a banking statement issued subsequent to deposit of the verification amounts, for example.

After determining the verification deposit amounts, the user may access the screen 218 by selecting the location of the new bank account 216 on the screen 120. As shown in FIG. 6B, the screen 218 may display the text fields 220 and 222, by which the user may enter the amounts of the two verification deposits. Additionally, the screen 218 may include the numerical keyboard 164 by which the user may input the verification deposit amounts into the fields 220 and 222. Once the verification deposit amounts have been entered, the user may complete the confirmation process by selecting the graphical button 224 and returning to the screen 120. As shown in FIG. 6B, if the deposit amounts entered by the user in the screen 218 match the verification amounts deposited by the banking provider, then the newly entered bank account 216 will be authorized and ready for use in conjunction with the transaction application 34, as shown in the final updated screen 120 of FIG. 6B. As will be discussed in further detail below, a bank account stored on the device 10 (or the device 92) may be used as both a crediting account and a payment account depending on whether the device 10 is assuming the role of the payee device or the payor device.

Continuing now to FIGS. 7-10B, the device 10, as discussed above, may include one or more preference settings, such as those represented by reference numeral 72 in FIG.

3, which may either be pre-configured by the manufacturer or later configured by the user. By way of example, the preference settings 72 may include the selection of a default payment account, a default crediting account, as well as additional settings, such as the selection and storing of an authorization PIN number for security purposes. Thus, the screen images illustrated in FIGS. 7-10B are intended to illustrate, by way of example, techniques by which the user may operate the device 10 to configure the aforementioned preference settings.

Figure 7:
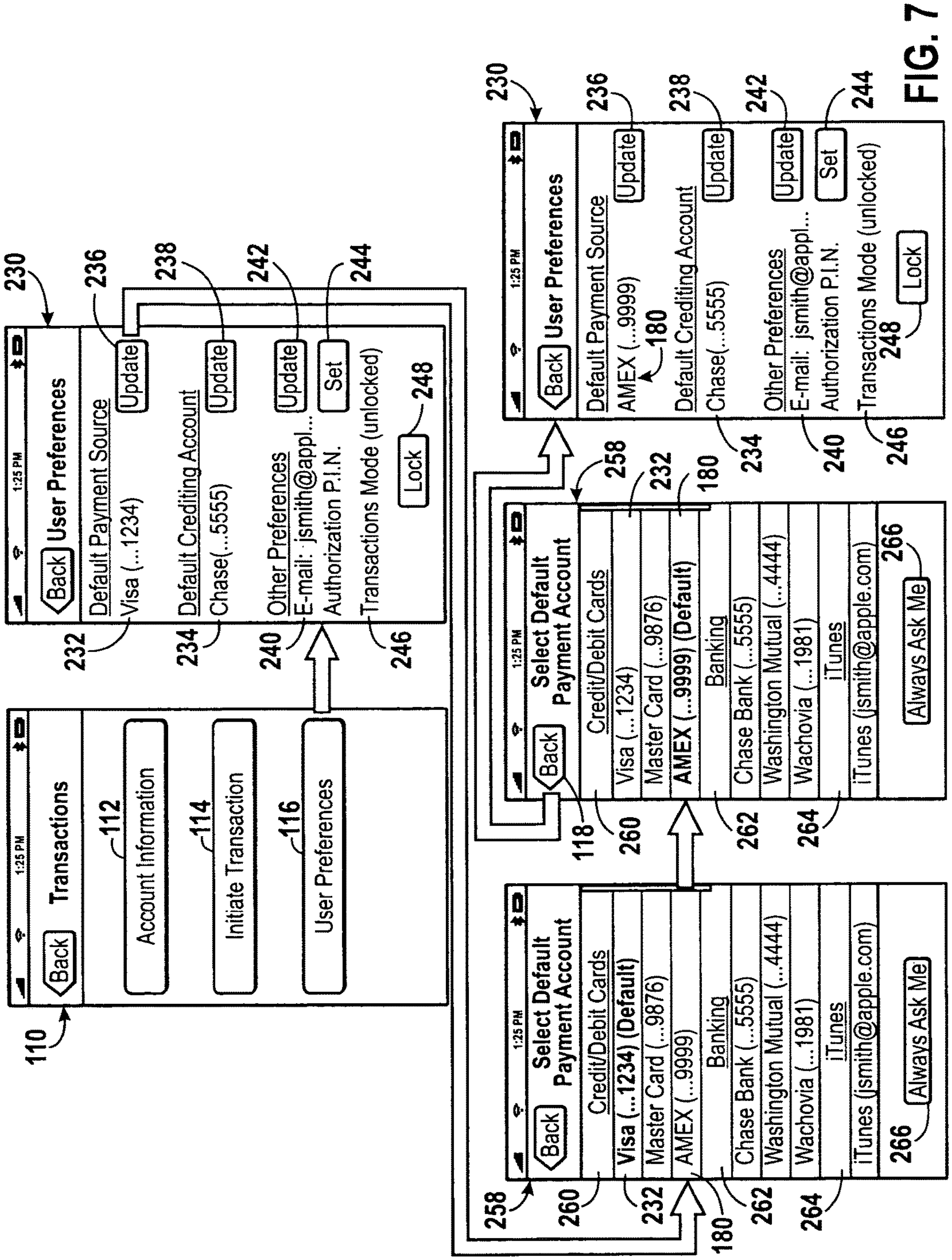
FIG. 7 shows a plurality of screens that may be displayed on the device of FIG. 1 illustrating a method for configuring a default payment account on the device of FIG. 1.

Referring first to FIG. 7, the selection of a default payment account may initially begin from the screen 110. There, the user may select the graphical button 116 to access the screen 230, which may display the present configuration of one or more user preferences on the device 10. In the illustrated embodiment, the user preference settings displayed on the screen 230 may include a presently selected default payment account 232 and a presently selected default crediting account 234. The screen 230 may also include the graphical buttons 236 and 238, which may be displayed next to the default accounts 232 and 234, respectively, and may allow the user to modify or change the default account settings if selected.

As will be discussed in further detail, the screen of 230 may additionally display various other preference settings, such as user-entered e-mail address 240 which may identify the user of the device 10 and which may also be used by the transaction application 34 for receiving payment receipts, for example. As shown in FIG. 7, the user may update the e-mail address setting 240 via selecting the graphical button 242. The screen 230 may further include the graphical button 244, by which the user may select to input and store an authorization PIN code, as well as indicate a permission status with regard to the transaction application 34. For instance, as indicated by reference numeral 246, the transaction application 34 may be in an "unlocked" mode, and may thus be used by the user to perform the transactions generally described above. For security purposes, the user may toggle this permission setting 246 between an unlocked and a locked mode, such as via selecting the graphical button 248, whereby the transaction application 34 may be disabled when in the locked mode. As will be appreciated, when the transaction application 34 is locked, the user may be unable to send or receive payments using the device 10. In certain embodiments, the transaction application 34 may only be unlocked upon providing an authorization PIN, as will be explained in further detail below.

Referring back to the default payment account 232 setting, the user may update this preference setting by selecting the graphical button 236, which may advance the user to the screen 258. The screen 258 may display a listing of all accounts presently stored on the device that may be selected as a payment account. In the illustrated embodiment, the listing of accounts may be organized into the categories designated by reference numerals 260, 262, and 264. As can be appreciated, this may be similar to the listing of the accounts described on the screen 120 with reference to 5A. The listing 260 may correspond to a listing of credit card accounts presently stored on the device 10. As shown in the listing 260, the credit card account 232 that was displayed on the previous screen 230 may be indicated as being the presently selected default payment account. Here, the user may have the option of selecting one of the other listed accounts as the default payment account. Additionally, the user may select the graphical button 266 if the user does not wish to configure a default payment account setting. For example, by selecting the graphical button 266, the transaction application 34 may prompt the user to select a payment account each time a payment is being made using the device 10.

In the present embodiment, the user may select the credit card account 180 that was entered in FIGS. 5A and 5B. For instance, the user may select the credit card account 180 by selecting its general location on the screen 258. Thereafter, the previously selected default payment account (e.g., credit card account 232) may be deselected, and the credit card account 180 may be indicated on the screen 258 as the presently selected default payment account. Next, the user may select the graphical button 118 to return to the screen 230, which may be updated to display the credit card account 180 as the newly selected default payment account.

Figure 8:
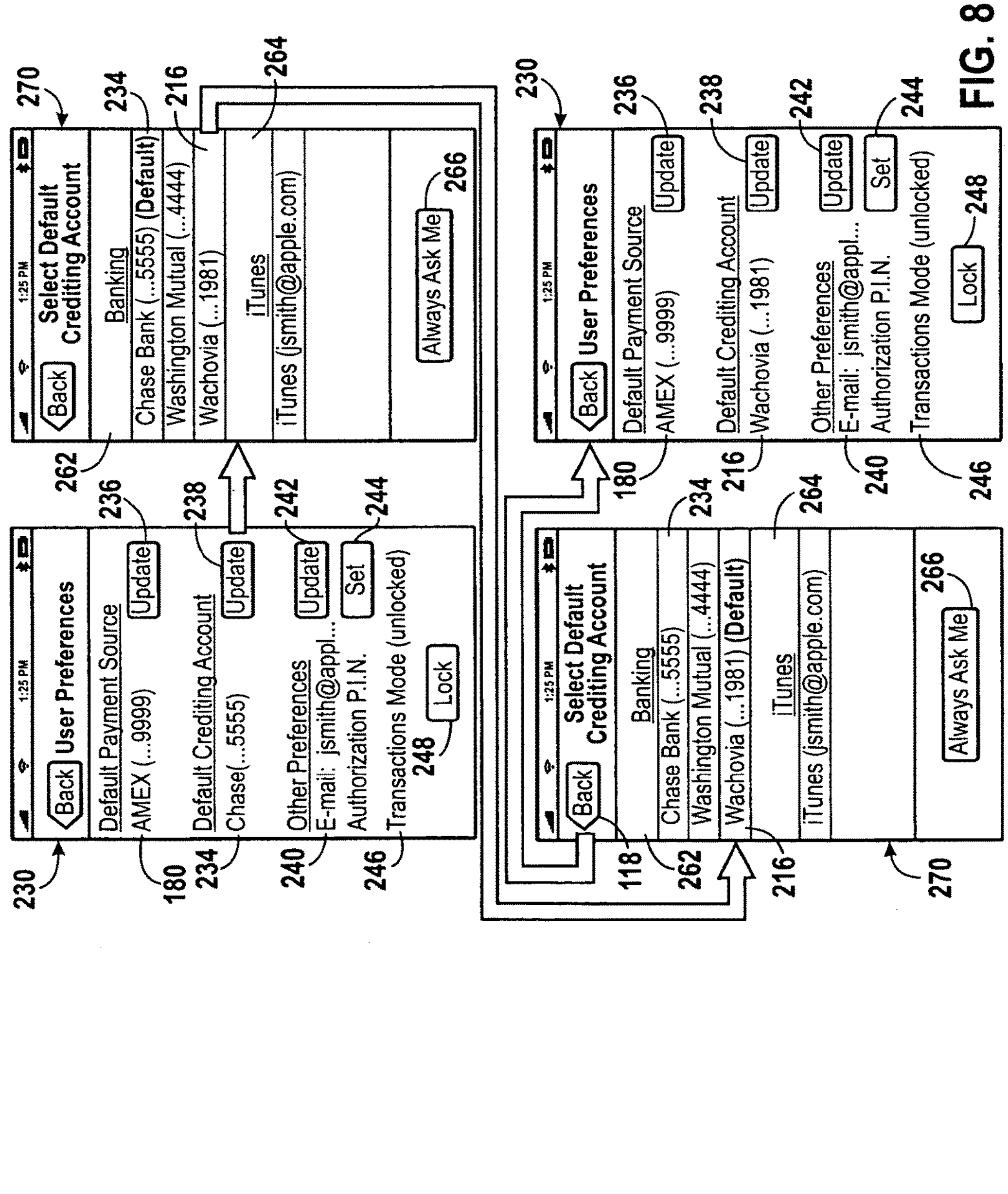
FIG. 8 shows a plurality of screens that may be displayed on the device of FIG. 1 illustrating a method for configuring a default crediting account on the device of FIG. 1.

Continuing now to FIG. 8, this figure shows additional screen images in which the user may select a default crediting account. As illustrated, the user may select the graphical button 238 on the screen 230 to access the screen 270. The screen 270 may display a listing of all accounts presently stored on the device that may be selected as a crediting account. For instance, the screen 270 may display the listing 262 of bank accounts and the listing 264 of non-cash accounts. However, the screen 270 may omit the listing 260 of credit card accounts discussed above with reference to the screen 258 of FIG. 7, since credit card accounts are not generally used as a medium to accept payment credits or deposits.

As shown in the listing 262, the bank account 234 that was displayed on the previous screen 230 may be indicated as being the presently selected default crediting account. Accordingly, the user may have the option of selecting one of the other listed accounts on the screen 230 as a default crediting account. By way of example, the user may select the bank account 216 that was entered in FIGS. 6A and 6B. For instance, the user may select the bank account 216 by selecting its general location on the screen 270. Thereafter, the previously selected default crediting account 234 may be deselected, and the bank account 216 may be indicated on the screen 270 as being the presently selected default crediting account. Next, the user may select the graphical button 118 to return to the screen 230, which may be updated to display the bank account 216 as the newly selected default payment account. Additionally, as discussed above, the user may select the graphical button 266 if the user does not wish to configure a default crediting account setting and, instead, prefers to be prompted to select a crediting account each time a payment is received via the device 10.

Once the default payment account (e.g., credit card account 180) and the default crediting account (e.g., bank account 216) have been configured by the user in the manner described above with reference to FIGS. 7 and 8, the user may continue to configure additional preference settings from the screen 230. For example, referring now to FIG. 9, a plurality of screen images depicting a method for selecting an authorization PIN is illustrated. Beginning with the screen 230, the user may select the graphical button 244 to access the screen 280. The screen 280 may include an instructional message 282 generally instructing the user to select a desired authorization PIN having a certain number of characters. For instance, in the illustrated embodiment, the device 10 may be configured to store a four digit PIN. However, it should be appreciated that other implementations may utilize authorization PINs of any desired length.

As illustrated in the screen 280, the user may enter the desired PIN 286 into a text field 284 by way of the numerical keyboard 164. Additionally, in embodiments where the device 10 may support PIN codes having both text and numerical characters, the user may access the text keyboard 160 (not shown in FIG. 9) by selecting the graphical button 166, as discussed above. Once the desired PIN 286 has been entered, the user may confirm the entered PIN 286 by selecting the graphical button 288, which may update the screen 280 to display a confirmation message 290 instructing the user to re-enter the selected PIN 286 into the confirmation text field 292. Thus, the user may re-enter the selected PIN 286 into the text field 292 by way of the numerical keyboard 164.

Once the PIN 286 has been entered into the text field 292, the user may complete the authorization PIN selection process by selecting the graphical button 294. As will be understood by those skilled in the art, upon the selection of the graphical button 294, the device 10 may determine whether the authorization PIN codes entered into the text fields 284 and 292 are identical. If the PINs entered into the text fields 284 and 292 do not match, either due to an erroneous user input or for any other reason, then the user may be notified of the mismatch (not shown in FIG. 9) and may be required to re-enter the PIN 286 into each of the text fields 284 and 292 once again. If the entered PINs are determined to be identical, then the PIN 286 may be stored on the device 10 for use as an authorization PIN code to provide additional security features with regard to various aspects of the transaction application 34, as will be discussed in further detail below. Thereafter, once the authorization PIN 286 is confirmed and stored into the device 10, the user may be returned to an updated screen 230 in which the graphical button 244 is replaced with the graphical button 298 corresponding to a function by which the user may edit or modify the presently stored authorization PIN code 286.

Figure 9:
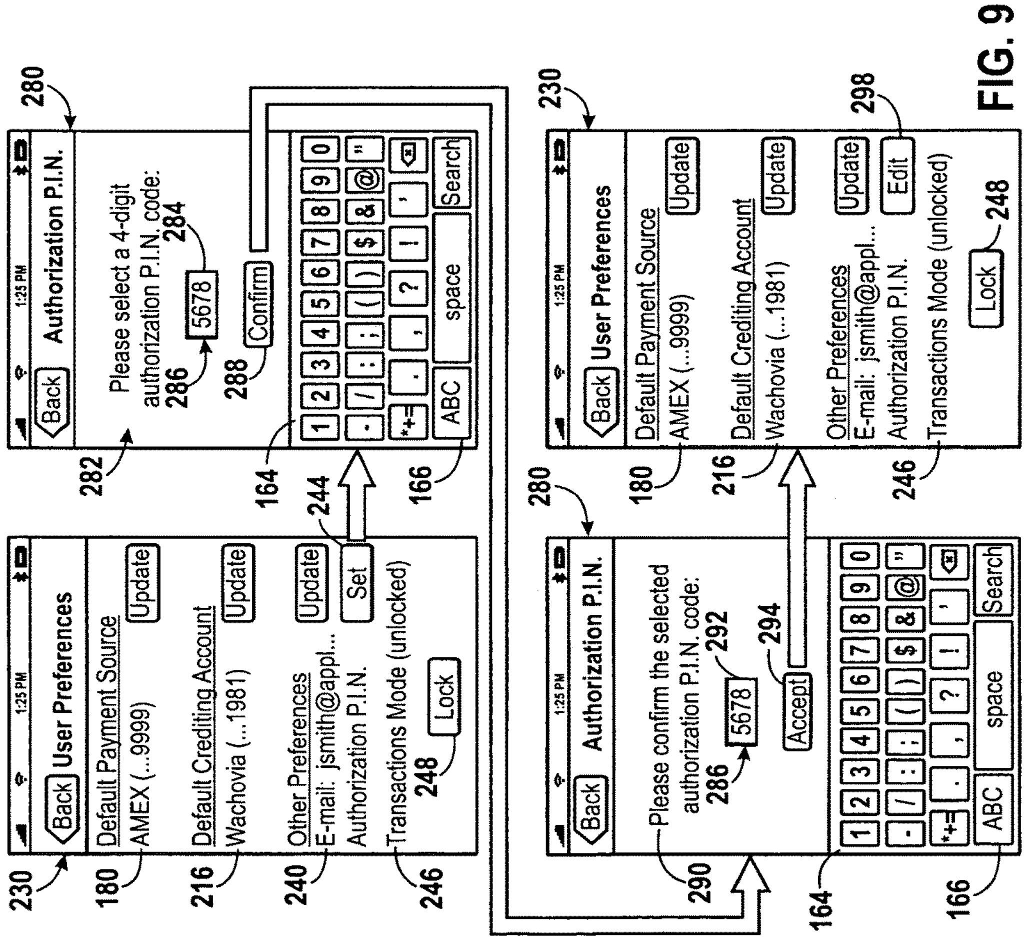
FIG. 9 shows a plurality of screens that may be displayed on the device of FIG. 1 illustrating a method for configuring an authorization PIN code in accordance with one embodiment.

In addition to providing the user with the function of selecting and storing the authorization PIN code 286, the user preference settings for the device 10 may additionally provide a function that locks or disables the transaction application 34, thus preventing the device from receiving, sending, or processing transaction requests while the transaction application 34 is locked. For example, once locked by the user, the transaction application 34, in one embodiment, may remain in the locked or disabled state until the authorization PIN 286 that was stored by the user in FIG. 9, is entered. These techniques with regard to the locking and subsequent unlocking of the transaction application may be better understood with reference to FIGS. 10A and 10B.

Figure 10A:
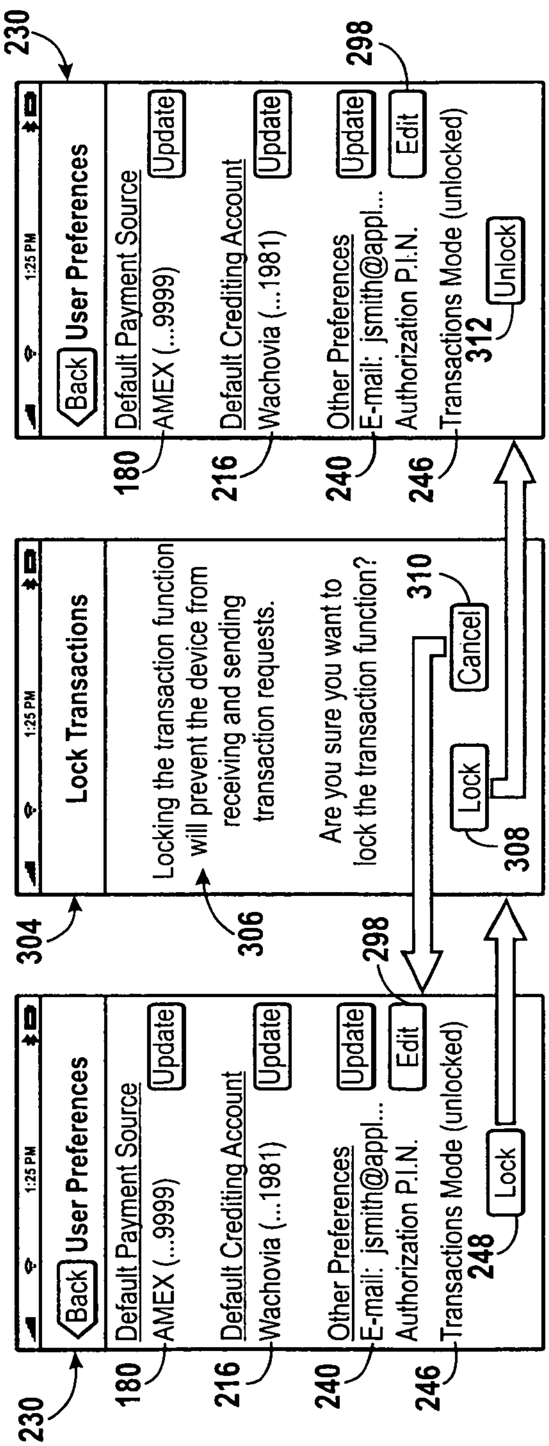
FIGS. 10A and 10B show a plurality of screens that may be displayed on the device of FIG. 1 illustrating a method for locking and unlocking a transaction application stored on the device of FIG. 1 in accordance with one embodiment.

Referring first to FIG. 10A, the screen 230, as discussed above, may display an indication of the current status of the permission setting 246 for the transaction application 34, which may presently indicate the transaction application 34 is in an unlocked state. In order to lock the transaction application 34, the user may select the graphical button 248 to access the screen 304. As shown in the screen 304, a notification message 306 may be displayed generally informing the user that the device 10 will be unable to receive or send transaction requests if the transaction application 34 is locked. If the user chooses to lock the transaction application 34, the user may do so by selecting the graphical button 308 on the screen 304. As shown in FIG. 10A, the selection of the graphical button 308 will lock the transaction application 34 and return the user to the screen 230, which may be updated to indicate that the permission setting 246 is presently in a locked state. It should be noted that the graphical button 248 may be replaced on the updated screen 230 with the graphical button 312 which, when subsequently selected, may represent a function allowing the user to unlock the transaction application 34. Additionally, if at the screen 304, the user decides not to lock the transaction application 34, the user may select the graphical button 310, thus returning to the previous screen 230 where the permission setting 246 for the transaction application is indicated as being unlocked.

Figure 10B:
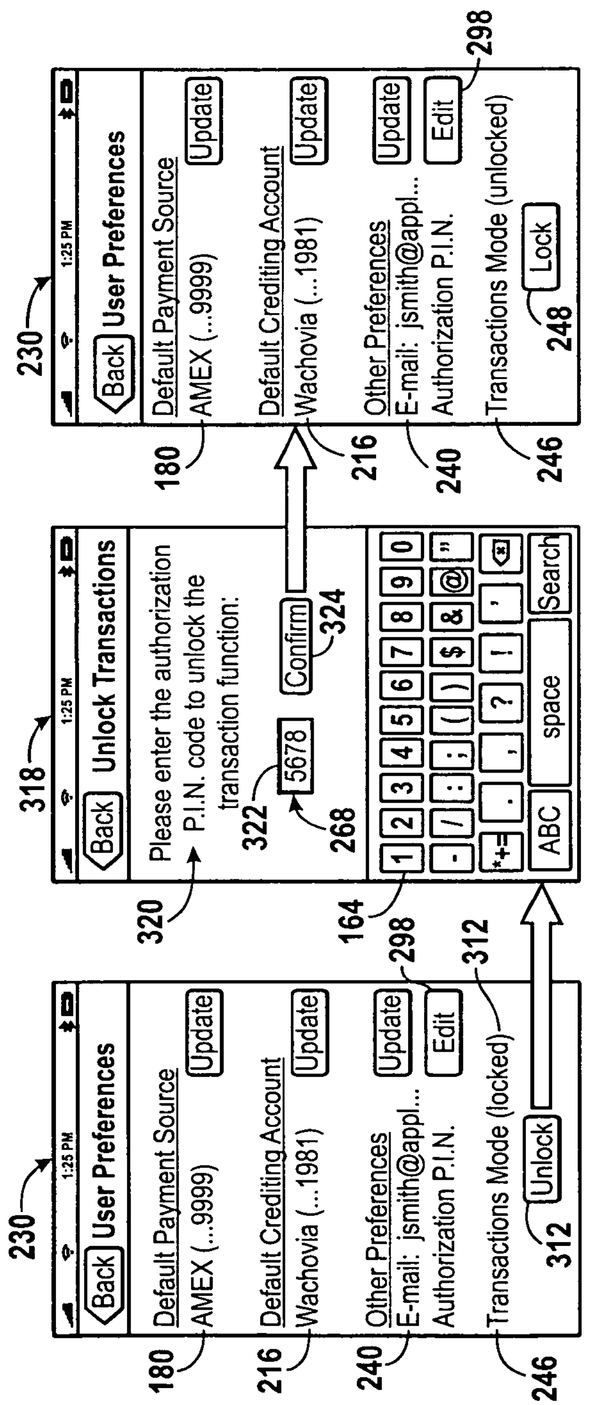

Continuing now to FIG. 10B, if the user chooses to lock the transaction application 34 in FIG. 10A, the user may select the graphical button 312 on the screen 230. Upon the selection of the graphical button 312, the user may be advanced to the screen 318, which may display the notification message 320, the field 322, and the graphical button 324. The notification message 320 may instruct the user to enter the authorization PIN 268 selected in FIG. 9. As shown here, the numerical keyboard 164 may be provided for entry of the authorization PIN 268 into the text field 322. Once the authorization PIN 268 has been entered, the user may confirm the unlock request by selecting the graphical button 324, which may return the user to the screen 230, wherein the permission setting 246 is updated to reflect that the transaction application 34 is once again in an unlocked state, thus re-enabling the functions of receiving and sending transaction requests using the device 10. Additionally, it should be noted that the graphical button 312 may be replaced with the graphical button 248, described above.

Figure 11A:
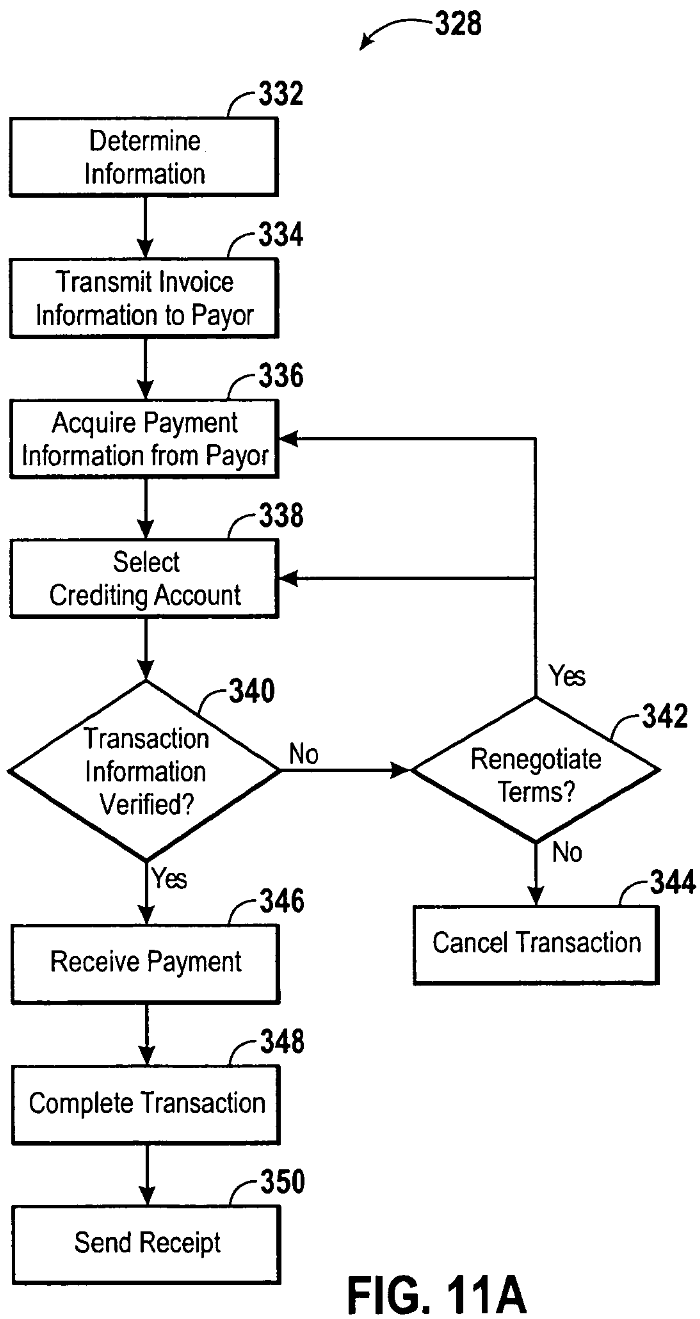
FIG. 11A depicts a flowchart illustrating a method of operating the payee device of FIG. 4 to initiate a transaction in accordance with one embodiment.
Figure 11B:
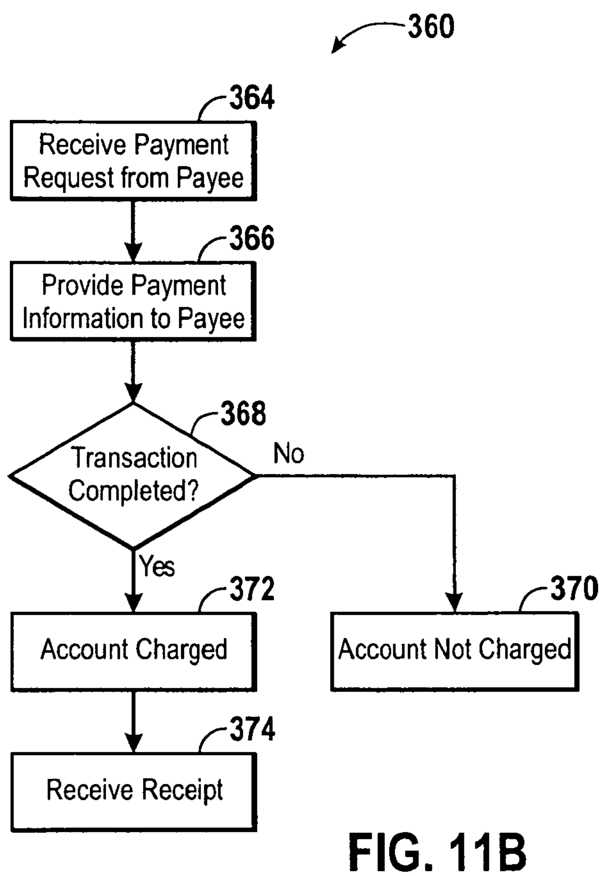
FIG. 11B depicts a flowchart illustrating a method of operating the payor device of FIG. 4 to respond to the transaction initiated by the method of FIG. 11A in accordance with one embodiment.

Having described the configuration of various aspects relating to the transaction application 34 that may be executed on the device 10, FIG. 11A illustrates a method for initiating and subsequently processing a transaction from the viewpoint of a payee, generally designated by the reference numeral 328. Similarly, FIG. 11B illustrates a method 360 describing the receipt of a transaction request and the subsequent action of making a payment in response to the transaction request from the viewpoint of a payor. It should be understood that the methods 328 and 360, in some situations, may occur at least partially concurrently.

Beginning with FIG. 11A, the method 328 may begin with the determination of an invoice at step 332. As will be understood, the term "invoice" may refer to the general terms of a payment request, which may include the amount of the requested payment, the identity of the requesting payee, as well as additional information describing the nature or reasons as to why the payment is being requested. Once the terms of the invoice are determined at step 332, the invoice information may be transmitted to the payor, as indicated by step 334. By way of example, the transmission of the invoice information described in the method 328 may be correspond to the communication of the payment request information 94 from the payee device 10 to the payor device 92, as discussed above with reference to FIG. 4.

Thereafter, the payee may await the transmission of information representing a payment account from the payor, as indicated by step 336. As discussed above, the receipt payment information from the payor may indicate an acknowledgement and acceptance of the requested payment from step 334. Upon receiving the payment information from the payor, the payee, at step 338, may select a crediting account on the device 10 to which the payee wishes the requested payment to be credited or deposited. For instance, as discussed above, the crediting account may be automatically selected as user-specified default crediting account 216, as described above with reference to FIGS. 6A and 6B, and/or may be manually selected by the user.

Next, the payment request information determined at step 332, the payment information received from the payor at step 336, and the selected crediting account from step 338, which may altogether be referred as the "transaction information," may be transmitted to one or more appropriate financial servers 100 for the validation and processing of the requested transaction. For instance, as noted above, the types of financial servers 100 to which the transaction information may be transmitted may depend on the types of payment and crediting accounts selected by the payor and the payee, respectively.

The transaction information may be processed at decision step 340 to determine whether the requested transaction may be authorized. If it is determined at step 340 that the financial servers 100 are unable to authorize one or more of the payment account or the crediting account for carrying out the requested transaction, then the method 328 may proceed to the decision step 342, whereby the payee may be prompted to renegotiate the terms of the present transaction. By way of example, if the payee wishes to renegotiate the terms of the transaction, the payee may either return to step 336 to receive an alternate payment account from the payor, or may return to step 338 to select an alternate crediting account. As will be appreciated, the decision as to whether to return to step 336 or 338 may depend on the reason or reasons as to why the transaction information could not be verified or authorized at the decision step 340. For instance, if the authorization process failed due to insufficient funds or credit with regard to the payment account received at step 336, then the payee may request that the payor provide an alternate payment account having the sufficient funds, credit, or otherwise, to satisfy the requested payment amount. In this scenario, the method 328 may proceed from the decision step 342 back to the step 336.

Alternatively, the situation may arise in which the authorization failure at decision step 340 is due to an incompatibility between the payment account and the crediting account. By way of example, this type of transaction failure may occur where the selected payment account is a credit card account and the selected crediting account is a bank account that is not authorized or configured to receive payments made from a credit card account. Thus, the method may either return to step 338 from decision step 342 in which the payee may be prompted to select an alternate crediting account that is authorized to accept payments from the selected payment account, or return to step 336 whereby the payee may request that the payor select an alternate payment account, such as a bank account, that is compatible with the payee's selected crediting account. Alternatively, the payee may choose to not to renegotiate the terms of the transaction at step 342, and thus cancel the present transaction at step 344.

Returning now to decision step 340, if it is determined that the requested transaction may be authorized with respect to the payment and crediting accounts, then, at step 346, a payment corresponding to the requested payment amount may be credited or deposited to the crediting account selected at step 338, as indicated by reference numeral. Once the payment has been received by the payee at step 346, the transaction may be completed at step 348. Thereafter, at step 350, a payment receipt may be transmitted to the payor by the payee, either directly via the payor device 10, or indirectly via one of the financial servers 100 under the payee's authorization. For example, the payee may authorize that an electronic receipt, such as the receipt 104 of FIG. 4, is transmitted from one or more financial servers 100 to the payor's device 92 upon successful completion of the transaction.

Continuing now to FIG. 11B, the transaction generally described in FIG. 11A from the payee's point of view is now described form the payor's point of view by way of the method 360. Beginning with step 364, the payor may receive a payment request from the payee. For example, the receipt of the payment request at step 364 may correspond to the transmission of the invoice information at step 334 of the method 328. Upon receipt of the payment request, the method 360 may proceed to step 366, wherein the payor may select a payment account from one or more of the available payment accounts stored on the payor device 92. As with the description of the selection of a default payment account 180 on the device 10 in FIGS. 5A and 5B, the payor device may incorporate similar features. Once the payment account is selected, the method may continue to step 366 in which the selected payment account is transmitted to the payee. As discussed above, in one embodiment, the transmission of the payment request and payment account information may be accomplished by way of an NFC connection between a payee device 10 and a payor device 92. Once the payee receives the information representing the payor's selected payment account, the payee may select a crediting account (e.g., step 338 of the method 328) and provide the transaction information to the one or more financial servers 100 for processing.

At decision step 368, a determination is made as to whether the transaction is successfully completed. If the transaction did not complete, such as for one or more of the above-discussed reasons, the payor's account will not be charged, as indicated at step 370. Alternatively, if it is determined at decision step 368 that the transaction is authorized by the financial servers and successfully completed, then the crediting account specified by the payor will be debited or charged for the requested payment amount at step 372. Thereafter, the payor may receive a receipt as shown by step 374, indicating that a payment has been made from the crediting account to the payee. For example, the receipt received at step 374 of the method 360 may correspond to the receipt transmitted at step 350 of the method 328, described above.

Figure 12A:
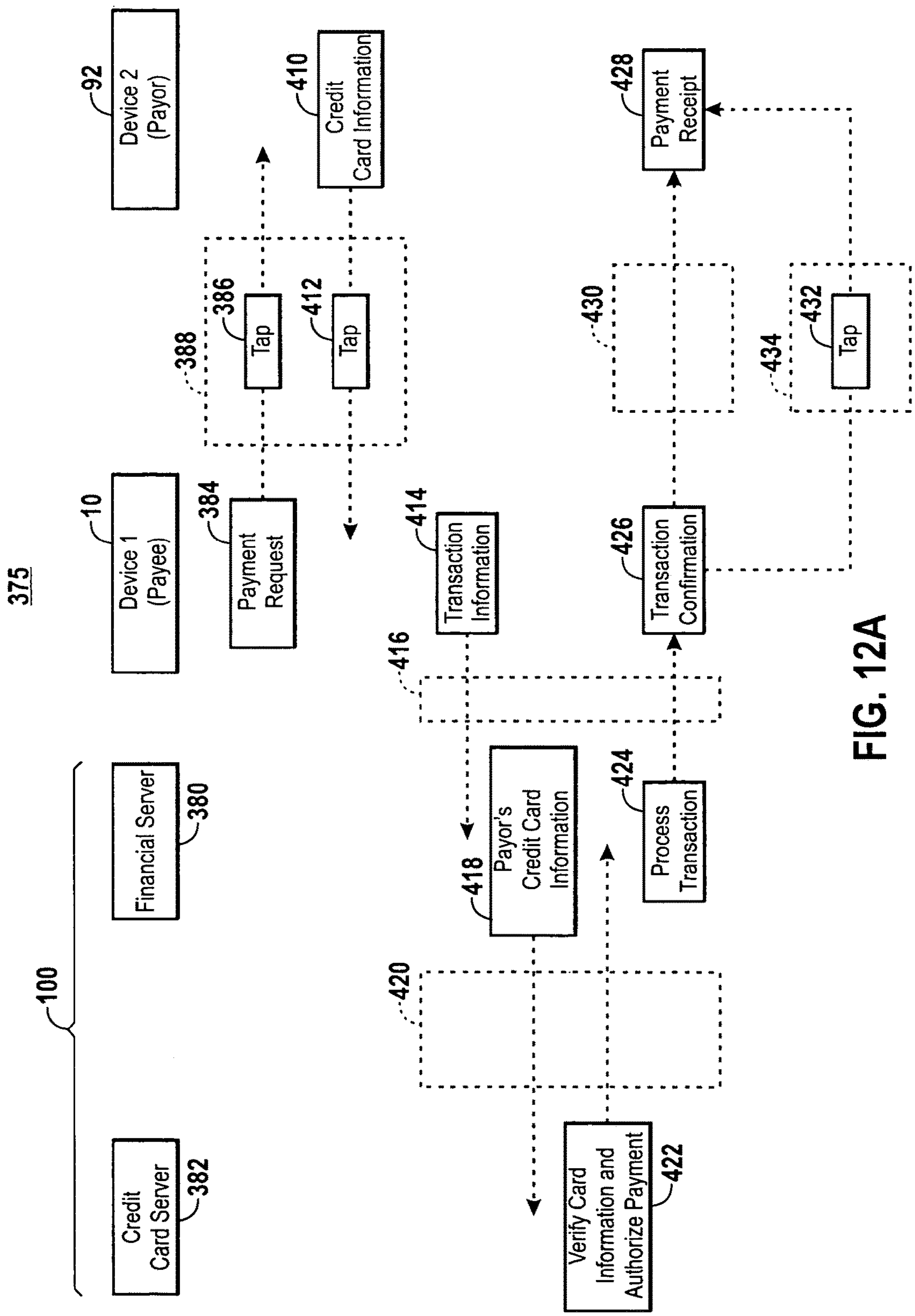
FIGS. 12A-12C are schematic representations of systems adapted to carry out various types of transactions that may be performed between the payee and payor devices of FIG. 4 in accordance with aspects of the present technique.
Figure 12B:
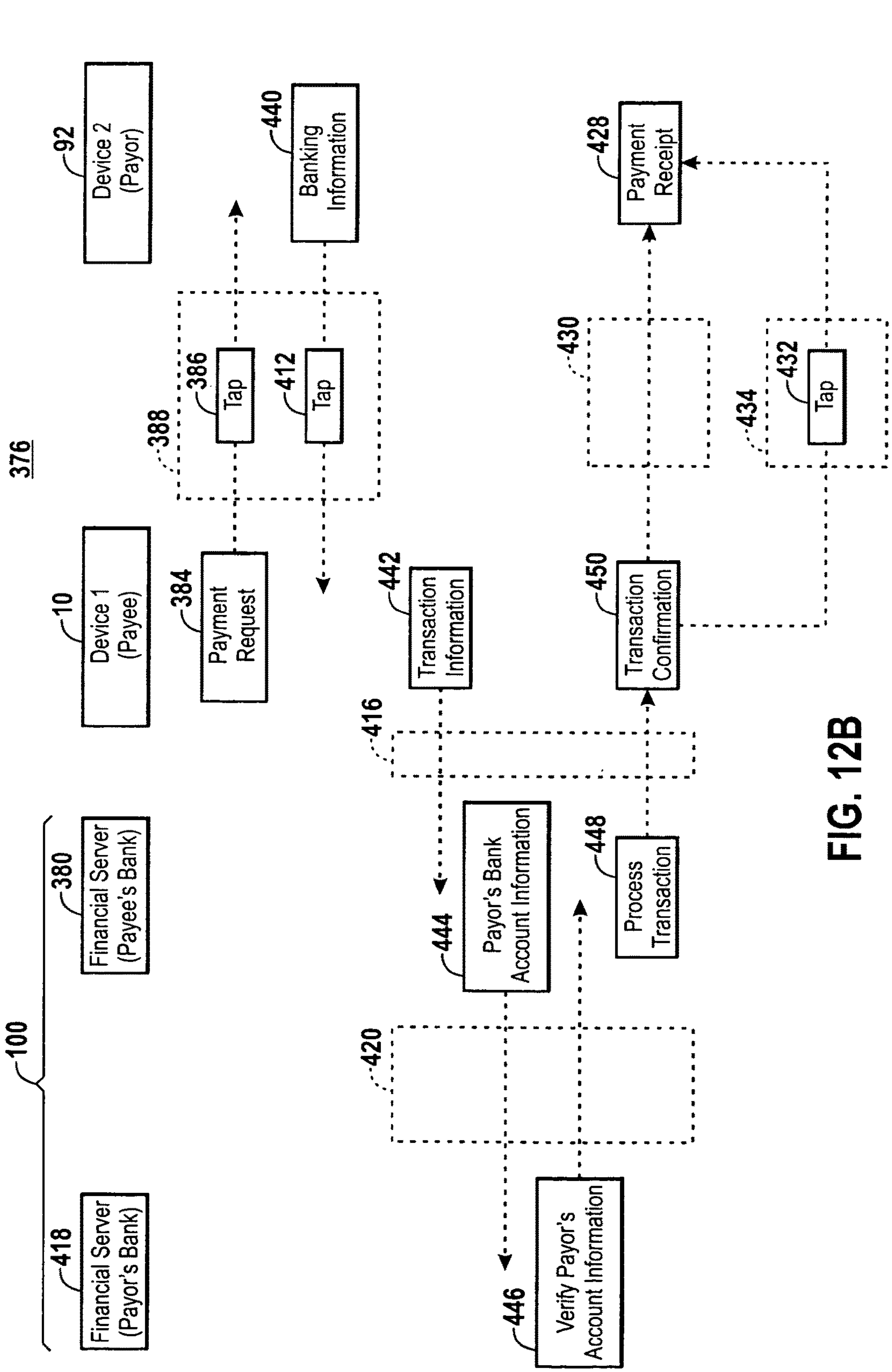
Figure 12C:
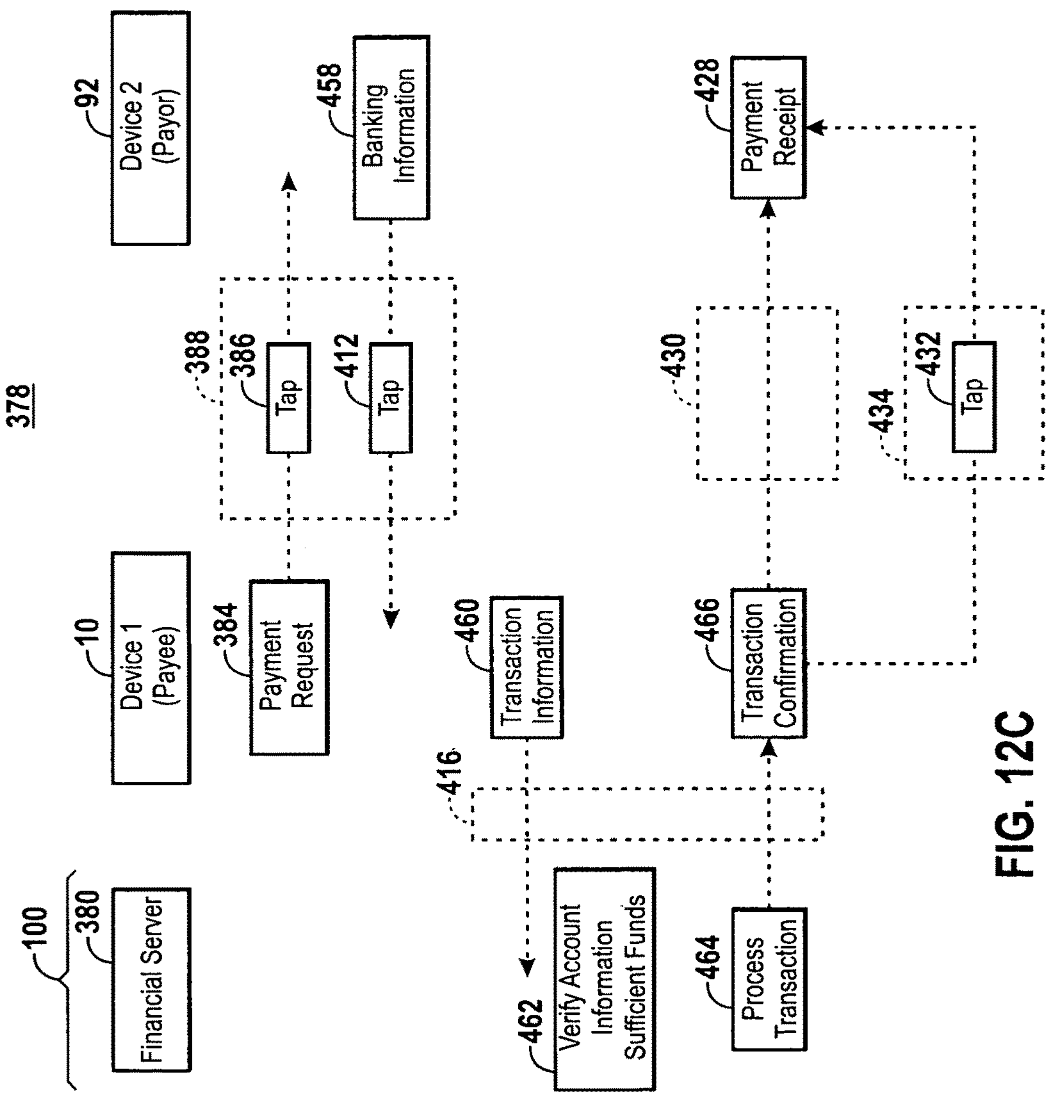

Continuing now with the present discussion, FIGS. 12A-12C illustrate schematic diagrams representing various transactions that may be performed between a payee device 10 and payor device 92 in accordance with the presently described techniques. In general, the embodiments illustrated by FIGS. 12A-C, depict several scenarios in which a transaction may be initiated between two NFC-enabled devices by way of an NFC tap operation, as will be explained in further detail below. For instance, FIG. 12A illustrates an in which a payment is made by way of a credit card account stored on the payor device 92 in response to a payment request provided by a payee device 10. FIGS. 12B and 12C illustrate additional embodiments in which a bank account is selected by the payor as the payment account. Specifically, FIG. 12B illustrates a scenario in which the selected payment and crediting accounts are maintained by different banking providers, and FIG. 12C illustrates a scenario in which the selected payment and crediting accounts are maintained by the same banking provider.

Beginning with FIG. 12A, the transaction 375 may include the payee device 10, the payor device 92, as well as the one or more financial servers 100 which, in the present embodiment, may include a bank server 380 and a credit card verification server 382. To initiate the transaction 375, the payee device 10 may first transmit a payment request 384 to the payor device 92. As discussed above, the payment request 384 may include the amount of the requested payment, the identity of the payee, as well as additional information with regard to the nature or reason for the payment request. As noted above, the payee device 10 and they payor device 92 may both be NFC-enabled devices. Accordingly, the payment request information 384 may be transmitted from the payee device 10 to the payor device 92 through the establishment of an NFC connection 388 by way of "tapping" the devices, or performing a "tap operation," as depicted by reference numeral 386.

As used herein, the term "tap" and "tap operation," or the like shall be understood to mean the action of placing one NFC-enabled device within the proximity of one or more additional NFC-enabled devices such that an NFC-based connection may be established between the devices. As discussed above, one technique for establishing an NFC-based connection may be through magnetic field induction, whereby a first NFC-enabled device acting as a host device generates an RF field, which in turn induces an NFC device located within a second device to transition from a passive state to an active state, thus establishing an NFC connection. Once established, information may be exchanged between the devices by way of the NFC connection.

Figure 13:
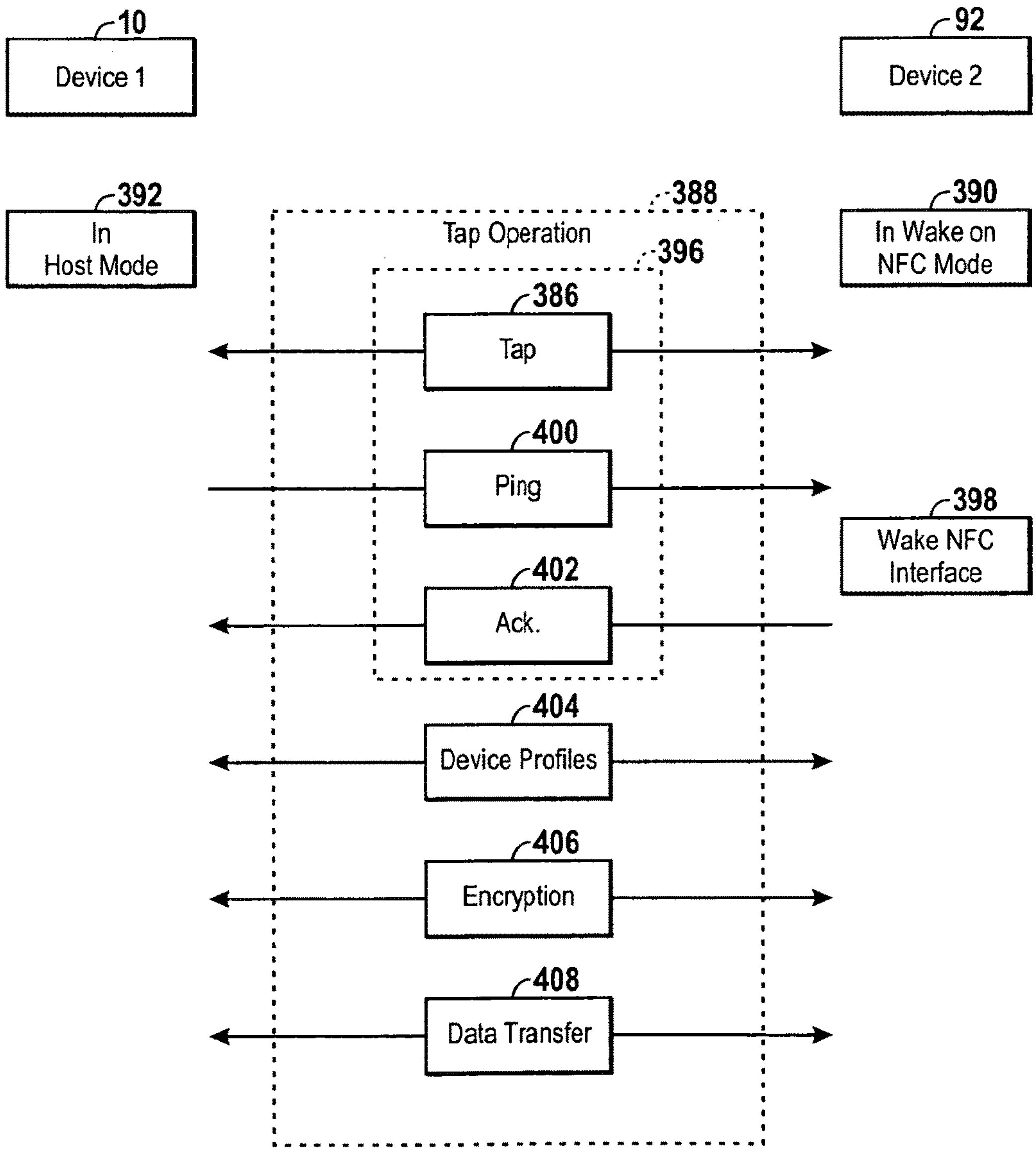
FIG. 13 is a schematic representation illustrating a communication process that may occur between the payee and payor devices of FIG. 4 during the transactions depicted by FIGS. 12A-12C.

Referring briefly to FIG. 13, a schematic diagram of the NFC tap operation 386 is illustrated. For instance, prior to the initiation of the NFC connection 388, the payor device 92 may be in a passive or a "wake on NFC" mode, as denoted by reference numeral 390. While in the passive state, an NFC device 46 and an NFC interface 60 that may be included in the device 92 may remain inactive until the NFC interface 60 detects an NFC transmission from an external device, such as the payee device 10. By way of example, once the payee device 10 is operated to transmit the payment request 384, the NFC interface 60 and corresponding NFC device 46 located within the payee device 10 may transition to an active or host mode, as denoted by reference numeral 392. While in the host mode 392, the NFC device 46 of the payee device 10 may periodically emit NFC communication signals to seek out other NFC-enabled devices having their own respective NFC interfaces 60 and NFC devices 46 that are within the appropriate range to facilitate an NFC connection.

For instance, when the payee device 10 and the payor device 92 are placed within an appropriate range (e.g., the tap operation 386) for establishing an NFC connection, the establishment of the connection may begin with an initiation handshake, referred to herein by reference numeral 396. It should be understood, that in tapping the devices, it is important that the NFC devices 46 within each respective device are positioned in such a way that the distance between the respective NFC devices 46 is suitable for establishing an NFC-based connection. For example, if the payor device 92 is a relatively large non-portable device, the payee would be required to position the payee device 10 such that the NFC device 46 within the payee device 10 is within the appropriate distance of any corresponding NFC circuitry within the payor device 92 in order to establish the NFC connection 388.

While the NFC interface 60 and the NFC device 46 of the payee device 10 are operating in the host mode, the payee device 10 may periodically emit ping messages 400. The corresponding NFC interface 60 of the payor device 92 may receive the ping messages 400, thus causing the NFC device 46 located within the payor device 92 to awake upon the detection of the NFC transmission (e.g., wake on NFC), thereby transitioning from a passive mode to an active mode, as indicated by reference numeral 398. Thus, once powered on and active, the NFC device 46 of the payor device 92 may reply in response to the ping message 400 by sending an acknowledgement message 402 which may be received via the NFC interface 60 of the payee device 10, thus completing the initiation handshake 396.

Following this initiation handshake 396, the payee device 10 and the payor device 92 may exchange device profiles as indicated by the reference numeral 404. The device profiles 404 may include a variety of information regarding the functions available on the payee device 10 and the payor device 92. For example, the device profiles 404 may be represented by data messages of any suitable form, including extensible markup language (XML), which may denote the device name, serial number, owner name, device type, as well as any other type of identifying information. For example, additional identifying information may include, for example, the name of a service provider, such as a network or cellular telephone service provider that may be associated with each of the devices 10 and 92. The device profiles 404 may additionally include information with regard to the capabilities of the payee device 10 or the payor device 92 by indicating which applications, drivers, or services may be installed on each device.

Additionally, the payee device 10 and the payor device 92 may also exchange information with regard to the encryption capabilities available on each device, as represented by reference numeral 406. As discussed above, because the various transactions discussed herein may invariably involve the transfer of sensitive information, such as information relating to credit card accounts and bank accounts, the use of one or more encryption measures for protecting the transaction information being transferred between a payee device 10 and a payor device 92, as well as to the one or more financial servers 100, may be implemented. Accordingly, once the NFC connection 388 is established and the device profiles 404 and encryption capabilities 406 are exchanged, information may be exchanged between the devices 10 and 92, as indicated by reference numeral 408.

Returning now to FIG. 12A, the data transfer 408 may include the transfer of the payment request information 384 from the payee device 10 to the payor device 92 by way of the established NFC connection 388. Next, upon receiving the payment request information 384, the payor respond may continue the transaction process by selecting a payment account stored on the payor device 92. In the illustrated embodiment, the selected payment account may be a credit card account. The payor device 92 may transmit the credit card information 410 corresponding to the selected credit card account to the payee device 10 via the NFC connection 388 by way of a second tap operation 412. As can be appreciated, he tap operation 412 may be carried out in a manner identical to the tap operation 386 described above with reference to FIG. 13, except that the payor device 92 may act as the host device, while the payee device may operate in a "wake on NFC" mode. It should also be noted, that in some embodiments, the exchange of the payment request information 384 and the payment account information 410 may occur via a single tap operation (e.g., 386) if distance between the devices 10 and 92 is maintained, thus keeping the NFC connection 388 active for the duration of the data transfer.

After receiving the credit card information 410 on the payee device 10, the payee may select a crediting account to which the requested payment is to be credited, as discussed above with reference to the method 328 (e.g., step 338). Once the crediting account is selected, the payor's credit card account information 410, the payee's crediting account information, and the payment request information 384, collectively represented by the transaction information 414, may be transmitted to the financial server 380 by way of a network connection depicted herein by reference numeral 416. By way of example, if the selected crediting account is a bank account, the financial server 380 may correspond to a banking provider that maintains the crediting account. Additionally, the network 416 by which the transaction information 414 is transmitted may be include any suitable network that may be provided by one communication interfaces 56 (e.g., WAN, LAN, WLAN, etc.) available on the payee device 10. For instance, the network 416 may be a wireless internet connection established by way of the WLAN interface 58, a local area network connection established through the LAN interface 66, or a wide area network connection established by way of the WAN interface 68, which may include one of various WAN mobile communication protocols, such as a General Packet Radio Service (GPRS) connection, an EDGE connection (Enhanced Data rates for GSM Evolution connection), or a 3G connection, such as in accordance with the IMT-2000 standard discussed above.

Upon receipt the transaction information 414, the financial server 380 may perform several actions to further the authorization of the requested transaction 375. For example, the financial server 380 may first assess the accounts provided by the transaction information 414 to determine whether the specified payment account and crediting account are compatible. As discussed above, the financial server 380 may be unable to process the requested transaction 375 if the specified crediting account is not authorized to accept payments from a credit card account. Next, if the crediting account and the payment account are determined by the financial server 380 to be compatible, the financial server 380 may further transmit the payor's credit card account information, represented by reference numeral 418, to the credit card verification server 382 by way of a network 420. The network 420 may be any type of suitable network for facilitating the transmission of data, including one or more of the network types described above with regard to the network 416 by which the transaction information 414 is initially transmitted to the financial server 380.

Once the payor's credit card account information 418 is received by the credit card verification server 382, additional verification and authorization steps, represented by reference numeral 422, may be performed in order to verify that the provided credit card account is valid and has the sufficient line of credit to fulfill the requested payment. Thus, if the credit card verification server 382 determines that the provided credit card information 418 corresponds to a valid credit card account having the sufficient credit to carry out the requested payment 384, the credit card verification server 382 may authorize the requested payment by sending an authorization message to the financial server 380 by way of the network 420. The financial server 380 may then complete the processing of the requested transaction 375, as illustrated by reference numeral 424, in which an amount corresponding to the requested payment is charged to the payor's credit card account, and where the charged is deposited to the payee's selected crediting account.

Thereafter, once the transaction has been successfully processed and completed at step 424, a transaction confirmation message 426 may be transmitted to the payee device 10 by way of the network 416. The transaction confirmation message 426 may generally indicate to the payee that the requested payment 384 has been completed. Additionally, a payment receipt 428 may also be transmitted to the payor device 92. The payment receipt 428 may be transmitted to the payor device 92 by any of the connection types described above. For example, the transmission of the payment receipt 428 may occur via a network 430, which may be any type of network connection established by way of a common networking interface available on the payee device 10 and the payor device 92, such as a LAN connection (e.g., interface 66), a WLAN connection (e.g., interface 58), or a WAN connection (e.g., interface 68). Additionally, the payment receipt 428 may also be transmitted by tapping the payee device 10 to the payor device 92. This tap operation, illustrated by reference numeral 432, may establish a further NFC connection 434, thus providing a channel by which the payment receipt 428 may be transmitted to the payor device 92.

The payment receipt 428 may include information, such as the total payment amount for the transaction 375, the method of payment (e.g., the credit card account 410), and the time of the transaction 375 was processed. Additionally, in certain embodiments, the payment receipt 428 may indicate additional charges of fees associated with the transaction processing services collectively provided by the devices 10 and 92 and the financial servers 100 (e.g., including the bank server 380 and credit card server 382) in carrying out the transaction 375. Thus, it should be noted that in accordance with a further aspect of the present disclosure, various business methods may be provided in which a transaction fee is charged to one or both of the payee and payor. The fee may be charged each time a transaction request is processed, or may be a flat fee based on a monthly subscription service, for example. Additionally, an agreement may be reached in which the transaction fees may be apportioned among one or more of the entities providing the transaction services, including the banking provider (e.g., associated with the financial server 380), the credit card provider (e.g., associated with the credit card server 382), or the device manufacturer(s) (e.g., manufacturer of the devices 10 and 92) for instance. In accordance with one embodiment, the transaction fees may initially be collected by a single entity (e.g., the banking provider), and later apportioned in an agreed manner amongst the remaining entities (e.g., the credit card provider and device manufacturer(s)).

Continuing now to FIG. 12B, a schematic diagram representing an alternate embodiment a transaction in accordance with the presently described techniques is illustrated and generally referred to by reference numeral 376. As discussed above, the transaction 376 may be similar to the transaction 375 described in FIG. 12A, except that the payment account selected by the payor may be a bank account rather than a credit card account. As discussed above, the payee device 10 may initially transmit a payment request 384 to the payor device 92 by way of the NFC connection 388, which may be established as a result of the tap operation 386. Upon receiving the payment request 384, the payor may select a bank account stored on the payor device 82 as the payment account and transmit the bank account information 440 to the payee device 10 using the NFC connection 388.

After receiving the bank account information 440 on the payee device 10, the payee may select a crediting account, as discussed above, and then transmit the transaction information 442, which may include the selected payment account (e.g., 440), crediting account, and payment request information 384 to the financial server 380 by way of the network 416. As discussed above, the financial server 380, which may correspond to a banking provider that maintains the payee's selected crediting account, may initiate one or more authorization steps, such as determining whether the specified payment account and crediting account are compatible. The financial server 380 may then transmit the payor's bank account information, represented by reference 444 to a second financial server 418 that is associated with the payor's banking provider. In other words, the present transaction 376 illustrates a scenario in which the bank accounts selected by the payee and payor are maintained by two different banking providers (e.g., different financial institutions).

The transmission of the bank account information 444 to the financial server 418 may be accomplished by way the network 420. Once the bank account information 444 is received, the financial server 418 may determine whether the account is a valid account, and whether the account contains the sufficient funds to satisfy the requested payment 384. If the financial server 418 determines payment request 384 may be authorized with regard to the bank account 444, an authorization message may be transmitted to the financial server 380 via the network 420. As discussed above, the financial server 380 may then complete the processing of the requested transaction 376, as illustrated by reference numeral 448, in which an amount corresponding to the requested payment is debited from the payor's bank account and subsequently deposited to the payee's crediting account.

Thereafter, once the transaction has been successfully processed, a transaction confirmation message 450 may be transmitted to the payee device 10 by way of the network 416. The transaction confirmation message 450 may generally indicate to the payee that the requested payment 384 has been applied to the crediting account, thus completing the transaction 376. Additionally, a payment receipt 428 may also be transmitted to the payor device 92 using one or the various available networking connections, as discussed above.

Referring now with FIG. 12C, another schematic diagram of a transaction in accordance with a further embodiment is illustrated and generally referred to by reference numeral 378. Specifically, FIG. 12C illustrates a transaction process that may be similar to the transaction 376 described with reference to FIG. 12B, but in which the payment account and the crediting account are bank accounts maintained by the same bank provider. As will be described in detail below, in the present embodiment, the one or more financial servers denoted by reference numeral 100 in FIG. 4, may only require a single financial server 380.

To initiate the transaction process 378, the payee device 10 may transmit a payment request 384 to a payor device 92 in a manner similar to that described above with regard to FIGS. 12A and 12B. For example, the transmission of the payment request 384 may be accomplished by tapping 386 the payee device 10 to the payor device 92, thus establishing an NFC connection 388 for the transfer of data. Once the payment request 384 is received, the payor may select a bank account as the payment account. Thereafter, the payor device 92 may transmit banking information 458 related to the selected bank account to the payee device 10 by way of the NFC connection 388.

Upon receiving the banking information 458 from the payor device 92, the payee may select a crediting account to which the requested payment 384 is to be credited. As noted above, in the presently illustrated scenario the selected crediting account and the provided payment account 458, collectively referred to herein as the transaction information 460, may both be accounts held by the same banking provider. Thus, the transaction information 460 may then be transmitted by way of the network 416 to the financial server 380 which may be associated with the common banking provider for both the payment and crediting accounts.

The financial server 380 may then perform the steps of verifying the validity of the provided accounts, as well as determining whether the payment account contains the sufficient funds to fulfill the payment request 384. It should be noted that unlike the embodiments described in FIGS. 12A and 12B, the financial server 380 is not required to transmit account information to a second external server, such as the credit card verification server 382 of FIG. 12A or the second financial server 418 of FIG. 12B due to the fact that a common banking provider maintains these accounts. Accordingly, the information pertaining to the crediting account and the selected payment account 458 is stored and accessible by the financial server 380. Accordingly, once the financial server 380, has verified that both the crediting and payment accounts are valid, and that the payment account contains the sufficient funds to fulfill the requested payment 384, the financial server 380 may process the transaction, as indicated by reference numeral 464 such that the requested payment is debited from the payor's bank account and subsequently deposited to the payee's crediting account, as discussed above. Upon completion of the transaction 378, a transaction confirmation message 466 may be transmitted from the financial server 380 to the payee device 10 by way of the network 416. Additionally, a payment receipt 428 may be transmitted to the payor device 92 using the available networking connections mentioned above.

Having described the various embodiments depicting device-to-device transactions (e.g., between a payor device 92 and a payee device 10) with respect to the transactions 375, 376, and 378 depicted in FIGS. 12A, 12B, and 12C, respectively, various techniques for operating the payee device 10 and the payor device 92 to accomplish the foregoing transactions 375, 376, and 378 are further illustrated in FIGS. 14A-14J by way of various screen images that may be displayed on either the payee device 10 or the payor device 92, as well as via schematic illustrations. Additionally, it should be noted that in the presently illustrated embodiment, the payee device 10 and the payor device 92 are both NFC-enabled devices.

Figure 14A:
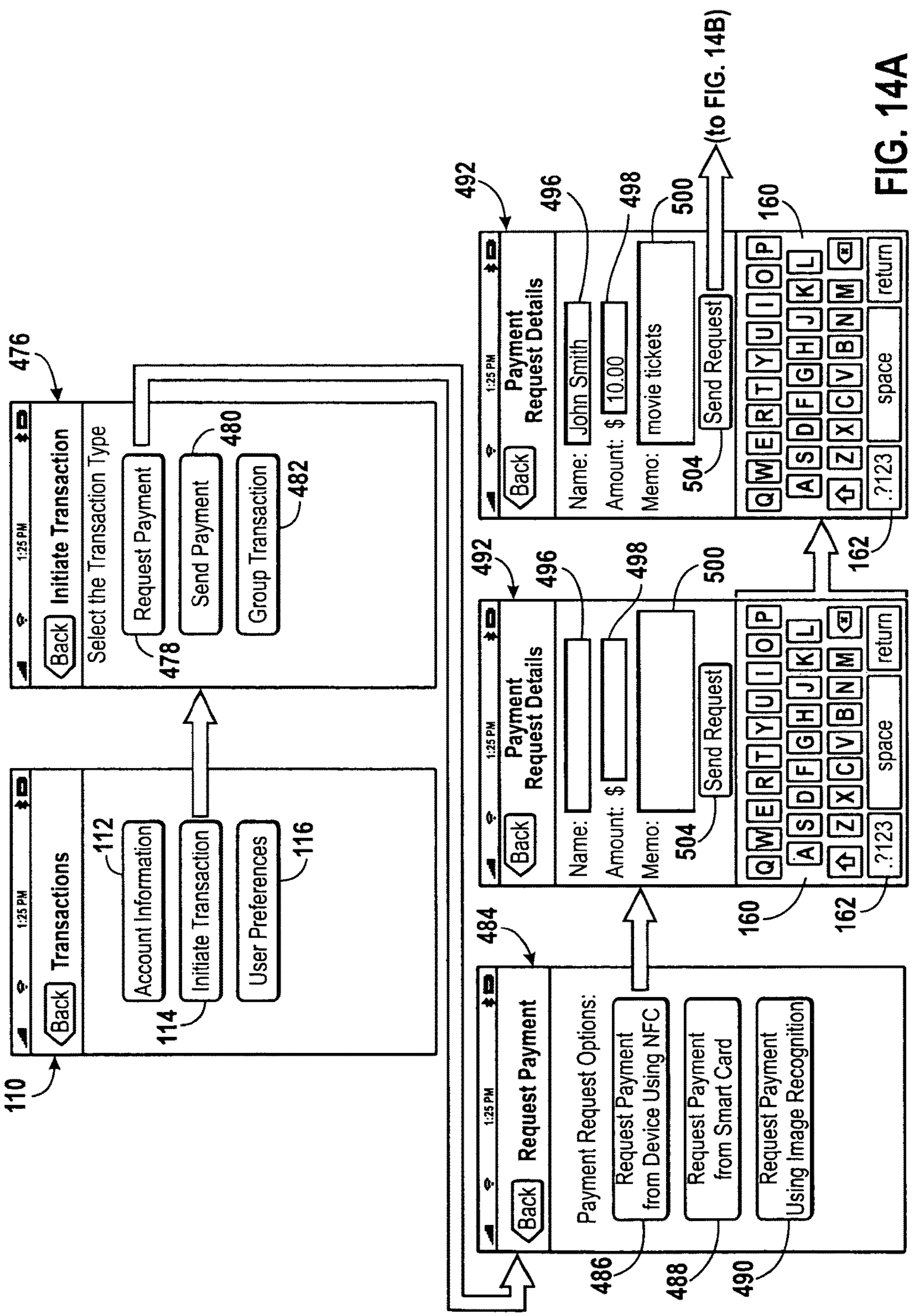
FIG. 14A shows a plurality of screens that may be displayed on the device of FIG. 1 illustrating a method for initiating a payment request to be transmitted to a payor device in accordance with one embodiment.

Referring first to FIG. 14A, a process by which the payee may operate the device 10 to transmit a payment request is illustrated. The actions depicted by these screen images may generally correspond to the step 332 of the method 328 illustrated in FIG. 11A, as well as the transmission of the payment request information 384 to the payor device 92, as discussed above. Additionally, the actions depicted herein may be performed from the point of view of the payee and thus, the actions depicted in these screens will be described as being performed by the payee.

As shown in the present figure, the process may begin from the screen 110 which, as discussed above, may represent a "home screen" for the transaction application 34. From the screen 110, the payee may select the graphical button 114, which may then advance the payee to the screen 476. The screen 476 may display a plurality of graphical buttons 478, 480, and 482. Each of these graphical buttons may represent a particular function that may be performed when selected by the payee. For instance, in the illustrated embodiment, the graphical button 478 may represent a function by which the user may initiate a payment request. The graphical button 480 may represent a function by which the user may send a payment to another device. Additionally, the graphical button 482 may allow the user to initiate a transaction between two or more other parties. The functions represented by the latter two graphical buttons 480 and 482 will be described in further detail below.

To initiate a payment request, the payee may select the graphical button 478, which may further advance the payee to the screen 484. Like the screen 476, the screen 484 may also display a plurality of graphical buttons 486, 488, and 490, each of which may represent specific functions. As shown here, the graphical button 486 may represent a function by which the payee may initiate a payment request using the NFC device 46. This function may generally correspond to the techniques described above with respect to the transactions 375, 376, and 378. Additionally, the graphical buttons 488 and 490 may represent additional functions available on the device 10 through which transactions may be initiated and will be described in further detail below.

By selecting graphical button 486, the payee may proceed to the screen 492. As shown in FIG. 14A, the screen 492 may include the text fields 496, 498, and 500 by which the payee may enter information relating to the payment request. For instance, the text field 496 may be used to enter the identify of the payee, the text field 498 may be used to specify the amount of the payment being requested, and the text field 500 may allow the payee to include a descriptive message regarding the nature or reason for the requested payment. As shown in the screen 492, the required information may be entered into the text fields 496, 498, and 500, by way of the text keyboard 160 or the numerical keyboard 164 (e.g., via selection of the graphical button 162). Once the required information is entered into the text fields 496, 498, and 500, the payee may transmit the entered information in the form of a payment request (e.g., 384) to a payor device 92 by selecting the graphical button 504.

The function represented by the graphical button 504 may correspond to executing an instruction to power on the NFC device 46 of the payee device 10, thus placing the device 10 into an NFC active mode and enabling the NFC interface 60, as described above. For example, referring now to FIG. 14B, upon the selection of the graphical button 504, the screen 508 may be displayed on the payee device 10. The screen 508 may include a notification message 510 indicating that the NFC interface 60 of the payee device 10 is presently active and capable of establishing an NFC connection with an external device for the transmission of the payment request information entered in the screen 492. Accordingly, the notification message 510 may further instruct the payee to tap (e.g., 386) the payee device 10 to a second device, such as a payor device 92, in order to establish the NFC connection.

Figure 14B:
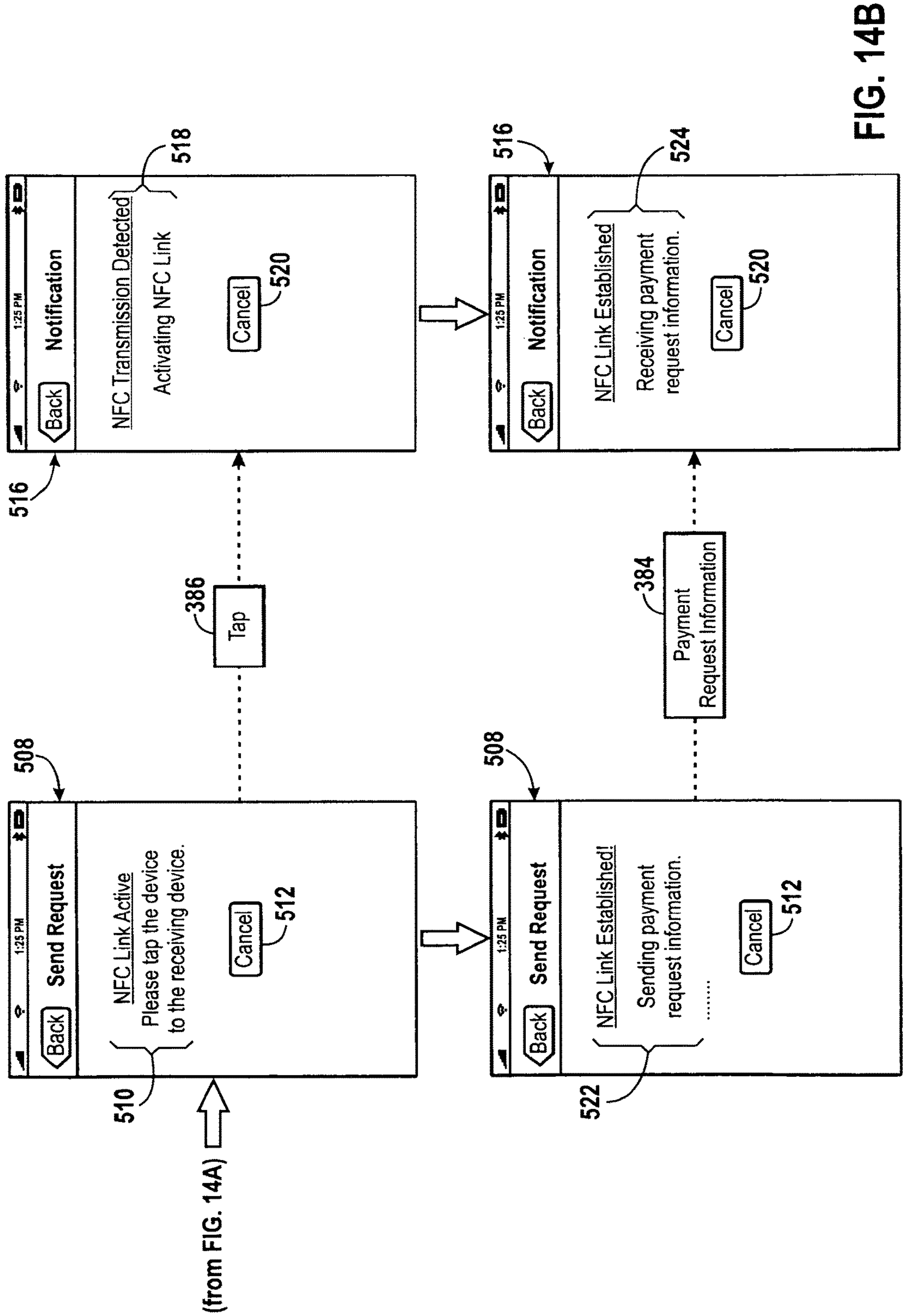
FIG. 14B shows a plurality of screens depicting the transmission of the payment request of FIG. 14A from the payee device to the payor device using an established communication channel.
Figure 14C:
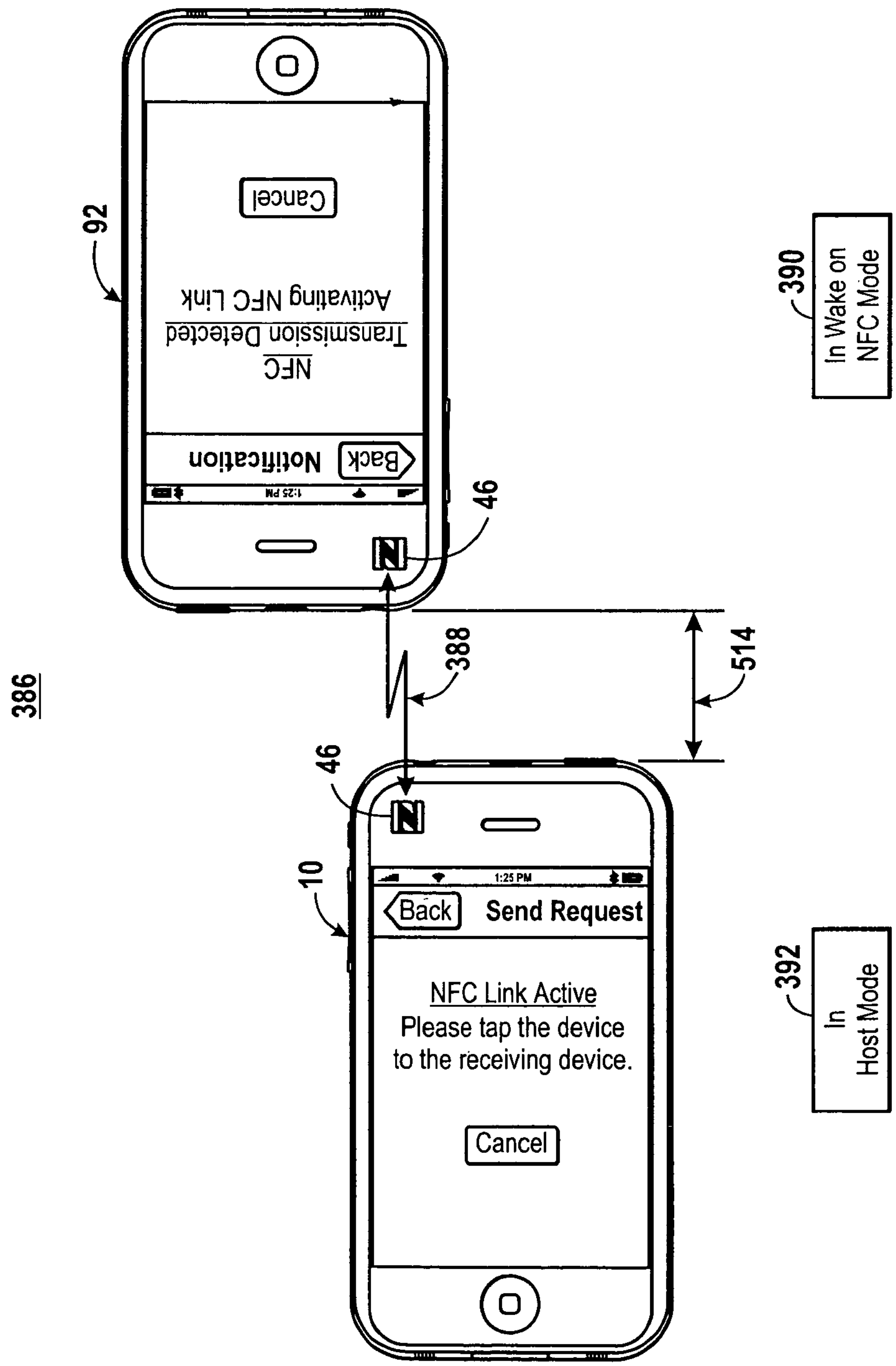
FIGS. 14C and 14D illustrate the establishment of the communication channel of FIG. 14B.
Figure 14D:
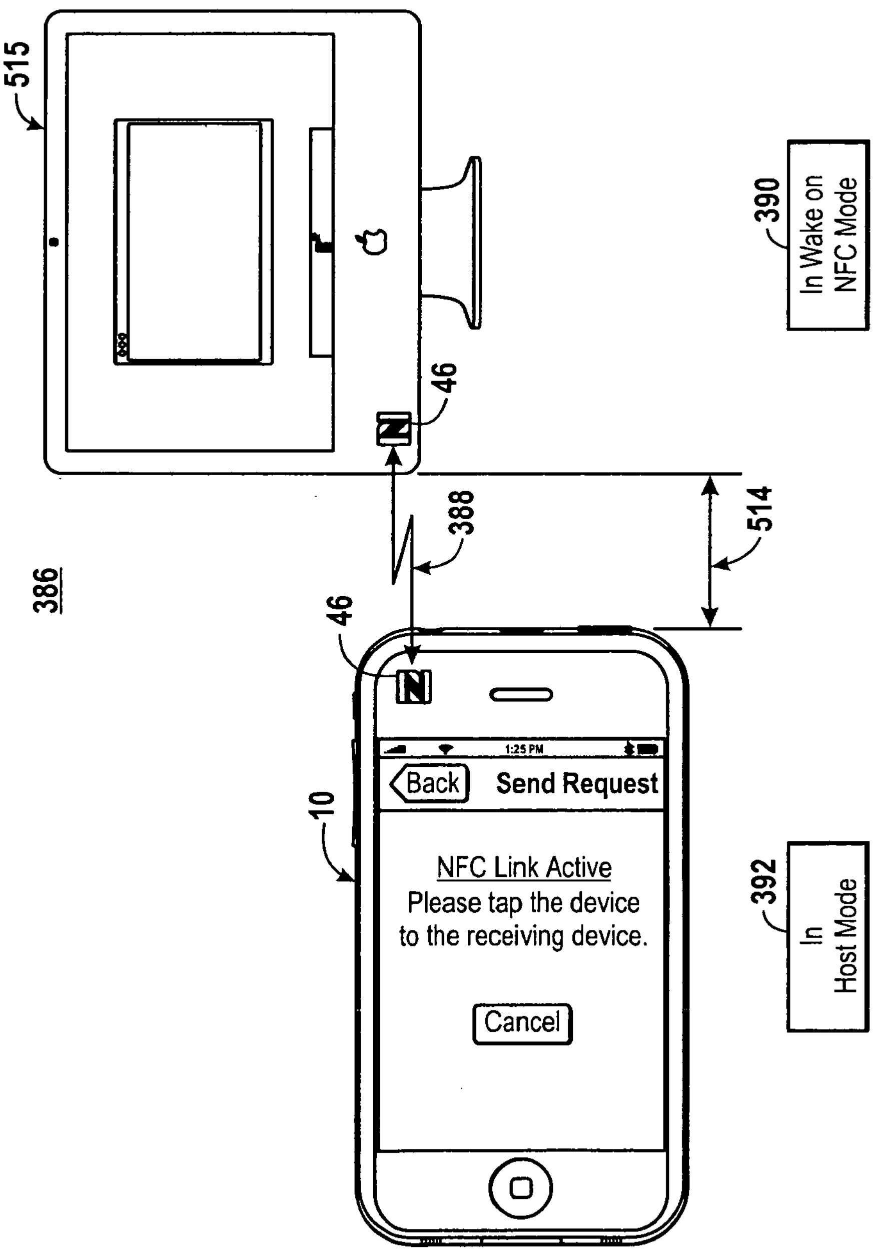

Referring briefly to FIG. 14C, the establishment of an NFC connection 388 between two devices, namely the payee device 10 and the payor device 92, by way of the tap operation 386 is illustrated. As discussed above, the NFC device 46 of the payee device 10 may be powered on upon the selection of the graphical button 504 illustrated in FIG. 14A, thus placing the device 10 into a host mode or active mode, as indicated by reference numeral 392, in which the active device 10 may periodically emit NFC transmission ping messages 400, as discussed above with reference to FIG. 13. As the active device 10 is placed within an acceptable distance 514 (e.g., 2-4 cm) from the payor device 92, which may presently be in a passive or wake on NFC mode, as illustrated by reference numeral 390, the payor device 92 may transition from the passive to an active mode in which the NFC device 46 within the payor device 92 is powered on, thus enabling the payor device's 92 corresponding NFC interface 60 and providing the establishment of the NFC connection 388 between the payee device 10 and the payor device 92 through which the payment request may be transmitted.

Although the payor device 92 illustrated in FIG. 14C is depicted as being a portable device similar to the payee device 10, it should be understood that in alternate embodiments, the payee device 92 may also include non-portable devices, such as a personal computer, a computing workstation, a payment terminal, or the like. For instance, referring now to FIG. 14D, the establishment of the NFC connection is depicted in which the payee device 10 is tapped to a non-portable desktop computer, illustrated here by reference numeral 515. Thus, it should be understood that embodiments of the present disclosure are intended to provide for the initiation and processing of transactions between any suitable types of electronic devices, whether portable or non-portable.

Returning to FIG. 14B, once the payee device 92 is tapped 386 to the payor device 92, the payor device 92 may detect the NFC transmissions (e.g., ping messages 400) being emitted from the payee device 10, and transition from a passive to an active mode, whereby the corresponding NFC device 46 of the payor device 92 is powered on. As shown in FIG. 14B, once the devices 10 and 92 have been tapped and NFC transmissions being emitted from the payee device 10 are detected, the screen 516 may be displayed on the payor device 92. The screen 516 may include a notification message 518 informing the payor that an NFC transmission has been detected and that in response, the corresponding NFC device 46 of the payor device 92 is being powered on and the corresponding NFC interface 60 enabled. The notification screen 516 may further provide a graphical button 520 by which the payor may cancel the NFC connection process if selected.

If the establishment of the NFC connection 388 is permitted on the payor device 92, then the screen 508 displayed on the payee device 10 may be updated to display the notification message 522. The notification message 522 may indicate that an NFC connection (e.g., 388) has been established between the payee device 10 and the payor device 92 and that through the NFC connection 388, the payment request information specified by the payee on the screen 492 of FIG. 14A is being transmitted to the payor device 92. The screen 508 may also include the graphical button 512 by which the payee has the option of canceling the payment request either prior to or during the transmission of the payment request information.

Meanwhile, the notification screen 516 displayed on the payor device 92 may similarly be updated to display the notification message 524. The notification message 524 may indicate to the payor that the NFC connection 388 has been established between the payor device 92 and the payee device 10, and that payment request information is presently being transmitted from the payee device 10 and received by way of the corresponding NFC interface 60 in the payor device 92.

Figure 15A:
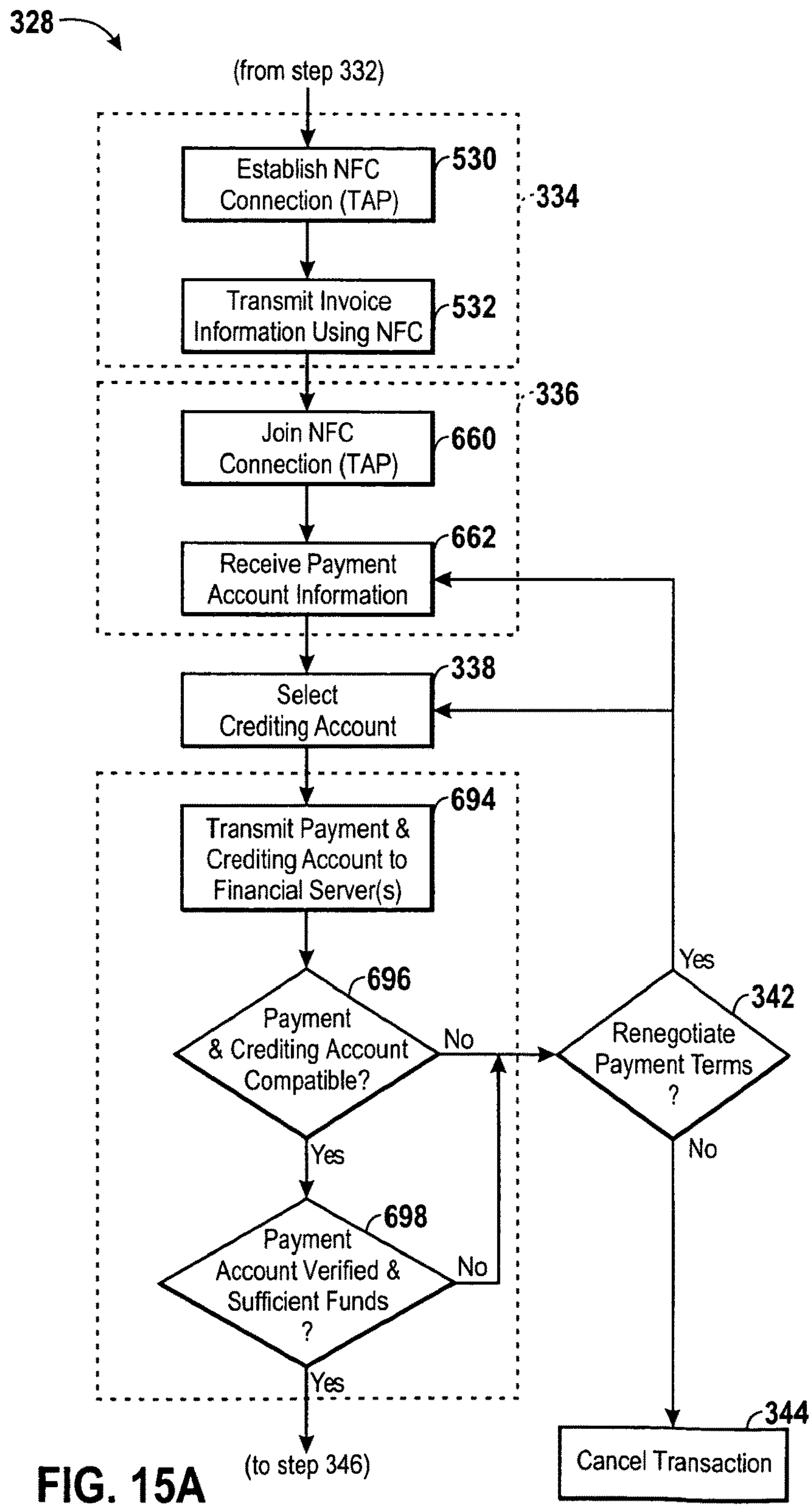
FIG. 15A depicts one or more steps of the method illustrated in FIG. 11A in further detail in accordance with the transactions depicted in FIGS. 12A-12C.
Figure 15B:
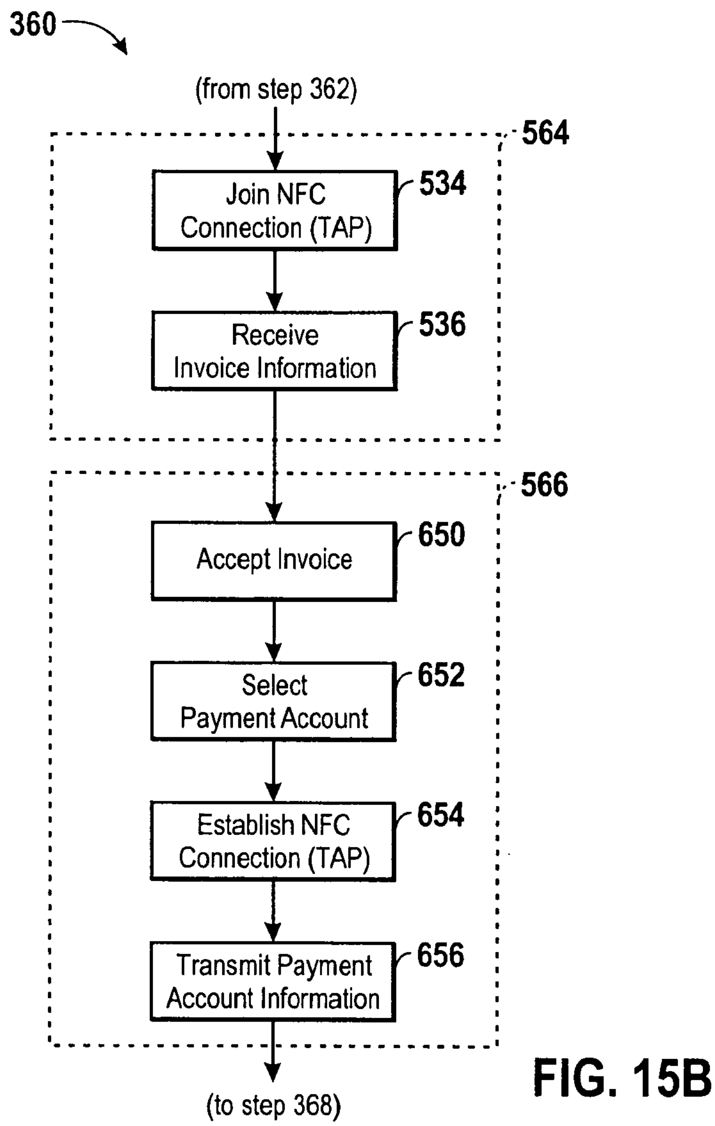
FIG. 15B depicts certain steps of the method illustrated in FIG. 11B in accordance with the transactions depicted in FIGS. 12A-12C.

As can be appreciated, the interactions between the payee device 10 and the payor device 92 described in FIG. 14B may generally correspond to one or more of the steps depicted in the methods 328 and 360 illustrated in FIGS. 11A and 11B, respectively. For instance, the actions illustrated in the screen 508 may represent the step 334 of transmitting an invoice to the payor. Referring briefly to FIG. 15A, which depicts various steps of the method 328 in greater detail in accordance with the present embodiment, the step of transmitting of payment request information to a payor (e.g., step 334) may include establishing an NFC connection, such as by way of the tap operating 386, as indicated by step 530. Additionally, the performance of the step 334 may further include transmitting the payment request information entered in the screen 492 to a payor device 92 using the established NFC connection, as represented by the step 532. Further, the screen 516 which may be displayed on the payor device 92 upon the detection of an NFC transmission from the payee device 10 may represent the step 364 of receiving a payment request in the method 360. For instance, referring now to FIG. 15B, the step 364 may be described in further detail in accordance with the presently illustrated embodiment. For example, the step 364 of receiving the payment request may, in accordance with the present embodiment, may include the act of joining an NFC connection by way of a tap operation, as illustrated by step 534. Additionally, once the NFC connection is established the payor device 92 may receive the payment request information transmitted from the payee device 10 using the NFC connection, as illustrated by step 536.

As described above, specifically with reference to FIGS. 12A-C, the payor, in response to a payment request 384 received from the payee device 10, may select an appropriate payment method on the payor device 92. For example, the selected payment account may include a credit card account (e.g., 410), a bank account (e.g., 440) provided by a different banking provider with respect to the bank provider associated with the payee's crediting account (e.g., 440), or a bank account (e.g., 458) in which the banking provider also manages the payee's crediting account. The selection of these various types of payment accounts may be illustrated by various screen images that may be displayed on the payor device 92, as depicted by FIGS. 14E-14G.

Figure 14E:
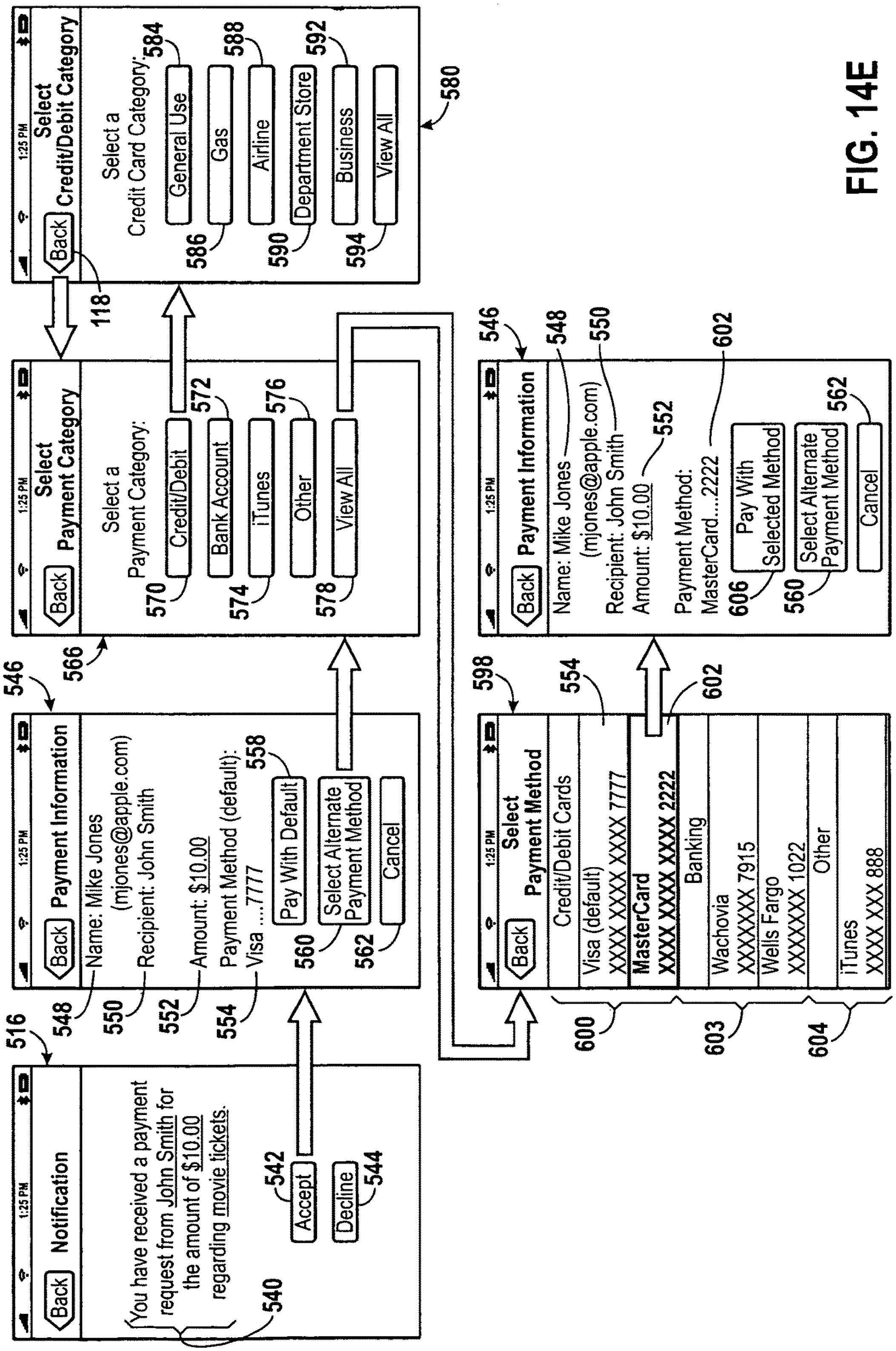
FIGS. 14E-14G show a plurality of screens that may be displayed on payor device illustrating various methods for selecting a payment account in response to the payment request of FIG. 14A.
Figure 14F:
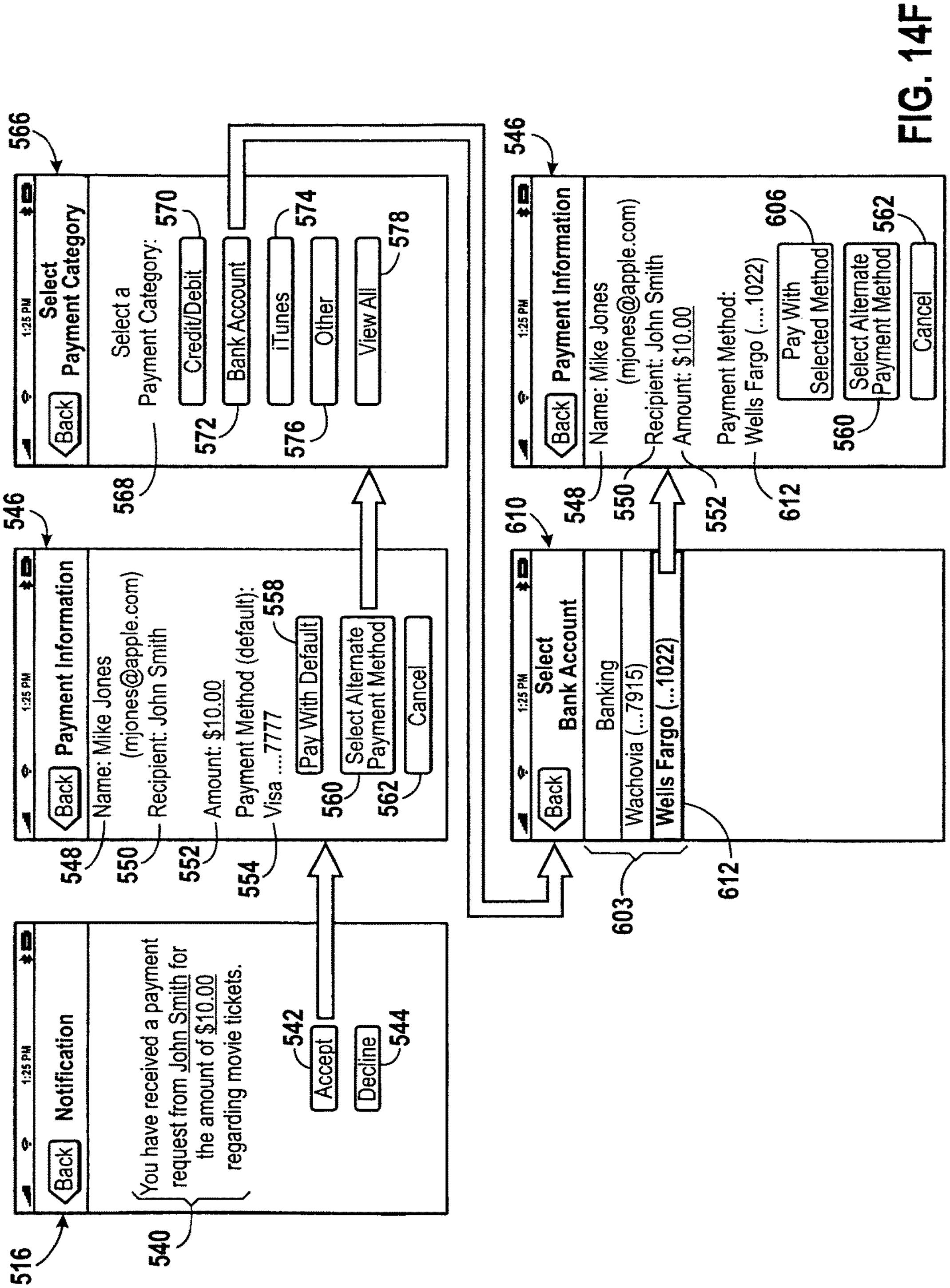
Figure 14G:
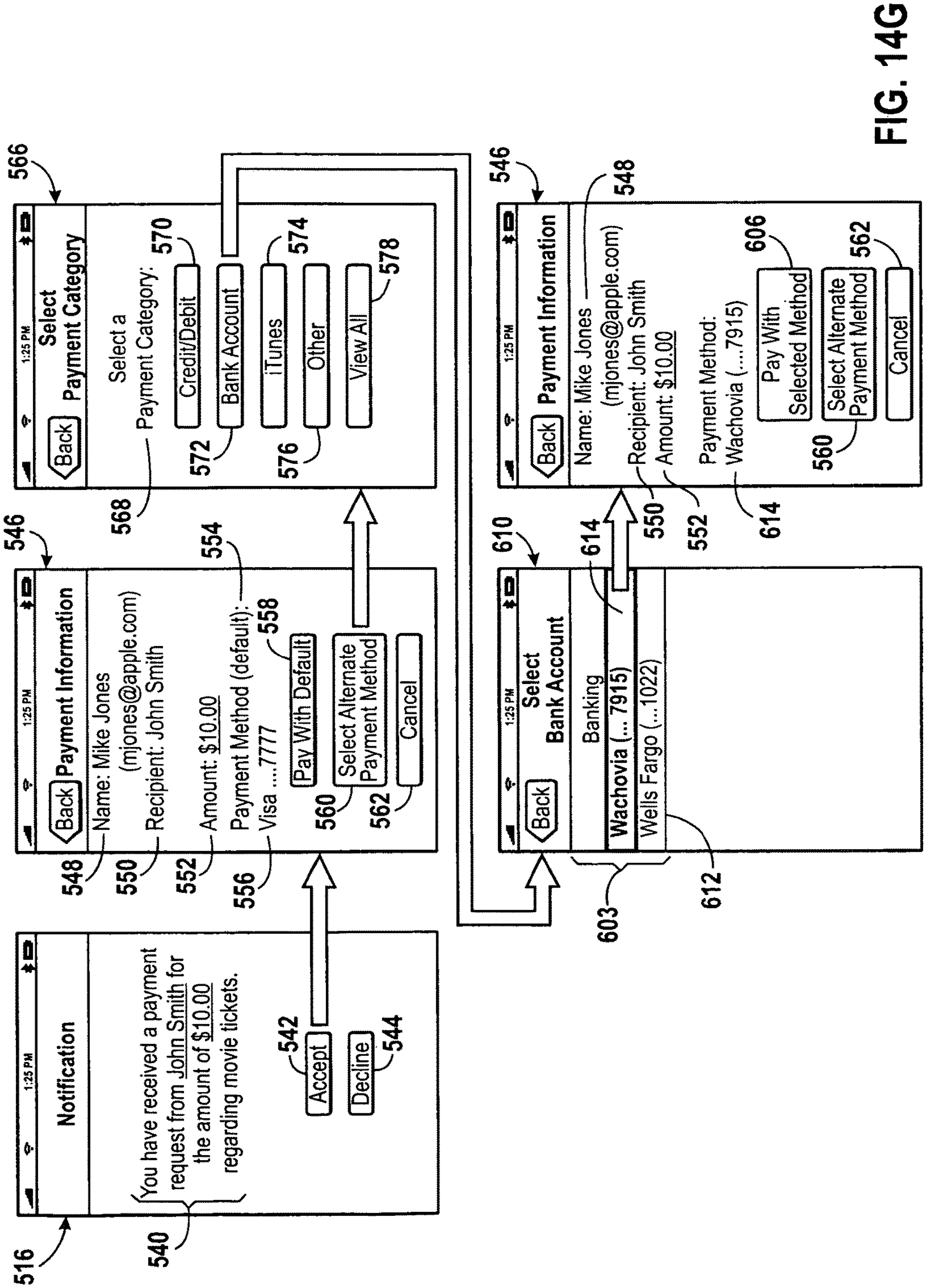

Referring first to FIG. 14E, once the payment request information has been received by the payor device, the screen 516 may be updated to display the details 540 of the payment request, which may generally reflect information entered by the payee into the fields 496, 498, and 500 on the screen 492 of FIG. 14A. Additionally the screen 516 may include the graphical buttons 542 and 544, by which the user may either accept or decline the payment request, respectively. As shown in FIG. 14E, if the payor selects the graphical button 542, the payor may be advanced to the screen 546. The screen 546 may list the some or part of the received payment request information. For instance, the screen 546 display the identity of the payee 550 and the requested payment amount 552. The screen 546 may also display information pertaining to the identity of the payor, as indicated by reference numeral 548. In the illustrated figure, the payor identify information 548 may include the name of the payor, as well as an associated e-mail address identifying the payor. Accordingly, the displayed e-mail address may be transmitted to the payee device 10 and utilized by the transaction process, such as for the sending of the payment receipt 428 described above.

The screen 546 may further display the presently selected payment account 554. As shown here, the current selected payment method 554 may be the default or preferred payment method which may have been selected by the payor, such as by using one or more of the techniques described above with reference to FIG. 7. Additionally, the screen 546 may include the graphical buttons 558, 560, and 562. The graphical button 558 may represent a function by which the payor may initiate the transmission of the payment information using the default payment account 554. The graphical button 560 may represent a further function by which the user may select an alternate method of payment. Thus, if the payor prefers to use an account other than the account 554 as the payment account in the present transaction, the payor may do by selecting the graphical button 560. Additionally, the payor may have the option of canceling the transaction through the selection of the graphical button 562.

If the payor chooses to select a payment account other than the currently selected default payment account 554, the payor may select the graphical button 560 to access the screen 566. The screen 566 may display a plurality of graphical buttons 570, 572, 574, 576, and 578 representing account categories. In certain embodiments, such as the presently illustrated embodiment, each of the categories represented by the buttons 570, 572, 574, 576, or 578, may be further subdivided into additional sub-categories. By way of example, the selection of the credit card account category, represented by the graphical button 570, may advance the payor to the screen 580, which may display the graphical buttons 584, 586, 588, 590, and 592 representing various sub-categories of credit card account types that may be selected by the payor. Referring back to the screen 146 of FIG. 5A, the credit card account sub-categories for the credit card accounts represented by the graphical buttons 584, 586, 588, 590, and 592 may correspond to one or more of the credit card categories provided in the drop-down field 154. Additionally, the payor may also have the option of viewing all available credit card accounts presently stored on the payor device 92 by selecting the graphical button 594.

The payor may also choose to view all available payment accounts (e.g., not limited to just credit card accounts) before making a payment account selection. For example, by selecting the graphical button 118 on the screen 580, the payor may be returned to the previous screen 566. Here, the payor may select the graphical button 578 to access a listing of all selectable payment accounts stored on the payor device 92, which may be provided by the screen 598. In the illustrated embodiment, the screen 598 may display a listing of all the currently stored and available payment accounts by categories. For example, the available payment accounts may be grouped according to credit card accounts 600, bank accounts 602, as well as additional accounts 604, including a non-cash iTunes® account, as generally described above.

As shown in the listing of the stored credit card accounts 600 on the screen 598, the available credit card accounts may include the presently selected default payment account 554, as well as an alternate credit card account 602. Thus, as illustrated on the screen 598, if the payor does not wish to use the default payment account 554 to provide the requested payment 384, the payor may select the alternate credit card account 602 as the payment account. Upon selecting the alternate credit card account 602, the payor may be returned to the screen 546, which may be updated to indicate the selection of the credit card account 602 as being the payment account for the present transaction. Additionally, the updated screen 546 may display the graphical button 606, which may replace the previously displayed graphical button 558. The graphical button 606 may represent a function by which the payor may initiate the sending of the credit card account information 602 to the payee device 10.

Alternatively, if the payor may choose accounts other than the listed credit card accounts 600 as the selected payment account. For instance, the user may select a bank account from the listing 603 or a non-cash account from the listing 604. Referring now to the screen images depicted in FIGS. 14F and 14G, these images illustrate a method by which the payor may select a bank account as the payment account. Specifically, FIG. 14F illustrates the selection of a bank account, in which the selected bank account and the payee's crediting account are maintained by different banking providers, such as described in the transaction 376 in FIG. 12B. FIG. 14G illustrates the payor's selection of a bank account and may correspond to the transaction 378 depicted by FIG. 12C, in which the selected payment account and the payee's crediting account are maintained by the same banking provider.

As shown in FIG. 14F, the payor may navigate to the screen 566 by first selecting the graphical button 542 on the screen 516 and then selecting the graphical button 560 on the screen 546 as discussed above. At the screen 546, rather than selecting the graphical button 570 or 578, as described above, the payor may select the graphical button 572 to access the screen 610, which may display the listing 603 of bank accounts stored on the payor device 92 that may be used as a payment account. As illustrated in the present embodiment, the payor may select the bank account 612. Thereafter, the payor may be returned to the updated screen 546 which may reflect the selection of the bank account 612 as the payment account for the present transaction. It should be noted that the bank account 612 is associated with a banking provider (e.g., Wells Fargo®) that may be different from the banking provider (e.g., Wachovia®) associated with the default crediting account 216 selected by the payee, as discussed above with reference to the screen 270 in FIG. 8. Thus, as explained above with reference to FIG. 12B, the authorization and processing of a transaction in accordance with the actions depicted by the screens of FIG. 14F may require a communication to occur between separate financial servers (e.g., the financial servers 380 and 418) associated with each respective banking provider.

FIG. 14G similarly illustrates the selection of a bank account by the payor that may share a common banking provider with the payee's crediting account, such as depicted by the transaction 378 in FIG. 12C. Beginning with the screen 516, the payor may select, in the following order: the graphical button 542 to navigate to the screen 546, the graphical button **56*b* to navigate to the screen 566, and the graphical button 572 to access the listing 603 of bank accounts on the screen 610. Here, rather than selecting the bank account 612, the payor may select the bank account 614. It should be noted that bank account 614 and the payee's default crediting account 216 are associated with the same banking provider (e.g., Wachovia®). Accordingly, upon selection of the bank account 614 the payor may be returned to the screen 546, which may be updated to reflect the selection of the bank account 614 as the payment account for the present transaction. Additionally, as discussed above with reference to FIG. 12C, a transaction in accordance with the actions depicted by the screens of FIG. 14G may be authorized and processed by a single financial server (e.g., 380**).

As discussed above, a device, such as the payee device 10 or the payor device 92, may include one or more security features, such as the use of an authorization PIN code, such as the PIN 286 described above in FIG. 9. As will be appreciated, the use of an authorization PIN code may prevent unauthorized payments from being made from the payor device 92 or the payee device 10. By way of example, the payor may configure the device (e.g., through one or more user preference settings) such that an authorization PIN code must be provided in order to authorize the sending and transmission of payment information from the payor device 92.

Figure 14H:
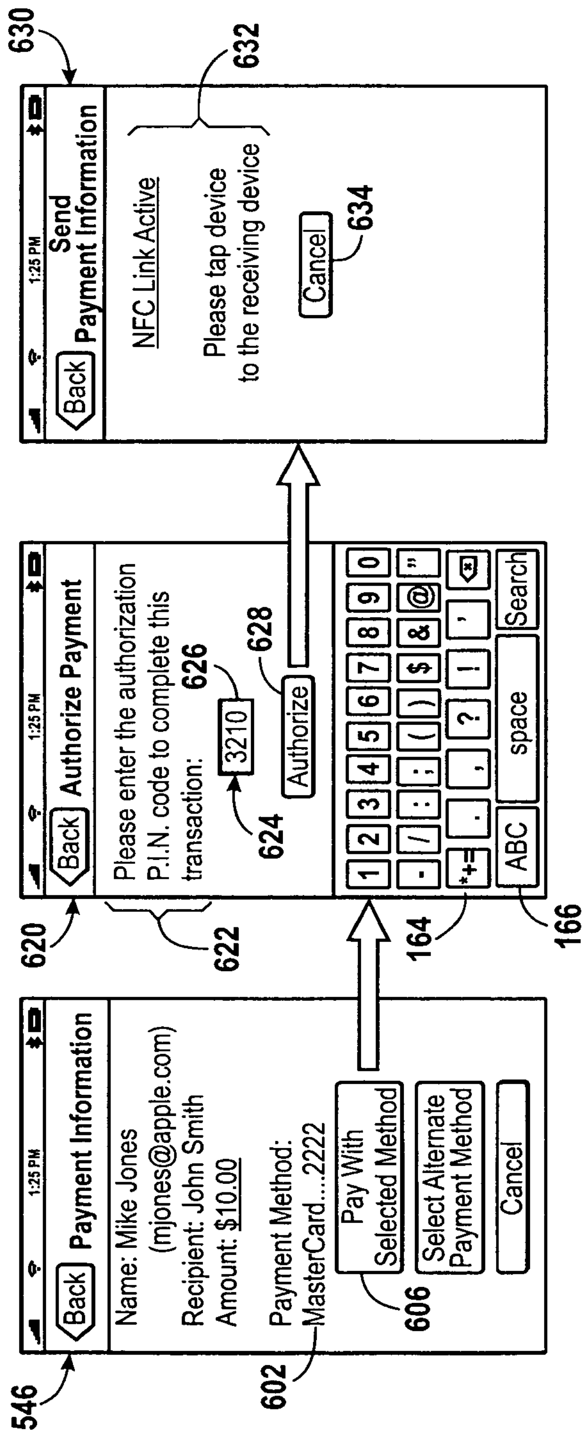
FIG. 14H shows a plurality of screens that may be displayed on the payor device for initiating the transmission of the payment account information selected in FIG. 14E to the payee device.

Continuing now to FIG. 14H, once a payment method, such as the alternate credit card account 602 has been selected, as indicated on the screen 546, the payor may proceed with the payment by selecting the graphical button 606. Thereafter, the screen 620 may be displayed on the payor device 92 and may include an instructional message 622 instructing the user that the authorization PIN code must be entered in order to complete the transaction. Accordingly, the payor may input the proper authorization PIN code 624 into the text field 626 by way of the numerical keyboard 164. As discussed above, it should be appreciated that the device may support the use of alphanumeric authorization pin codes. In such embodiments, the user may toggle between a numerical keyboard 164 and the text input keyboard 160 (not shown in FIG. 14H) by selecting the graphical button 166. Additionally, while the use of the authorization PIN code 624 has been illustrated in FIG. 14H with regard to the selection of the credit card account 602 in FIG. 14E, it should be appreciated that the authorization PIN code 624 may also be implemented with regard to the embodiments illustrated by FIGS. 14F and 14G as well, where the selected payment method is a bank account, as well as with any other type of payment method that may be selected on the payor device 92.

Once the proper authorization PIN code 624 has been entered, the user may authorize and send the payment information to the payee device 10 by selecting the graphical button 628. Upon selection of the graphical button 628, the screen 630 may be displayed on the payor device 92 and may indicate, as represented by the reference numeral 632, that the NFC device 46 of the payor device 92 has been powered on, thus enabling the corresponding NFC interface 60 and placing the payor device 92 into an active or host mode, as discussed above. The notification message 632 may further instruct the payor to perform a tap operation to the receiving device, in this case, the payee device 10. Additionally, the screen 630 may include the graphical button 634, by which the payor may select in order to cancel the sending of the payment information if necessary.

Figure 14I:
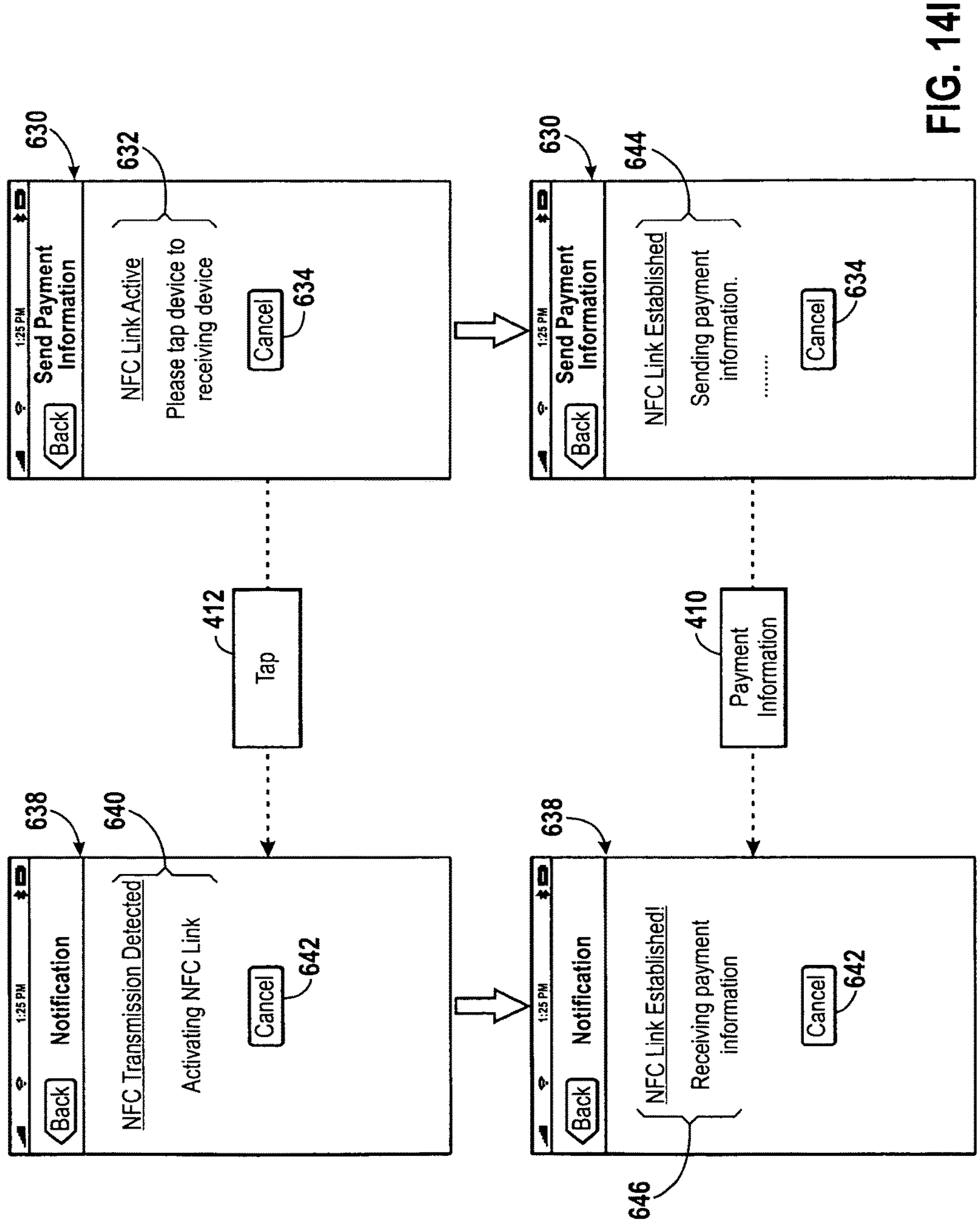
FIG. 14I shows a plurality of screens depicting the transmission of the payment account information selected in FIG. 14E to from the payor device to the payee device using the established communication channel of FIG. 14B.

Continuing now to FIG. 14I, this figure generally depicts a tap operation and subsequent establishment of an NFC connection between the payor device 92 and the payee device 10. As discussed above in FIG. 14H, the screen 630 which may be displayed on the payor device 92 may include the instructional message 632 indicating to the payor that the payor device 92 is currently in an active mode, and further instruct the payor to perform a tap operation, such as the tap operation 412 depicted in FIG. 12A, to the payee device 10. Thus, once the payor device 92 and the payee device 10 are placed within proximity of each other, such that the distance between the two devices is sufficient for the establishment of an NFC connection, the payee device 10 may detect the NFC transmissions being emitted from the payor device 92, such as the ping messages 400 as described above.

Upon detection of the NFC transmissions from the payor device 92, the payee device may activate its own corresponding NFC device 46. Further, the screen 638 may be displayed on the payee device 10 including the notification message 640 indicating to the payee that an NFC transmission has been detected and that the NFC device 46 of the payee device 10 is being powered on. The notification screen 638 may also further include the graphical button 642, which provides the payee with an option to cancel the establishment of an NFC connection if so desired. Thus, if the payee permits the establishment of the NFC connection, the screen 630 displayed on the payor device 92 and the screen 638 displayed on the payee device 10 may each be updated to display the notification messages 644 and 646, respectively. The notification message 644 displayed on the send payment information screen 630 may indicate to the payor that an NFC connection has been established and that the payment information 410 which may include, for example, the credit card account 602 selected in FIG. 14E, is being transmitted to the payee device 10. At the same time, the notification message 646 displayed on the screen 638 of the payee device 10 may indicate to the payee that the NFC connection has been established, and that the payment information 410 is being received on the NFC interface 60 of the payee device 10.

The actions depicted by the screens shown in FIGS. 14E-14I, may generally represent the step of providing payment information to the payee, as indicated by step 336 of the method 360 depicted and described above in FIG. 11B. Referring again to FIG. 15B, the step 366 of providing the payment information to the payee is illustrated in further detail. For instance, upon receiving the invoice information (step 536), a determination may be made on the payor device 92 as to whether or not to accept the received payment information, as illustrated by step 650. This step may correspond to the selection of the graphical button 542 on the screen 516, as discussed above.

Once the payment request information is accepted, the payor, at step 652, may further proceed with the step of selecting a payment account from which the payment request is to be debited or charged. This step may generally be represented by the selection of the alternate credit card account 602 depicted in FIG. 14E, or the selection of the bank accounts 612 or 614 depicted in FIG. 14F and FIG. 14G, respectively. Thereafter, once an appropriate payment account is selected, an NFC connection may be established by a tapping operation, as indicated at step 654, thereby establishing an NFC connection between the payor device 92 and the payee device 10, as discussed above, at step 654. Next, at step 656, the selected payment account information from step 652 may be transmitted to the payor device 10 by way of the established NFC connection. Referring to FIG. 14I, the transmission of the payment information at step 656 may correspond to the transmission of the payment information 410 from the payor device 92 to the payee device 10.

Additionally, from the point of view of the payee, the steps of establishing the NFC connection by way of the tap operation 412, as well as the receipt of the payment information 410, may correspond to the step 336 of the method 328, which represents the acquisition of the payment information 410 from the payor device 92. This step is further described FIG. 15A, in which the step 336 is illustrated in additional detail in accordance with the presently illustrated transaction. Referring to FIG. 15A, step 336 may include the step of first joining an NFC connection established through a tap operation, such as the tap operation 412, represented here by reference numeral 660. Following the establishment of the NFC connection, the payee may, at step 662, receive the payment account information (e.g., 410) corresponding to the selected payment account (e.g., step 652). Once the payment information is received by the payee device 10, the step of selecting a crediting account, as depicted by step 338 in FIG. 15A, may be performed on the payee device 10.

Figure 14J:
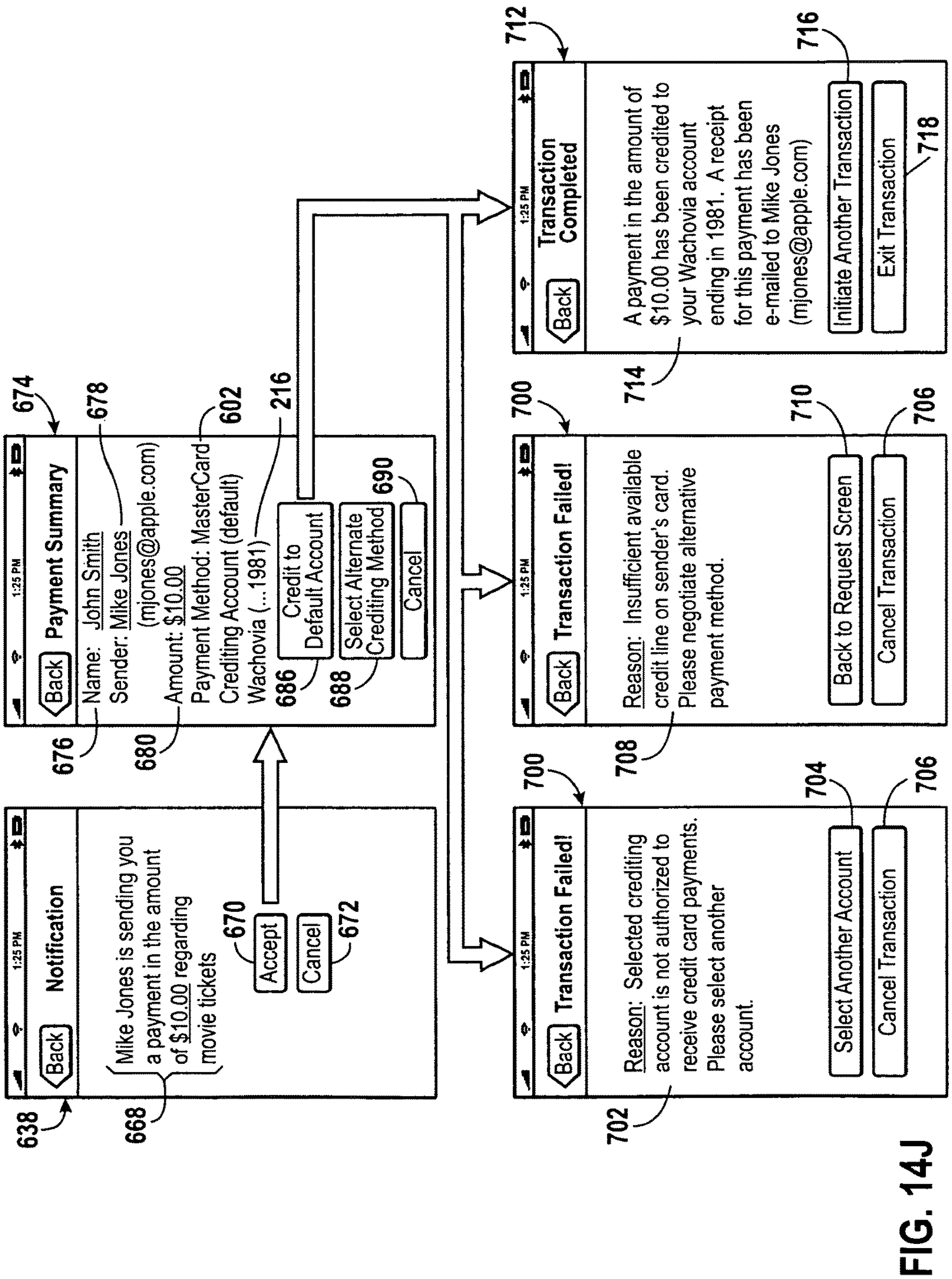
FIG. 14J shows a plurality of screens that may be displayed on the payee device illustrating a method for selecting a crediting account and completing the transaction originally initiated in FIG. 14A.

Referring now to FIG. 14J, the selection of the crediting account by the payee is illustrated by the screens 638 and 674 in accordance with one embodiment of the disclosure. Referring first to the screen 638, once the payment information 410 is received by the payee device 10, the screen 638 may be updated to display the notification message 668. The notification message 668 may include information pertaining to the identity of the payor, as well as the amount of the requested payment. In response to the notification message 668, the payee may either accept the offered payment by selecting the graphical button 670 or, alternatively, may choose to cancel the payment process by selecting the graphical button 672. If the payee chooses to accept the payment by selecting the button 670, the payee may be navigated to the screen 674.

As shown in FIG. 14J, the screen 674 may display the payee identity information 676 and the payor identity information 678. The payee identity information 678 may display both the name of the payor as well as one or more additional identifying attributes, such as an e-mail address, for example. As described in detail above, upon the successful completion of the transaction, a payment receipt, such as the payment receipt 428, may be sent to the payor's e-mail address specified in the payor identity information 678.

The screen 674 may further include the payment amount information 680, the payment method information specified by the payor, represented by reference numeral 682, as well as a crediting account to which the requested payment is to be credited. As shown on the screen 674, a crediting account may be initially selected as a default crediting account 216 specified by the payee during the configuration of device preferences, as discussed above with reference to FIG. 8. Additionally, the screen 674 may include the graphical button 686 by which the user may initiate the process of crediting the requested payment to the default crediting account 216, the graphical button 688 by which the user may select an alternate crediting account, as well as the graphical button 690 by which the user may cancel the pending transaction.

If the payee chooses to credit the payment to the default crediting account 216, as illustrated by the selection of the graphical button 686, the authorization and verification steps depicted by the decision block 340 in FIG. 11A, may be performed. The decision logic and determination steps that may take place in the decision block 340 are illustrated in further detail in FIG. 15A. As shown in FIG. 15, once the payee has selected the crediting account at step 338 and initiated the processing of the transaction information, such as by selecting the graphical button 686 on the screen 674, both the payment account (e.g., 602) selected by the payor and the crediting account (e.g., 216) specified by the payee may be transmitted, as indicated by step 694, to one or more financial servers (e.g., 100) for verification of the account information and authorization of the requested transaction. For example, as discussed above, specifically with reference to FIGS. 12A-12C, the one or more financial servers 100 may include a bank server, a credit card server, or some combination thereof, depending on the types of accounts provided by the payee and the payor.

Continuing now to step 696, a determination may be made by the financial servers as to whether the selected payment and crediting accounts are compatible. As discussed above, the case may arise in which the crediting account specified by the payee may not be authorized or configured to accept payments from the payment account selected by the payor. To provide one example, the payment and crediting account may not be compatible if the crediting account is a bank account that is not authorized to receive payments directly from a credit card account. For instance, referring back to FIG. 14J the screen 700 showing the notification message 702 may be displayed if it is determined by the financial servers 100 that the selected payment and crediting accounts are not compatible.

The method depicted in FIG. 15A may then proceed to the decision step 342 in which the payee has the option of renegotiating the payment terms by selecting an alternate crediting account, thus returning the method back to step 338. For example, the renegotiation of payment terms may be performed by selecting the graphical button 704 on the screen 700 of FIG. 14J. Alternatively, the payee may renegotiate the selection of a different payment account by the payor, thereby returning the method to step 662. Further, if at decision step 342 the payee chooses not to renegotiate the payment terms, then the payee may cancel the transaction, as indicated by step 344, such as by selecting the graphical button 706 on the screen 700.

Returning to the decision step 696, if it is determined that the payment and crediting account specified by the payor and the payee are compatible, then the method may proceed to the decision step 698, in which a determination may be made by the one or more financial servers 100 as to whether the payment account is valid and contains the sufficient funds to satisfy the requested payment. If it is determined that the specified payment is either invalid or does not contain sufficient funds to satisfy the requested payment, the method may return to decision step 342, in which the payee has the options either canceling the transaction at step 344, or renegotiating the terms of the transaction, such as by requesting that the payor provide another payment account that does contain the sufficient funds. As will be appreciated, this action may return the method back to step 662. Referring again to FIG. 14J, the notification message 708 may be displayed on the screen 700 if it is determined at step 698 that the payment account selected by the payor lacks the sufficient funds to satisfy the requested payment. Accordingly, the screen 700 may include the graphical button 710 by which the user may select in order to return to the payment request screen 484 discussed above in FIG. 14A. Additionally, as discussed above, the payee may also cancel the transaction by selecting the graphical button 706.

If it is determined at step 698 that the specified payment and crediting accounts are both valid and that the payment account has the sufficient funds, then the transaction may be authorized by the financial servers and processed, wherein the amount specified in the payment request may be debited from the payment account and credited to the crediting account. For instance, as discussed above with reference to FIG. 12A, once the selected payment credit card account (e.g., 602) is verified, the credit card server 382 may send an authorization message to the financial server 380 indicating that the transaction has been approved for processing, as represented by block 424. Thereafter, once the transaction is processed, the payee may receive a payment, as indicated at step 346 of the method 328 in FIG. 11A. Additionally, from the viewpoint of the payor, a determination may made at step 368 of the method 360 in FIG. 11B as to whether the transaction was processed and completed successfully. If it is determined that the transaction failed for any reason, such as those depicted by the notification messages 702 and 708 in FIG. 14J, then the payor's account is not charged at step 370.

Similarly, if it is determined that the transaction was processed successfully, then the payor's account may be debited for the amount specified in the payment request at step 372, as discussed above. For example, referring again to FIG. 14J, upon the successful completion of a transaction, the screen 712 may be displayed on the payee device 10. The screen 712 may include the notification message 714 informing the payee that the requested payment amount 680 has been credited to the selected crediting account 216. The notification message 714 may further indicate to the payee that a payment receipt (e.g., 428) for the present transaction has been sent or transmitted to the payor. As discussed above, a payment receipt in an electronic form may be e-mailed to the payor using the e-mail address provided in the payor identification information 678 on the screen 674. The transaction notification screen 712 may further include the graphical buttons 716 and 718. The graphical button 716 may be selected in order to initiate a subsequent transaction. For example, by selecting the graphical button 716, the payee may be returned to the transaction initiation screen 476 described above in FIG. 14A. Additionally, the user may exit the transaction application 34 by selecting the graphical button 718, thereby returning to the home screen 29 of the payee device 10, for example.

While the techniques and screen images associated with the transactions described above with regard to the embodiments illustrated in FIGS. 12A-C and FIGS. 14A-J specifically rely on the initiation of a transaction by a payee, such as via sending a payment request (e.g., 384) from the device 10, it should be appreciated that in additional embodiments, the payor may initiate the transaction as well. For instance continuing now to FIGS. 16A and 16B, these figures collectively illustrate methods from the viewpoints of the payor and the payee, respectively, in which a transaction may be initiated by a payor and subsequently processed by a payee using the techniques generally discussed above.

Figure 16A:
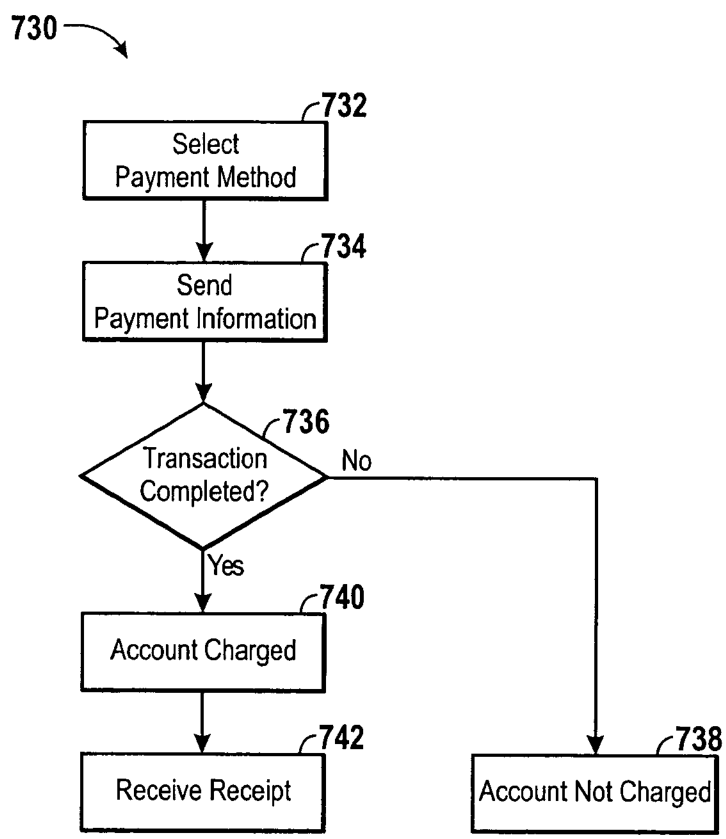
FIG. 16A depicts a flowchart illustrating a method in which the payor device of FIG. 4 is operated to initiate a transaction in accordance with one embodiment.

Referring first to FIG. 16A, a method 730 for initiating a transaction from the viewpoint of the payor is illustrated. The method 730 begins with a selection of a payment method at step 732. As described above, the selection of the payment method may include selecting a payment account from one or more payment accounts stored upon a device, such as the payor device 92. Once a payment account is selected, the payment information corresponding to the selected payment account may be transmitted or sent to a payee, as indicated by step 734. As discussed above, the transmission of the payment information may occur through a communication channel established between a payor device 92 and a device belonging to the payee, such as the device 10. In the above-discussed embodiments, this communication channel may include an NFC connection, but may also include additional communication channels established via other communication interfaces that may be available on the payee device 10 and the payor device 92, such as those illustrated in FIG. 3 by the communication interface 56 (e.g., WAN, LAN, WLAN, PAN, etc.). Next, at decision step 736, a determination is made as to whether the transaction initiated by the payor is successfully completed. For example, as discussed above, the successful completion of a transaction may result in the payee's selected crediting account being credited with a payment from the payment account selected at step 732. If it is determined that the transaction did not complete successfully, then the payor's payment account will not be charged, as indicated at step 738.

Returning to step 736, if it is determined that the transaction initiated by the payor is completed successfully, then the method may proceed to step 740, where the payor's selected payment account is charged for an amount that may be specified in the payment information sent at step 734, as discussed above. Finally, after the payor's account is charged at step 740, the payor may receive a receipt from the payee, as indicated at step 742, which may serve as an acknowledgement that the payment sent by the payor has been received. As discussed above, in some embodiments, the receipt may be in electronic form and received by the payor through an e-mail address.

Figure 16B:
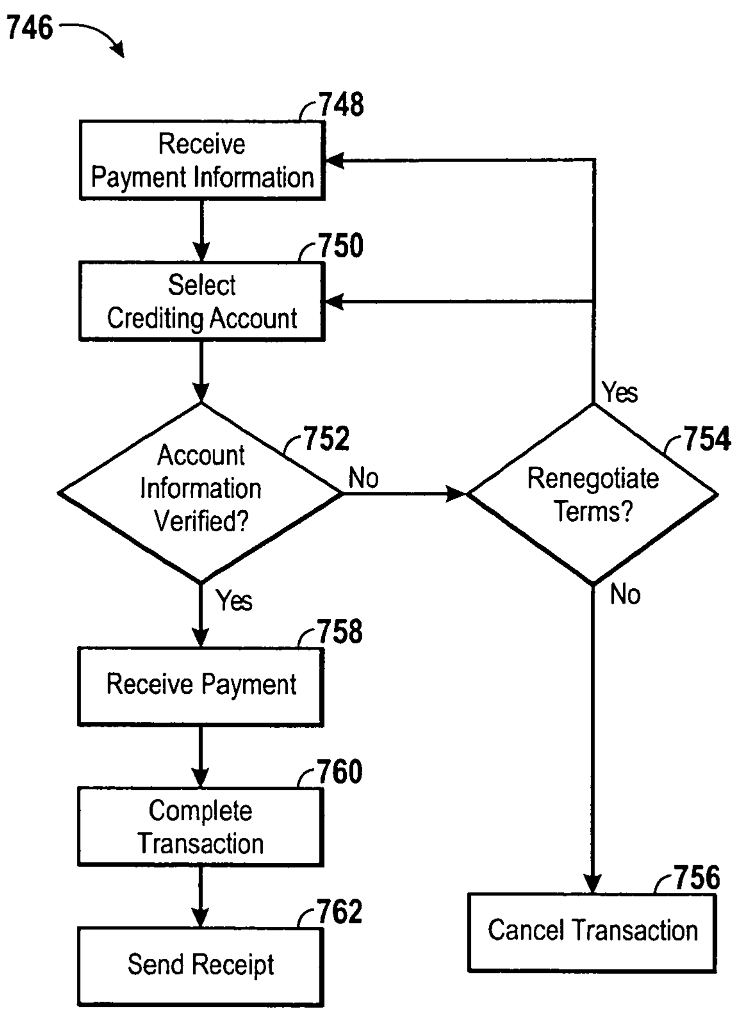
FIG. 16B depicts a flowchart illustrating a method in which the payee device of FIG. 4 is operated to respond to the transaction initiated in FIG. 16A in accordance with one embodiment.

Referring now to FIG. 16B, a method for responding to the transaction initiated by the payor in the method 730 of FIG. 16A and subsequently processing the transaction is illustrated and generally referred to by reference numeral 746. The method 746 may begin at step 748 wherein payment information is received by the payee. By way of example, the payment information received by the payee at step 748 may correspond to the payment information sent by the payor at step 734 of the method 730. The payment information may include, for example, information with regard to a payment account selected by the payor, the identity of the payor, as well as the amount of the payment being sent by the payor. The payment information may be received using a device, such as the device 10 described above, using an NFC connection, for example.

Thereafter, at step 750, the payee may select a crediting account to which the received payment is to be credited. For example, the crediting account may be selected by the payee from one or more crediting accounts stored on the payee device 10. Once the appropriate crediting account is selected, the payee may initiate the account verification process by transmitting the account information, which may include both the payment account information sent by the payor, as well as the selected crediting account information from step 750, to one or more financial servers configured to verify these accounts and to authorize a payment from the payment account to the selected crediting account. This account verification and payment authorization process is represented in FIG. 16B by decision step 752, in which a determination is made as to whether both the payment account and the crediting account as specified in the present transaction are valid, and whether a payment account is authorized and has the sufficient funds to perform the requested payment. If it is determined at step 752 that the transaction cannot be processed, such as for one or more of the reasons described above with regard to FIG. 14J, for example, then the method 746 may proceed to decision step 754.

At decision step 754, the payee may have the option of renegotiating the terms of the transaction. As described above, this may include one or more of either selecting an alternate crediting account, or requesting that the payor provide an alternate payment account. Accordingly, if the payee decides to select an alternate crediting account, the method may return back to step 750. Alternatively, if the payee chooses to request that the payor provide an alternate payment account, the method may return to step 748, whereby the payee may then receive payment information relating to, for example, a newly selected alternate payment account. Additionally, the payee may also have the option of canceling the transaction, as indicated by step 756, if a decision is made not to renegotiate the terms of the transaction at decision step 754.

Returning to the decision step 752, if it is determined that the payment account and the crediting account are both verified and that the payment from the payment account to the crediting account may be authorized, then the payee may receive the payment sent by the payor at step 758. For example, the receipt of the payment at step 758 may include debiting the amount of the payment, such as specified in the payment information received at step 748, from the payor's selected payment account, and thereafter crediting the same amount to the payee's selected crediting account, thus completing the transaction at step 760. Additionally, the method 746 may further include sending a receipt acknowledging that the payment sent by the payor has been received by the payee, as indicated by step 762. The transmission of the receipt at step 762 may correspond to the receipt received by the payor at step 742 of the method 730 illustrated by FIG. 16A.

Figure 17A:
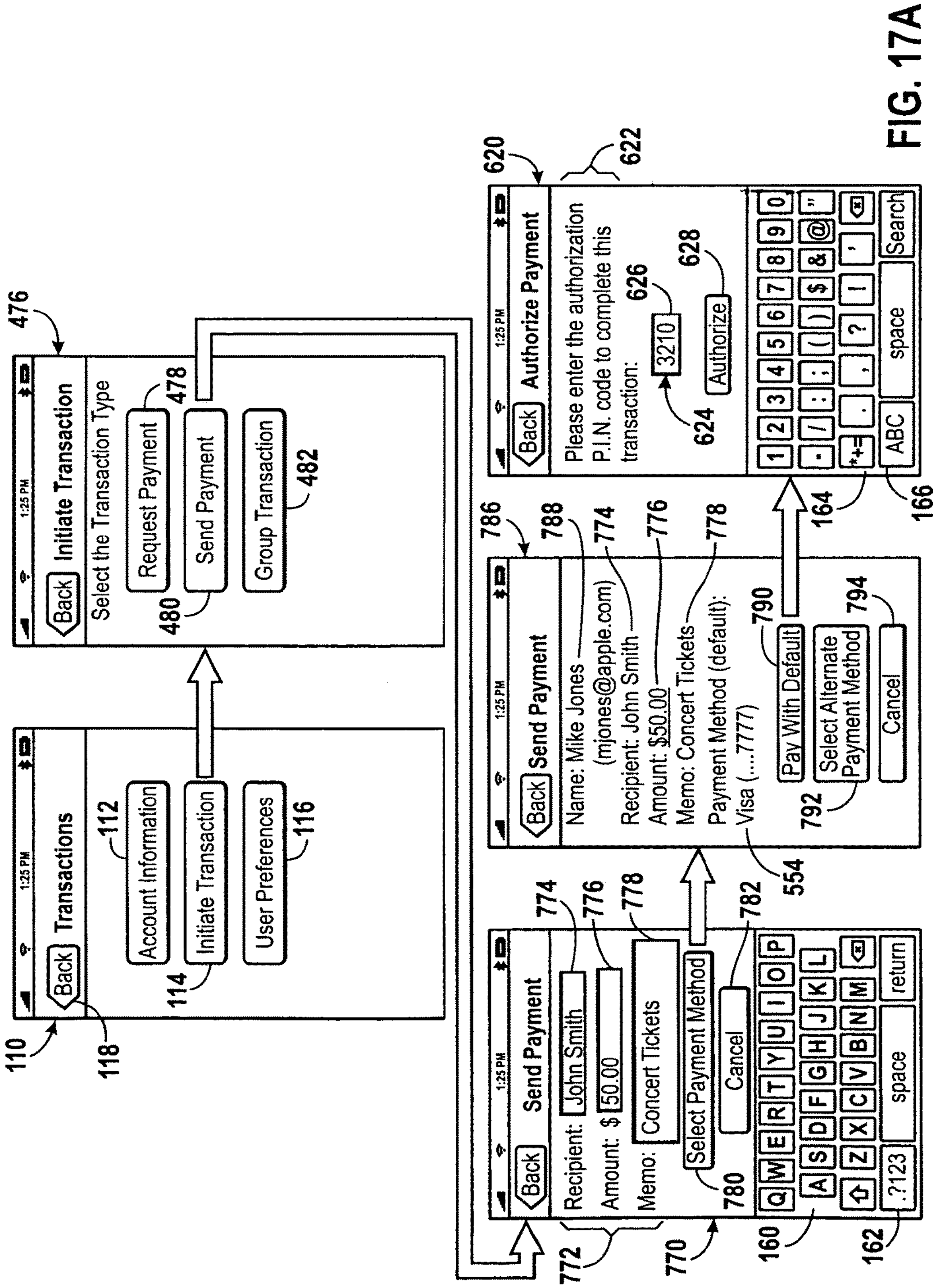
FIG. 17A shows a plurality of screens that may be displayed on a payor device illustrating a method for initiating a transaction in accordance with the methods described in FIGS. 16A-16B in accordance with one embodiment.

Continuing now to FIG. 17A, a plurality of screen images depicting the initiation of the transaction on the payor device 92 is illustrated in accordance with the transaction described by FIGS. 16A and 16B. The payor device 92 may include a transaction application similar to the transaction application represented by the icon 34 and described above with reference to the payee device 10. Upon execution of the transaction application, the transaction screen 110 discussed above in FIG. 5A, may be displayed on the payor device 92. From the transaction home screen 110, a transaction may be initiated via selection of the graphical button 114.

Upon selection of the graphical button 114, the payor may be advanced to the screen 476. The screen 476 may display the graphical buttons 478, 480, and 482, as discussed above. As illustrated the payor may initiate the sending of a payment by selecting the graphical button 480. Thereafter, the payor may be advanced to the screen 770. The screen 770 may include a plurality of text fields, generally represented by the reference numeral 772, in which the payor may input information by way of the text keyboard 160. For instance, as illustrated on the screen 770, the payor may input the identity of the payee 774, the amount of the payment being sent to the payee 776, as well as a brief description with regard to the purpose or nature of the payment 778. The screen 770 may further include the graphical buttons 780 and 782. Once the information 774, 776, and 778, have been entered into the form fields 772, the user may proceed to the screen 786 in order to select an appropriate payment method by selecting the graphical button 780. Alternatively, the user has the option of canceling the transaction, and therefore, not sending a payment by selecting the graphical button 782.

As shown on the screen 786, the information pertaining to the payee's identity 774, the amount of the payment being sent 776, as well as the description regarding the payment 778, may be displayed. Additionally, the screen 786 may further display the information pertaining to the identity of the payor, as depicted by reference numeral 788. As discussed above, the payor identity information may include both the name of the payor, as well as an additional identifying attribute, such as an e-mail address. Also displayed on the screen 786 may be the selection of a payment method. As shown in FIG. 17A, the selected payment method be initially selected as the default payment method 554, discussed above with reference to FIG. 14E.

The screen 786 may further include the graphical buttons 790, 792, and 794. As discussed above, these buttons may correspond to specific functions that may be performed on the payor device 92 upon the selection of these buttons. For instance, the graphical button 790 may represent a function by which the payor may initiate the transaction using the default payment account 554 as the selected payment method. The graphical button 792 may represent a function by which the payor may be directed to one or more screens for the selection of an alternate payment method, such as those described above with reference to the screen 566 of FIG. 14E. The payor may also have the option of canceling the payment by selecting the graphical button 794.

The payee device 10 and the payor device 92 may each have configured thereon one or more security features. For instance, as described above with a reference to FIG. 14H, the payor device 92 may require the entry of a previously stored authorization PIN code before the sending of a payment may be authorized. By way of example, as illustrated in FIG. 17A, upon selection of the graphical button 790, the payor may be advanced to the screen 620 discussed above in FIG. 14H. The screen 620 includes a prompt 622 instructing the user to enter the authorization PIN code 624 into the text field 626 using the numerical keyboard interface 164. Additionally, as discussed above the user may select the graphical button 166 to toggle between the numeric keyboard interface 164 and a text input keyboard interface 162

(not shown in FIG. 17A). For instance, this feature may be implemented in embodiments where the device 92 supports alpha-numeric PIN codes including both text and number characters.

Once the authorization PIN code 624 has been entered, the payor may proceed to send the entered payment information from the screen 786 to the payee. For example, as discussed above with reference to FIG. 14I, the sending of the payment information may be accomplished by way of an NFC connection established between the payor device 92 and the payee device 10 through a tap operation 412. Accordingly, once the payor device 92 and the payee device 10 have been tapped and placed within a distance that is capable of supporting an NFC connection (e.g., 2-4 cm) between these devices, the payment information displayed on the screen 786 may be transmitted to the payee device 10 by way of the established NFC connection.

Figure 17B:
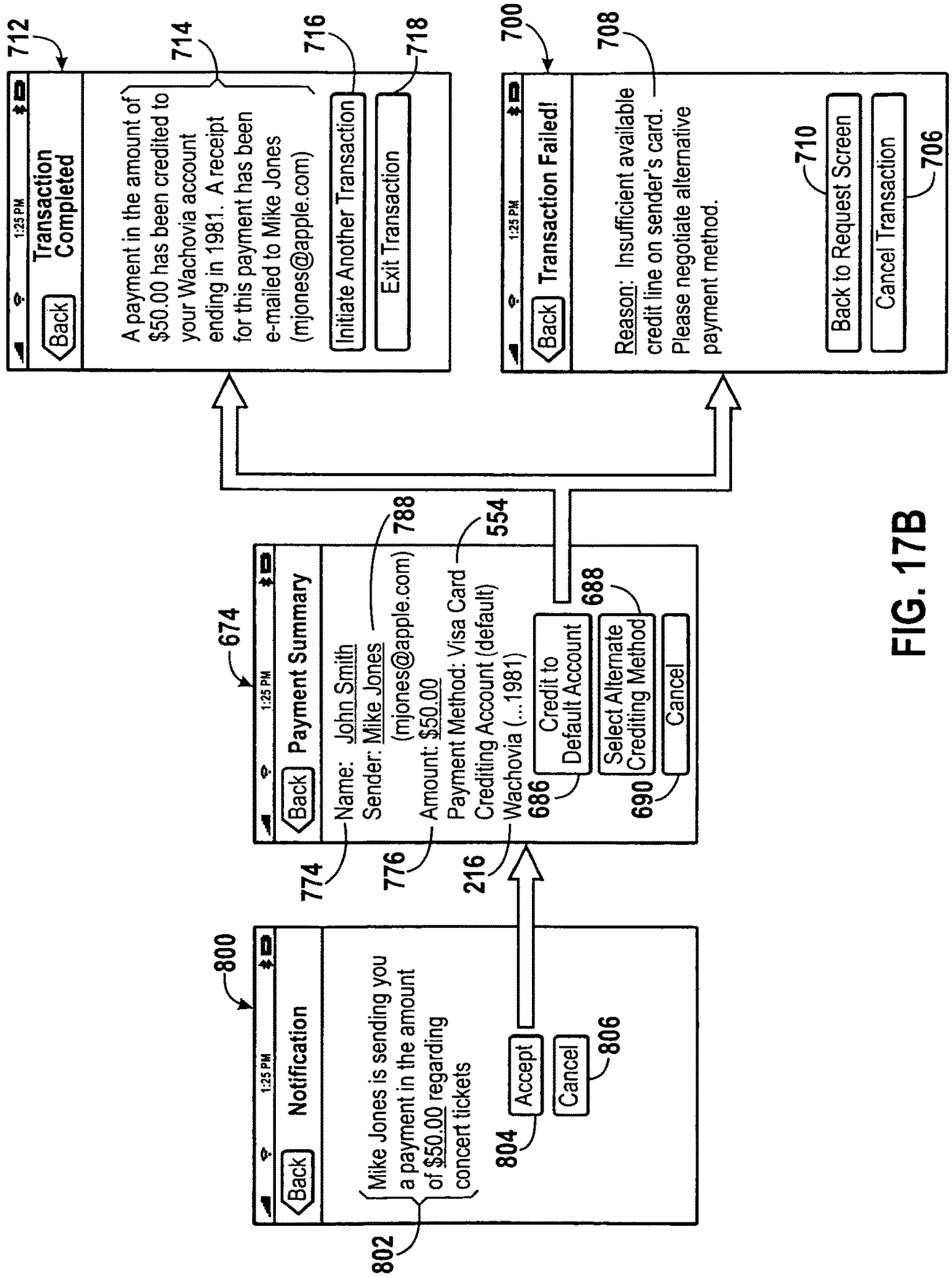
FIG. 17B shows a plurality of screens that may be displayed on a payee device illustrating a method for selecting a crediting account and completing the transaction initiated by FIG. 17A.

Continuing now to FIG. 17B, once the payment information is received by the payee device 10, the screen 800 may be displayed on the payee device 10. The screen 800 may include the notification message 802 informing the payee that an offer for payment in the amount specified by the payor in the screen 770 of FIG. 17A has been received. The screen 800 may further include the graphical buttons 804 and 806. By selecting the graphical button 804, the payee may be advanced to the screen 674, as previously discussed above in FIG. 14J. The screen 674 may display the information that was entered by the payor in the screen 770, such as the identity of the payee 774, the amount of the payment being sent 776, as well as the method of payment selected by the payor, in this case, the default payment account 554. The screen 674 may further include the payor's identification information 788, which may include the payor's e-mail, and may be used to send a receipt to the payor if the transaction is successfully completed. The screen 674 may further display the presently selected crediting account to which the payment is to be credited. As shown here, the selected crediting account is initially the default account 216 that was configured in FIG. 8. To process the transaction based on these settings, the payee may select the graphical button 686. As discussed above, the selection of the graphical button 686 may initiate a process by which the payment account 554 selected by the payor is debited for the amount 776, which is then credited to the selected crediting account 216. This process may involve verification and authorization of the transaction by one or more financial servers 100, such as those described above in FIGS. 12A-C.

Depending on whether the processing of the transaction is successful, the screens 700 or 712 discussed above in FIG. 14J may be displayed on the payee device 10. For instance, if the transaction failed for one or more reasons, the screen 700 may be displayed. The screen 700 may include a notification message 708 informing the payee as to the reason or reasons that the transaction failed. Additionally, the screen 700 may provide the payee with an option to either return to the screen 484, such as by way of the graphical button 710, as well as an option to cancel the transaction through the selection of graphical button 706. If the transaction is successfully completed, the screen 712 may be displayed on the payee device 10, displaying the notification message 714 informing the payee that the transaction has successfully completed and that the payment amount specified by the payor 776 has been credited to the selected crediting account 216. The notification message 714 may further inform the payee that a receipt has been sent to the payor.

While the above-described embodiments all illustrate transactions involving the use of monetary instruments, such as credit card and bank accounts, it should be understood that the techniques set forth in the present disclosure may be applicable to other types of accounts representing a holding of some sort of medium of exchange, including the non-monetary and non-cash accounts described above (e.g., 126, 604). For example, a non-cash account may be an account associated with an online music vendor service, such as an iTunes® account, available through the iTunes® online digital media store/service operated and managed by Apple Inc.

An iTunes® account may operate on the basis of credits which may be exchanged or redeemed from an internet-based online virtual store for the purchase of music files (e.g., .mp3, .m4a) as well as other related types of media, such as podcasts, music videos, audio books, game applications, movies, or the like. Upon purchase, these media products may be stored on the device 10, such as in the long term storage device 54 for later viewing or listening by the user. While the credits associated with an iTunes® account may not have monetary value in the real world, these credits may nevertheless be used as a non-cash medium of exchange with regard to products and services offered through the iTunes® service. Further, in accordance with aspects of the present disclosure, credits held by iTunes® accounts may be exchanged between account holders by way of the transaction techniques described above.

Before continuing the present discussion, it should be understood that the use of the iTunes® services offered by Apple Inc. are described herein merely by way of example and, that in accordance with the present disclosure, the techniques described here may be applicable to non-cash accounts provided by a number of online vendors, in which a non-cash medium of exchange (e.g., "credits") may be stored in these accounts and exchanged for products or services offered by the respective online vendor.

Figure 18:
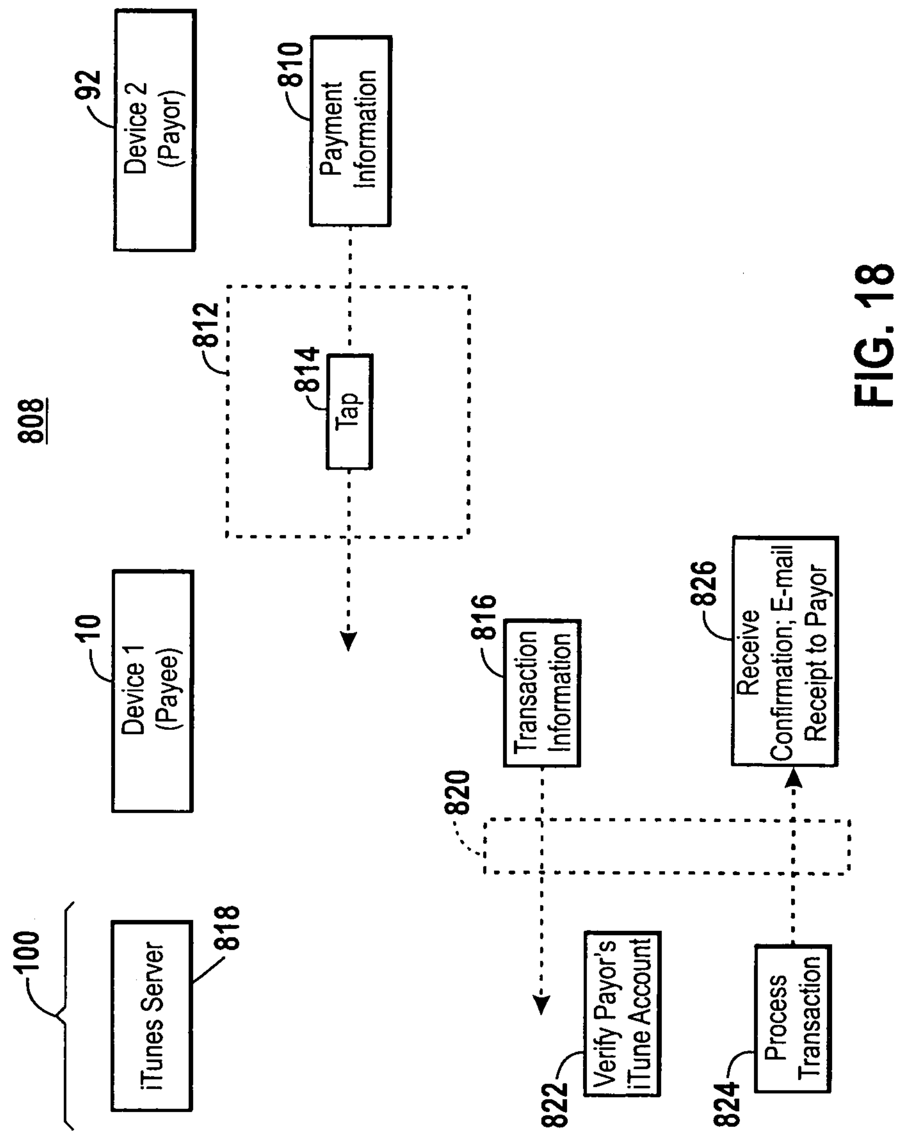
FIG. 18 is a schematic representation of a system adapted to carry out a transaction in which a selected payment account includes a non-cash account in accordance with one embodiment.

Referring now to FIG. 18, the transaction techniques illustrated by FIGS. 17A and 17B are described now with reference to iTunes® accounts held by the payee and payor. Specifically, FIG. 18 illustrates a schematic representation of a transaction 808 in which a payment is initially sent from a payor device 92 to a payee device 10, and wherein the payment information 810 sent to the payee specifies the an iTunes® account belonging to the payor as being the selected payment account. The payment information 810 may further indicate amount or number of credits which the payor wishes to transfer to the payee as a payment. In order to transmit the iTunes® account information to the payee device 10, a tap operation 814 between the payee device 10 and the payor device 92 may be performed, thus establishing an NFC connection 812 through which the payment information 810 may be transferred.

After receiving the payment information 810 on the payee device 10, the payee may select the appropriate crediting account to which the payee wishes for the payment indicated by the payment information 810 to be credited. For example, in the illustrated scenario, the selected crediting account may be a respective iTunes® account belonging to the payee. Thus, the payee's and the payor's iTunes® account information, as well as the payment amount (e.g., in credits) specified in the payment information 810, may be collectively represented by the transaction information block 816. Thereafter, the transaction information 816 may be transmitted by the payee device 10 to the one or more financial servers 100, described above, for further processing of the transaction 808.

As shown in FIG. 18, the one or more financial servers 100 in the present embodiment may be represented by an iTunes® server 818 configured to maintain the respective iTunes® accounts belonging to the payor and the payee. As discussed above, specifically with reference to the transaction 378 depicted in FIG. 12C, when both a payment account and a crediting account are held by the same entity or financial institution, it may not be necessary to communicate with an additional external server (e.g., belonging to a different entity or financial institution) for authorization and processing of the transaction.

The transmission of the transaction information 816 to the iTunes® server 818 may occur by way of a network 820, which may be provided by any suitable networking interface available on payee device 10, such as those specified by the communication interface block 56 in FIG. 3. Upon receiving the transaction information 816, the iTunes® server 818 may perform one or more verification actions, as indicated by reference numeral 822, to verify that both of the iTunes® accounts are valid, and that the payor's iTunes® account has at least a sufficient number of credits in order to satisfy the payment amount specified in the payment information 810. If it is determined that both iTunes® accounts are valid and that the payor's iTunes® account has sufficient credits, then the transaction may be processed, as indicated by reference numeral 824. Thereafter, the iTunes® server 818 may transmit, by way of the network 820, a confirmation message to the payee device 10 notifying the payee that the payee's iTunes® account has been credited with a payment. Additionally, as represented by reference numeral 826, upon receiving the confirmation, the payee device 10 (or the iTunes® server 818) may further be configured to transmit a receipt to the payor device 92, such as an electronic receipt using the payor's e-mail address, acknowledging that payor's iTunes® account has been debited or charged for the amount specified by the payment information 810, thereby concluding the transaction 808. The above-described transaction 808 may be better understood with reference to FIGS. 19A-19D, in which a plurality of screen images depicting the transaction 808 illustrated by FIG. 18A is illustrated.

Figure 19A:
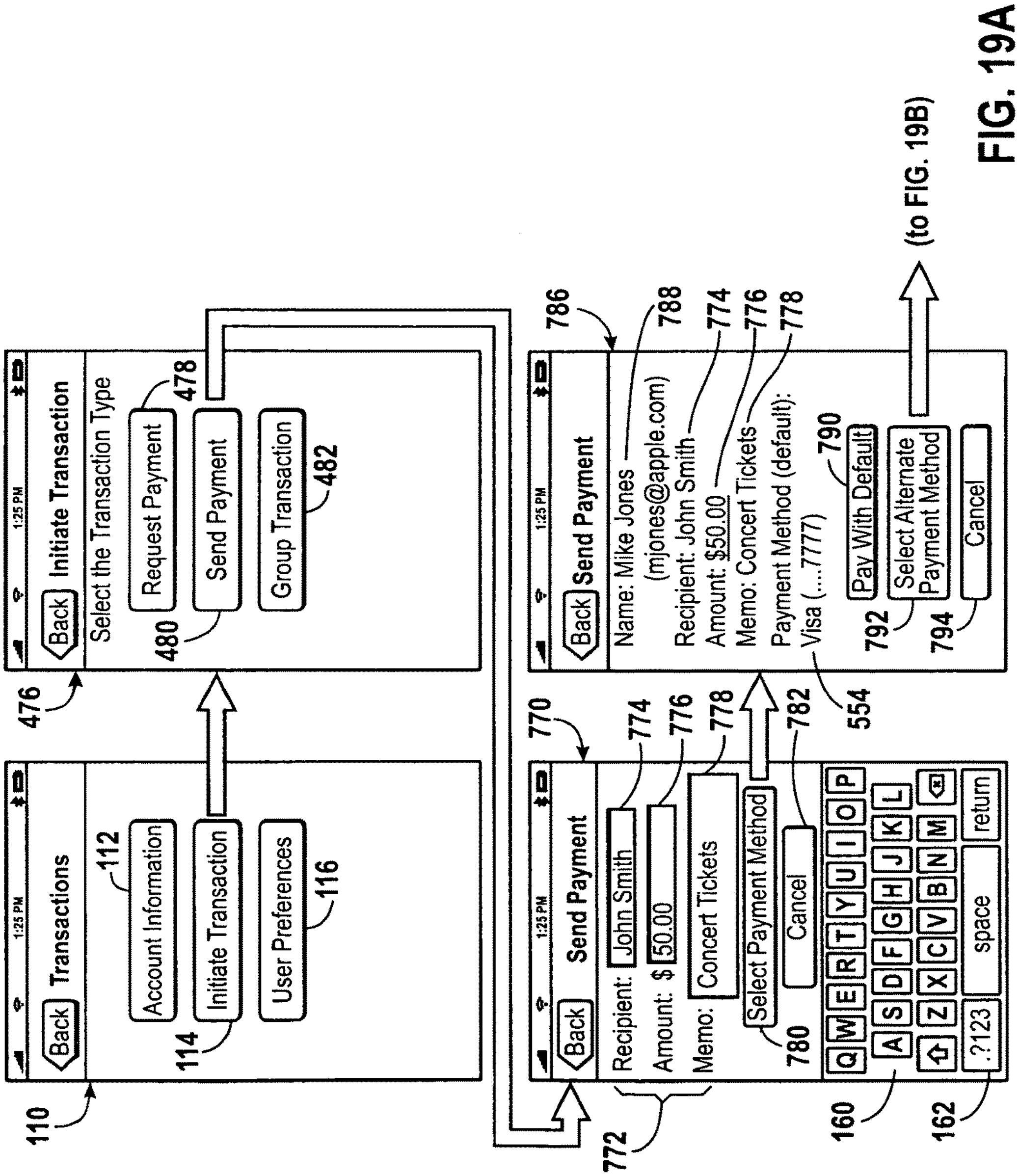
FIGS. 19A and 19B show a plurality of screens that may be displayed on a payor device illustrating a method for selecting the non-cash account of FIG. 18 as a payment account and initiating a transaction in accordance with one embodiment.

Beginning first with FIG. 19A, it should be noted that these screens are generally identical to those described above with reference to FIG. 17A. For instance, beginning from the screen 110, the payor may initiate the transaction process by selecting the graphical button 114. Thereafter, the screen 476 may be displayed, and the payor may further select the graphical button 480 to specify that the transaction is to be initiated directly via the sending of the payment (e.g., without first awaiting for a request form the payee, as discussed above in FIGS. 12A-12C). Upon selection of the graphical button 480, the payor may be advanced to the screen 770, whereby the form fields 772 may be completed using the text keyboard interface 160. Thereafter, by selection of the graphical button 780, the user may be further advanced to the screen 786, which may display the payee identity information 774, the payment amount 776, as well as a brief description regarding the nature of the payment 778. Additionally, the screen 786 may further include identity information pertaining to the payor 788, as well as display the presently selected payment method. As shown here, the payment method may initially be selected as the default payment account 554. Next, rather than selecting the graphical button 790 to initiate the payment using the default payment account 554, as described above in FIG. 17A, the payor may select the graphical button 792 in order to select the iTunes® account described in FIG. 18 as the selected payment method.

It should be noted that specified reason 778 for the present payment may represent a cash or monetary sum of a debt owed to payee by the payor, and may not necessarily be related to one or more of the services offered through the iTunes® service. Nevertheless, the present figures illustrate how an agreement may be reached between the payor and the payee to satisfy the debt using a non-cash asset, in this case, iTunes® credits.

Figure 19B:
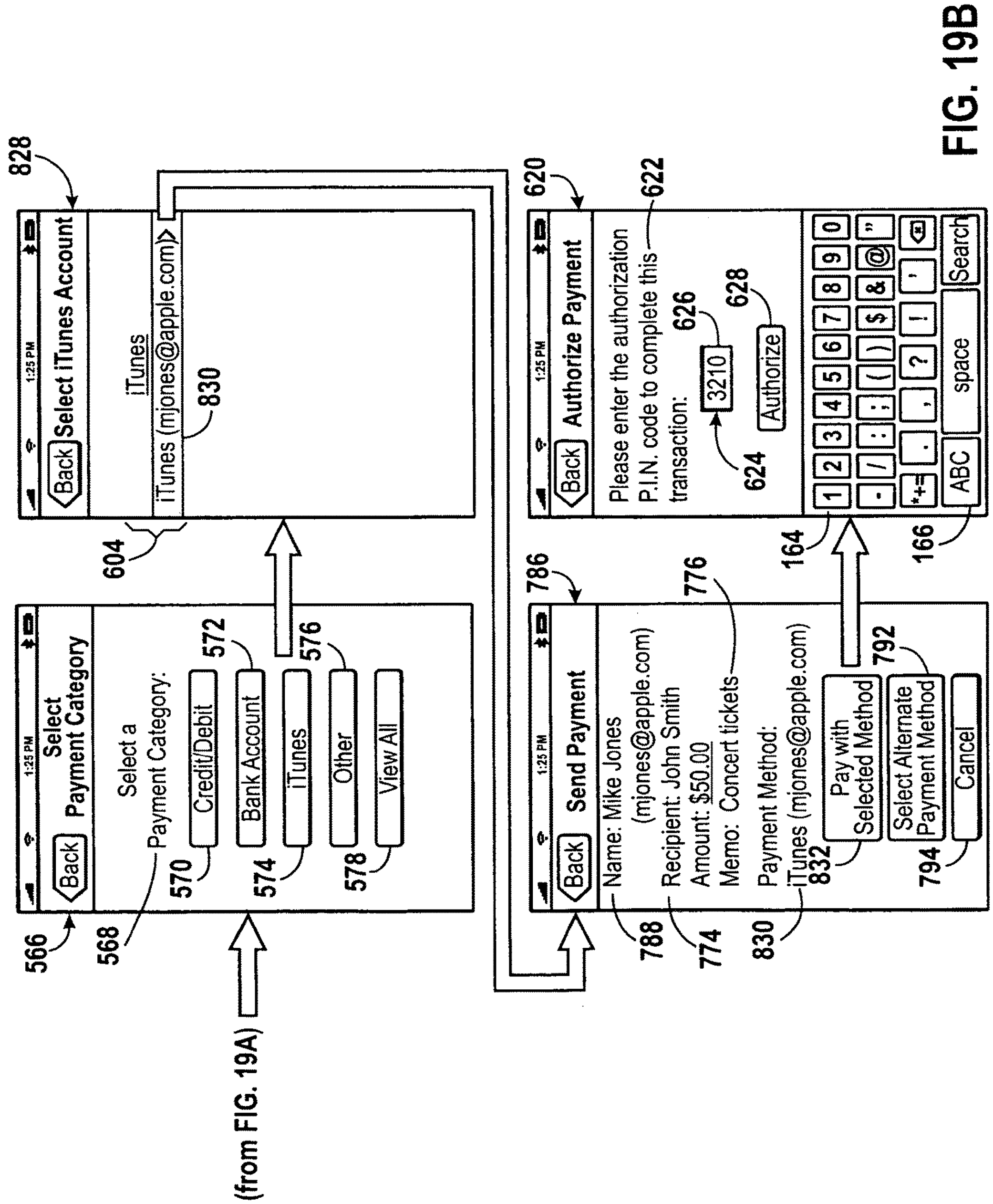

Continuing to FIG. 19B, upon selection of the graphical button 792, the payor may be advanced to the screen 566 previously described above with reference to FIG. 14E. As discussed above, the screen 566 may display a plurality of graphical buttons 570, 572, 574, 576, and 578, each corresponding to a payment category which may be selected by the payor. As shown in FIG. 19B, the payor may select the graphical button 574 in order to proceed to the screen 828. The screen 828 may display a listing 604 of all iTunes® accounts presently stored on the payor device 92. Accordingly, the payor may select the desired iTunes® account 830 for use as a payment account in the present transaction 808.

Upon selection of the iTunes® account 830, the payor may be returned to the screen 786 in FIG. 19B, which may be updated to reflect the selected iTunes® account 830 as the payment method. Thereafter, the payor may select the graphical button 832 in order to proceed to the screen 620. As discussed above, the payor device 92 may include one or more security features requiring that an authorization PIN code is first provided before transmitting payment information from the payor device 92. For example, as shown in the screen 620, the payor may be required to input the authorization PIN 624 into the text field 626. Once the authorization pin code 624 is entered (e.g., via the numeric keyboard interface 164), the payor may authorize the sending of the iTunes® account information 830 by selecting the graphical button 628.

Figure 19C:
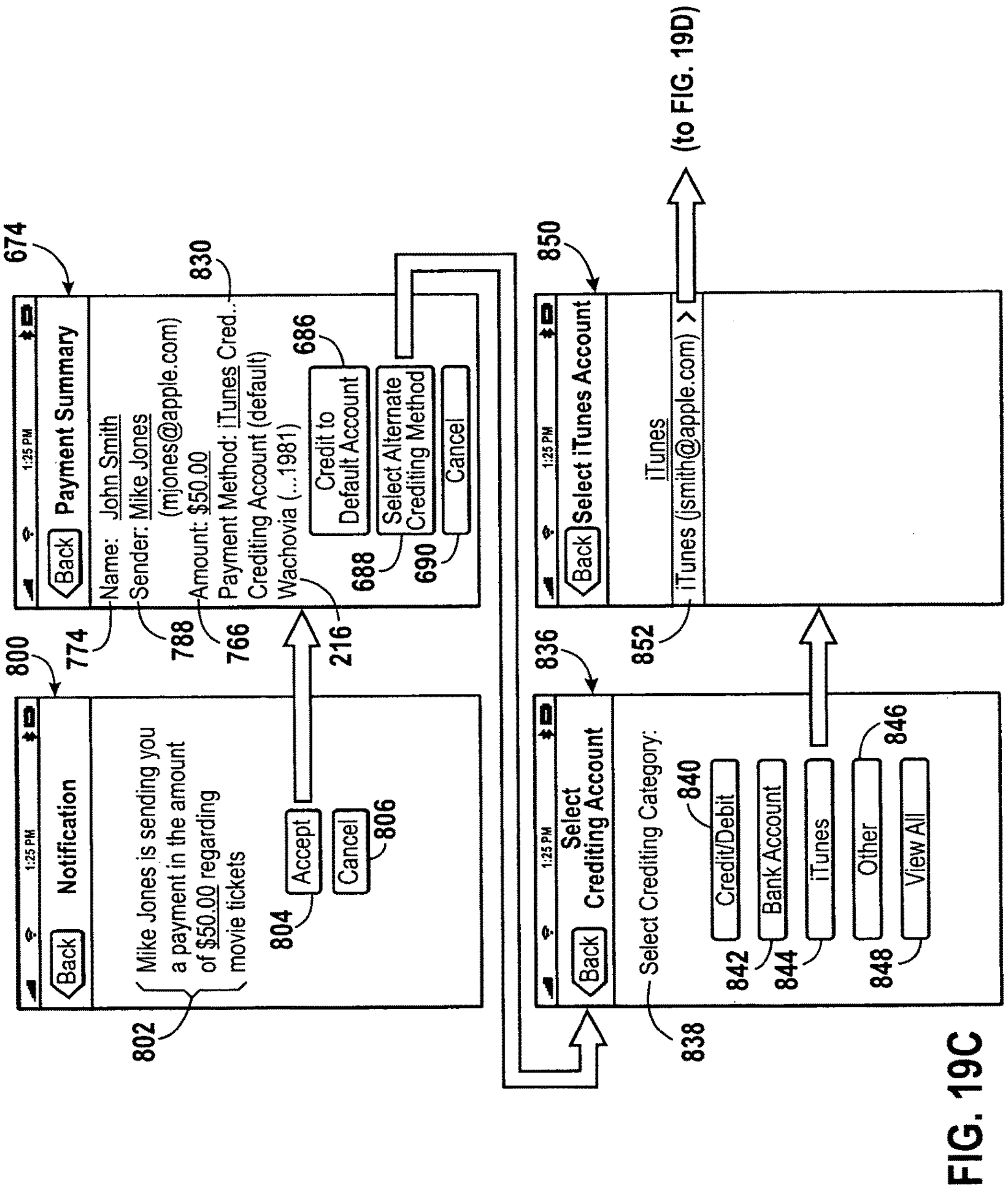
FIG. 19C shows a plurality of screens that may be displayed on a payee device illustrating a method for selecting a non-cash crediting account in accordance with one embodiment.

Continuing now to FIG. 19C, the screens illustrated herein depict screen images that may be displayed on the payee device 10 upon receiving the iTunes® payment account information 830. As discussed above, the receipt of the payment information 830 may be performed by establishing an NFC connection through a tap operation 814, as depicted in FIG. 18. Upon receiving the payment information 830, the notification screen 800 may be displayed on the payee device 10. The screen 800 may include a notification message 802 informing the payee that a payment in the amount indicated by the reference numeral 776 has been received from the payor 788. The screen 800 may further display the graphical buttons 804 by which the user may proceed with additional steps to complete the processing of the transaction, and the graphical button 806, by which the user may choose to cancel the present transaction.

For example, by selecting the graphical button 804, the user may be advanced to the screen 674, as described above in FIG. 14J. The screen 674 may display the identity of the payee 774, the identity of the payor 788, the amount of the requested payment 776, as well as the selected payment method, the iTunes® account 830. As will be understood, the requested payment amount may in terms of "credits" stored in the payor's iTunes® account 830. As shown in the screen 674 of FIG. 19C, the crediting account may initially be selected as the default crediting account 216. Here, rather than selecting the graphical button 686 to credit the payment to the default crediting account 216, the payee may select the graphical button 688 in order to select an alternate crediting account.

Upon selection of the graphical button 688, the payee may be navigated to the screen 836, which may be similar to the screen 566 described above in FIG. 19B, except that the functions provided by the screen 836 relate to the selection of the crediting account rather than the payment account. The screen 836 may include the prompt 838 instructing the payee to select from one of the following crediting account categories represented by the graphical buttons 840, 842, 844, 846, and 848. In order to select a compatible account (in this case an iTunes® account) for receiving a payment sent by the payor, the user may select the graphical button 844, thus advancing the user to the screen 850. The screen 850 may include a listing of all the iTunes® accounts stored on the payee device 10. Accordingly, the payee may select the iTunes® account 852 as the crediting account in the present transaction 808.

Figure 19D:
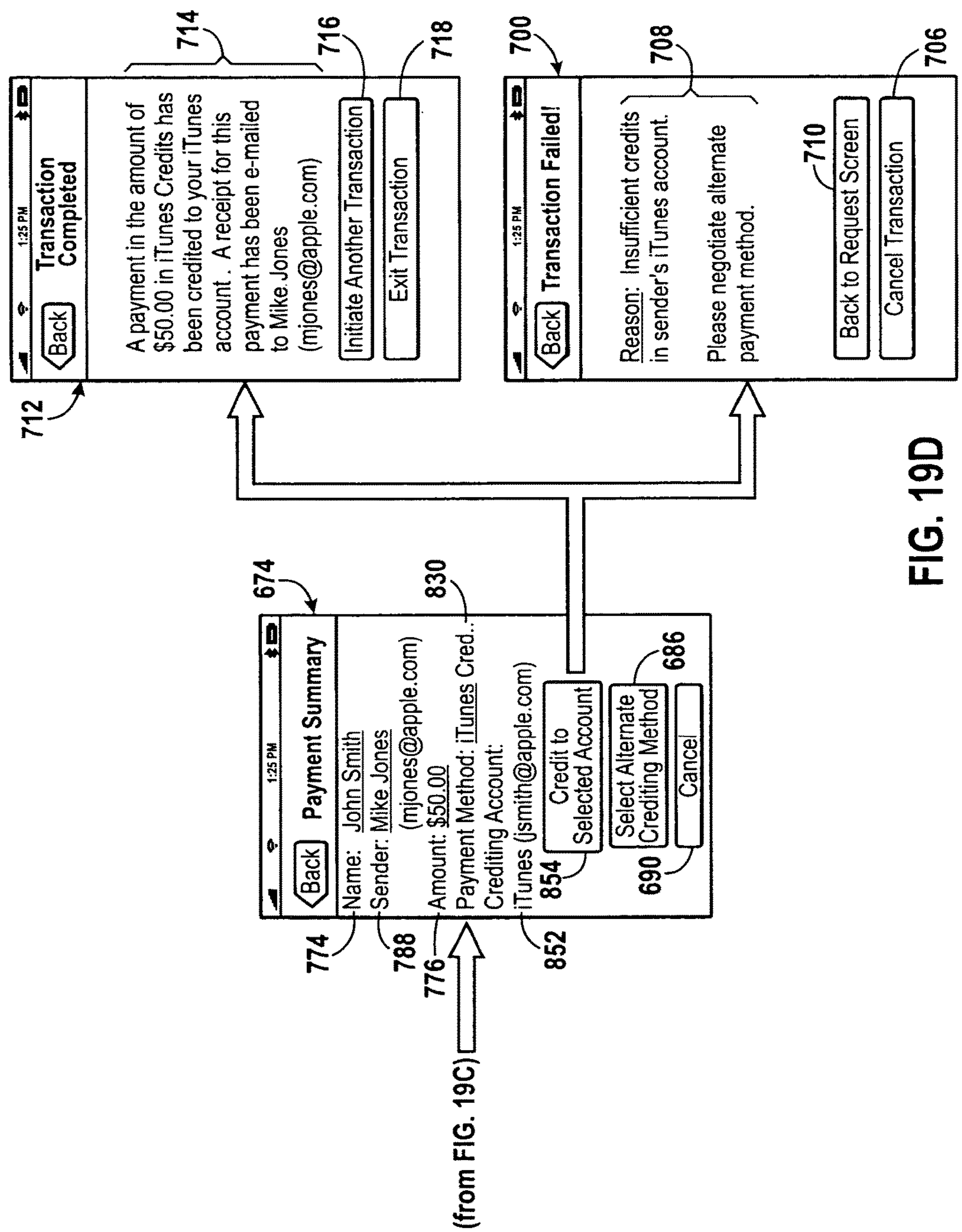
FIG. 19D shows a plurality of screens that may be displayed on a payee device illustrating a method for selecting a crediting account and completing the transaction initiated in FIG. 19A.

Following the selection of the iTunes® account 852, the payee may be returned to the screen 674. As shown in FIG. 19D, the updated screen 674 may display the iTunes® account 852 as the selected crediting account. Additionally, the graphical button 686 may be replaced on the updated screen 674 with the graphical button 854. Upon selection of the graphical button 854, the process of transmitting the transaction information 816 which, as discussed above, may include information pertaining to the selected payment account 830 as well as the selected crediting account 852, may be transmitted to the iTunes® server 818 for processing of the payment initiated by the payer in FIGS. 19A and 19B. If the transaction fails to complete for one or more reasons, the screen 700 may be displayed on the payee device 10. The screen 700 may notify the payee the reason or reasons as to why the transaction failed. For instance, in the illustrated embodiment, the notification message 708 may inform the payee that there were insufficient credits in the payor's iTunes® account 830 to satisfy the payment amount 776. Alternatively, if the transaction is successfully completed, the screen 712 may be displayed on the payee device 10. The screen 712 may include a notification message 714 notifying the payee that credits from the payor's iTunes® account 830 have been credited to the payee's iTunes® account 852. The notification message 714 may also inform the payee that a receipt with regard to the completed transaction has been provided to the payor.

In a further implementation of the present technique, the payment amount could be directly credited to an iTunes® gift card. For instance, an account number associated with a gift card may be maintained by the iTunes® server 818. Upon receipt and authorization of the transaction information 816, the iTunes® server 818 may credit the payment amount which, may be in the form of iTune® credits, to the payee's iTune's gift card account. Thus, the payee may use the gift card to add additional gift credits to the payee's iTunes® account and/or redeem credits stored on the gift card for downloadable media content, such as music files, movie files, audio books, podcasts, etc.

While the above embodiments have been described with regard to the processing of transactions between two electronic devices, such as the payee device 10 and the payor device 92, additional implementations of the presently described techniques may further include transactions in which the payee device 10 receives payment information from sources other than a portable or non-portable electronic device of the type generally represented by the payor device 92. For instance, referring now to FIG. 20 a schematic diagram of a transaction 860 in which a payment is made by way of a smart card, illustrated here by reference numeral 862, to a payee device 10 is illustrated. The smart card 862 may be similar to a conventional credit card, but may further include a storage apparatus, such as a secured storage chip 864. The storage chip 864 may be configured to store information pertaining to a credit card account or a banking account (e.g., if the smart card 862 is a debit card) represented by the information printed on the smart card 862. For example, the storage chip 864 may include the account number corresponding to the smart card, the name of the account holder, as well as an expiration date associated with the smart card account, as well as any other relevant information pertaining to the payor's smart card account.

In the illustrated embodiment, the storage chip 864 may communicate with an external device, such as the payee device 10, by way of an NFC connection established via magnetic field induction using, for example, an RF signal. As will be understood by those skilled in the art, smart cards may be differentiated from the electronic devices (e.g., payee device 10, payor device 92) described above in that although the smart card 862 includes an electronic component, namely the storage chip 864, the smart card 862 does not include a power source or a processing device that may generally be associated with electronic devices. Instead, the smart card 862 may rely on a built-in inductor to capture an RF signal that may be transmitted from the payee device 10, such as by way of the NFC device 46, and thereby use the RF signal to temporarily provide power to the electronic components of storage chip 864 such that the data stored thereon may be transmitted to a receiving device. As will appreciated by those skilled in the art, the transmission of information from a smart card may be in conformance with the NFC techniques discussed above, as well as other known standards, such as ISO/IEC 14443 and ISO 15693, for example.

Figure 20:
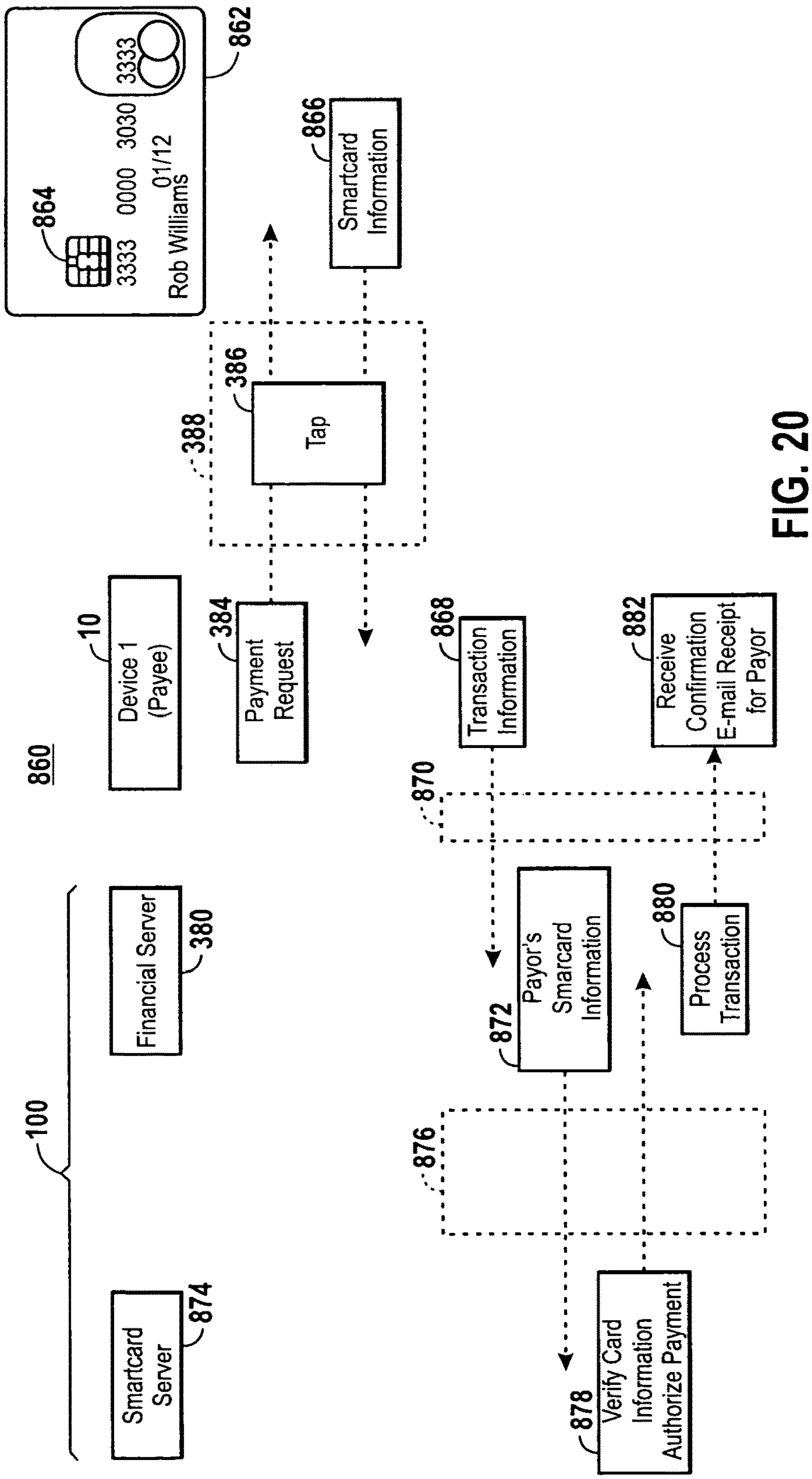
FIG. 20 is a schematic representation of a system adapted to carry out a transaction in which a selected payment account is provided by a smart card.

As shown in FIG. 20, the transaction 860 may be initiated by the payment request 384. In initiating the payment request 384, the NFC device 46 of the payee device 10 may be powered on, activating the NFC interface 60 and providing an RF signal. Accordingly, an NFC connection 388 may be established by tapping the active payee device 10 to the smart card 862. The smart card 862, upon detecting the RF signal being emitted from the payee device 10, may use a portion of the signal to induce the storage chip 864 to transmit information, such as the smart card information represented by the reference numeral 866, to the payee device by way of the NFC connection 388 established via the tap operation 386. In some embodiments, the RF signal may be rectified by the smart card 862

The payee device 10, upon receiving the smart card information 866, may further require that the account holder, the payor, provide additional verification information, such as providing an amount to be charged to the smart card 862 and, in some embodiments, providing one or more security verification actions. By way of example, one such security verification action may require that the payor provide a card verification valuation (CVV) corresponding to the smart card 862. The CVV value may be printed on the smart card 862, but may be either not transmitted from the storage chip 864, or not stored on the storage chip 864 itself. Thus, as will be understood, these additional security verification procedures may prevent the unauthorized initiation of payment from a smart card 862.

In addition to the smart card account information, the payment amount, and the above-described security information (e.g., the CVV code), the payee may select an appropriate crediting account on the payee device 10, as generally described above. Thereafter, this information, collectively referred to as the transaction information and represented by block 868, may be transmitted to the one or more financial servers 100. Specifically, the transaction information 868 may be transmitted to the financial server 380 by way of the network 870. The financial server 380 may correspond to a financial institution holding or maintaining the crediting account selected by the payee. The network 870 by which the transaction information is transmitted, may include one of any suitable networks described above, such as those provided by the communication interfaces 56 of the payee device 10.

Upon receiving the transaction information 868, the financial server 380 may further transmit the payor's smart card account information, represented here by the block 872, to the smart card server 874 by way of the network 876, which again may be provided by any suitable network such as a LAN, a WAN, or a WLAN. The smart card server 874 may be associated with a credit card provider, which maintains the account corresponding to the smart card 862. The smart card server 874 may perform a one or more verification and/or authorization processes, as represented by the reference numeral 878, wherein the payor's smart card account 872 is verified for validity and sufficiency of funds, for example. Accordingly, if the payor's smart card account 872 is determined to be both valid and having the sufficient funds to complete the requested payment 384, the smart card server 874 may send an authorization message to the financial server 380 by way of the network 876.

Upon receiving the authorization message, the financial server 380 may complete the transaction, whereby the payor's smart card account 872 is charged for an amount corresponding to the requested payment 384, and wherein the payee's selected crediting account is credited for that amount. Once the transaction 860 is successfully processed, a confirmation message 882 may be sent to the payee device 10 from the financial server 380. Additionally, as also depicted by the reference number 882, one of the one or more financial servers 100, such as the financial server 380 or the smart card server 874, may transmit a receipt to the payor acknowledging that the smart card account 872 has been charged. In one embodiment, one of the one or more financial servers 100 may transmit an electronic receipt to an e-mail associated with the smart card account 872.

Figure 21A:
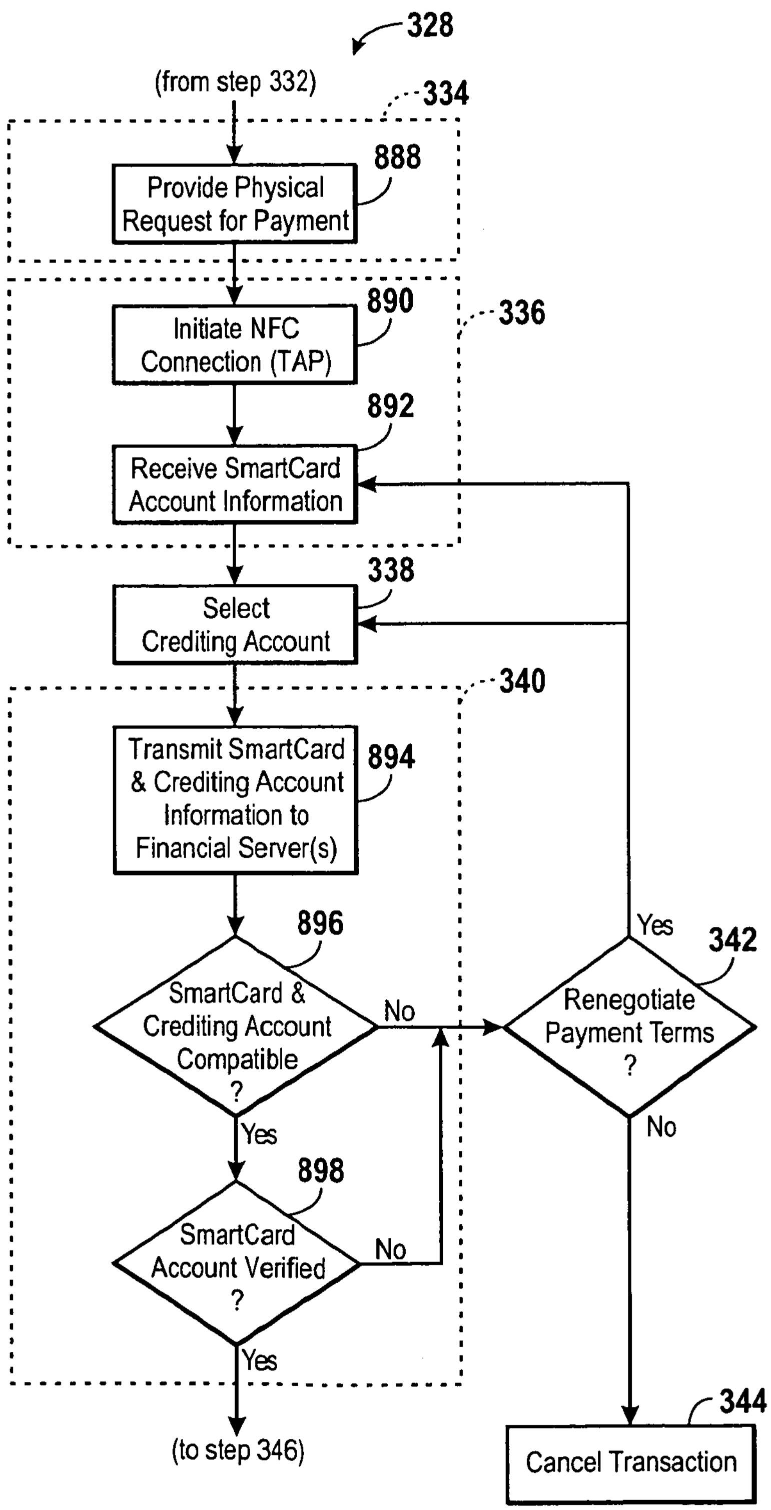
FIG. 21A depicts one or more steps of the method illustrated in FIG. 11A in further detail in accordance with the transaction depicted in FIG. 20.

The processing of a transaction 860 between the payee device 10 and the smart card 862, when applied to the method 328 depicted by FIG. 11A, may be further understood with reference to FIG. 21A. Specifically, FIG. 21A depicts certain steps of the method 328 in additional detail as applied to the present embodiment. For instance, the step 334 of transmitting an invoice to the payor may include, in the present embodiment, providing a physical or verbal request for a payment, as depicted by step 888. For instance, the payee and payor may mutually agree upon the terms of the payment before the smart card information 866 is transmitted to the payee device. Once the terms of the payment have been agreed upon, the step of acquiring payment information from the payor may include initiating an NFC connection between the payee device 10 and the smart card 682, through which the smart card account information 866 stored on the storage chip 864 may be transmitted to the payee device 10, as indicated by step 890. For example, this step may correspond to the establishment of the NFC connection 388 by way of the tap operation 386, as illustrated above in FIG. 20.

Once the smart card information 866 has been transmitted from the storage chip 864 of the smart card 862, it may be received by the payee device 10 using the NFC connection 388, as indicated by step 892. Upon receiving the smart card information 866, a crediting account may be selected on the payee device 10 at step 338. Thereafter, at decision step 340, the smart card account information 866 as well as the selected crediting account information, may be transmitted to the one or more financial servers 100 for verification and processing, as depicted by step 894. The process of verifying the smart card account 872 and the crediting account may include the decision steps 896 and 898. For example, decision step 896 may include making a determination as to whether the smart card account and the selected crediting account are compatible. As discussed above, in the present context, the term "compatible" refers to whether or not the crediting account is configured to receive a credit card payment from the smart card account. If it is determined at step 896, that the smart card account the selected crediting account are compatible, then the method 328 may proceed to the decision step 898, in which it is further determined as to whether the smart card account 872 provided by the payor is valid and has the sufficient funds (e.g., line of credit) to satisfy the requested payment 384. If it is determined that the smart card account is valid and has sufficient funds, then the transaction may be processed, in which the payee receives the payment at step 346 of the method 328, thereafter completing the transaction 860 at step 348.

Returning to the decision steps 896 and 898, if it is determined that either accounts are incompatible, or that the smart card account is either invalid or lacks the sufficient funds to fulfill the requested payment, then the method may proceed to decision step 342 in which the payee may determine whether or not to renegotiate the terms of the payment. If the payee does not wish to renegotiate the terms of the payment, then the transaction may be canceled at step 344. Alternatively, should the payee choose to revise the payment terms, the payee may either acquire information from another smart card belonging to the payor, thus returning the method back to step 892, or the payee may select an alternate crediting account at step 338. As will be appreciated, the renegotiation of the payment terms may depend on the outcome of the decisions made at steps 896 and 898. Further, although not illustrated in FIG. 21A, the renegotiation of payment terms at step 342 may also include pursuing a transaction in which the payment information is stored on an electronic device, such as the payor device 92 described above in FIGS. 12A-C, and transmitted to the payee device 10.

Figure 21B:
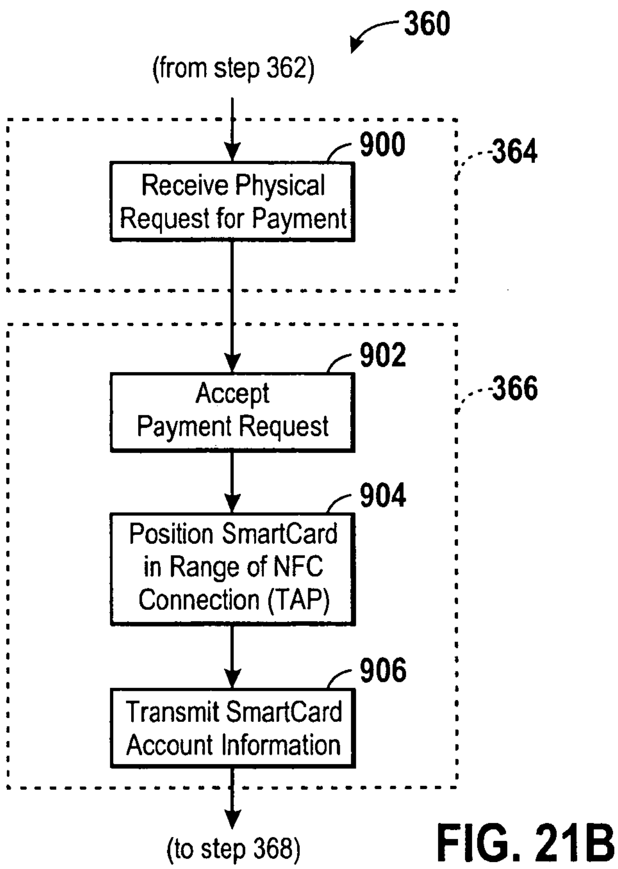
FIG. 21B depicts certain steps of the method illustrated in FIG. 11B in accordance with the transaction depicted in FIG. 20.

Continuing now to FIG. 21B, certain steps of the method 360 are described in further detail from the view point of the payor in accordance with the transaction 860 described above in FIG. 20. Specifically, FIG. 21B depicts, in further detail, the step 364 of receiving a payment request from the payee, and the step 366 of providing payment information to the payee. The step 364 of receiving a payment request may include receiving a physical request for a payment, as indicated by step 900. As discussed above, a physical request may include a mutual agreement between the payee and the payor with regard to the terms of the payment to be made using the smart card 862. Thereafter, if the payment terms are satisfactory, the payor may accept these terms at step 902. At step 904, the payor may position the smart card 862 within range of the payee device, which may include and NFC device 46. Thus, when the payee device powers on the NFC device 46, thus entering an active mode, the information stored on the storage chip 864, which may include the smart card account information 866, may be transmitted from the smart card 862 to the payee device 10 by way of an NFC connection 388 established via the tap operation 386. Thereafter, the method 360 may proceed to the decision step 368, as well as the remaining steps of the method fully depicted in FIG. 11B.

Figure 22A:
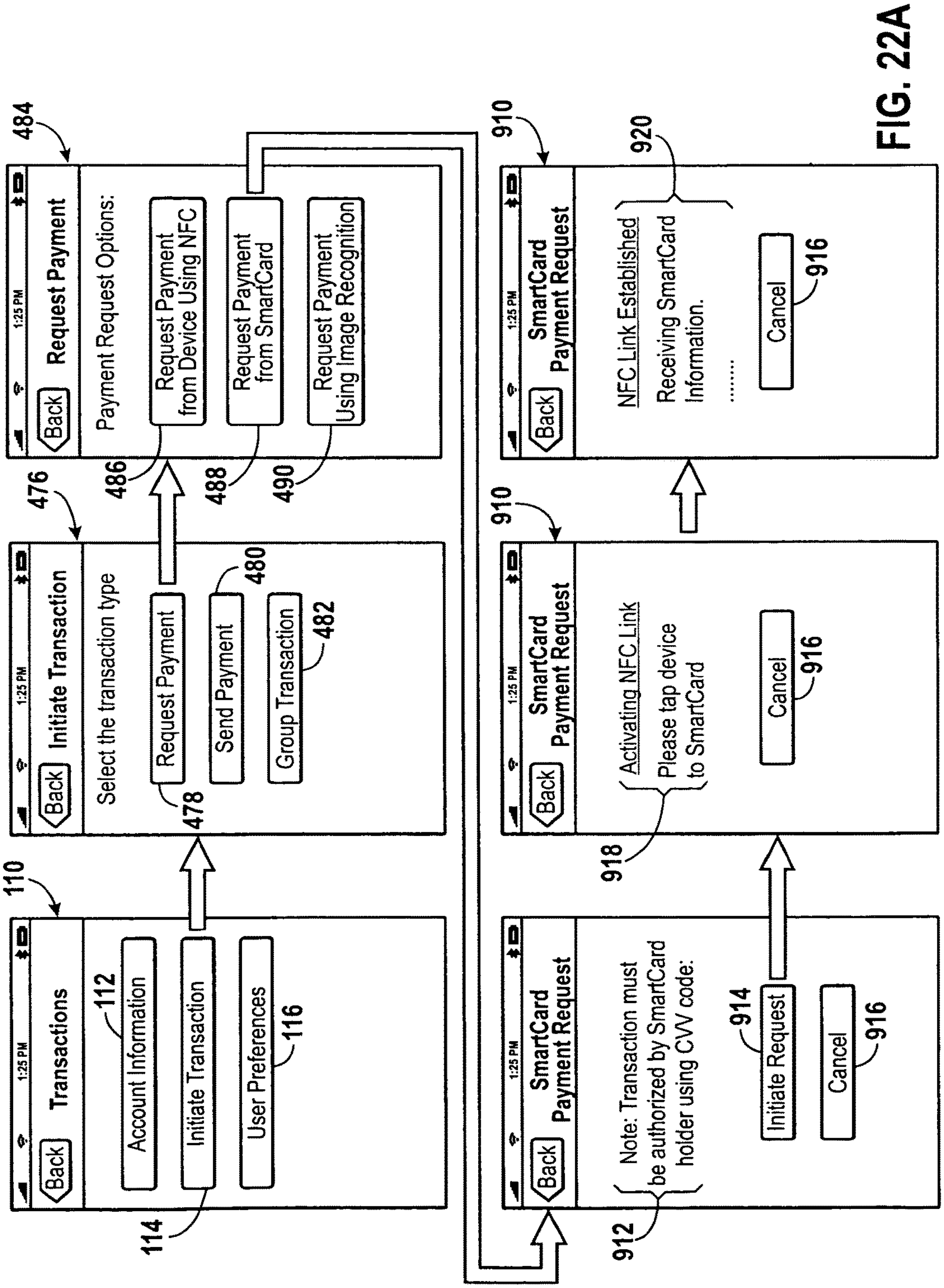
FIG. 22A shows a plurality of screens that may be displayed on a payee device of FIG. 18 illustrating a method for receiving payment information stored on the smart card of FIG. 18 in accordance with one embodiment.
Figure 22B:
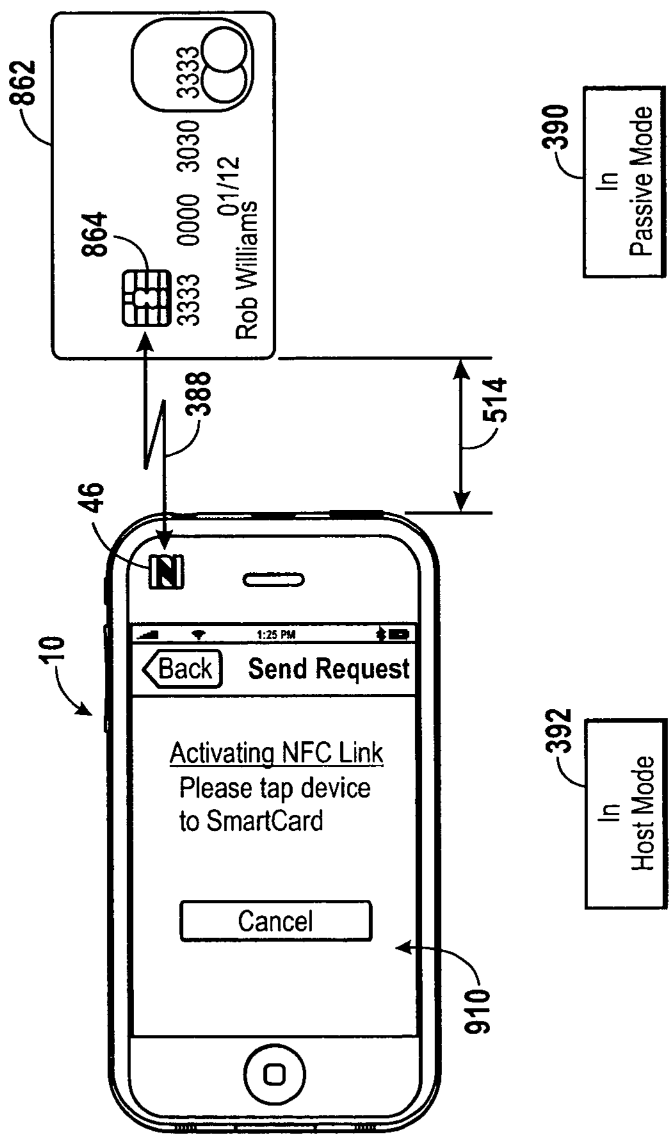
FIG. 22B illustrates the establishment of the communication channel between the payee device and the smart card of FIG. 18 for the transmission of the payment information in FIG. 22A.
Figure 22C:
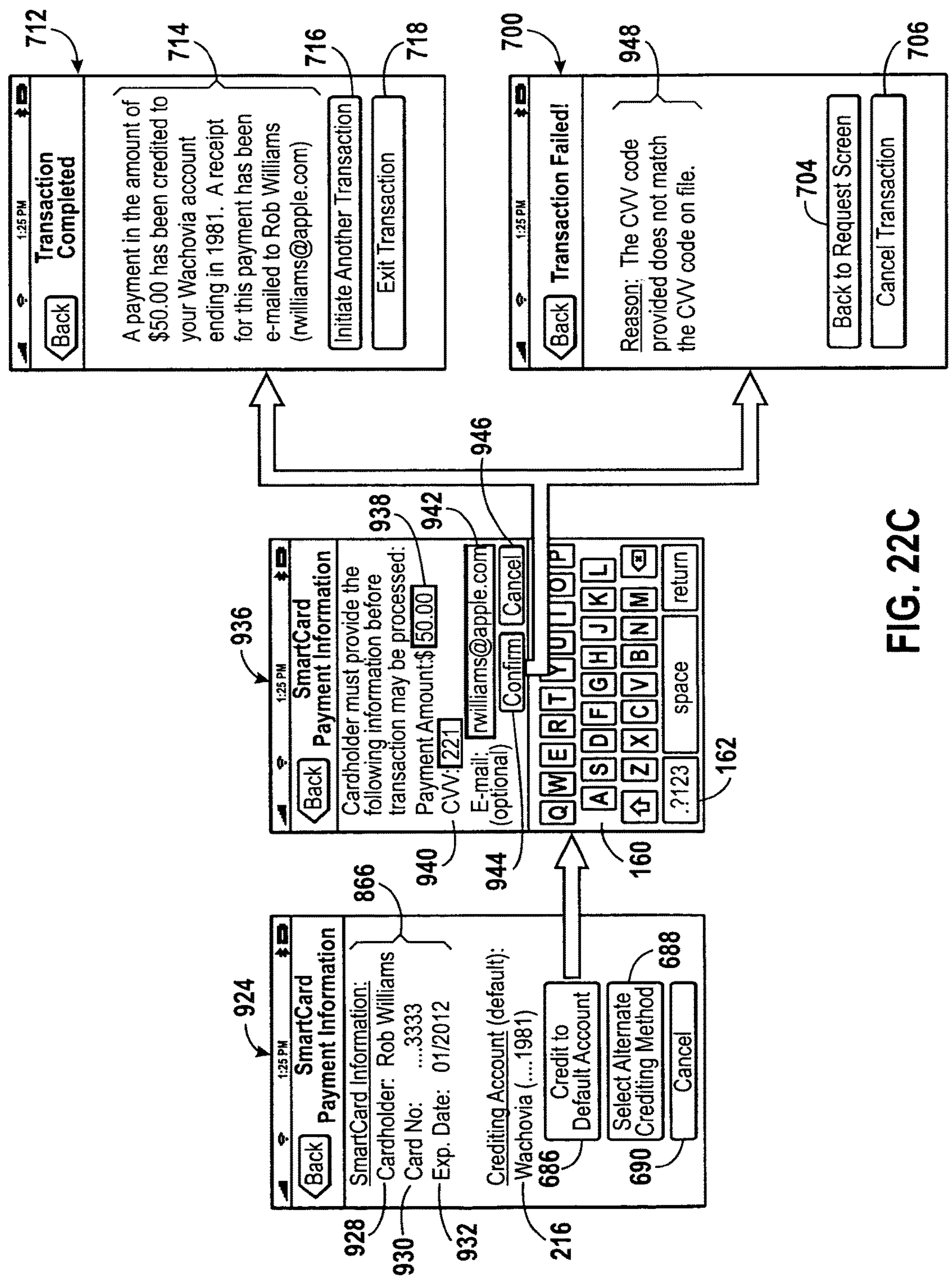
FIG. 22C illustrates a plurality of screens that may be displayed on a payee device illustrating a method for selecting a crediting account and completing the transaction initiated in FIG. 22A.

Continuing now to FIGS. 22A-C, a plurality of screen images depicting the operation of the payee device 10 in performing the transaction described in FIG. 20 is illustrated. Referring first to FIG. 22A, the process of initiating the transaction may begin with the selection the graphical button 114 displayed on the screen 110. As discussed above, the screen 110 may represent a home screen for the transaction application (e.g., represented by the icon 34 on the home screen 29 of the payee device 10). By selecting the graphical button 114, the payee may be advanced to the screen 476, as described above in FIG. 14A, which may display the graphical buttons 478, 480, and 482. In order to initiate a payment request, the user may select the graphical button 478, thus advancing the user to the screen 484. As discussed above in FIG. 14A, the screen 484 may display a plurality of graphical buttons, 486, 488, and 490, each representing different techniques and functionalities of the payee device 10 for initiating the request of a payment. For example, the graphical button 486, as described above, may represent the function for requesting a payment in accordance with the transactions described above in FIGS. 12A-C. Here, rather than selecting the graphical button 486, the payee may select the graphical button 488 in order to indicate that the payment request is to be directed towards a transaction involving at least one smart card 862.

Upon selection of the graphical button 488, the payee may be advanced to the screen 910. The screen 910 may include a notification message 912 instructing the payee that in order to complete the transaction, the owner of the smart card 862 (e.g., the payor) must perform at least one security verification action, such as the providing of a CVV code, as discussed above. The screen 910 may further display the graphical buttons 914 and 916. The graphical button 914 may represent a function by which the payment request is initiated by powering on the NFC device 46. Additionally, the payee also has the option of canceling the payment request by selecting the graphical button 916. Upon selection of the graphical button 914, the NFC device 46 of the payee device 10 may be powered on, thus enabling the NFC interface 60. Accordingly, the screen 910 may be updated to display the notification message 918, generally informing the user that the NFC interface is currently active and further instructing the user to tap the payee device 10 to the payor's smart card 862.

Referring now to FIG. 22B, the establishment of an NFC connection between the payee device 10 and the smart card 862 by way of the tap operation 386 depicted in FIG. 20, is illustrated. As discussed above, the powering on of the NFC device 46 may place the payee device into a host or active mode 392. As the active device 10 is place within an acceptable distance, represented by the distance 514, from the smart card 862, which may be in a passive mode 390, an NFC connection 388 may be established between the payee device 10 and the smart card 862. Accordingly, by magnetic field induction, the storage chip 864, which may store the smart card account information, may temporarily be powered to transmit the smart card information to the payee device 10 by way of the established. NFC connection 388. Returning now to FIG. 22A, the transmission of the smart card account information 866 from the storage chip 864 may be depicted in the screen 910, which includes the updated notification message 920, generally indicating to the payee that the smart card information is being received by the payee device 10.

Once the smart card account information 866 has been transmitted to the payee device 10, the screen 924 may be displayed. The screen 924 may display the smart card account information 866, including the identity of the account holder 928, the account number 930, as well as an expiration date associated with the account 932, for example. The screen 924 may further display the presently selected crediting account, which may initially display the default crediting account 216, as described above with reference to FIG. 8. Additionally, the screen 924 may include the graphical buttons 686, 688, and 690, described above with reference to FIG. 14J. By selecting the graphical button 686, the payee may be advanced to the screen 936, which may represent one or more of the security verification actions required by the payor, as discussed above.

As illustrated in the screen 936, the text fields 938, 940, and 942 are provided through which the payor may be required to enter the requested data. For instance, the payor may be required to enter the payment amount in the text field 938. As discussed above, the payment amount may be mutually agreed upon between the payee and the payor at step 888 in FIG. 21A. The payor may be further required to enter the CVV code on the smart card into the text field 940. As discussed above, this step may constitute an additional measure of security, thus preventing the unauthorized of initiation of payments from the smart card 862, such as in instances where the smart card account information 866 stored on the storage chip 864 was obtained without the payor's consent. The payor may further be provided the option of entering an e-mail address into the text field 942. For instance, the e-mail address may be transmitted to one or more financial servers 100, and subsequently used to provide the payor with an electronic receipt if the transaction 860 is successfully completed. As displayed on the screen 936, the payor may enter the above-discussed data into the text fields 938, 940, and 942 by way of the text keyboard 160. Additionally, for fields in which numerical inputs are required, the payor may access the numerical keyboard 164 (not shown in FIG. 22C) by selecting the graphical button 162, as discussed above.

Once the information is entered into the text fields 938, 940, and 942, the payee may initiate the processing of the transaction by selecting the graphical button 944. Alternatively, the payee may have the option of canceling the transaction by selecting the graphical button 946. Thereafter, if the transaction fails to be processed successfully for one or more reasons, the screen 700 may be displayed on the payee device 10. The screen 700 may display a notification message 948 informing the payee as to the reason or reasons as to why the transaction failed. As illustrated in FIG. 22C, the notification message 948 may indicate that the CVV code provided in the text field 940 of the screen 936 was incorrect and, accordingly, the requested payment could not be authorized. If the transaction is processed successfully, the screen 712 may be displayed on the payee device 10. As discussed above in FIG. 14J, the screen 712 may display the notification message 714 generally informing the user that a payment in the amount specified in the text field 938 has been applied to the selected crediting account 216. The notification message 714 may further inform the payee a receipt has been provided to payor, such as via the e-mail address specified in the text field 942 of the screen 936.

Figure 23:
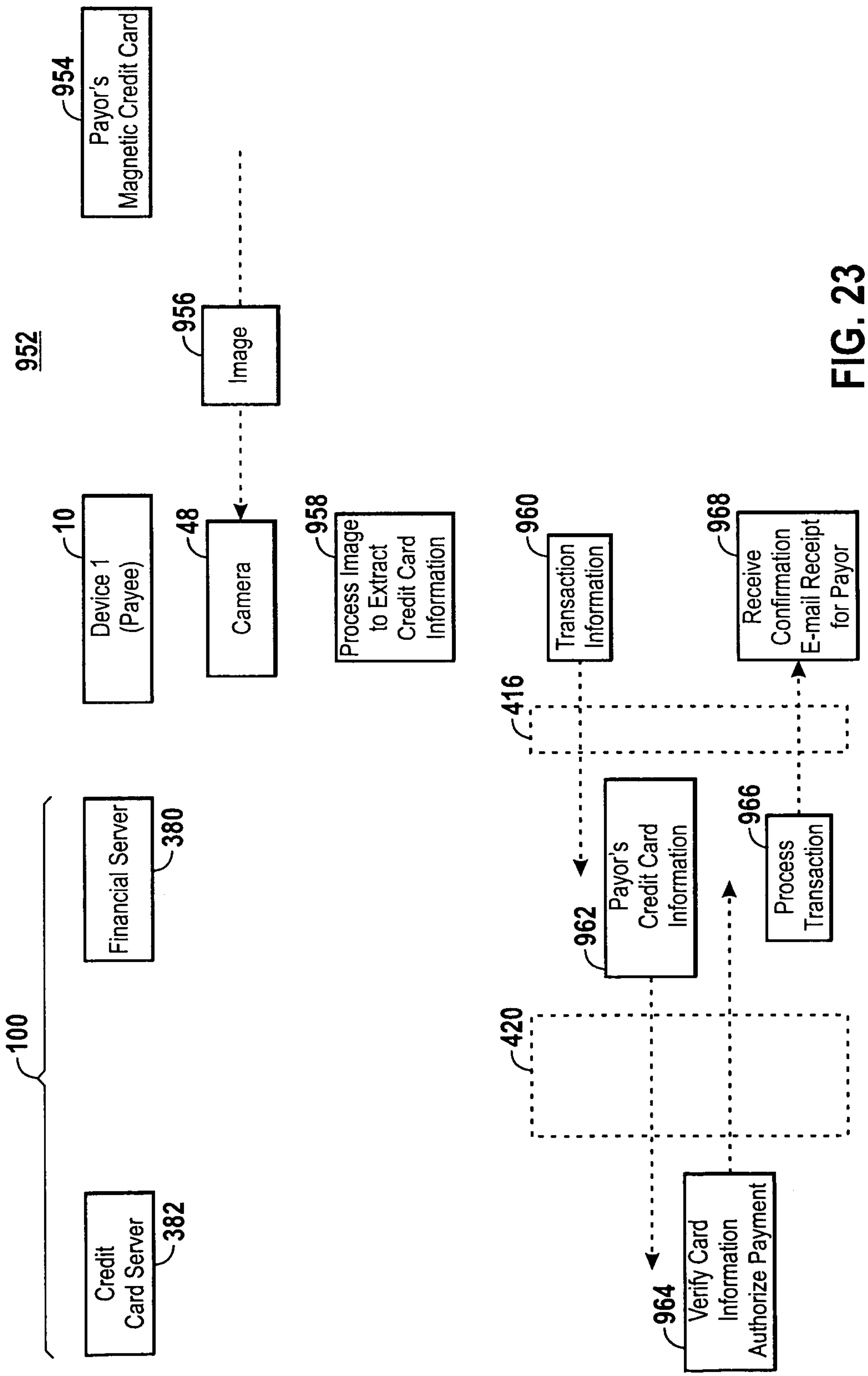
FIG. 23 is a schematic representation of a system adapted to carry out a transaction in which a selected payment account is provided using a magnetic credit card provided by the payor in accordance with one embodiment.
Figure 24:
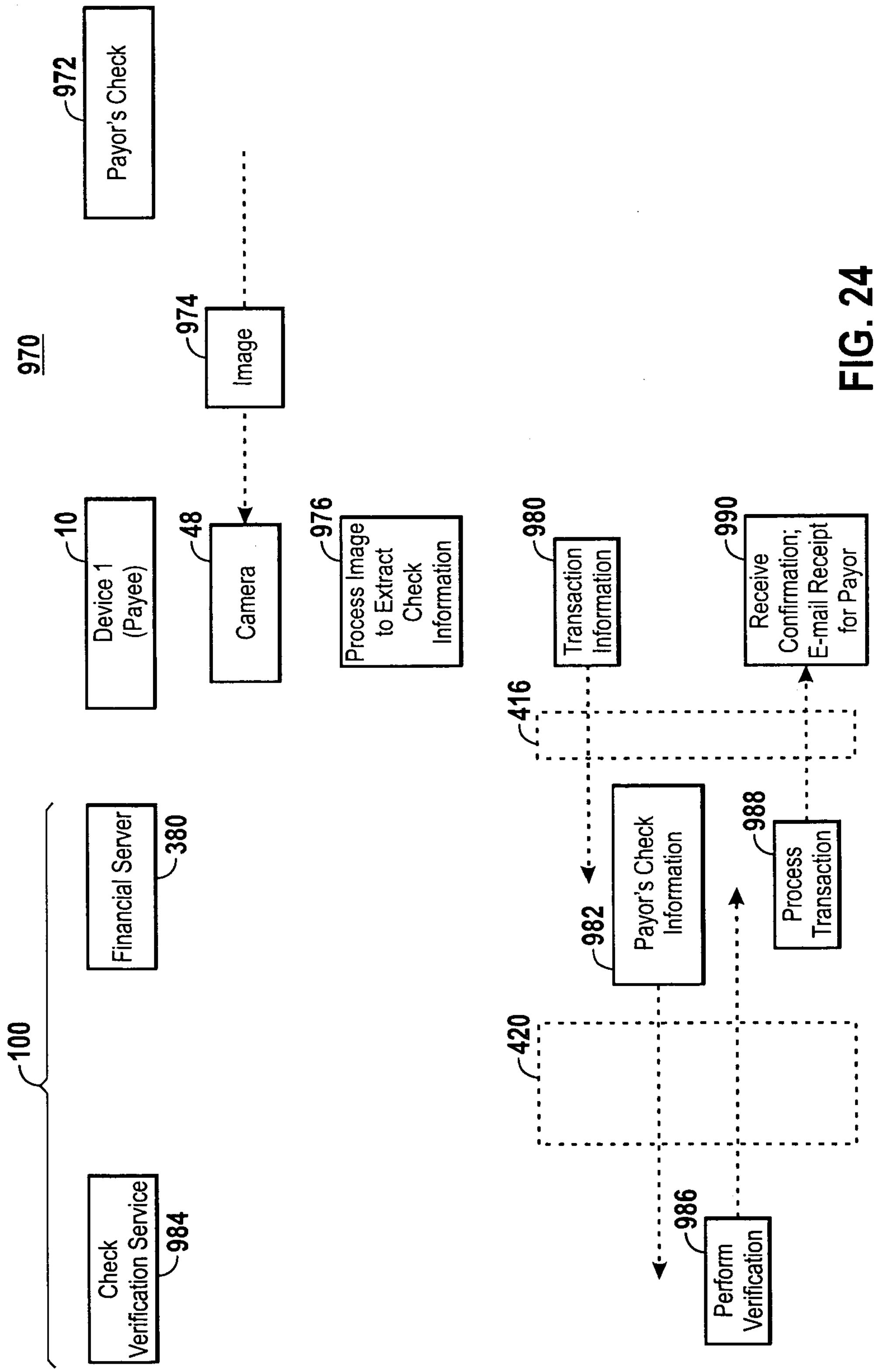
FIG. 24 is a schematic representation of a system adapted to carry out a transaction in which a selected payment account is provided using a check provided by the payor in accordance with one embodiment.

Continuing now to FIGS. 23 and 24, the transactions 952 and 970 are illustrated, respectively, in accordance with a further aspect of the present disclosure. Specifically, the transactions 952 and 970 may represent the functionality provided by the graphical button 490 displayed on the screen 484, as discussed above with reference to FIG. 14A. For instance, as will be described in further detail below, the transactions depicted in FIGS. 23 and 24 may rely on the use of the camera 48 on the payee device 10 to acquire an image of a payment instrument, such as a payor's magnetic credit card, or a check.

Referring now to FIG. 23, the transaction 952 may be initiated via the acquisition of an image of a payor's credit card 954. For example, the payment request may originate by agreement between the payee and payor, in which the payor agrees to fulfill the requested payment using the credit card 954. Accordingly, the payee may power on or activate the camera device 48 on the payee device and acquire an image 956 of the payor's credit card 954. Upon receiving the image 958, the payee device 10 may process the image 956, such as by using an optical character recognition (OCR) technique, as mentioned above, to extract the credit card account information corresponding to the credit card 954, as indicated by reference numeral 958.

Once the credit card account information corresponding to the credit card 954 has been determined, such as by an imaging application adapted to execute the OCR process, the payee may select an appropriate crediting account. Thereafter, the crediting account information, the extracted credit card account information 958, as well as additional data, such as the amount of the requested payment, collectively referred to here by reference numeral 960, may be transmitted to the financial server 380 discussed above by way of the network 416. As discussed above, the financial server 380 may correspond to the banking provider maintaining the payee's selected crediting account. The financial server 380 may initiate one or more of the authorization actions described above, such as with reference to FIG. 12A, which may include transmitting the payor's credit card account information, illustrated here by reference numeral 962, to an external credit card server 382 by way of the network 420. The credit card server 382 may correspond to a credit card provider that maintains the payor's credit card account 962. The credit card server 382 may process the credit card account information 962 to determine whether the provided credit card account is a valid account having a sufficient line of credit to fulfill the requested payment, as indicated by the reference numeral 964.

If the credit card server 382 determines that a charge in the amount corresponding to the requested payment to the specified credit card account 962 may be authorized, then the credit card server 382 may transmit an authorization message to the financial server 380 by way of the network 420. Upon receiving the authorization from the credit card server 382, the financial server may process the transaction 952, as generally indicated by the reference number 966. As discussed above, the processing of the transaction 952 may include charging the credit card account 962 for the amount specified in the payment request, and depositing or crediting a corresponding amount to the payee's selected crediting account. Once the transaction 952 has been completed, a confirmation message may be transmitted to the payee device 10 by way of the network 416. Additionally, if the payor's e-mail address is known or provided, an electronic receipt acknowledging the payment may also be transmitted to the payor.

The transaction techniques described above with regard to the acquisition of the image 956 representing the payor's credit card 954, may also be applicable to other types of payment instruments, such as a check corresponding to a checking account held by the payor. For instance, continuing to FIG. 24, a transaction 970 is illustrated in which payment information in response to a payment request is acquired using the camera device 48 to obtain an image 974 of a check 972 provided by the payor. Once the image 974 is received by the payee device 10, the check image 974 may be processed, as described above, to extract certain information from the check image 974, such as the name or identity of the payor, a routing number corresponding to the payor's banking provider, the account number corresponding to the payor's bank account, as well as an identification number corresponding to the payor's check 972. Once the above-discussed information has been extracted from the check image, 974, the payee may select an appropriate crediting account for receiving the requested payment. Thereafter, the information extracted from the check image 974, the selected crediting account, as well as the amount of the requested payment, collectively referred to here by the reference numeral 980, may be transmitted to the financial server 380 by way of the network 416, as discussed above.

The financial server 380 may initiate one or more of the authorization actions discussed above, which may include transmitting the payor's check information, such as the check information extracted during the image processing step 976, to a check verification service, depicted here by the reference numeral 984, by way of the network 420. As will be appreciated, a check verification service may perform one or more of various functions relating to the validation or verification of checks. For example, a check verification service may offer this service to banking providers, vendors, and retailers, by way of a subscription based service, which may be accessed by either using a telephone, or by one or more of the networks generally described above. In some instances, the check verification services described herein may be offered or provided by the banking provider itself. In general, check verification services, such as the check verification service 984, may perform several functions, which may include verifying a payor's identity, as well as determining whether the payor has a history of providing bounced checks. Based on these records, the check verification service 984, may determine whether or not the check information 982 provided may be verified and thus authorized to satisfy the requested payment. This verification process is represented here by the reference numeral 986.

If the check verification service 984 determines that the requested payment may be carried out using the check information 982, the check verification service 984 may transmit an authorization message to the financial server 380 by way of the network 420. Upon receiving the authorization message, the financial server 380 may process the transaction, as indicated by the reference numeral 988, whereby the bank account corresponding to the payor's check 972, is debited for the amount of the requested payment, and whereby the debited amount is further credited to the payee's crediting account. Once the transaction has been completed, a confirmation message may be transmitted from the financial server 380 to the payee device 10 by way of the network 416, as indicated here by the reference numeral 990. Additionally, if the payor had provided an e-mail address, an electronic receipt may be transmitted to the payor, as described above.

Figure 25A:
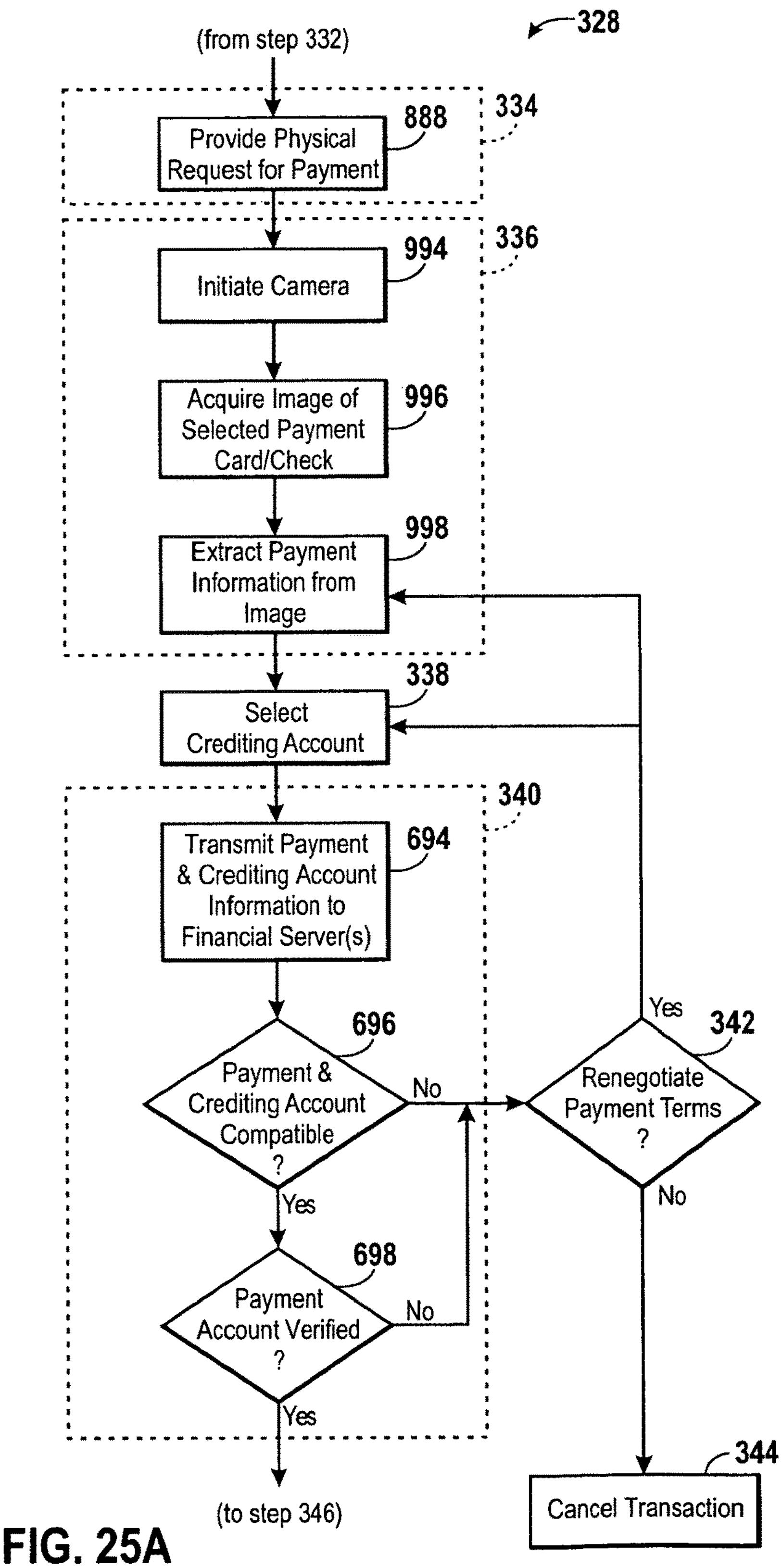
FIG. 25A depicts one or more steps of the method illustrated in FIG. 11A in further detail in accordance with the transactions depicted in FIGS. 23 and 24.
Figure 25B:
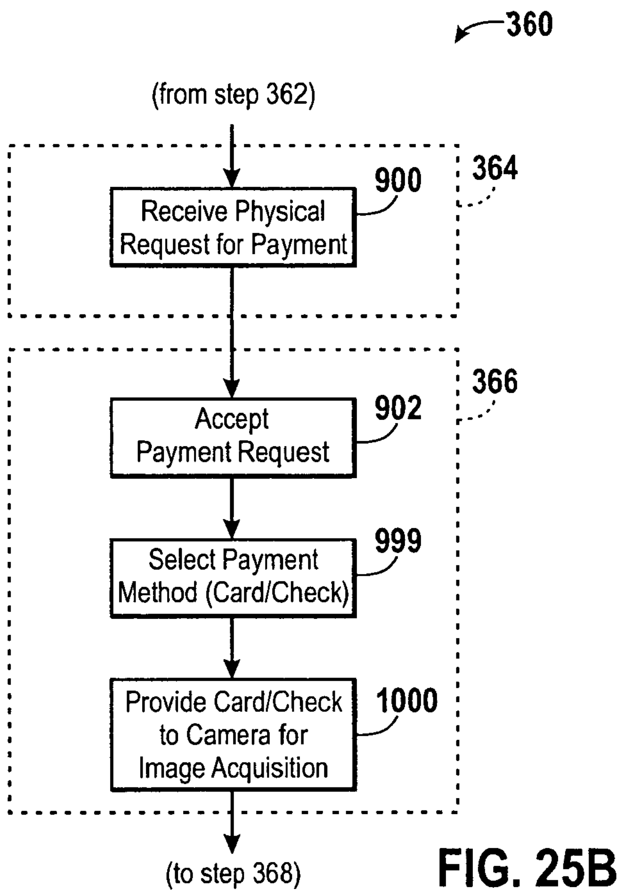
FIG. 25B depicts one or more steps of the method illustrated in FIG. 11B in further detail in accordance with the transactions depicted in FIGS. 23 and 24.

Various steps of the transactions 952 and 970 depicted in FIGS. 23 and 24, respectively, may correspond to one or more of the steps described in the method 328 and 360 in FIGS. 11A and 11B, respectively. For instance, the acquisition of the image 956 and the image 974 may correspond to the step 336 of acquiring payment information from the payor. Additionally, the acceptance of a payment request and the act of providing either the credit card 954 or the check 972 may correspond to the step 366 of providing payment information to a payee, as depicted in the method 360. Referring now to FIGS. 25A and 25B, the above-emphasized steps 336 and 366, are depicted in further detail in accordance with the presently illustrated embodiment.

Referring to FIG. 25A, the step 334 of transmitting or providing an invoice, which may represent a payment request, to the payor may include the step 888 of providing a physical request for a payment. For example, as discussed above with reference to FIG. 21A, the step 888 may include a mutual agreement between the payee and payor with regard to the terms of the payment before either the credit card 954 or the check 972 is provided by the payor for image acquisition. Next, the step 336 of the method 328, when performed in accordance with the presently illustrated embodiment, may include the steps 994 and 996. As shown in the present figure, the step 994 may correspond to the step of initiating the camera device 48 for the acquisition of an image.

Next, at step 996, an image may be acquired using the initiated camera device 48, and may reflect an image of either the credit card 958 illustrated in FIG. 23, the check 972 illustrated in FIG. 24, or any other type of payment instrument from which payment information may be extracted from an image thereof. Once the image has been acquired at step 776, payment information may be extracted from the acquired image, as illustrated by the step 998. Thereafter, the payee may select an appropriate crediting account at step 338 and proceed to the decision step 340 for the authorization of the requested transaction. As shown in the present figure, the decision step 340, when performed in accordance with the presently illustrated embodiments, may include the steps 694, 696, and 698, as discussed above with reference to FIG. 21A. Thus, it should be understood that the transaction authorization steps that may be performed with reference to the transactions 952 and 970 may generally be substantially identical to the authorization steps described in the above-discussed embodiments.

Referring now to FIG. 25B, the steps 364 and 366 of the method 360, when performed in accordance with the presently illustrated embodiment from the viewpoint of the payor, are illustrated in further detail. For example the step of receiving a payment request from the payee, as represented by reference numeral 364, may include the step 900 of receiving a physical request for a payment. As discussed above, the physical request may include a mutual agreement between the payee and the payor with regard to the terms of the payment to be made from either the credit card 954 or the check 972. Next, the step of providing payment information to the payee, as represented by the reference numeral 366, may include the steps 902, 999, and 1000. For instance, as discussed above, if the terms of the requested payment are agreed upon, the payor may accept the payment request at step 902. Thereafter, the payor may select a payment method at step 999, which may include the credit card 954, the check 972, or any other type of suitable payment instrument. Once the desired payment method has been selected, the payor may provide the selected payment method to the payee device 10 for image acquisition by the camera 48.

The transactions generally depicted by FIGS. 23 and 24, may now be explained in further detail with reference to FIGS. 26A-26D and FIGS. 27A-27G, which may illustrate various screen images depicting a technique for operating the payee device 10 in order to carry out the transactions 952 or 970, as depicted in FIGS. 23 and 24, respectively. Specifically, the screen images depicted in FIGS. 26A-26D may illustrate the acquisition of an image corresponding to the credit 954 of FIG. 23, and the subsequent processing of a transaction using the acquired image. FIGS. 27A-27G may generally depict the acquisition of an image corresponding to the check 972 of FIG. 24, and the subsequent processing of the transaction 970 from the viewpoint of the payee device 10.

Figure 26A:
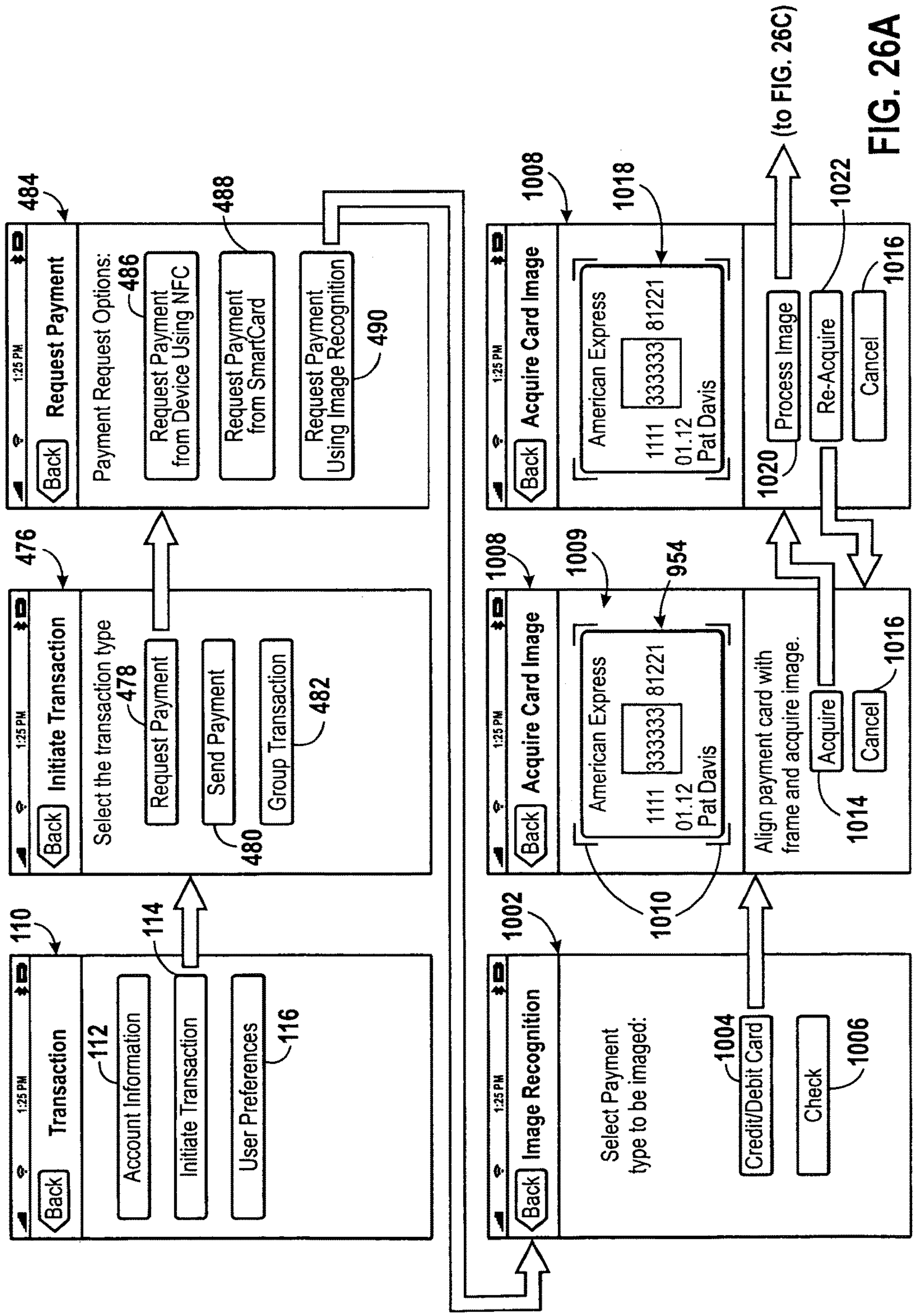
FIG. 26A shows a plurality of screens that may be displayed on a payee device illustrating a method for acquiring an image of the credit card of FIG. 23 in accordance with one embodiment.

Referring now to FIG. 26A, the initiation of the transaction 952 described in FIG. 23 may include navigating through the screens 110, 476, and 484, previously discussed above. For instance, beginning with the screen 110, the payee may navigate to the screen 476 by selecting the graphical button 114. Next, the payee may further navigate to the screen 484 by selecting the graphical button 478 from the screen 476. The screen 484 may include the above-described graphical buttons 486, 488, and 490. As discussed above, each of these graphical buttons may represent various functionalities provided by the device 10 for initiating the request of a payment. For instance, the graphical button 486 may represent a function for initiating a payment request in accordance with the techniques described above with reference to FIGS. 12A-12C. The graphical button 488 may represent the functionality of initiating a payment request in accordance with the transaction techniques described above with reference to FIG. 20. Here, the payee may initiate a transaction in accordance with the techniques described above with reference to FIGS. 23 and 24 by selecting the graphical button 490. Upon selection of the graphical button 490, the payee may be advanced to the screen 1002, which may provide the payee with one or more options, depicted by the graphical buttons 1004 and 1006, for acquiring payment information using the above-described image recognition techniques. As shown here, the graphical button 1004 may represent a function by which the payee may acquire an image of a credit or debit card, such as illustrated in the transaction 952. Additionally, the graphical button 1006 may correspond to the function of acquiring an image of a check, such as the check 972, and will be described in further detail below with reference to FIGS. 27A-27G.

Upon selection of the graphical button 1004, the camera device 48 of the payee device 10 may be powered on and initiated for image acquisition purposes. Additionally, the payee may be advanced to the screen 1008, which as shown in FIG. 26A, may function as a viewfinder, represented by the reference numeral 1009, displaying in real time, images being detected by the camera 48. The viewfinder 1009 may include the acquisition frames 1010, which may serve to provide the payee with a means for centering an acquired image. As discussed above, once the terms of a payment request have been agreed upon, the payor may provide a credit card (e.g., 954) to the payee device 10 for acquisition of an image by the camera device 48. For instance, as shown in the present figure, the payee may position the payee device 10 such that when viewed by the camera device 48, the credit card 954 is aligned with the image acquisition frame 1010. Once the credit card 954 is aligned, the payee may acquire an image of the credit card 1018 by selecting the graphical button 1014. Additionally, the payee may have the option of canceling the image acquisition process by selecting the graphical button 1016.

Once an image of the credit card 952 has been acquired, the screen 1008 may be updated to display the acquired image, referred to here by the reference numeral 1018. Accordingly, the payee may review the acquired image 1018 to determine whether the quality of the acquired image generally meets the standards required for effective image processing. For example, the payee may determine whether the acquired image 1018 is properly aligned with the acquisition from 1010, whether the image 1018 is properly focused, or whether the image 1018 was acquired under sufficient lighting conditions. If the payee determines that the acquired image 1018 is suitable for image processing to extract the payment information from the card 954, the user may initiate the credit card information extraction process by selecting the graphical button 1020. If the payee determines that the acquired image. 1018 is not of sufficient quality for image processing, the payee may select the graphical button 1022 to return to the viewfinder 1009 for the acquisition of a subsequent image of the credit card 954.

The processing of the credit card image 1018 may be briefly explained with reference now to FIG. 26B. As discussed above, the processing of images acquired by the camera device 48 of the payee device 10 may utilize one or more optical character recognition techniques for the extraction of text data from the acquired image. Additionally, in some embodiments, the image recognition techniques may further provide for the recognition of certain images or graphics in the resulting acquired image. For instance, such image processing application may provide for the recognition of brand logos or symbols that may identify a corresponding credit card provider or bank provider, for example.

Figure 26B:
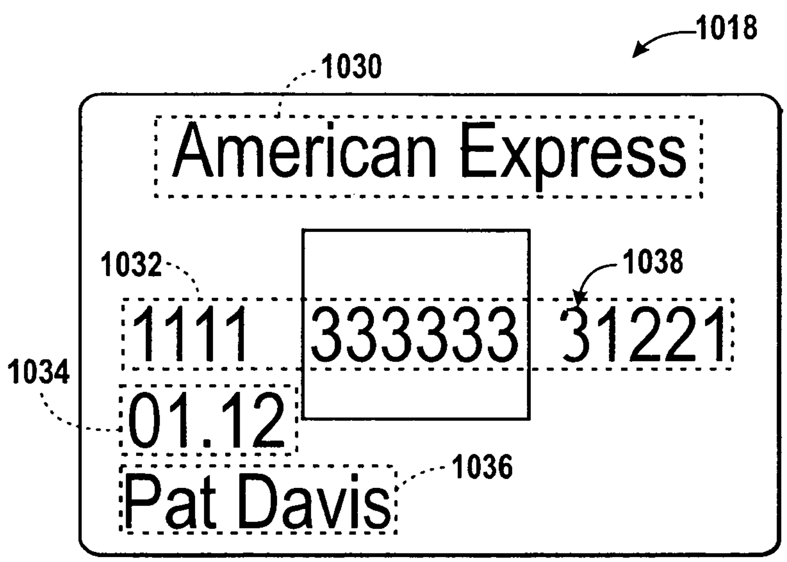
FIG. 26B depicts a technique for processing the image acquired in FIG. 26A for the extraction of payment information.

As shown in FIG. 26B, an image recognition application, in accordance with the presently described embodiment, may analyze the image 1018 to determine one or more regions of interest. For example, based on the analysis of the image 1018, the image processing application may identify the regions 1030, 1032, 1034, and 1036, as being regions of interest that may contain account information pertaining to the credit card 954. For instance, the region 1030 may correspond to the identity of the credit card provider. The region 1032 may provide for a credit card account number associated with the selected credit card 954. Further, the region 1034 may correspond to an expiration date associated with the provided credit card 954, and the region 1036 may correspond to the identity of the payor and/or the holder of the credit card 954.

As will be appreciated, the accuracy of image processing and recognition application may generally depend on the quality of the image being processed, such as the image 1018. As illustrated in FIG. 26B, the reference numeral 1038 may represent a portion of the image 1018 in the region 1032 that may be distorted or incomplete. For instance, this may be due to artifacts in the resulting image 1018 acquired using the camera device 48, as described in FIG. 26A, or may be due to physical damage or defect on the physical credit card 954 itself. For instance, through natural wear, one or more of the numbers or characters printed on the credit card 954 may be partially or entirely obscured or distorted. By way of example, the character represented by the reference numeral 1038, which may have originally represented the number "8", may appear distorted in the account number region 1032 of the acquired image 1018. Due to these distortions, the image recognition application may be unable to identify the character 1038 as being the number "8." As will be explained in detail below, the present techniques may provide the payee (or the payor) with the ability to review and correct the extracted payment information prior to submitting the transaction information for authorization and processing.

Figure 26C:
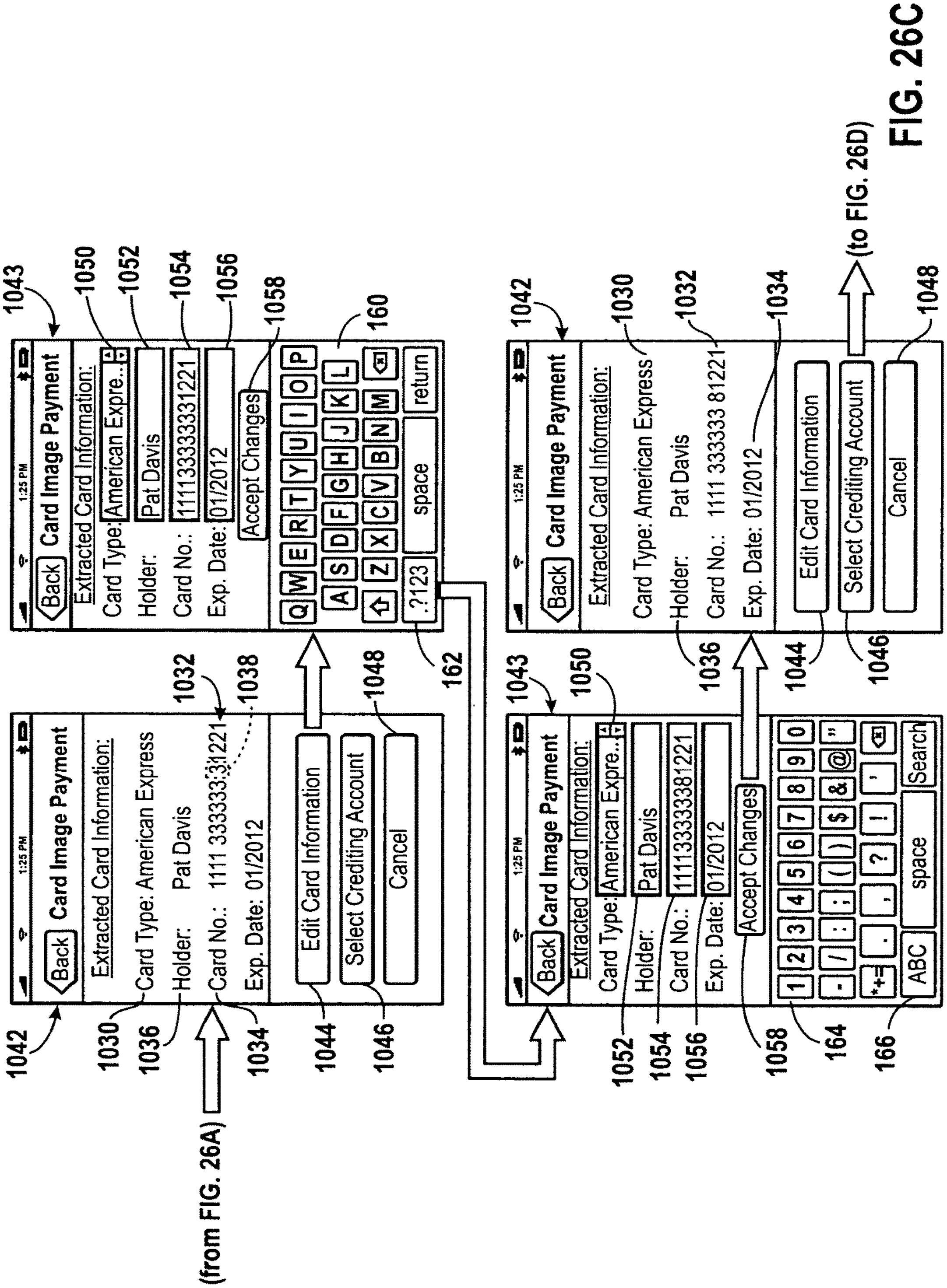
FIG. 26C shows a plurality of screens that may be displayed on a payee device illustrating a method for editing information obtained by the image processing step depicted in FIG. 26B.
Figure 26D:
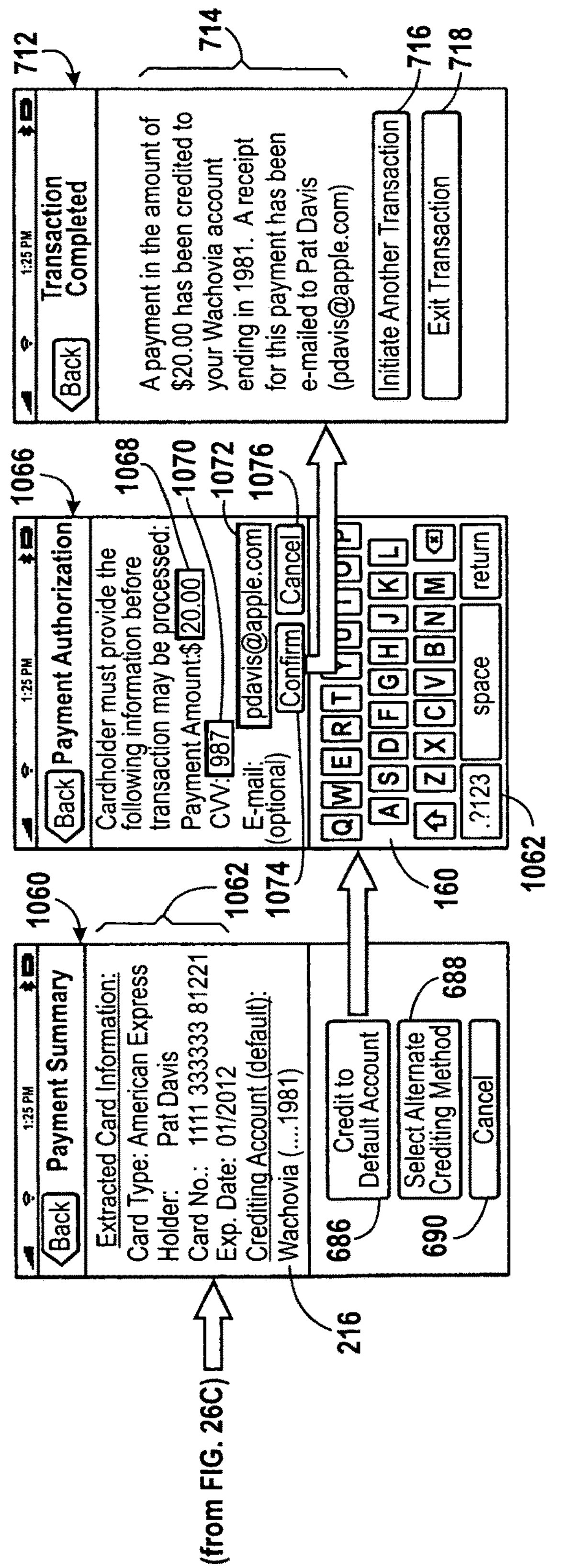
FIG. 26D shows a plurality of screens that may be displayed on a payee device illustrating a method for selecting a crediting account and completing the transaction initiated in FIG. 22A.

Continuing now to FIG. 26C, once the image processing steps described in FIG. 26B have been completed, the screen 1042 may be displayed on the payee device 10. As shown here, the screen 1042 may display the information extracted from the credit card image 1018. For instance, the screen 1042 may display the identity of the credit card provider 1030, the credit card account number 1032, an expiration date associated with the payor's credit card 1034, and the identity of the payor 1036, as discussed above. Additionally, the screen 1042 may display the graphical buttons 1044, 1046, and 1048, each of which may correspond to specific functions that may be performed on the device 10.

Referring specifically to the credit card account number 1032 extracted from the image 1018, it should be noted that the presently displayed extracted account number 1032 is not accurate when compared to the actual account number printed on the credit card 952 due to the distorted character 1038. Accordingly, the payee may edit the displayed extracted credit card information by selecting the graphical button 1044. Upon selection of the graphical button 1044, the user may access the screen 1043, which may display a dropdown selection field 1050, as well as the text fields 1052, 1054, and 1056. These fields may initially be populated with the corresponding extracted credit card information 1030, 1032, 1034, and 1036 from the previous screen 1042 and may be individually selected and edited by the payee or the payor using the displayed text keyboard 160 or the numerical keyboard 164 if necessary.

For instance, as shown in the present embodiment, the payee may use the numerical keyboard 164 to edit the credit card account information displayed in the text field 1054 in order to correct for the inaccuracy that may have resulted from the distorted character 1038 that in the acquired credit card image 1018. Accordingly, if the payee confirms that the edited credit card information is now accurate, the payee may select the graphical button 1058 to return to the screen 1042, in which the credit card account number 1032 may be updated to reflect the corrections made by the payee on the screen 1043. Thereafter, the payee may proceed with the transaction process by selecting the graphical button 1046, thus navigating to the screen 1060 in FIG. 26D.

As shown in the screen 1060, the credit card information extracted from the image 1018 and later edited by the payee, such as described in FIG. 26C, is displayed and generally designated by the reference number 1062. Additionally, the screen 1060 may display a crediting account, which in the present embodiment, may be the default crediting account 216, as discussed above. The screen 1060 may further display the graphical buttons 686, 688, and 690, which may represent the functions previously described with reference to the screen 674 depicted in FIG. 14J. Accordingly, in order to initiate the process of crediting a payment to the crediting account based on the extracted card information 1062, the payee may select the graphical button 686 to navigate to the screen 1066.

As can be appreciated, the screen 1066 may essentially provide additional security measures that must be addressed prior to transmitting the transaction information, such as to the financial servers 100. For example, in the illustrated embodiment, the screen 1066 may include the text fields 1068, 1070, and 1072, as well as the graphical buttons 1074 and 1076. Accordingly, the screen 1066 may require that the payor provide the requested information to the fields 1068, 1070, and 1072 prior to initiating the processing of the present transaction. For instance, the field 1068 may be used to enter a payment amount corresponding to the request payment. The field 1070 may require that the payor provide a CVV number corresponding to the credit card 952. As discussed above, the use of these additional authorization measures may aid to prevent the occurrence of unauthorized charges, such as those that may have been initiated based on the unauthorized acquisition of credit card images.

Additionally, an e-mail address belonging to the payor may be provided in the text field 1072. As discussed above, the provided e-mail may be used to transmit a receipt or acknowledgement to the payor once the transaction is complete. As discussed above, the entry of data into the text fields 1068, 1070, and 1072 may be accomplished by way of the text keyboard interface 160, or the numerical keyboard interface 164 (not shown in FIG. 26D). Once the information required by the text fields 1068, 1070, and 1072 have been entered, the transaction authorization process may be initiated by selecting the graphical button 1074. Additionally, the payor or payee may have the option of canceling the present transaction by selecting the graphical button 1076. If the transaction is authorized and successfully processed, the screen 712 may be displayed on the payee device 10. As discussed above, the screen 712 may display a notification message 714 indicating to the payee the requested payment amount has been deposited to the specified crediting account 216, and that a receipt has been provided to the payor, such as via the e-mail address provided in the text field 1072 of the screen 1066.

Figure 27A:
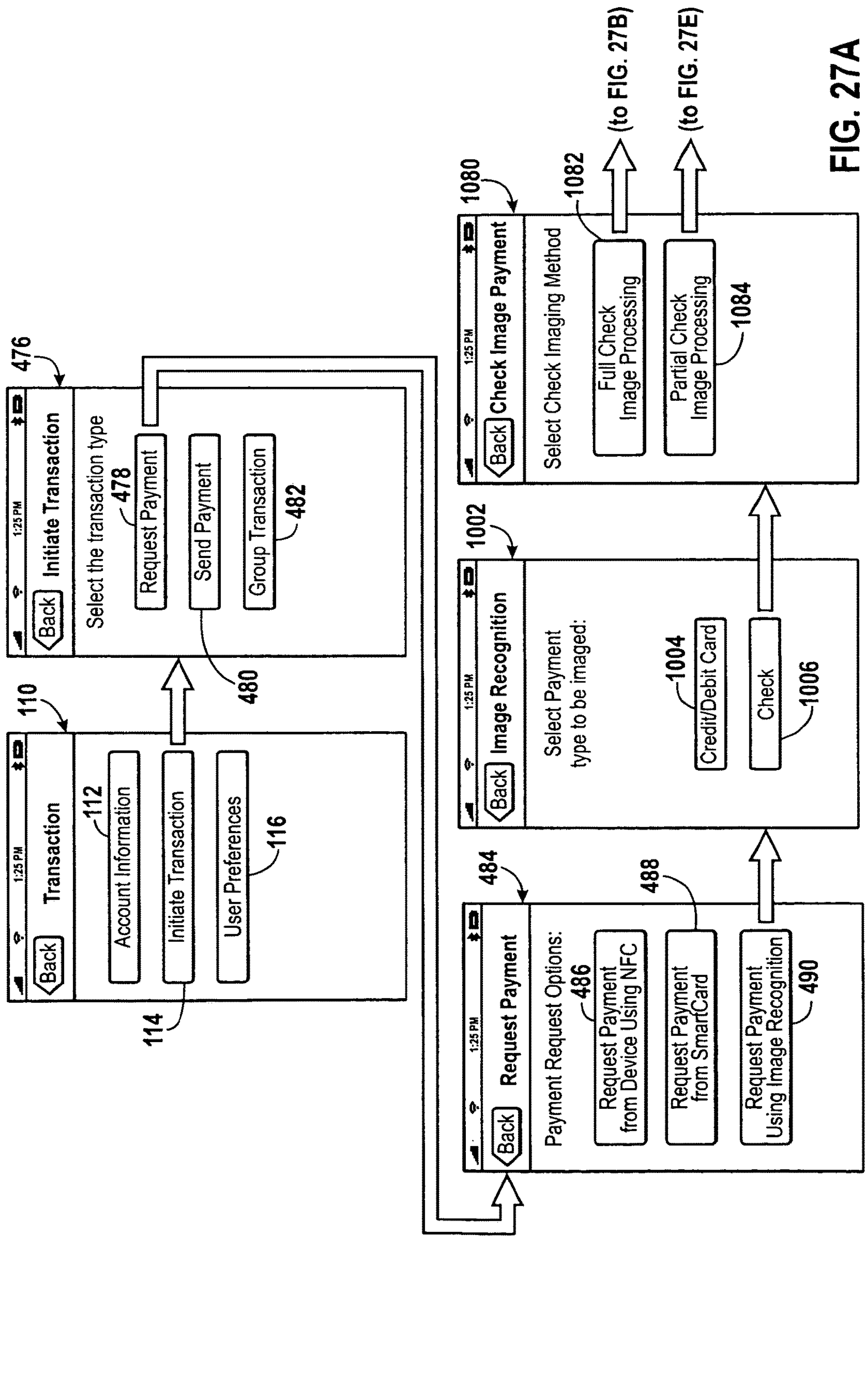
FIGS. 27A and 27B show a plurality of screens that may be displayed on a payee device illustrating a method for acquiring an image of the check in FIG. 24 in accordance with one embodiment.

Continuing now to FIGS. 27A-27G, one or more techniques for operating the payee device 10 in accordance with the transaction 970 described above with reference to FIG. 24 is explained by way of a plurality of screen images. As shown in FIG. 27A, the initiation of the camera device 48 for the acquisition of a check image, such as an image corresponding to check 972, may require that the payee navigate through the above discussed screens 110, 476, and 484. For example, beginning with the screen 110, the user may select the graphical button 114 to proceed to the screen 476. There, the user may further navigate to the screen 484, by selecting the graphical button 478. From the screen 484, the user may select the graphical button 490 to navigate to the screen 1002, as discussed above in FIG. 26A. Here, rather than selecting the graphical button 1004 to initiate the process for requiring a credit card image, the user may instead select the graphical button 1006 to begin the process for acquiring an image of a check.

As shown in FIG. 27A, the selection of the graphical button 1006 may navigate the payee to the screen 1080. The screen 1080 may display the graphical buttons 1082 and 1084. Each of these graphical buttons corresponding to a respective technique for processing a check image acquired in accordance with the presently described techniques. Specifically, the graphical button 1082 may represent a function for processing a full check image. As will be understood, in order to initiate the processing of a full check image, an image of an entire check must be first acquired. As will be explained in further detail below, the use of the full check image processing function represented by the graphical button 1082 may be selected in circumstances where the check provided by the payor has the payment amount indicated on the check, and is signed by the payor and made out to the payee. Thus, it may be necessary to process the full check image in order to extract the information relating to the amount of the payment indicated by the payor on the check.

Figure 27B:
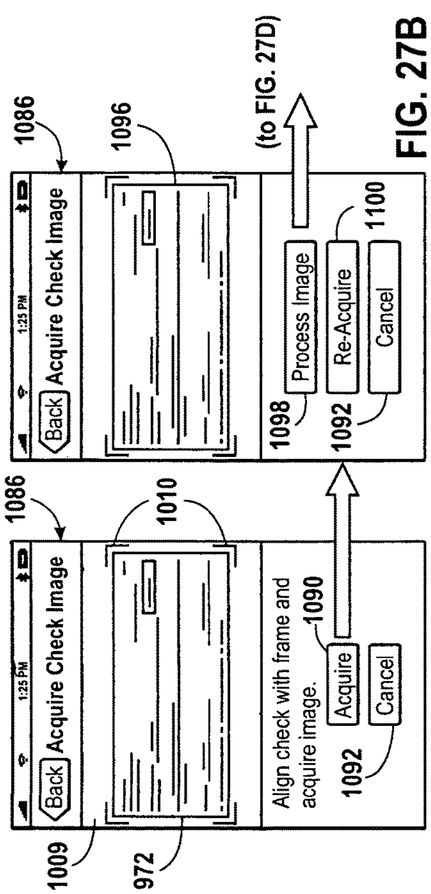

For example, referring now to FIG. 27B, upon selection of the graphical button 1082, the screen 1086 may be displayed on the payee device, and the camera device 48 may be initiated for image acquisition, as discussed above. As shown in screen 1086, the view finder 1009 associated with the camera device 48 may be displayed. The viewfinder may include the acquisition frame 1010. Accordingly, the payee may position the payee device 10, such that the entirety of the check 972 is aligned with the acquisition frame 1010. Once the check 972 is aligned with the image frame 1010, the payee may select the graphical button 1090 to acquire an image using the camera 48. Additionally, the section of the graphical button 1092 on the screen 1086 may allow for the payee to cancel the image acquisition process if necessary.

Once the image of the check 972 has been acquired, the acquired image, represented here by the reference numeral 1096, may be displayed on the screen 1086. As discussed above, the payee may evaluate the acquired image 1086 to determine whether the image is suitable for use by the image processing application, as discussed above. If the payee determines that the acquired image 1096 fails to conform to one or more quality standards required by the image processing application, as discussed above, the payee may select the graphical button 1100 in order to return to the viewfinder 1009 and acquire a subsequent image. If the payee determined that the acquired image 1096 is suitable for processing by the image recognition application, the user may begin the image processing steps by selecting the graphical button 1098.

Figure 27C:
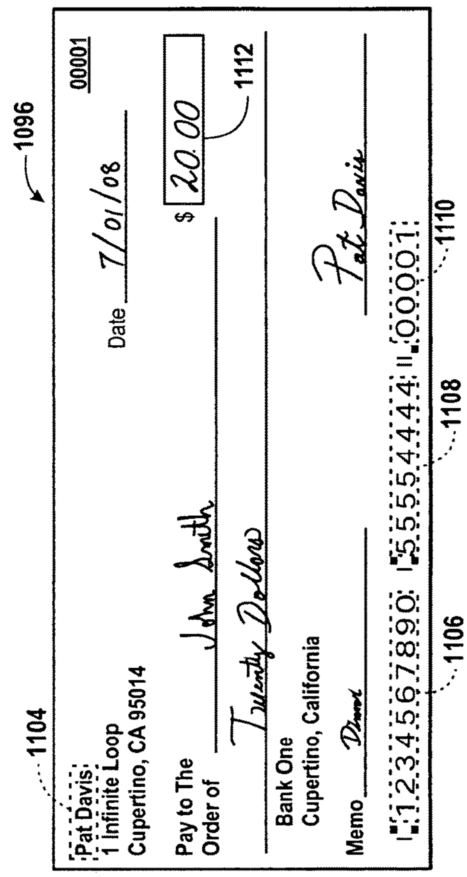
FIG. 27C depicts a technique for processing the image acquired in FIG. 27B for the extraction of payment information.
Figure 27D:
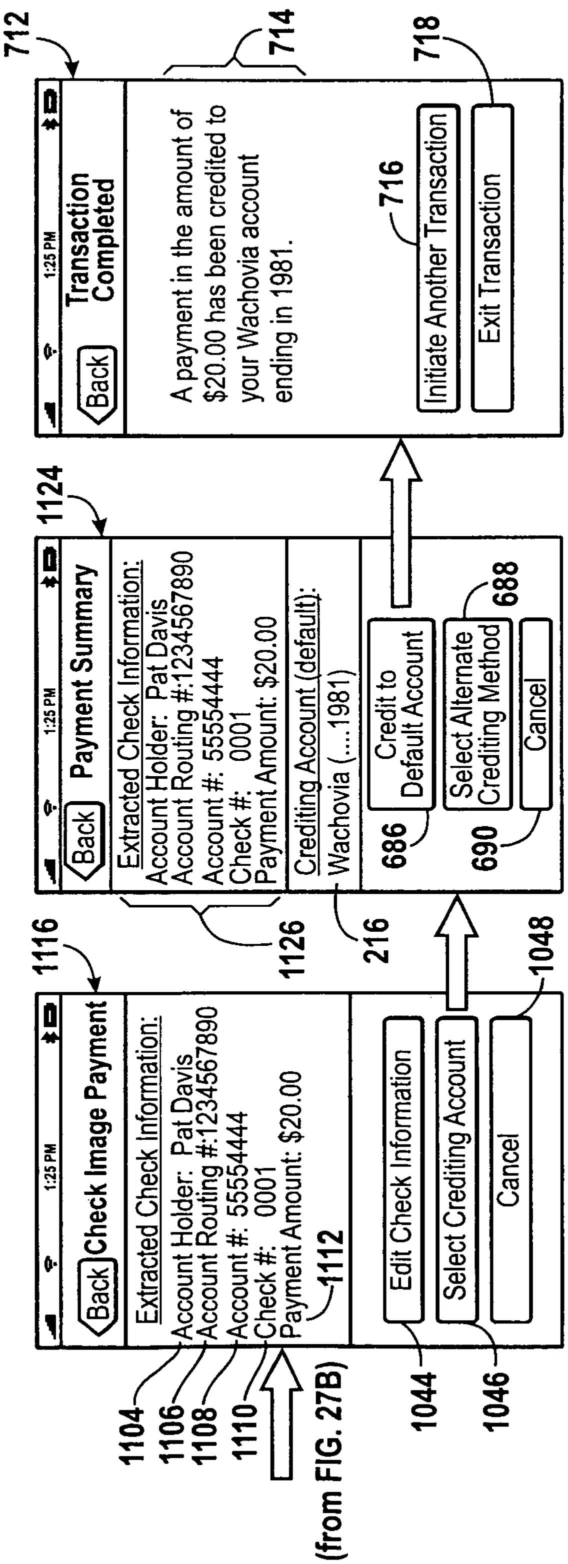
FIG. 27D shows a plurality of screens that may be displayed on a payee device illustrating a method for selecting a crediting account and completing the transaction initiated in FIG. 27A.

The processing of the check image 1096 may be further explained with reference to FIG. 27C. As illustrated, the image processing application may process the acquired image 1096 to determine various regions of interest, such as the regions designated by the reference numerals 1104, 1106, 1108, and 1110. This process may be similar to the process described above with regard to the processing of the credit card image 1018 in FIG. 26B. Additionally, the image processing application may also designate the region 1112, which may correspond to a payment amount written on the check 972 by the payor, as a region of interest. As shown in FIG. 27C, the region 1104 may correspond to the identity of the payor, and the region 1106 may correspond to a routing number that may be used to identify the banking provider associated with the payor's bank account number, which may be represented in the region 1108. Further, the image processing application may also designate the region 1110 as corresponding to the check number associated with the provided check 972. Accordingly, as explained above, once the regions are recognized by the image processing application, the information contained within the regions 1104, 1106, 1108, 1110, and 1112, may be extracted and displayed on the screen 1116, as illustrated in FIG. 27D.

As shown in the screen 1116, in addition to the check information extracted from the image 1096, the screen 1116 may also display the graphical button 1118, as well as the graphical buttons 1046 and 1048, which were previously described above with reference to FIG. 26C. Thereafter, in a manner similar to the editing process described above with reference to FIG. 26C, the user may select the graphical button 1118 to edit the extracted information from the check image 1096 if any portion of the information is determined to be inaccurate. If the extracted information is determined to be correct, as indicated in FIG. 27D, the user may select the graphical button 1046 to access the screen 1124.

As shown on the screen 1124, the information extracted from the check image, such as the information represented by the reference numerals 1104, 1106, 1108, 1110, and 1112, is displayed and generally designated by the reference numeral 1126. The screen 1124 may also display the section of a crediting account, which as discussed above, may initially be selected as the payee's default crediting account 216. Further, the screen 1124 may also display the graphical buttons 686, 688, and 690, as discussed above with reference to the screen 674 in FIG. 14J. Accordingly, to initiate the transaction authorization steps by which the payment account represented by the check information 1126 is charged or debited for the payment amount 1112, the payee may select the graphical button 686. It should be noted, that in the presently illustrated embodiment, that the security measures depicted above with reference to the screen 1066 of FIG. 26D, may not be required because the check 972 provided to the payee in the present embodiment has been specifically made out to the payee, thus indicating that the payor had previously acquiesced to the payment request. Thereafter, if the transaction is authorized and successfully processed, such as by the one or more financial servers 100, the screen 712 may be displayed on the payee device 10. As discussed above, the screen 712 may include the notification message 714 indicating that the requested payment amount has been credited to the selected crediting account 216.

Referring briefly back to FIG. 27A and, specifically to the screen 1080, the graphical button 1084 may represent an additional function provided on the payee device 10, in which the transaction 970 depicted above in FIG. 24, may be initiated by obtaining only a partial image of a check (e.g., as opposed to a full image). As will be explained in further detail below, the functions provided by the graphical button 1084 may be used in circumstances in which the check provided by the payor is blank, whereby the transaction 970 may only be initiated upon receiving some sort of additional authorization from the payor, such as the providing of a bank account PIN number, for instance.

Figure 27E:
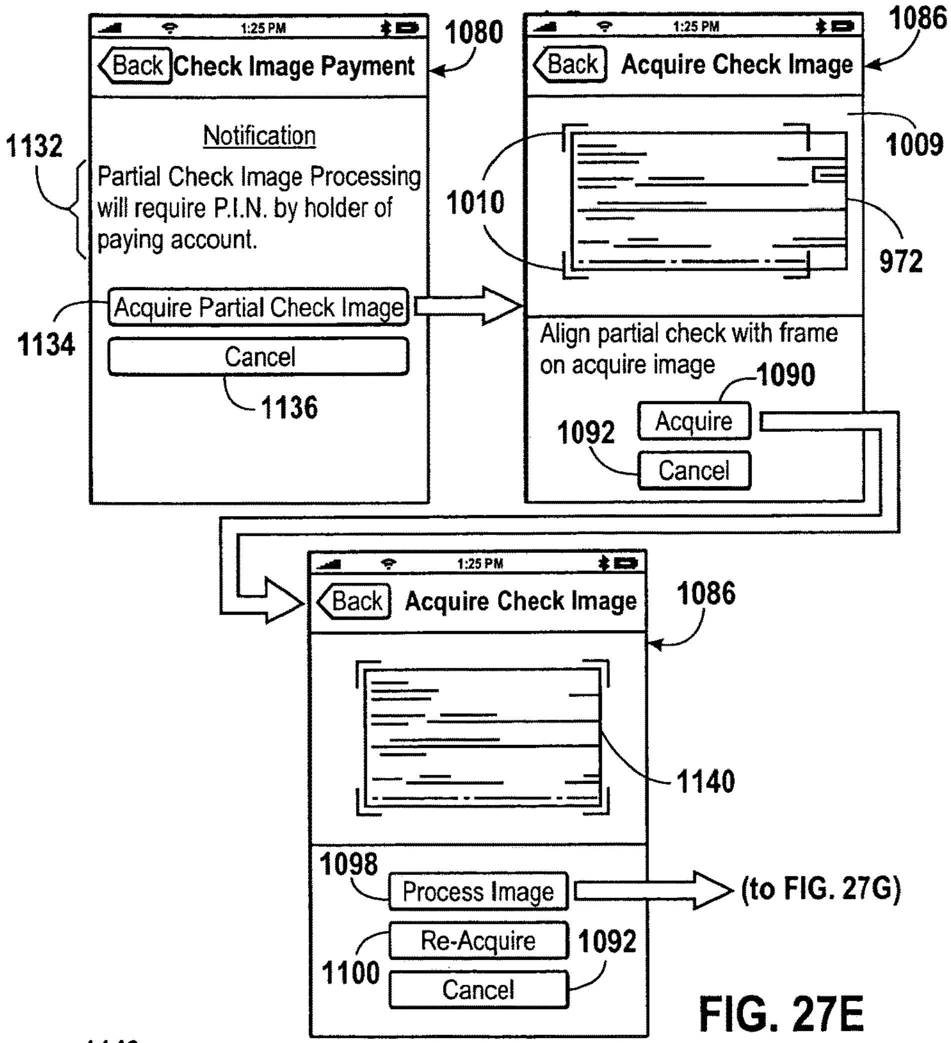
FIG. 27E shows a plurality of screens that may be displayed on a payee device illustrating a method for acquiring an image of the check in FIG. 24 in accordance with a further embodiment.
Figure 27F:
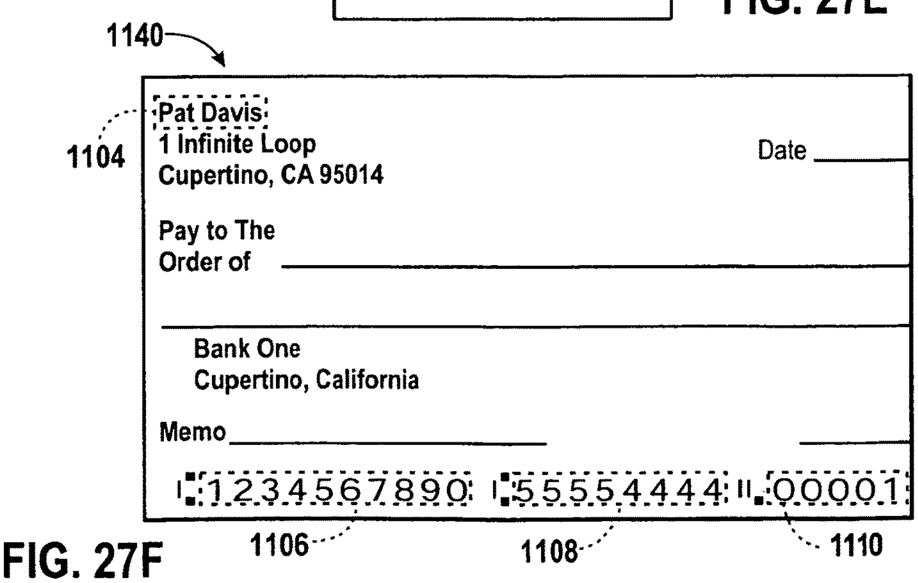
FIG. 27F depicts a technique for processing the image acquired in FIG. 27E for the extraction of payment information.

Continuing now to FIG. 27E, upon selecting the graphical button 1084, the screen 1080 may be updated to display the notification message 1132, and the graphical buttons 1134 and 1136. The notification message 1132 may generally inform the payee that the present transaction may further require the providing of a banking account PIN number by the payor. In order to proceed with the acquisition of the partial check image, the payee may select the graphical button 1134. Additionally, the payee may have the option of canceling the check image acquisition process by selecting the graphical button 1136. Upon selection of the graphical button 1134, the user may be navigated to the above discussed screen 1086, which may include the viewfinder 1009 associated with the camera device 48. As shown in the screen 1086, the viewfinder 1009 may include the image acquisition frame 1010. Thus, the payee may position the device 10 such that the desired portion of the check 972 to be imaged is contained in the region defined by the acquisition frame 1010. Once the desired portion of the check 972 is properly aligned, the payee may acquire an image of this portion of the check 972 by selecting the graphical button 1090 on the screen 1086. Additionally, the payee may have the option of canceling the image acquisition step by selecting the graphical button 1092.

Upon selection of the graphical button 1090, an image of the aligned portion of the check 972 may be acquired and displayed on the screen 1086, as indicated by the reference numeral 1140. Here, in the manner similar to the screens 1086 described above with reference to FIG. 27B, the payee may evaluate the image 114 to determine if the quality of the acquired image is sufficient for processing by the image processing application. For example, if the image 1140 fails to meet one or more quality standards discussed above, the payee may select the graphical button 1100 to reacquire a subsequent image of the check 972. If it is determined that the acquired image 1140 is suitable for processing by the image processing application, the payee may initiate the payment information extraction process by selecting the graphical button 1098. For example, referring now to FIG. 27F, the processing of the partial check image 1140 may generally be similar to the processing of the full check image 1096, as described above with reference to FIG. 27C, except that the partial check image 1140 does not contain the region 1112 corresponding to the payment amount printed on the check 972 by the payor. Thus, in the present embodiment, the image processing application may process the partial check image 1140 to extract only the identity of the payor 1104, the routing number corresponding to the payor's banking provider 1106, the payor's bank account number 1108, as well as the check number 1110.

Figure 27G:
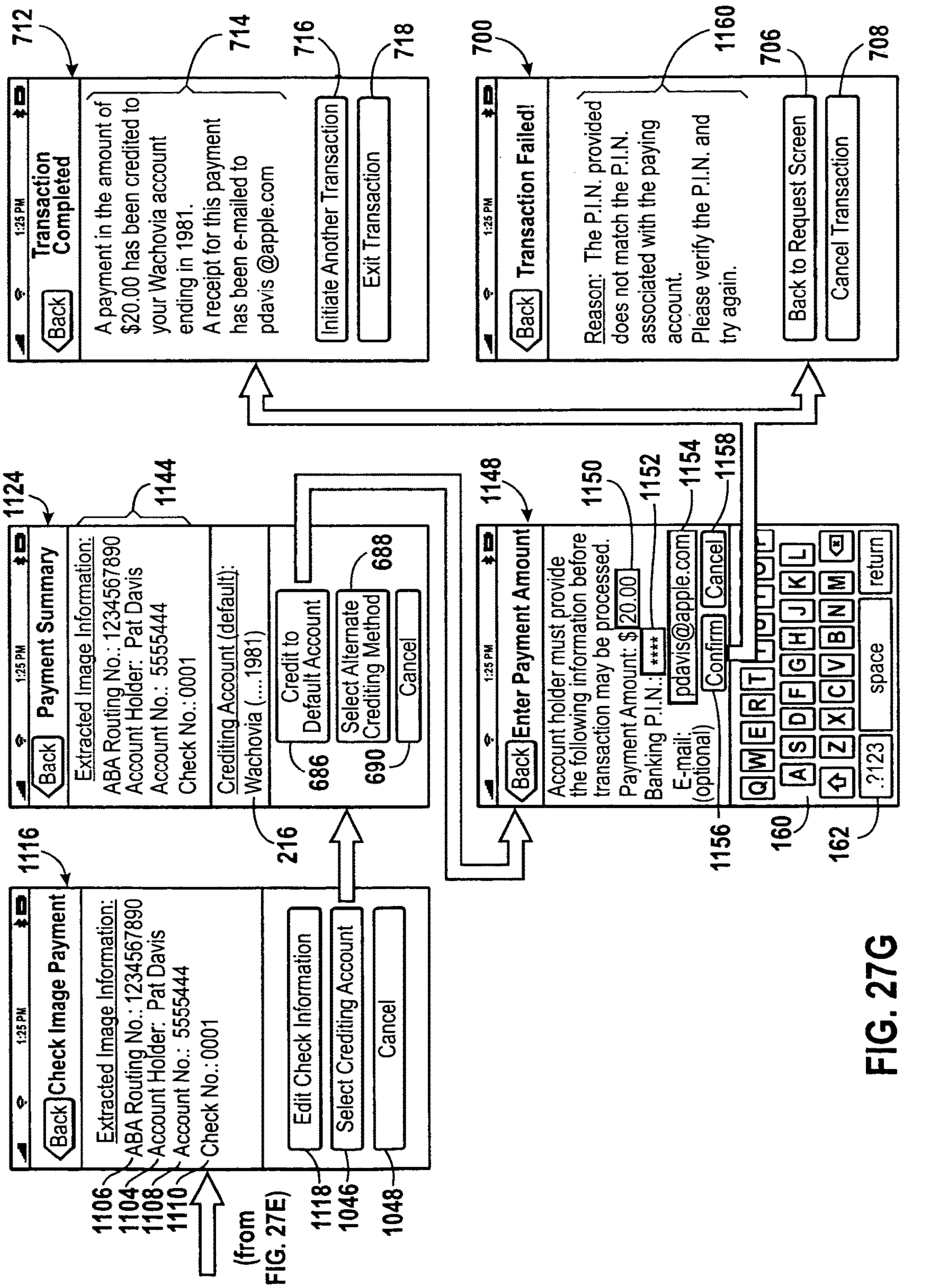
FIG. 27G shows a plurality of screens that may be displayed on a payee device illustrating a method for selecting a crediting account and completing the transaction initiated in FIG. 27A based on the image acquired in FIG. 27E.

Once the partial check image 1140 is processed by the image recognition application, the payee may be advanced to the screen 1116 illustrated in FIG. 27G. As shown in the screen 1116, the extracted check information, including the payor's identity 1004, the routing number of the banking provider associated with the selected payment account 1106, as well as the bank account number 1108 and the check identification number 1110 associated with the provided check 972, may be displayed. Additionally, the screen 1116 may also provide the graphical button 1118, which may represent the same functionality described above with reference to FIG. 27D, as well as the graphical buttons 1046 and 1048. Thus, if the check image information extracted from the image 1140 is determined by the payee to be accurate, the payee may proceed to the selection of the crediting account by selecting the graphical button 1046. For instance, the selection of the graphical button 1046 may navigate the payee to the screen 1124, which may display the extracted check information provided on the previous screen 116, generally referred to here by the reference numeral 1144, as well as the section of a crediting account, which may initially be selected as the default crediting account 216. Additionally, the screen 1124 may further include the graphical buttons 686, 688, and 690, each of which may correspond to the functions described above with reference to screen 674 in FIG. 14J. Accordingly, to initiate the authorization and processing of the present transaction, in which a payment is credited to the payee's default crediting account 216, the graphical button 686 may be selected, thereby advancing the payee to the screen 1148.

The screen 1148 may be similar to the screen 1066 discussed above in FIG. 26D, in that one or more additional authorization steps may be completed by the payor before the transaction may be processed. For instance, the illustrated screen 1148 may include the text fields 1150, 1152, and 1154. Using either the keyboard interface 160 or the numerical keyboard interface 164 (not shown in FIG. 27G), the payor may enter the amount of the requested payment into the text field 1150, as well as a PIN number associated with the bank account corresponding to the provided check 972 into the text field 1152. Optionally, if the payor wishes to receive an electronic receipt upon completion of the transaction, such as in the form of an e-mail, the payor may provide a valid e-mail address in the text field 1154. The screen 1148 may further include the graphical buttons 1156 and 1158. Accordingly, once the required information is entered into the text fields 1150, 1152, and 1154, the graphical button 1156 may be selected in order to initiate the authorization and processing of the present transaction. Additionally, the transaction may be cancelled at this point by selecting the graphical button 1158.

As discussed above, if the transaction is completed successfully, the screen 712 may be displayed on the payee device 10. The screen 712 may include the notification message 714 notifying the payee that the requested payment has been credited to the selected crediting account 216, and that a receipt regarding the present payment has been transmitted to the e-mail address provided by the payor in the text field 1154 of the screen 1148. Alternatively, if the transaction fails for one or more reasons, the screen 700 may be displayed on the payee device instead. In the present figure, the screen 700 may include the notification message 1160, which may indicate that the pin number provided by the payor in the text field 1152 in the previous screen 1148 does not match the pin number contained within the records maintained by the banking provider. Accordingly, the payee may be instructed to request that the payor either reenter or verify the pin number entered on the screen 148. It should be understood that the notification message 1160 is meant to illustrate one example of why the present transaction may fail. Indeed, any of the reasons discussed above may contribute to a transaction failing to process successfully (e.g., lack of sufficient funds on payment account, etc.).

Figure 28:
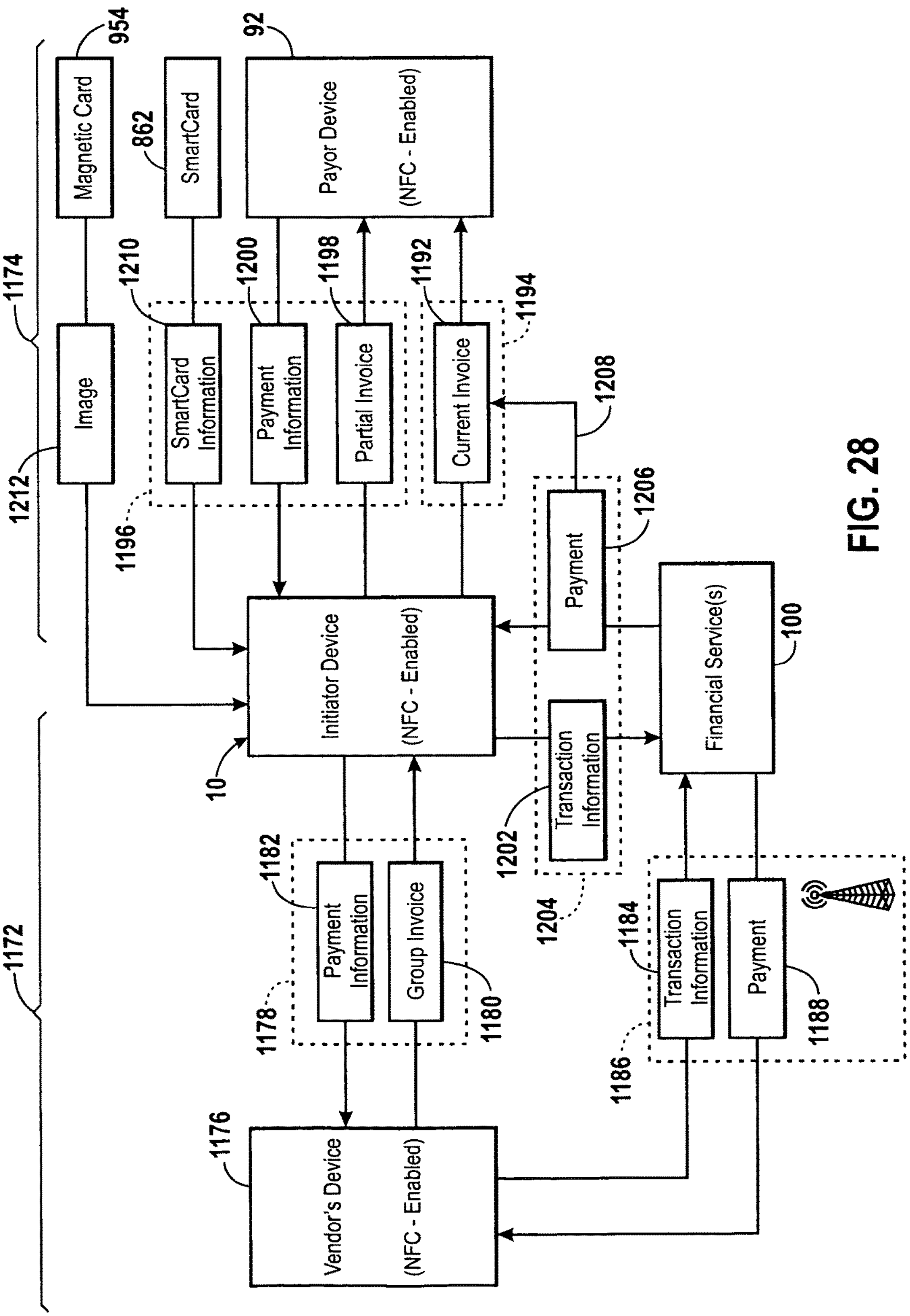
FIG. 28 is a schematic representation of a system adapted to carry out a group transaction including multiple payors in accordance with one embodiment.

Continuing now to the remaining figures, additional aspects of the presently described techniques are illustrated. As discussed above, the electronic device 10 may include one or more functions adapted to carry out a group transaction involving one or more payors. For example, as discussed above with reference to FIG. 14A, the graphical button 482 may be selected from the screen 476 to carry out a group transaction. Referring now to FIG. 28, a schematic representation of the system for performing a group transaction in accordance with one aspect of the present disclosure is illustrated and generally referred to by the reference number 1170. As illustrated in the present figure, the group transaction 1170 may include a primary transaction, designated by the reference numeral 1172, as well as one or more secondary transactions, as designated by the reference numeral 1174.

In the primary transaction 1172, the electronic device 10 which may act as the initiating device for the group transaction 1170, and may assume the role of a payor in making a payment to the vendor device 1176. Thereafter, the initiating device 10 may act as a payee and receive additional payments from the holders of the payor device 92, the smart card 862, and the magnetic credit card 954. For the purpose of the present discussion, and to more clearly differentiate between the holders of each of these payment instruments, the holder of the magnetic credit card 954 shall be referred to herein as the credit card payor. Similarly, the holder of the smart card 862 shall be referred to herein as the smart card payor, and the holder of the payor device, which may be an NFC enabled device in accordance with the embodiments discussed above, shall be referred to herein as the NFC payor. As will be explained in further detail below, the payments made to the initiator device 10 by the credit card payor, the smart card payor, and the NFC payor, may be in response to a payment owed to the vendor. For example, the presently illustrated transaction 1170 may occur in the context in which one party (e.g., the initiator) initially pays for a group invoice containing amounts owed by each of the illustrated parties, and in which the remaining parties later provide a payment to the initiating party.

By way of example, the present technique may be utilized in a setting where the parties illustrated in FIG. 28 wish to split a bill or invoice at a restaurant. In the primary transaction 1172, the initiator device 10 may act as the payor with respect to the vendor device 1176, which may be a device operated by personnel associated with the restaurant. As discussed above, the initiator device and the vendor device 1176 may establish an NFC connection 1178 by which a group invoice 1180 may be transmitted from the vendor device 1176 to the initiator device 10. Thereafter, the initiator may select an appropriate payment account on the initiator device, which may be the default payment account 180, as described above with reference to FIG. 7. Once selected, the payment account information 1182 may be transmitted to the vendor device 1176 by way of the NFC connection 1178.

Upon receiving the payment information 1182, the vendor device 1176, which may act as the payee device in the primary transaction 1172, may select a crediting account and then transmit the crediting account information, the payment account information 1182, as well as the requested payment amount correspond to the group invoice 1180, collectively referred to here by the reference number 1184, to one or more financial servers 100, as discussed above. As shown in the present figure, the transmission of the transaction information 1184 may occur by way of a network designated by the reference number 1186. The network 1186 may include any of the suitable networks mentioned above, such as a LAN or a WLAN network connection, for example.

Once the transaction information 1184 is received, the financial servers 100 may process and authorize the requested transaction and, if the transaction is authorized, a payment 1188 may be provided to the vendor. For example, once the primary transaction 1172 is authorized by the financial servers 100, the amount requested in the group invoice 1180 may be charged from the payment account 1182 specified by the initiator device 10 and credited to a crediting account specified on the vendor device 1176. Accordingly, the primary transaction 1172 may be completed at this point, and the initiator device 10 may have the option of proceeding with the secondary transactions 1174. As discussed above, the secondary transactions 1174 may include transactions involving the NFC device 92, the smart card 862, and the magnetic credit card 954. It should be appreciated, however, that additional devices or payment instruments may also be included in the secondary transaction 1174 in other embodiments, and need not necessarily be limited to the examples provided herein.

As shown in FIG. 28, once the primary transaction 1172 has been completed, the initiator device 10 may transmit the current invoice 1192 to the NFC payor device 92 by way of an ad-hoc network, designated by the reference numeral 1194. Initially, the current invoice 1192 may be identical to the group invoice 1180. Before requesting the payment from the group transaction members (e.g., the credit card payor, the smart card payor, and the NFC payor), the initiator may apportion the group invoice 1180 in accordance with the amounts owed by each transaction member. As will be illustrated below, the apportioning of the invoice items may be updated in real time and viewed on the current invoice 1192, which may be displayed on the NFC payor device 92. Additionally, the current invoice 1192 may also be updated in real time to reflect payments received by the initiator device 10.

Once the group invoice 1180 has been apportioned by the initiator on the initiator device 10, the amounts owed by each of the credit card payor, the smart card payor, and the NFC payor, may be communicated to these parties as a partial invoice. By way of example, the initiator device may begin the process of receiving payments by establishing an NFC connection 1196 with the NFC payor device 92 to transmit the partial invoice 1198 to the NFC payor. As will be appreciated, the partial invoice 1198 may reflect the portion of the group invoice 1180 owed to the initiator by the NFC payor. Thus, in accordance with the techniques generally described above with respect to the embodiments depict in FIGS. 12A-12C, a payment account may be selected on the NFC payor device 92 and, thereafter, be transmitted to the initiator device 10, as illustrated by the reference numeral 1200.

Upon receiving the payment information 1200 from the NFC payor device 92, the initiator device 10 may select a crediting account and transmit the payment information 1200, the crediting account information, as well as the amount reflected in the partial invoice 1198, collectively referred to here as the transaction request information 1202, to the financial servers 100 by way of the network 1204. As will be understood, the network 1204 may be provided by way of one or more of the communication interfaces available on the device 10, as discussed above. Thereafter, if the financial servers 100 determine that the transaction request represented by the transaction information 1202 may be authorized, then a payment 1206 may be credited to the crediting account selected by the initiator device 10. Additionally, as discussed above, the payments made by any of the payors in the secondary transaction may be updated in real time on the current invoice 1192 being viewed by the NFC payor. For example, each payment 1206 received by the initiator device may also be reflected on the current invoice 1192, as indicated by the arrow 1208.

Once the initiator device 10 has received the first payment from the NFC payor device 92, the initiator device 10 may continue to receive the remaining payments from the smart card payor and the credit card payor. For example, in accordance with the techniques described above with reference to the transaction 860 depicted in FIG. 20, the initiator device may receive the smart card information 1210 corresponding to the smart card 862 by way of the NFC connection 1196 through a tap operation. Additionally, the initiator device 10 may acquire an image 1212 of the magnetic credit card 954 in accordance with the techniques described above with reference to the transaction 952 depicted in FIG. 23. Accordingly, the initiator device 10 may then transmit the smart card information 1210, as well as the payment information that may be extracted from the image 1212, to the financial servers 100 by way of a network 1204 for authorization of these additional secondary transactions. Accordingly, if these transactions are authorized by the financial servers 100, respective payments from the credit card payor and the smart card payor, also referenced here by the numeral 1206, may be credited to a crediting account selected by the initiator device 10. Additionally, the current invoice 1192 being viewed by the NFC payor 92 may be updated to reflect the processing of these additional payments from the credit card payor and the smart card payor, as indicated by the reference numeral 1208.

Figure 29:
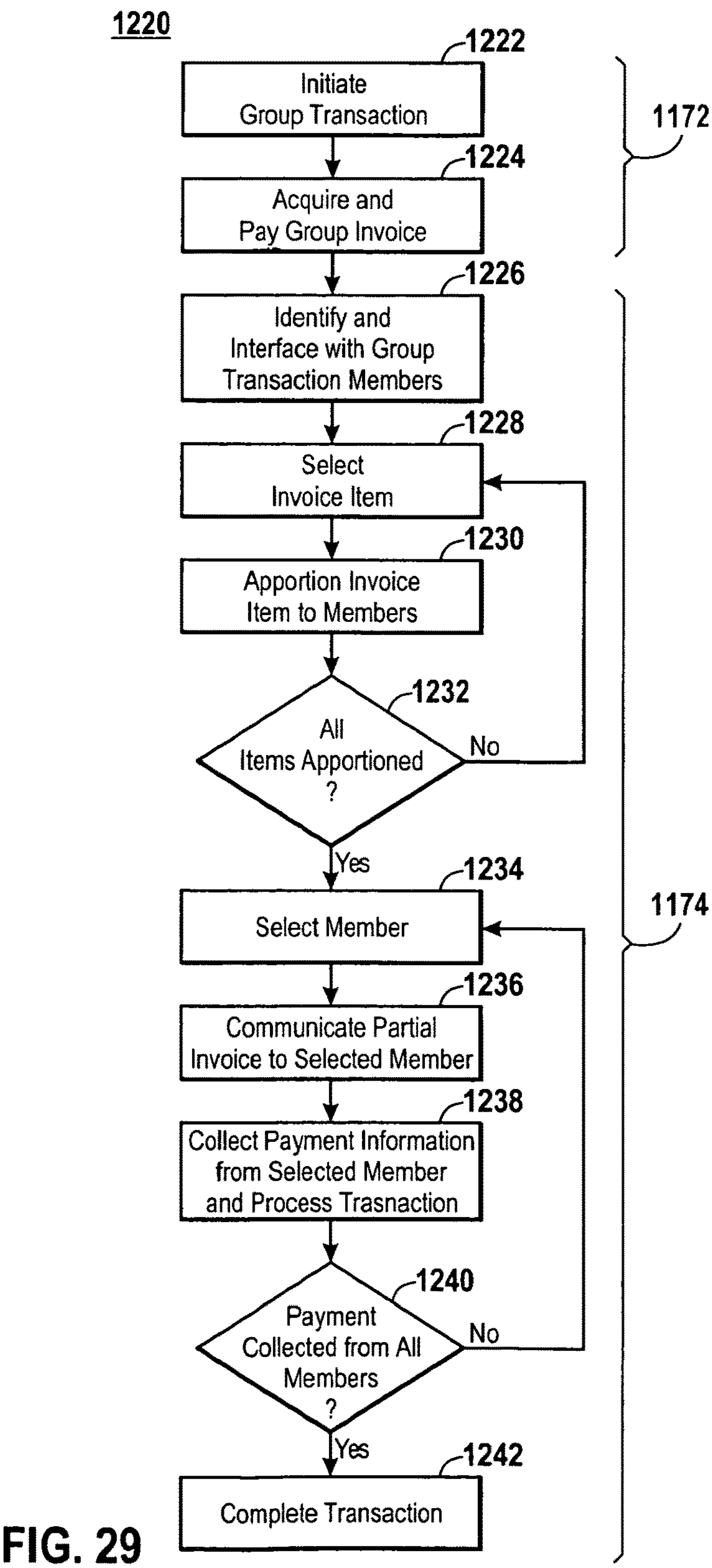
FIG. 29 depicts a flowchart illustrating a method of for performing the group transaction of FIG. 28.

Continuing now to FIG. 29, a method 1220, which may depict a technique for operating the initiator device 10 to carry out the group transaction 1170 discussed in FIG. 28, is illustrated. As shown in step 1222, a group transaction may be initiated by the initiator device 10. Thereafter, at step 1224, the initiator may receive and pay a group invoice, such as the group invoice 1180. As discussed above, in accordance with one embodiment, the receipt and payment of the group invoice by the initiator device 10 may occur by way of the NFC connection 1178. Once the group invoice has been paid by the initiator device 10, the method 1220 may proceed to step 1226, whereby the initiator may identify and interface with the additional group transaction members, which may include the credit card payor, the smart card payor, and the NFC payor, as discussed above. Next, the initiator may proceed to apportion the items listed on the group invoice to the appropriate group transaction member. For instance, the initiator may select a first invoice item at step 1228, and apportion the selected item to the appropriate group transaction member at step 1230. As shown by the subsequent decision block 1232, the initiator may continue the apportioning process until all the invoice items listed on the group invoice 1180 have been properly apportioned to the correct group transaction member.

Thereafter, the initiator may begin the process of collecting payments from each of the group transaction members. For example, the initiator may select a first group transaction member at step 1234. Next, at step 1236, a partial invoice corresponding to the selected member from step 1234 may be communicated. For example, the partial invoice may be communicated to the NFC payor device 92 by way of the NFC connection 1196 discussed above. Additionally, the partial invoices may also be communicated verbally, for example, to the credit card payor and the smart card payor. Upon receiving the partial invoice, the respective payor may select a payment account and provide the payment account information to the initiator. For instance, as illustrated by step 1238, the initiator may collect the payment information from the selected group transaction member and then process the transaction, such as by transmitting the transaction request to the financial servers 100. As discussed above, if the requested transaction is authorized by the financial servers 100, a corresponding payment may be made to a crediting account specified by the initiator.

Thereafter, as shown by the decision step 1240, the initiator device may continue to collect payments until a payment has been received from each of the group transaction members. Accordingly, once all payments have been received, the group transaction may be completed at step 1242. It should be noted, that the steps 1222 and 1224 discussed above may correspond to the primary transaction 1172, and that the remaining steps 1126-1242 may correspond to the secondary transaction 1174 as indicated above in FIG. 28.

The above-described group transaction 1170 may be better understood with reference to FIGS. 30A-30L, which may generally depict various screen images that may be displayed on either the initiator device 10 or the NFC payor device 92 during the course of the group transaction 1170. For example, referring first to FIG. 30A, the primary transaction 1172 may be initiated on the initiator device 10 beginning with the screen 110. Next, the initiator may select the graphical button 114 to navigate to the screen 476, which may display the graphical button 482, as discussed above. Accordingly, the initiator may access the group transaction functions provided by the device 10 by selecting the graphical button 482, thus advancing to the screen 1270. The screen 1270 may display the graphical buttons 1272, 1274, and 1276. Each of these graphical buttons may represent specific functions, as discussed above. For instance, the graphical button 1272 may represent a function by which the initiator may initiate the group transaction 1170. Similarly, the graphical button 1274 may allow the initiator to join an existing group transaction, such as a group transaction that may have been previously initiated by another member. Additionally, the initiator may cancel the group transaction by selecting the graphical button 1276.

As shown in the present figure, the selection of the graphical button 1272 may navigate the initiator to the screen 1278. The screen 1278 may provide for the selection of various options with respect to the group transaction. For example, a first option may be provided in which the initiator may pay a group invoice, such as the group invoice 1180, as a primary transaction (e.g., 1172), and thereafter apportion of the invoice among additional transaction members and collect payments from each of these transaction members as a series of secondary transactions (e.g., 1174). This may be the scenario generally described by the group transaction 1170 in FIG. 28.

As shown in the screen 1278, an additional group transaction option in which the initiator may directly split an invoice among one or more other transaction members may be provided. This situation will be further explained with reference to FIG. 32 below. The options depicted on the screen 1278 may be represented by the graphical elements 1280 and 1282, which may represent check box graphic icons, by which the initiator may select the appropriate option. For instance, as illustrated in the present figure, the initiator may select the check box 1280 to indicate that the present transaction is to be performed in accordance with the techniques discussed above in FIG. 28. Once the option 1280 is selected, the initiator may select a graphical button 1284 in order to begin the group transaction 1170.

Upon selection of the graphical button 1284, the user may be advanced to the screen 1288, by where the primary transaction discussed above, and referred to the reference numeral 1172, may begin. For instance, the screen 1288 may represent the initiation of the NFC connection 1178. The screen 1288 may also include the notification message 1290, which may indicate to the initiator that the NFC device 46 of the initiator device 10 is being powered on, thus activating the NFC interface 60, as discussed above. The screen 1288 may also include the graphical button 1292 by which the initiator may select to cancel the establishment of the NFC connection 1178 if necessary.

Figure 30A:
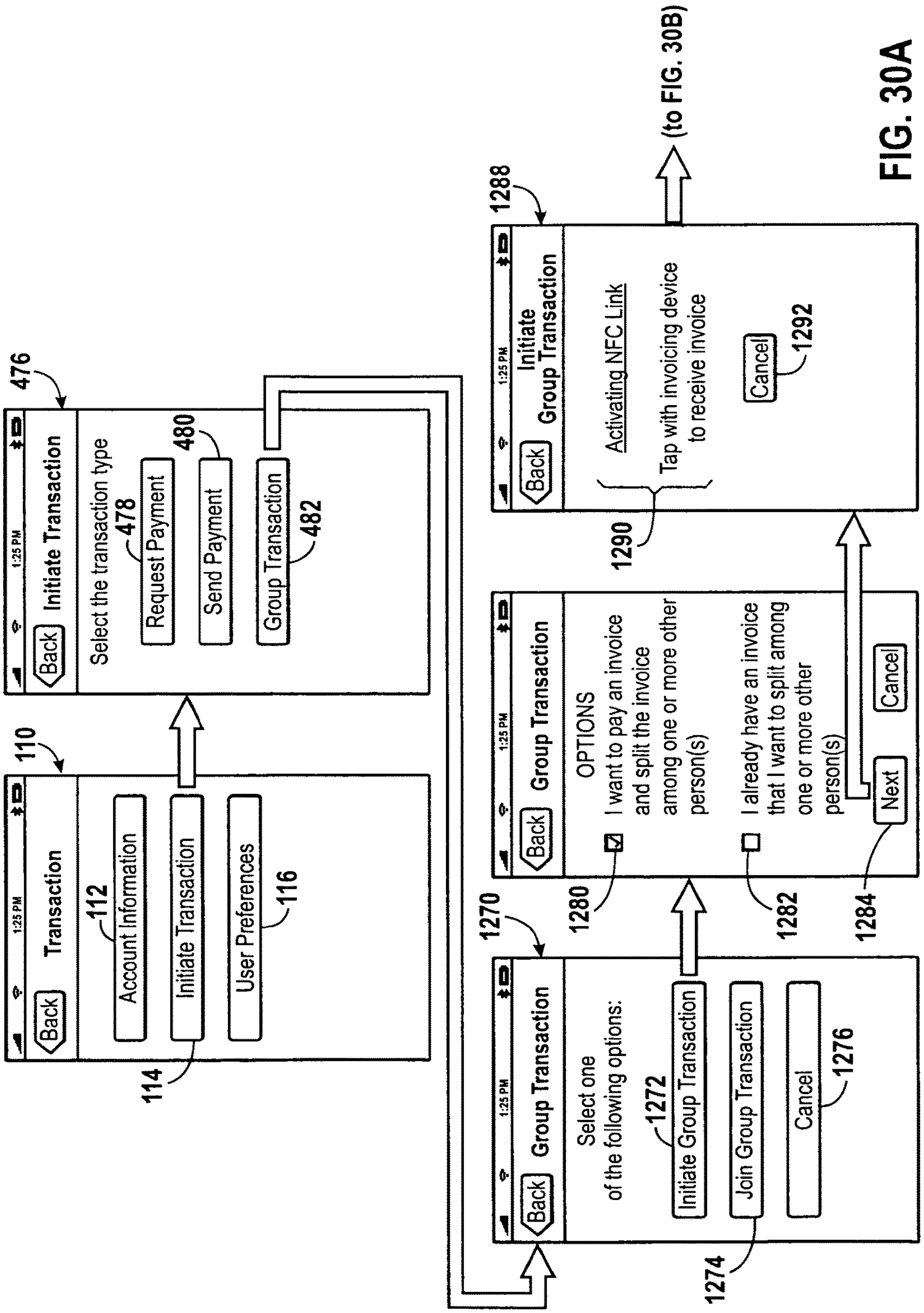
FIG. 30A shows a plurality of screens that may be displayed on an initiator device illustrating a method for initiating a primary portion of the group transaction of FIG. 28.
Figure 30B:
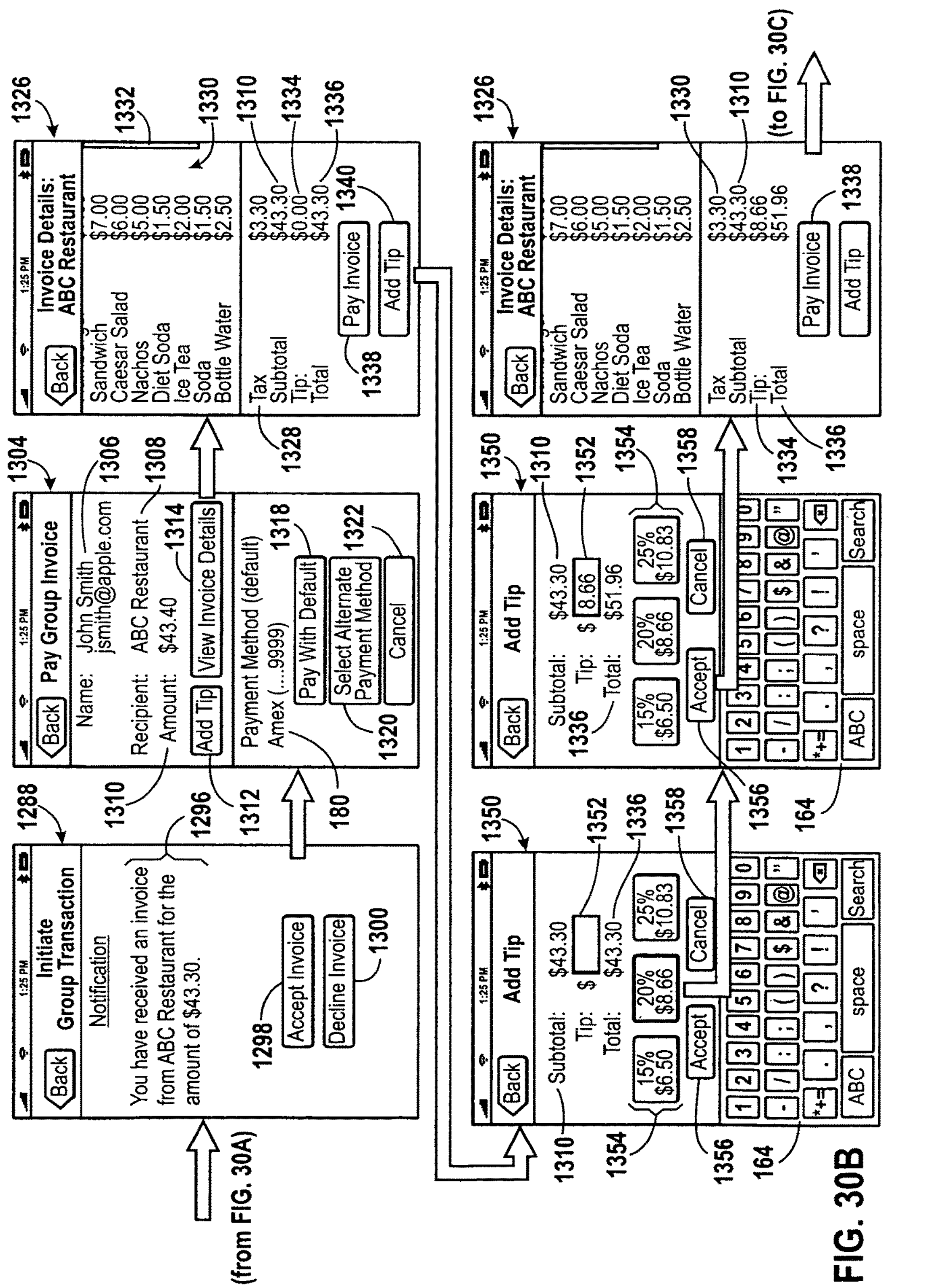
FIGS. 30B and 30C show a plurality of screens that may be displayed on an initiator device illustrating a method for completing the primary transaction initiated in FIG. 30A and further initiating a secondary portion of the group transaction.

Upon establishment of the NFC connection 1178, the initiator device 10 may receive the group invoice 1180 from the vendor device 1176 with which the NFC connection 1178 has been established. For example, once the group invoice 1180 has been received by the initiator device 10, the screen 1288 may be updated, as depicted in FIG. 30B, to display the notification message 1296. As shown here, the notification message 1296 may inform the initiator that the group invoice 1180 has been received. Accordingly, by way of the graphical buttons 1298 and 1300, the initiator may either accept or decline the received group invoice 1180. To accept the group invoice, the initiator may select the graphical button 1298 to navigate to the screen 1304. The screen 1304 may display the identity of the initiator 1306, the identity of the vendor 1308, as well as the amount requested by the group invoice, referred to here by the reference number 1310. As will be explained below, the amount 1310 may reflect a subtotal prior to the addition of a gratuity amount. For example, the present embodiment may be reflected in a scenario where the vendor is a restaurant and the invoice reflects a restaurant bill. Accordingly, the graphical buttons 1312 and 1314 are also provided on the screen 1304 by which the initiator may choose to specify a gratuity amount, or view the invoice details, respectively.

The screen 1308 may further display the presently selected payment account, which may be initially selected as the default payment account 180 specified by the initiator, as discussed above in FIG. 7. Accordingly, the graphical buttons 1318, 1320, and 1322 may be provided wherein the graphical button 1318 represents the function by which the initiator may pay the invoice using the presently selected default payment account 180, wherein the graphical button 1320 represents a function by which the initiator may select an alternate payment account, and wherein the graphical button 1322 may allow the initiator to cancel the present transaction.

As shown in FIG. 30B, the initiator may view the group invoice 180 by selecting the graphical button 1314, thus navigating to the screen 1326. The screen 1326 may include a section that generally lists all the group invoice items, referred to here by the reference numeral 1330. Additionally, the scroll bar function 1332 may be provided on the screen 1326 such that the initiator may navigate through the listing of the invoice items 1330 if the listing cannot be viewed in its entirety in the provided display section. In addition to the listing of the invoice items 1330, the screen 1326 may also list any applicable tax amount 1328. As will be appreciated, the sum of the invoice items 1330 and the tax amount 1328 may be summed to obtain the subtotal 1310 discussed above. The screen 1326 may additionally display a gratuity amount 1334, which may initially be zero prior to the addition of a gratuity amount by the initiator. Accordingly, the subtotal for the group invoice 1310 and any gratuity amount 1334 may be summed to determine the total amount of the group invoice 1336. Further, the graphical buttons 1338 and 1340 may also be provided on the screen 1326, in which the graphical button 1338 may provide the initiator with the function of proceeding to pay the displayed invoice based on its current status. Additionally, the graphical button 1340 may be selected if the initiator chooses to specify the gratuity amount 1334.

For example, if the graphical button 1340 is selected, the initiator may be navigated to the screen 1350 for the addition and selection of a gratuity amount. The screen 1350 may display the current subtotal of the group invoice 1310, and provide the initiator with the text field 1352 by which the initiator may enter a desired gratuity amount. For instance, the initiator may choose to enter the gratuity amount using the numerical keyboard 164, or may select a pre-calculated gratuity amount, as provided by the graphical buttons referred to here by the reference numeral 1354. As shown here, the pre-calculated gratuity amounts represented by the graphical buttons 1354 may correspond to certain percentages of the current subtotal amount 1310. By way of example, in the present figure, the initiator may select the graphical button which corresponds to a gratuity that is 20% of the current subtotal 1310. As illustrated here, upon selection of the above-discussed gratuity amount 1334, the text field 1352 may be populated to reflect the selection. Additionally, the total amount 1336 for the group invoice 1080 may be updated to reflect the addition of the gratuity amount 1334. For example, the current group invoice total 1336 may be computed by summing the above-discussed subtotal amount 1310 and the presently selected gratuity amount 1334. Thereafter, the initiator may select the graphical button 1356 to accept the selected gratuity amount and the corresponding updated group invoice total amount 1336, or may cancel the present transaction by selecting the graphical button 1358. As illustrated in the present figure, the selection of the graphical button 1356 may return the user to the screen 1326, which may be updated to display the selected gratuity amount 1334 and the updated total amount for the group invoice 1336. If the initiator is satisfied with the current group invoice total amount 1336, the initiator may select the graphical button 1338 to proceed with the payment of the group invoice amount 1336.

Figure 30C:
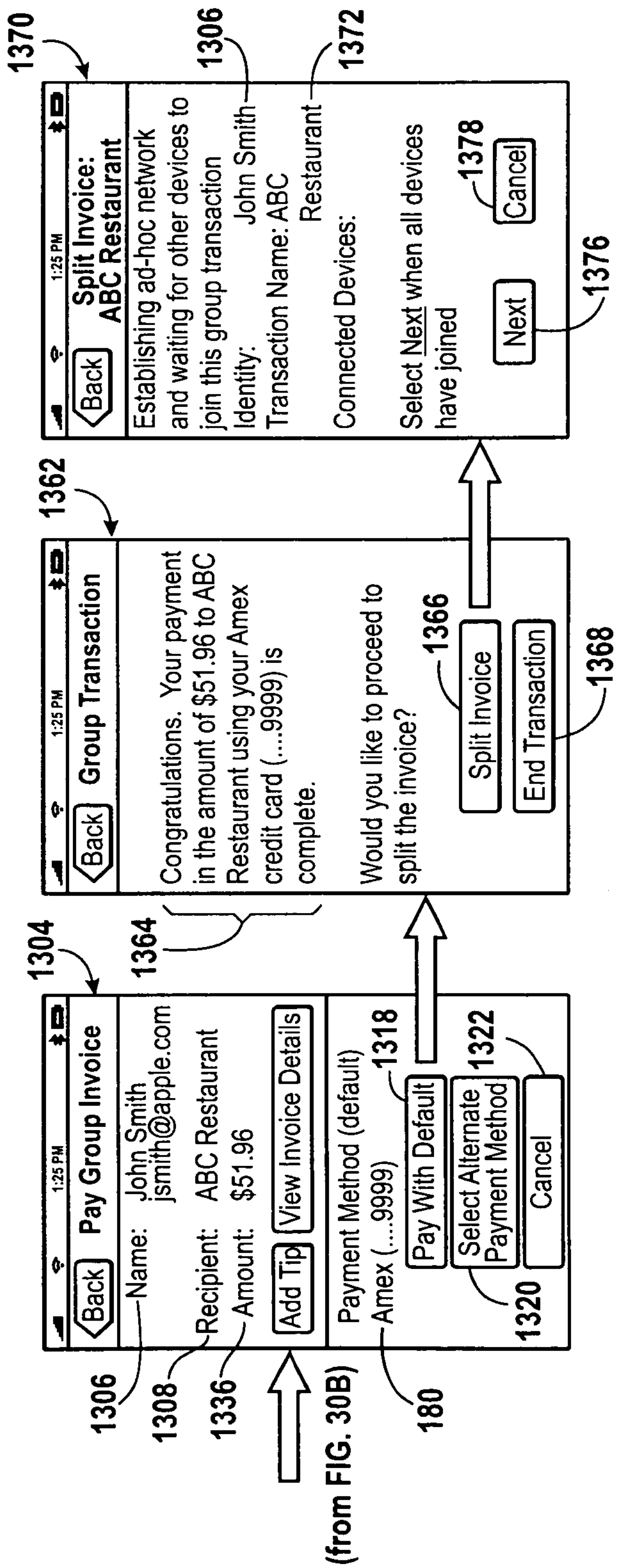

Referring to FIG. 30C, the selection of the graphical button 1338 may return the initiator to the screen 1304, which may be updated to reflect that the group invoice amount 1336 has been updated to include the addition of the gratuity amount 1334 specified from the screen 1350. Accordingly, the initiator may initiate the payment of the group invoice total 1336 using the default payment account 180 by selecting the graphical button 1318. As discussed above, the selection of the graphical button 1318 may transmit the payment account information 1182 to the vendor device 1176 by way of the NFC interface 1178. Accordingly, the vendor device 1176 may transmit the present transaction request 1184 to the financial servers 100 in order to process and authorize the requested payment.

As shown in FIG. 30C, if the primary transaction 1172 is authorized by the financial servers 100, the screen 1362 may be displayed on the initiator device 10. The screen 1362 may display the notification message 1364 indicating to the initiator that the group invoice 180 has been paid using the selected default payment account 180. Additionally, the screen 1362 may include the graphical buttons 1366 and 1368. The graphical button 1368 may represent the function by which the user may end or cancel the transaction. The graphical button 1366 may allow the user to apportion the group invoice 1180, and thus initiate the secondary transactions 1174 discussed above with reference to FIG. 28. As shown in FIG. 30C, upon selection of the graphical button 1366, the screen 1370 may be displayed. The screen 1370 illustrates the establishment of an ad-hoc network, such as the network 1194. As discussed above, capable devices, such as the NFC payor device 92 may join the established ad-hoc network in order to view the current invoice 1192, as well as updates that may be made to the current invoice 1192 during the various steps performed during in the secondary transactions 1174.

The screen 1370 may display the identity of the initiator 1306, as well as apply an identification name to the present group transaction, as indicated here by the reference numeral 1372. As shown here, the transaction identifier 1372 may be identical to the recipient 1308 ("ABC Restaurant") of the payment in the primary transaction illustrated by FIGS. 30A and 30B. Additionally, the screen 1370 may include the graphical buttons 1376 and 1378. The graphical button 1378 may allow the initiator to cancel the establishment of the ad-hoc network, for example, if none of the other transaction members, such as the credit card payor and the smart card payor, are using devices capable of connecting to an ad-hoc network. If the group transaction 1170 does include at least one device capable of joining the ad-hoc network, such as the presently illustrated device 92, the initiator may wait for the device 92 to join the network before selecting the graphical button 1376 to begin the process of apportioning the group invoice 1180.

The process of connection to the ad-hoc network 1194 with respect to the viewpoint of the NFC payor device 92 may be illustrated with reference to FIG. 30D. For example, in order to join the ad-hoc network established by the initiator device 10, as described in FIG. 30, the NFC payor may select the graphical button 114 from the screen 110. It should be noted that the screens depicted in FIG. 30D may be similar to one or more of the screens discussed above with reference to the initiator device 10. Thus, it should be understood that the transaction application provided on the initiator device, such as the application 34, may also be provided on the payor device 92 in the present embodiment. Upon selection of the graphical button 114, the payor may be advanced to the screen 476. To access a group transaction function provided on the NFC payor device 92, the payor may then select the graphical button 482 thus navigating to the screen 1270. Here, the payor may operate the NFC payor device to join the ad-hoc network discussed above by selecting the graphical button 1274.

Figure 30D:
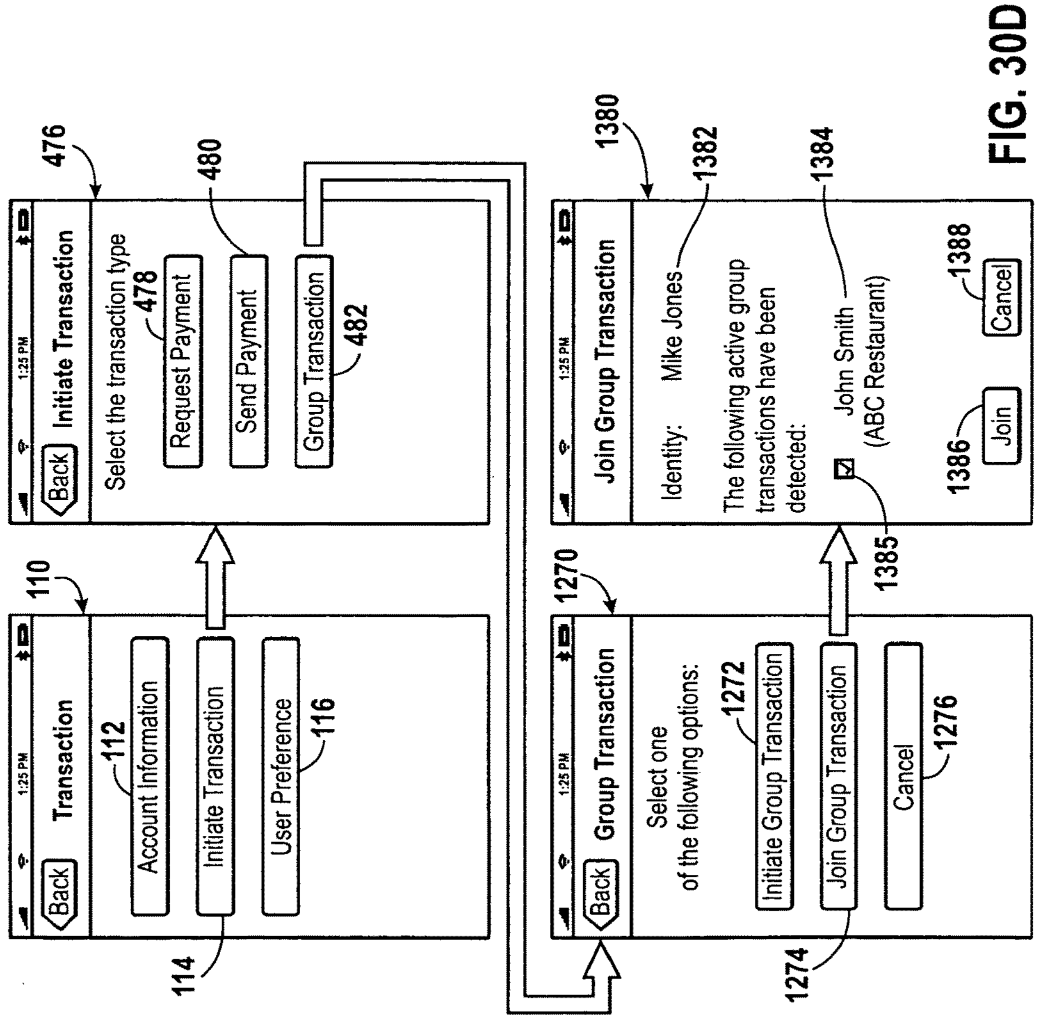
FIG. 30D shows a plurality of screens that may be displayed on an payor device illustrating a method for joining the group transaction of FIG. 28.

As shown in FIG. 30D, the selection of the graphical button 1274 may navigate the NFC payor to the screen 1380. The screen 1380 may display the identity of the payor 1382, as well as display a listing of available ad-hoc networks, which may represent ongoing group transactions. For example, the network established by the initiator and described in FIG. 30C, is listed here and referred to by the reference numeral 1384. Thus, the payor may select the listed network 1384, such as by way of the check box selection graphic 1385, and join the selected network by selecting the graphical button 1386. Additionally, the NFC payor may also have the option of declining to join the ad-hoc network by selecting the graphical button 1388. As will be understood, if the latter is selected, the NFC payor may still participate in the group transaction 1170, but may be unable to view any real time updates to the current invoice 1192.

Once all capable devices have joined the ad-hoc network 1194 established by the initiator device 10, the apportioning of the group invoice items may begin. For example, referring now to FIG. 30E, the screen 1370 discussed in FIG. 30C may be updated to indicate that the NFC payor, represented here by the reference numeral 1382, has joined the established ad-hoc network. Accordingly, because no other payor devices are participating in the present transaction, the initiator may select the graphical button 1376 to navigate to the screen 1400 to begin apportioning the group invoice items 1330.

Figure 30E:
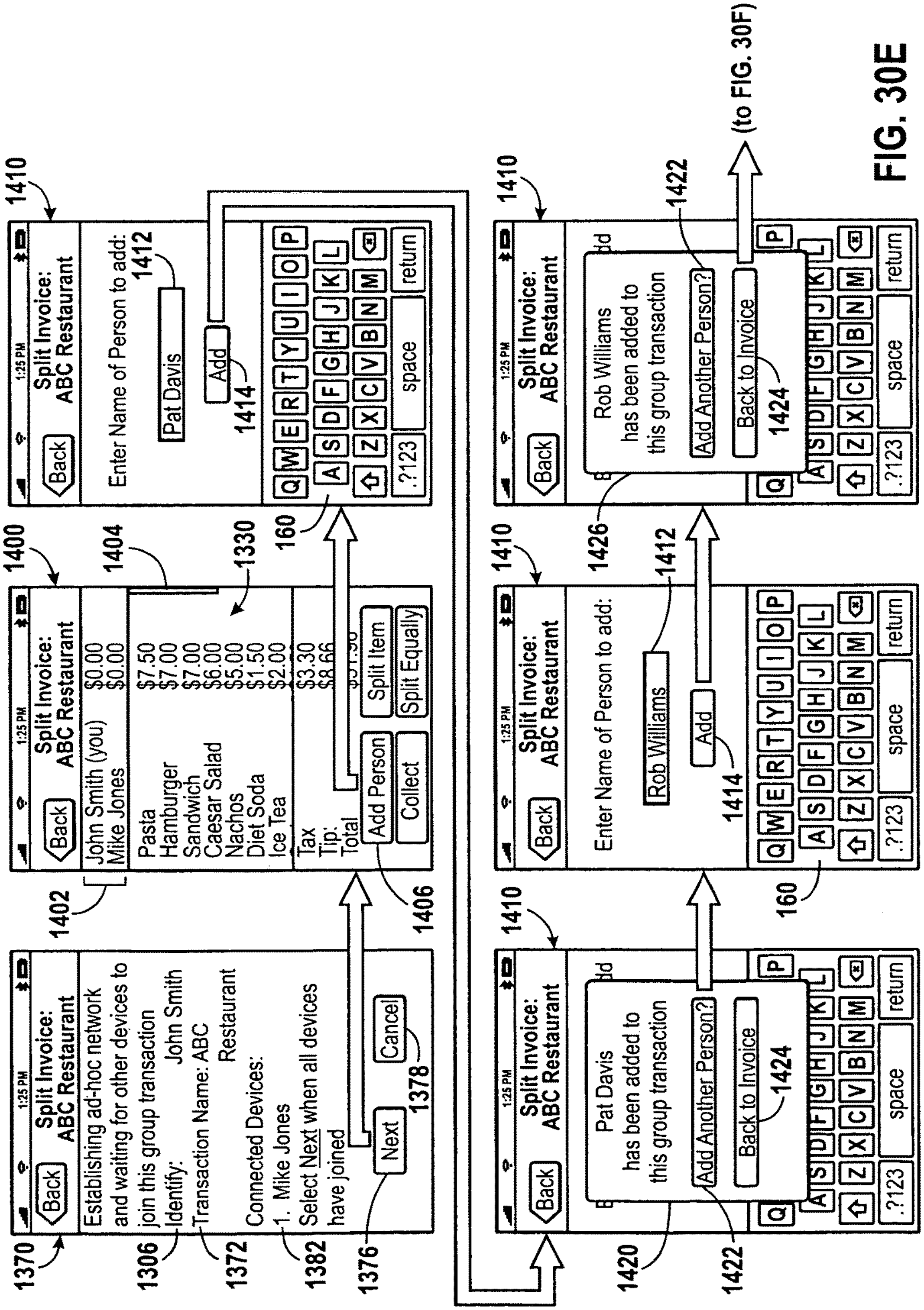
FIG. 30E shows a plurality of screens that may be displayed on an initiator device illustrating a technique for adding additional transaction members to the group transaction depicted in FIG. 28.

As illustrated in the screen 1400, a listing of the group transaction members may be displayed. As shown here, the listing 1402 may initially only include the initiator and the NFC payor, who is presently connected to the initiator device 10 by way of the ad-hoc network 1194. The screen 1400 may also display a listing of the group invoice items 1330. As discussed above, a scroll bar function, represented by the graphic 1404, may be provided on the screen 1400 if the listing of the group invoice items 1330 may not be displayed in its entirety due to screen size limitations. Next, in order to add the remaining transaction members to the present group transaction, the initiator may select the graphical button 1406. Upon selection of the graphical button 1406, the initiator may be navigated to the screen 1410 which may display the text field 1412 and the graphical button 1414, as well as the text keyboard 160. Thus, the initiator, by way of the text keyboard 160, may enter the identity of the credit card payor into the text field 1412. Once the identity of the credit card payor has been entered, the initiator may add the credit card payor to the present transaction by selecting the graphical button 1414. As shown in FIG. 30E, the selection of the graphical button 1414 may cause a pop-up window 1420 to be displayed on the screen 1410. The pop-up window 1420 may notify the initiator that the credit card payor has been added to the present transaction and may further provide the initiator with the graphical buttons 1422 and 1424. For example, as illustrated here, the selection of the graphical button 1422 may close the pop-up window 1420 and allow the initiator to re-access the screen 1410 to add an additional member, such as the smart card payor. Thus, the initiator may repeat the steps discussed above and enter the identity of the smart card payor into the text field 1412. By selecting the graphical button 1414 again, the pop-up window 1426 may be displayed on the screen 1410 notifying the initiator that the smart card payor has also been added to the present transaction 1170. Accordingly, because all of the group transaction members illustrated in the secondary transaction 1174 of FIG. 28 have now been added, the initiator may return to the screen 1400 by selecting the graphical button 1424.

Figure 30F:
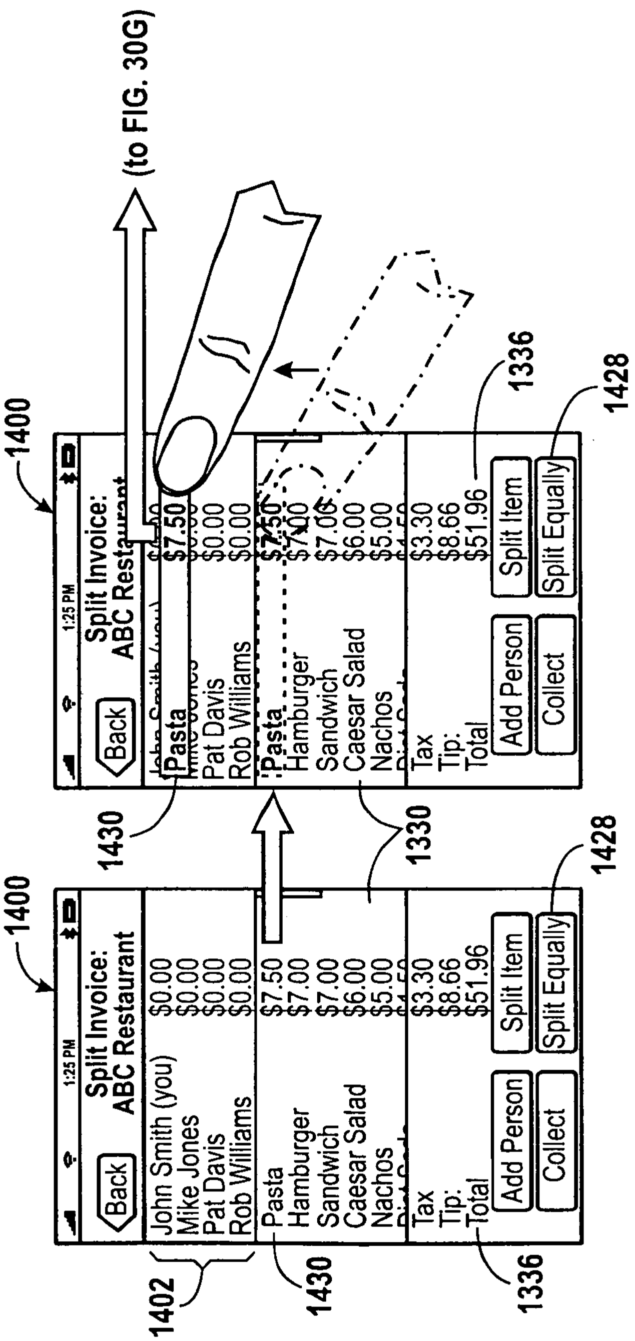
FIG. 30F shows a plurality of screens that may be displayed on an initiator device illustrating a technique for apportioning invoice items to a group transaction member.

Continuing now to FIG. 30F, the apportioning of one of the group invoice items 1330 by the initiator is illustrated. As shown in the present figure, the screen 1400 may display an updated listing of the transaction members 1402, which may include the credit card payor and the smart card payor added using the techniques described in FIG. 30E. Next, the initiator may apportion the group invoice item 1430 by selecting the location of the item 1430 on the screen 1400, such as by using a finger or other object, such as a stylus, and, while maintaining contact with the display 24 of the initiator device 10, move the selected invoice item 1430 to the location on the screen 1400 corresponding to the appropriate transaction member. As will be understood, this operation may commonly be referred to in the context of graphical user interfaces as a "drag and drop" operation. Additionally, as shown on the screen 1400, the initiator may select the graphical button 1428 if the initiator chooses to split the entire group invoice 1080 equally among the transaction members 1402. For example, the selection of the graphical button 1428 may divide the group invoice total 1336 equally among the initiator, the NFC payor, the credit card payor, and the smart card payor. Further, while the drag and drop illustration depicted in the present figure represents one implementation that may be provided on a device in accordance with the presently described techniques, it should be understood that any type of suitable interfacing technique for apportioning the group invoice items 1330 may be used in the present transaction.

Figure 30G:
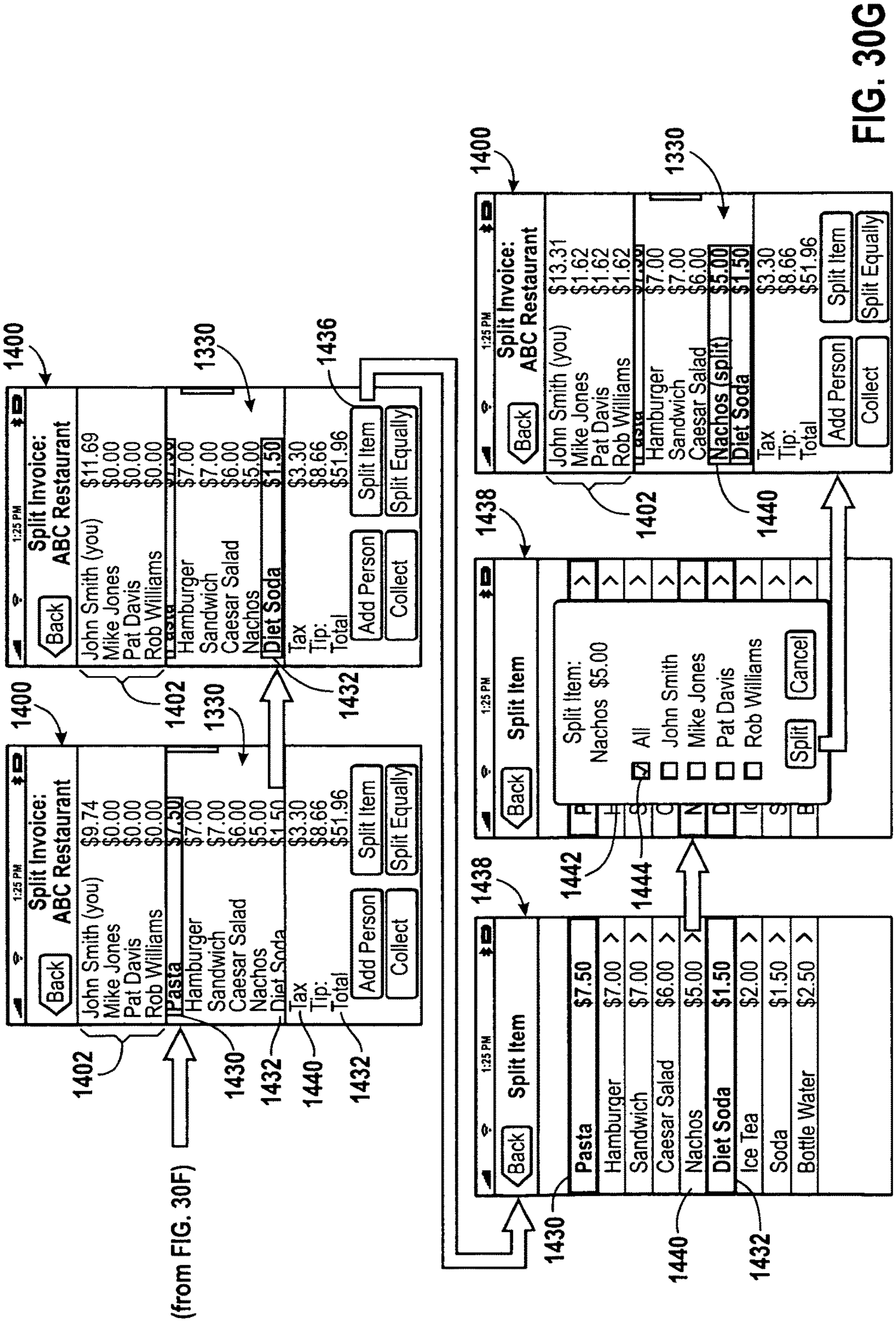
FIG. 30G shows a plurality of screens that may be displayed on an initiator device illustrating a technique for apportioning invoice items to two or more group transaction members.

Continuing to FIG. 30G, the screen 1400 may be updated to indicate that the invoice item 1430 has been apportioned to the initiator. As illustrated in the present figure, the apportioning of the group invoice items 1330 may also include the automatic apportioning of the tax and gratuity amount represented here by the reference numerals 1328 and 1334, respectively, based on the proportional amount of the cost of the apportioned invoice item 1430 compared to the total invoice amount 1336. It should be appreciated, however, that alternate techniques for apportioning the tax amount 1328 and the gratuity amount 1334, including alternate schemes for an automatically apportioning these amounts, as well as techniques for manual apportionment of these amounts by the initiator, are also within the scope of the present disclosure. Next, the initiator may continue to apportion the remaining group invoice items 1330. For example, FIG. 30G further illustrates the apportioning of the invoice item 1432 to the initiator on the listing 1402, as well as the subsequent automatic apportionment of any additional tax and gratuity amount in accordance with the techniques discussed above.

As will be appreciated by those skilled in the art, the need may arise to apportion a particular invoice item amongst two or more of the transaction members 1402. By way of example, a particular invoice item may have been shared by each of the transaction members 1402. Accordingly, a shared invoice item may be apportioned by selecting the graphical button 1436. The selection of the graphical button 1436 may navigate the initiator to the screen 1438. The screen 1438 may generally display a listing of the group invoice items 1330, and may also indicate which invoice items 1330 have already been apportioned, such as the invoice items 1430 and 1432. As will be appreciated, the already-apportioned invoice items 1430 and 1432 may not be selectable on the screen 1438. As illustrated in the present figure, the initiator may select a shared invoice item 1440 in order to apportion this item amongst multiple group transaction members. For example, upon selecting the invoice item 1440, the pop-up window 1442 may be displayed on the screen 1438.

The pop-up window 1442 may display a listing of the present group transaction members 1402. As shown here, a check box graphic may be provided with each group transaction member. Accordingly, the initiator may specify how the invoice item 1440 is to be apportioned by selecting the appropriate group transaction members using the check box graphics associated with each respective member. Additionally, as illustrated in the present figure, the initiator may apportion the shared invoice item 1440 equally amongst all the group transaction members 1402 by selecting the check box graphic represented here by the reference number 1444. Once the appropriate selection is made, the initiator may select the graphical button 1446 to apportion the shared invoice item 1440 in accordance with the selection reflected in the pop-up window 1442. Additionally, the initiator may cancel this apportionment process by selecting the graphical button 1448. Upon selection of the graphical button 1446, the invoice item 1440 may be apportioned equally amongst all of the group transaction members 1402 and the initiator may be returned to the screen 1400. As shown in the listing of the group invoice items 1330 on the updated screen 1400, the listing of the invoice item 1440 may be updated to indicate that that this item has already been apportioned, as discussed above.

Figure 30H:
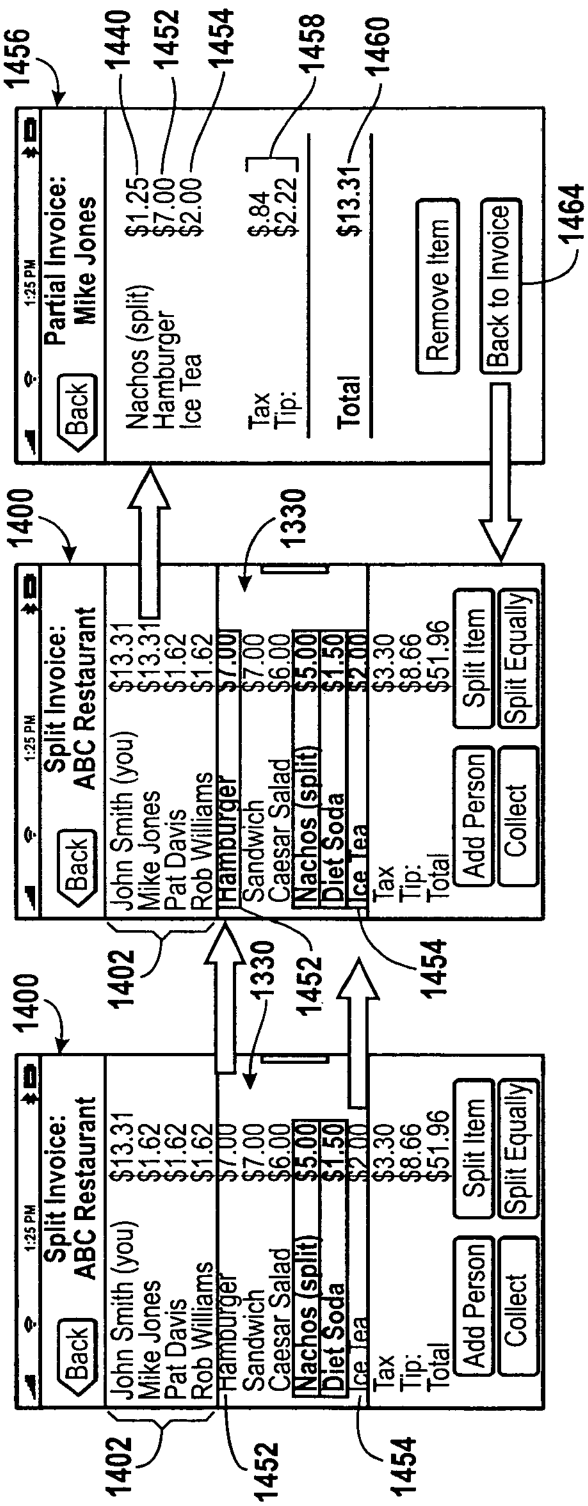
FIG. 30H shows a plurality of screens that may be displayed on an initiator device illustrating a method for viewing a partial invoice in accordance with one embodiment.
Figure 30I:
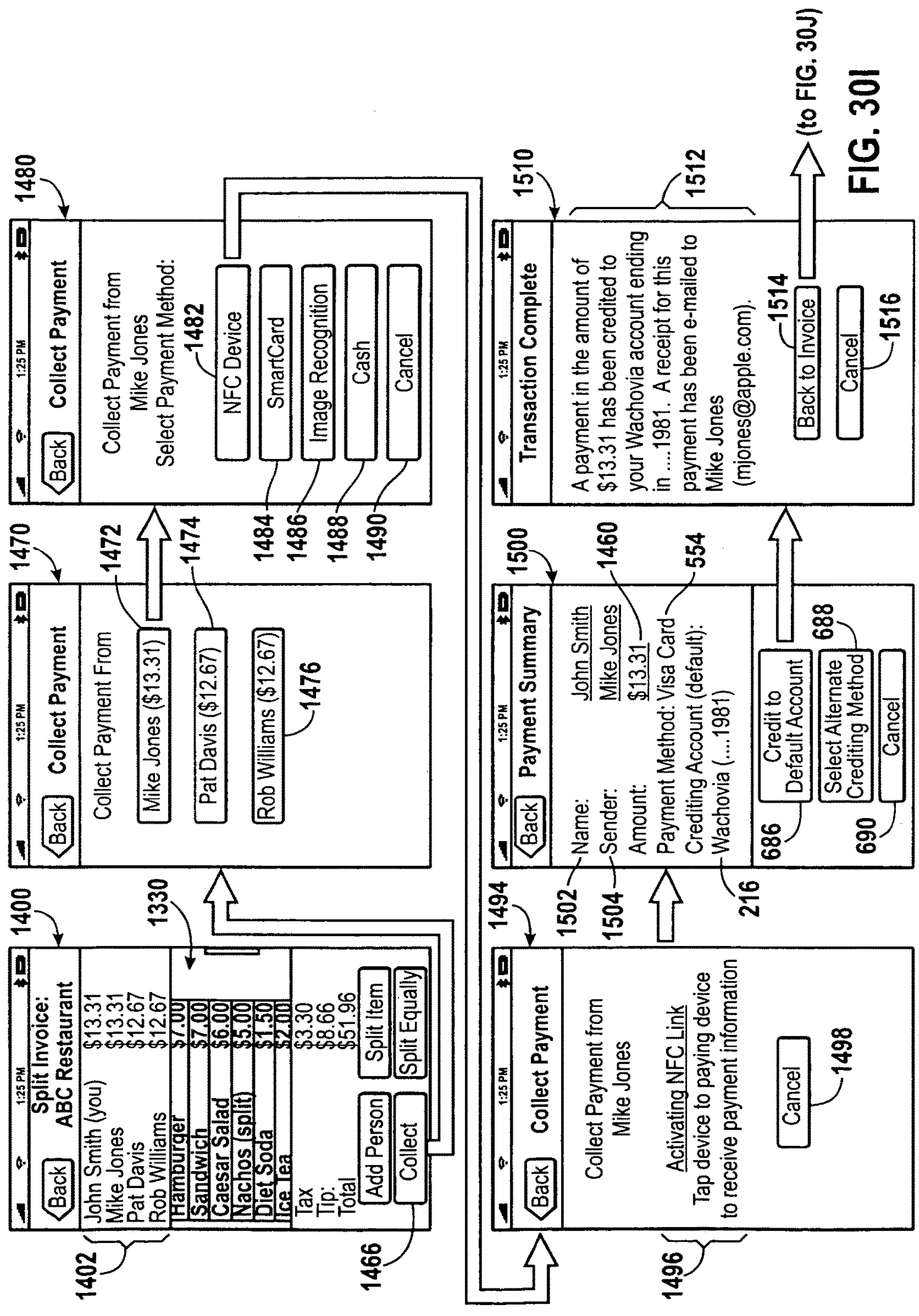
FIGS. 30I-30L show a plurality of screens that may be displayed on an initiator device illustrating methods for collecting payments from each of the group transaction members in accordance with one embodiment.

Continuing now to FIG. 30H, after apportioning the shared invoice item 1440, the initiator may continue to apportion additional invoice items. For example, FIG. 30H illustrates the apportionment of the invoice items 1452 and 1454 that may correspond to amounts owed by the NFC payor. As illustrated in the present figure, once the invoice items 1452 and 1454 are properly apportioned, their respective listings may be updated on the screen 1400, as discussed above. As will be appreciated, during the apportioning of the invoice items 1330, the initiator may select one or more of the group transaction members displayed in the listing 1402 to view the current status of a partial invoice. For example, by selecting the NFC payor, the initiator may view the screen 1456, which may display a partial invoice corresponding to the amount owed by the NFC payor. As shown here, the screen 1456 may display the NFC payor's portion of the shared invoice item 1440, as well as the additional invoice items 1452 and 1454. Further, as discussed above, based on the total cost of the apportioned invoice items, any applicable tax and gratuity amount may be automatically computed, as indicated here by the reference numeral 1458. Thus, by summing the above items, tax, and gratuity amounts, a total amount for the partial invoice, referred to here by the reference numeral 1460, may be displayed. Additionally, the screen 1456 may also provide the graphical button 1462 by which the initiator may remove apportioned items from the present group transaction member, such as items that may have been erroneously apportioned. To continue with the apportioning of the remaining group invoice items 1130, the initiator may select the graphical button 1464 to return to the screen 1400.

Once all of the group invoice items 1330 have been properly apportioned, as depicted in the updated screen 1400, the initiator may begin the process of collecting payments from each of the group transaction members, as discussed above with reference to the steps 1234-1240 in the method 1220 of FIG. 29, by selecting the graphical button 1466. As illustrated in the present figure, the selection of the graphical button 1466 may display the screen 1470 on the initiator device. The screen 1400 may display graphical buttons, such as the graphical buttons 1472, 1474, and 1476, each of which may correspond to a respective one of the group transaction members 1402. For instance, the graphical button 1472 may correspond to the NFC payor, the graphical button 1474 may correspond to the credit card payor, and the graphical button 1476 may correspond to the smart card payor, as discussed above. As will be understood, the screen 1470 may not include a graphical button corresponding to the initiator, because in paying the group invoice 1180 in the primary transaction. 1172, the initiator has already satisfied the initiator's respective portion of the group invoice 1080.

The collection of payments from each of the remaining group transaction members depicted by the graphical buttons 1472, 1474, and 1476, may be carried out in accordance with one or more of the transaction techniques discussed above. For example, by selecting the graphical button 1472, the initiator may be advanced to the screen 1480, which may display a plurality of graphical buttons 1482, 1484, 1486, and 1488. Each of these graphical buttons may represent different methods in which a payment may be obtained from the corresponding from the group transaction member. For instance, the graphical button 1482 may represent the techniques depicted by the transactions 375, 376 or 378 in FIGS. 12A, 12B, and 12C, respectively. Additionally, the graphical button 1484 may represent the transaction techniques described above with reference to the transaction 860 described in FIG. 20. Further, the graphical button 1486 may represent the function described in the transactions 952 and 970 and depicted in FIGS. 23 and 24, respectively. As shown here, the initiator may also have the option of receiving a cash payment form the corresponding group transaction member by selecting the graphical button 1488. Although not explained in detail here, the selection of the graphical button 1488 may simply display a confirmation screen by which the initiator may confirm receipt of the payment once a cash payment corresponding to the partial invoice amount has been transferred from the group transaction member to the initiator. Lastly, the graphical button 1490 may allow the initiator to cancel the present transaction or to return to the screen 1470, if necessary.

As discussed above, the NFC payor may be in possession of the NFC payor device 92. Accordingly, the initiator may choose to acquire a payment from the NFC payor by selecting the graphical button 1482 to initiate a payment by establishing an NFC connection (e.g., 1196) between the NFC interfaces 60 of each respective device 10 and 92 in order to exchange information pertaining to the partial invoice and a corresponding payment account that may be selected by the NFC payor. For instance, as illustrated in the present figure, the selection of the graphical button 1482 may display the screen 1494 on the initiator device 10. The screen 1494 may display the notification message 1496, which may generally inform the initiator that the NFC connection 1194 is being established and that a tap operation to the NFC payor device 92 may be required. The screen 1494 may also include the graphical button 1498, thus allowing the initiator to cancel the establishment of the NFC connection 1196 if necessary.

Once the partial invoice 1198 and the payment information 1200 have been exchanged between the initiator device 10 and the payor device 92, as depicted in FIG. 28, the screen 1500 may be displayed on the initiator device. The screen 1500 may display the identity of the initiator 1502, the identity of the NFC payor 1504, as well as the payment amount, which may correspond to the partial invoice amount 1460 depicted on the screen 1456 in FIG. 30H. The screen 1500 may also display the payment account selected by the NFC payor in accordance with the techniques discussed above, which may be the NFC payor's default payment account 554, as illustrated in FIG. 14E. The screen 1500 may also display the presently selected crediting account, which may be the default crediting account 216. Thus, as discussed above, in order to accept the payment amount 1460 being offered by the NFC payor, the initiator may select the graphical button 686 to credit the requested payment to the default crediting account 216. Thereafter, if the transaction is successfully completed, the screen 1510 may be displayed on the initiator device. The screen 1510 may include the notification message 1512 which may generally indicate to the initiator that the amount 1460 owed by the NFC payor has been credited to the initiator's crediting account 216. Additionally, the notification message 1512 may also indicate that an acknowledgment or receipt has been provided to the NFC payor. Thereafter, the initiator may return to the screen 1400 by selecting the graphical button 1514 to collect the remaining payments from the smart card payor and the credit card payor, or cancel or end the transaction by selecting the graphical button 1516.

Figure 30J:
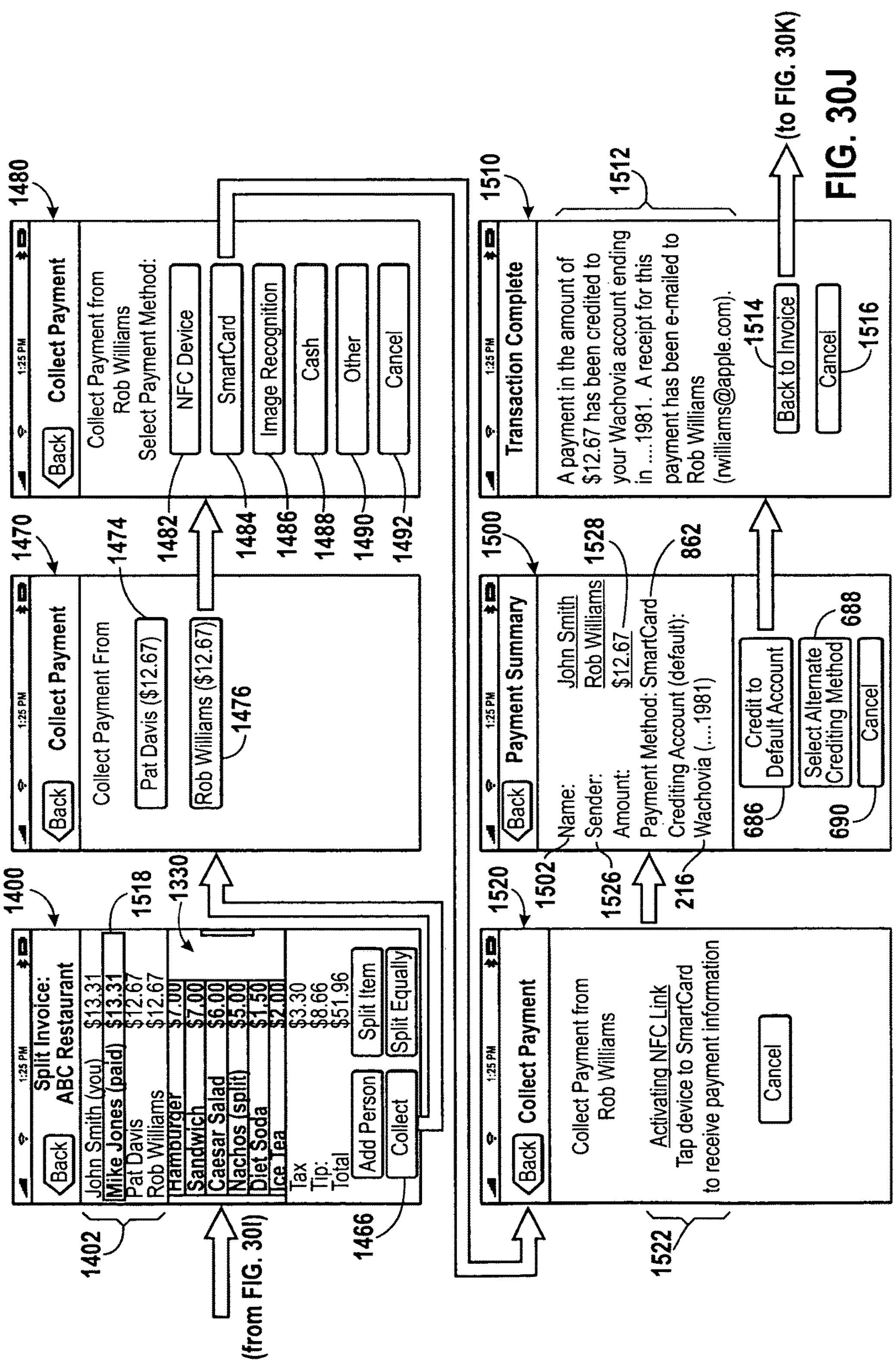

Continuing now to FIG. 30J, once the payment has been received by the NFC payor, the listing 1402 on the screen 1400 may be updated, as indicated by the reference number 1518, to indicate that a transaction between the initiator and the NFC payor has been completed. Next, the initiator may continue to collect the remaining outstanding partial invoices from the credit card payor and the smart card payor by selecting the graphical button 1466 again. Upon selection of the graphical button 1466 in FIG. 30J, the initiator may be navigated to the screen 1470. As illustrated in the present figure, the screen 1470 may be updated to reflect that the amount owed by the NFC payor has been received by the initiator. For instance, the presently illustrated screen 1470 may be updated wherein the previously displayed graphical button 1472 is removed, and only the remaining graphical buttons 1474 and 1476 are displayed, each of which may represent the outstanding payments owed by the credit card payor and the smart card payor.

Here, by selecting the graphical button 1476, the initiator may return to the screen 1480, as discussed above in FIG. 30I, by which the initiator may select an appropriate method for receiving a payment from the smart card payor. For example, in the present figure, the initiator may select the graphical button 1484 to initiate the receipt of a payment using the techniques discussed above with reference to FIG. 20. For example, upon selection of the graphical button 1484, the screen 1520 may be displayed on the device 10 and display the notification message 1522 indicating to the initiator that the NFC interface on the device 10 is presently active, and that an NFC connection 1196 may be initiated by tapping the smart card 862 and the initiator device 10, as illustrated in FIG. 28. Next, once the information stored on the storage chip 864 of the smart card 862 has been received by the initiator device, such as by way of the NFC connection 1196, the screen 1500 may be displayed. As discussed above, the screen 1500 may display the identity of the initiator, as well as the identity of the smart card payor, referred to here by the reference number 1526. The screen 1500 may also display a payment amount 1528 that may correspond to the partial invoice owed by the credit card payor. Thus, the initiator may select the graphical button 686 to initiate the transaction authorization actions discussed above, such as transmitting the present information to the financial servers 100, in order to credit the payment amount 1528 to the crediting account 216. As shown in the screen 1510, the notification message 1512 may be displayed if the present transaction is successfully processed, and the smart card 862 is charged for the amount 1528. Thereafter, in order to complete the group transaction, the initiator may then select the graphical button 1514 to return to the screen 1400 and to collect the final outstanding payment from the credit card payor.

Figure 30K:
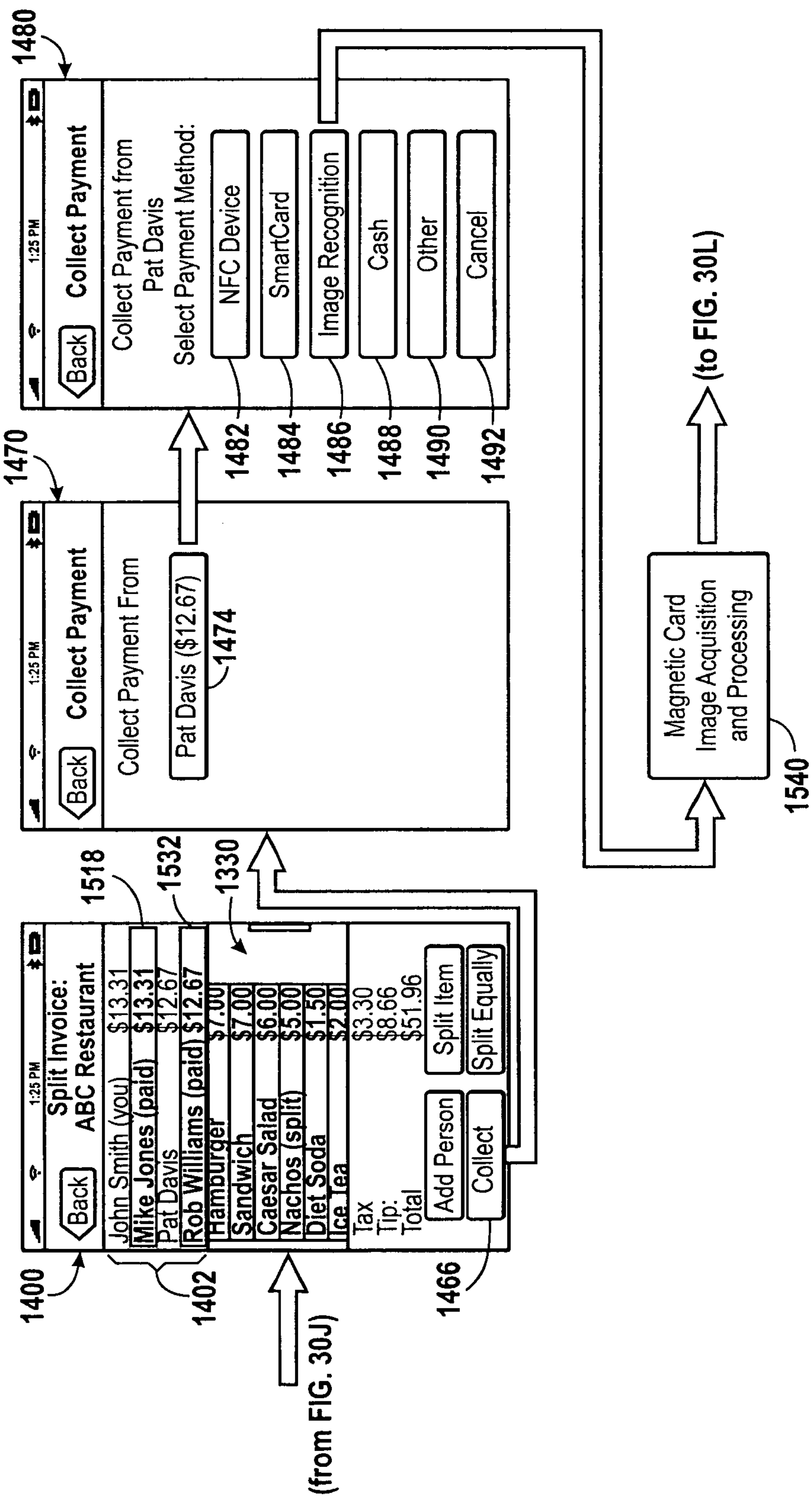

Continuing now to FIG. 30K, upon selection of the graphical button 1514, the screen 1400 may be updated and displayed on the initiator device 10. As shown in the present figure, the listing 1402 on the updated screen 1400 may indicate that the partial invoice owed by the smart card payor has been received by the initiator, as referred to here by the reference numeral 1532. Accordingly, to collect the remaining payment owed by the credit card payor, the initiator may select the graphical button 1466 to access the updated screen 1470. As shown here, the updated screen 1470 may now only display the graphical button 1474, which reflects the only remaining payment owed to the initiator. By selecting the graphical button 1474, the initiator may proceed to the screen 1480, and select the graphical button 1486 in order to obtain a payment from the credit card payor's magnetic credit card 954 using the image processing and information extraction techniques referred to here by the reference number 1540 and generally described above with reference to the transactions 952 and 970, as depicted by FIGS. 23 and 24, respectively. For example, the initiator device 10 may acquire an image 1212 of the magnetic credit card 954 using the camera 48 discussed above. Once the image 1212 has been acquired by the initiator device 10, one or more image processing techniques, such as the OCR techniques mentioned above, may be utilized to extract information from the image 1212 corresponding to the credit card account represented by the credit card 954.

Figure 30L:
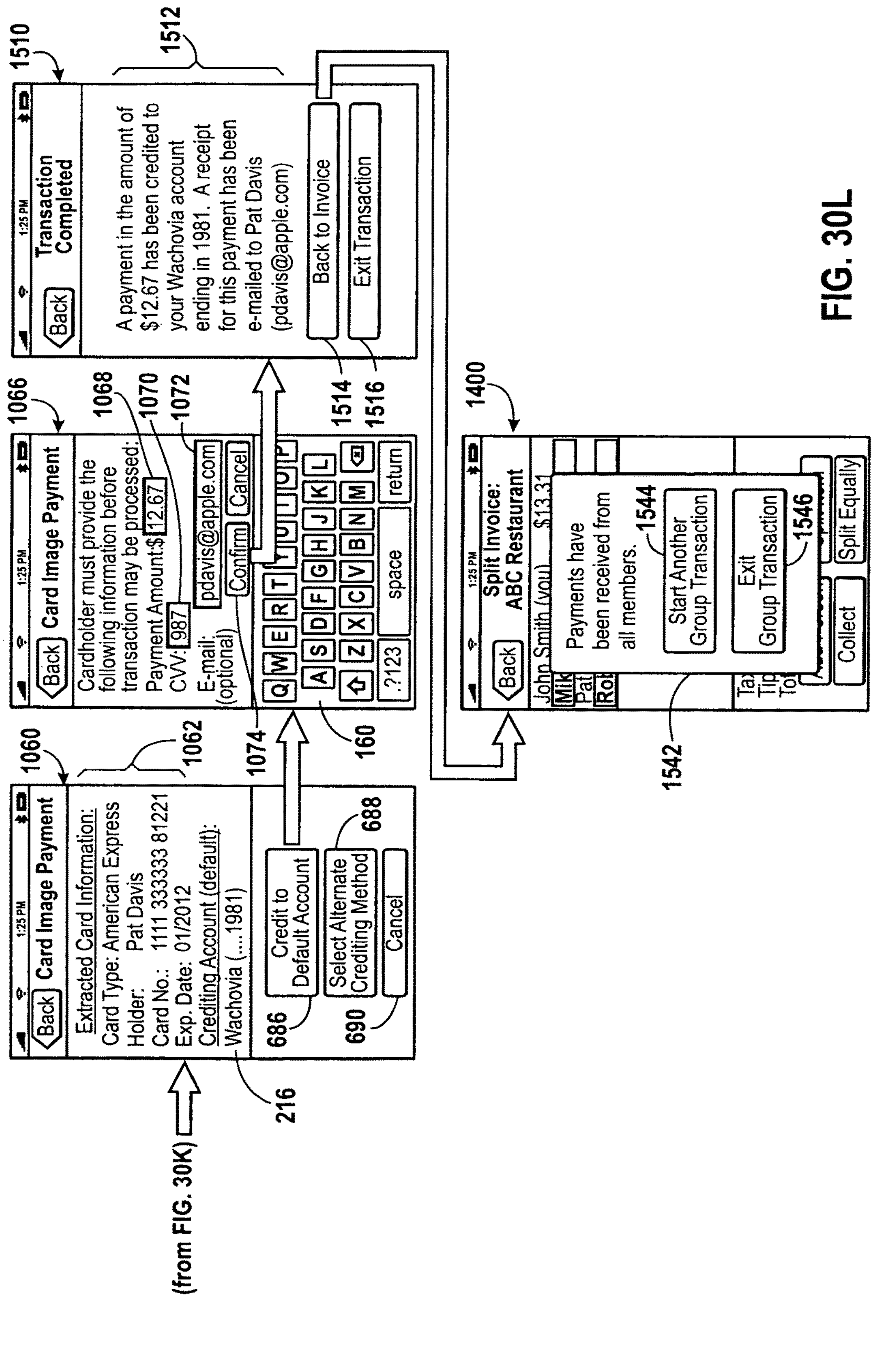

Continuing to FIG. 30L, once the required credit card information has been extracted from the image 1212, the screen 1060 discussed above with reference to FIG. 26D may be displayed. Though not illustrated here, it should be understood that the various techniques discussed above for editing the extracted card information for any inaccuracies that may have occurred during the image processing and extraction steps 1540 may also be provided. In order to credit the partial invoice owed by the credit card payor to the crediting account 216, the initiator may select the graphical button 686. The selection of the graphical button 686 may navigate the initiator to the screen 1066 which, as discussed above, may represent one or more additional authorization actions that must be performed by the credit card payor before the transaction may be processed. For example, the screen 1066 may require that the credit card payor enter the invoice amount in the text field 1068, as well as provide a CVV code corresponding to the credit card 954 in the text field 1070. Additionally, the credit card payor may have the option of providing an e-mail address in the text field 1072, which may be used to transmit a payment receipt to the credit card payor once the transaction has been completed.

Once the information required by the field is displayed on screen 1066 has been provided by the credit card payor, the remaining transaction may be processed by selecting the graphical button 1074. If the transaction is successfully processed, the screen 1510 may be displayed on the initiator device 10, including the notification message 1512 indicating to the initiator that the final payment owed by the credit card payor has been received and credited to the crediting account 216. The initiator may then exit the transaction by selecting the graphical button 1516. Alternatively, if the initiator chooses to return to the invoice screen 1400, the pop-up window 1542 may be displayed, as illustrated in the present figure. The pop-up window 1542 may indicate to the initiator that all outstanding payments have been received from the group transaction members. The pop-up window may also include the graphical button 1544 by which the user may select to initiate a subsequent group transaction and the graphical button 1546 by which the initiator may accept to exit the completed group transaction, and thus return to the home screen 29 of the device 10, for example.

While the determination of each partial invoice in the above-described group transaction is provided by way of the apportioning of specific group invoice items, as illustrated in FIGS. 30F-30H, it should be understood that this technique is merely intended to provide an example of one possible implementation. Indeed, in additional implementations, the transaction application 34 executed on the devices 10 or 92 may allow the initiator or the group transaction members themselves to specify a partial payment amount to satisfy their respective portions of the group invoice.

Figure 31:
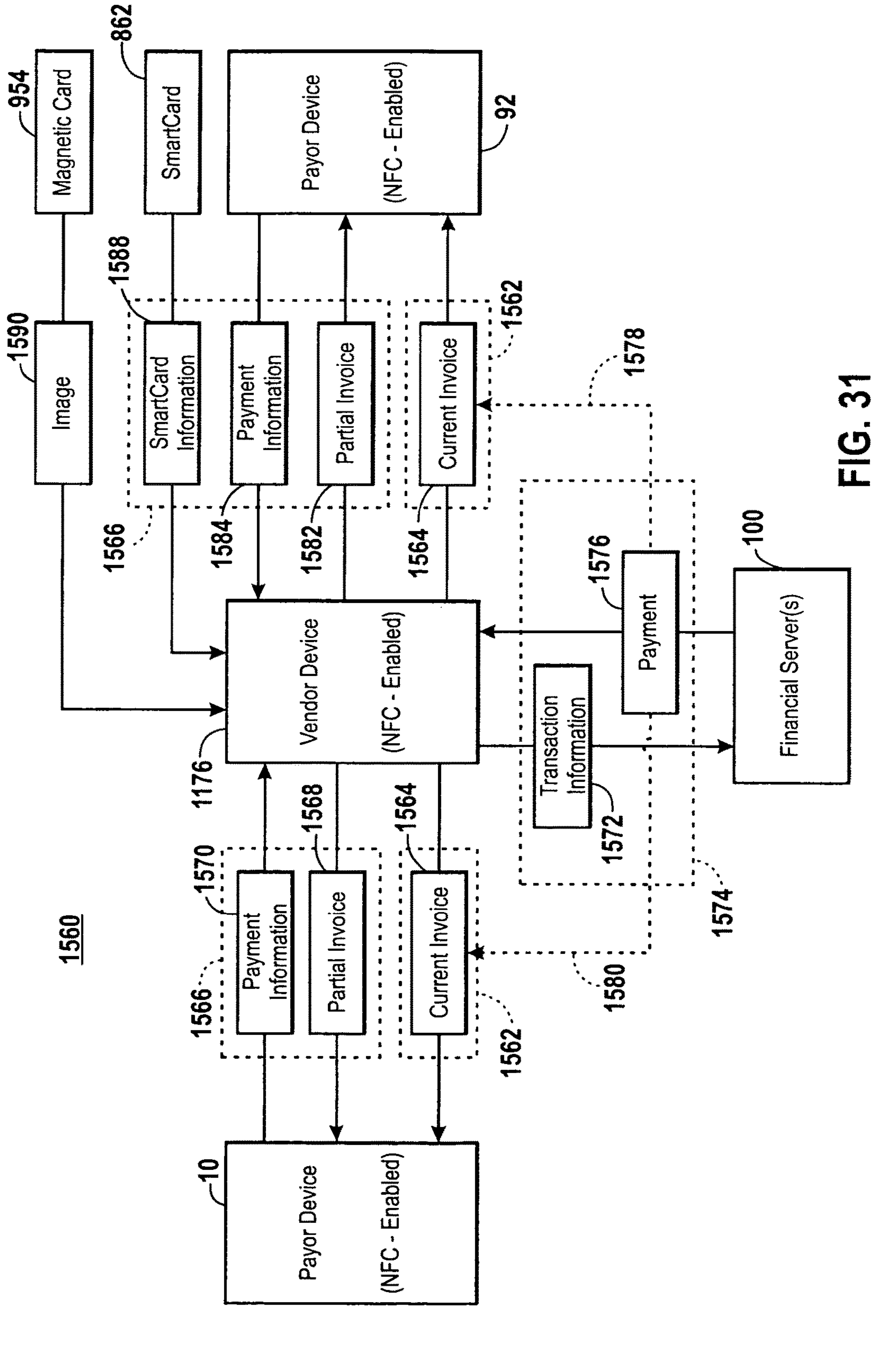
FIG. 31 is a schematic representation of a system adapted to carry out a transaction including multiple payors in accordance one embodiment.

Continuing now to FIG. 31, an alternate implementation of a system configured to conduct the group transaction discussed above with reference to FIG. 28, is illustrated and generally designated here by the reference number 1560. The illustrated transaction 1560 may differ from the transaction 1170 discussed above in that the vendor device 1176 may act as the initiating device for the presently illustrated transaction. Additionally, the device 10 in the present transaction 1560 may act as a payor making a payment with regard to a partial invoice to the vendor. As will be appreciated, the presently illustrated transaction may not include the primary transaction step 1172 and the secondary transaction step 1174 discussed in FIG. 28, but rather may be completed in a single group of transactions in which a payment is received from each of the credit card payor, the smart card payor, the NFC payor associated with the NFC payor device 92, as well as the NFC payor associated with the NFC payor device 10. For the purposes of differentiating between the users of the device 10 and the device 92, the respective users of these devices shall be referred to as the first NFC payor (corresponding to the NFC payor device 10) and the second NFC payor (corresponding to the NFC payor device 92). As discussed above, the vendor device 1176 may establish an ad-hoc network by which all capable devices participating in the present transaction 1560 may join. For example, as illustrated here, the device 10 and the device 92 may join the ad-hoc network 1562 to receive the current invoice 1564, which may reflect a group invoice collectively representing a total amount owed by each of the presently illustrated transaction members. Also, as discussed above, the first and second NFC payors may view the current invoice 1564, which may be updated in real time during the course of the transaction 1560, such as to reflect the apportioning of invoice items to corresponding transaction members, as well as to reflect the receipt of payments by the vendor from the group transaction members.

Once all the invoice items have been properly apportioned on the vendor device, partial invoices may be communicated to each of the payors participating in the transaction 1560. For example, a partial invoice corresponding to the amount owed by the first NFC payor, represented here by the reference number 1568, may be transmitted from the vendor device 1176 to the NFC payor device 10 by way of an established NFC connection 1566. As discussed above, the establishment of the NFC connection 1566 may require a tap operation between each of the payor device 10 and the vendor device 176. Upon receiving the partial invoice 1568, the first NFC payor may select a payment account on the device 10, and transmit the payment account information, represented here by reference number 1570, to the vendor device 1176 by way of the NFC connection 166. As discussed above, the vendor device 1176 may then transmit the transaction information 1572, which may also include a selected crediting account, to the financial servers 100 by way of the network 1574, which may be provided by any of the suitable networks discussed above. If the requested transaction 1572 is authorized by the financial servers, a payment, represented by the reference number 1576, may be credited to the vendor's selected crediting account. Additionally, any payments received by the vendor device during the course of the present transaction 1560, may be indicated on the current invoice 1564 being viewed by the first and second NFC payors by way of the ad-hoc network 1562. As will be understood, the current invoice 1562 may be updated to reflect outstanding payments that have already been received.

Next, the vendor device may further transmit the partial invoice 1582 corresponding to the second NFC payor. For example, as illustrated in the present figure, the partial invoice 1582 may be transmitted to the payor device 92 by way of the NFC connection 166. Thus, as discussed above, the second NFC payor may select a payment account, represented by the reference number 1584, and transmit the corresponding information with regard to the selected payment account to the vendor device, which may then further transmit the information 1572 to the financial servers for authorization and processing. Additionally, the vendor device may also receive payment information from the smart card 862, by way of the NFC network 1566. For example, as discussed above, using an NFC tap operation, information stored on a storage chip contained within the smart card 862, represented here by the reference number 1588, may be transmitted to the vendor device 1176.

The vendor device 1176 may also include a camera, such as the camera 48 discussed above, that may be used to obtain an image of the magnetic credit card 954. Once obtained, the image, referred to here by the reference number 1590, may be processed using one or more of the techniques discussed above for extracting account information corresponding to the credit card 954. As will be understood, the payment information received from each of the payors participating in the group transaction 1560 may be transmitted to the financial servers 100 for processing. Thus, if the requested payments are authorized by the financial servers, a corresponding payment, represented here by the reference number 1576, will be applied to the vendor's selected crediting account, as discussed above.

Figure 32A:
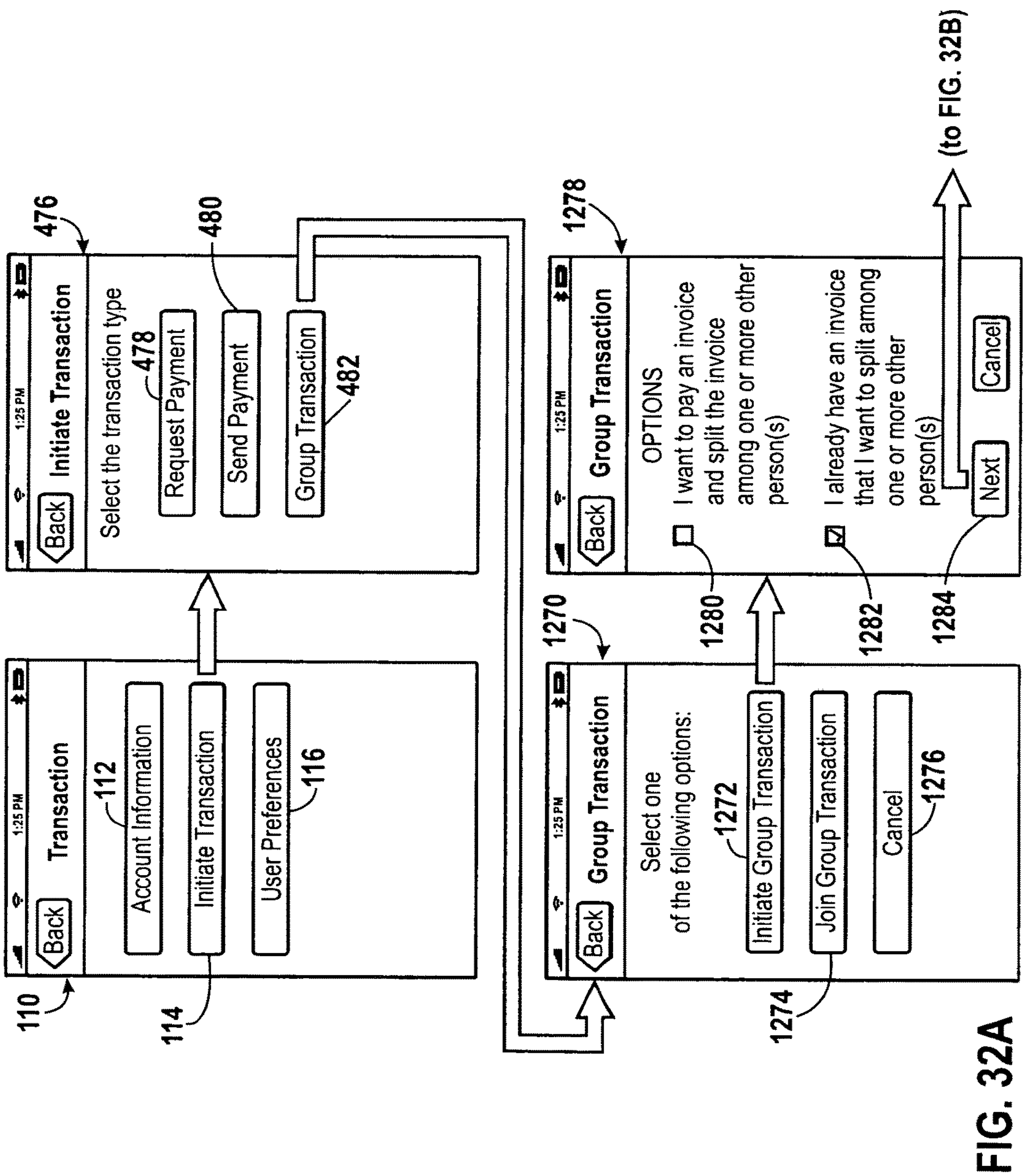
FIGS. 32A and 32B show a plurality of screens that may be displayed on a vendor device illustrating a methods for initiating the group transaction of FIG. 31.
Figure 32B:
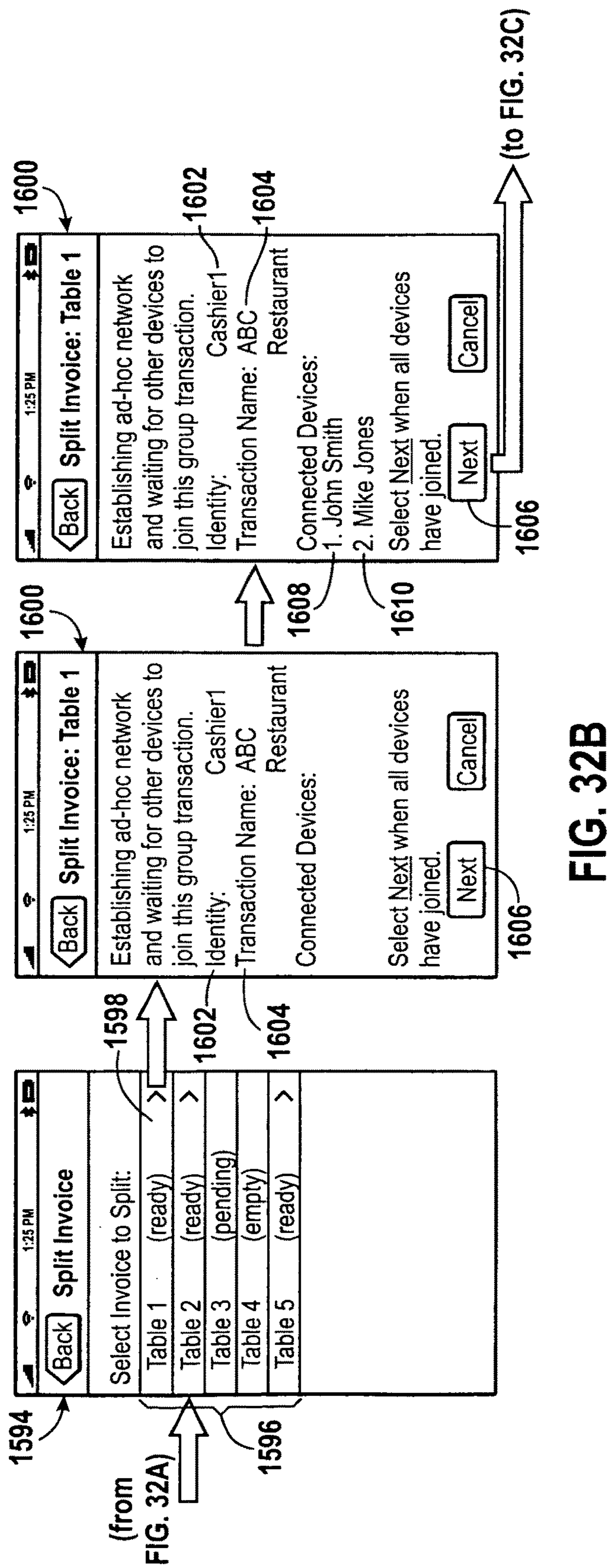
Figure 32C:
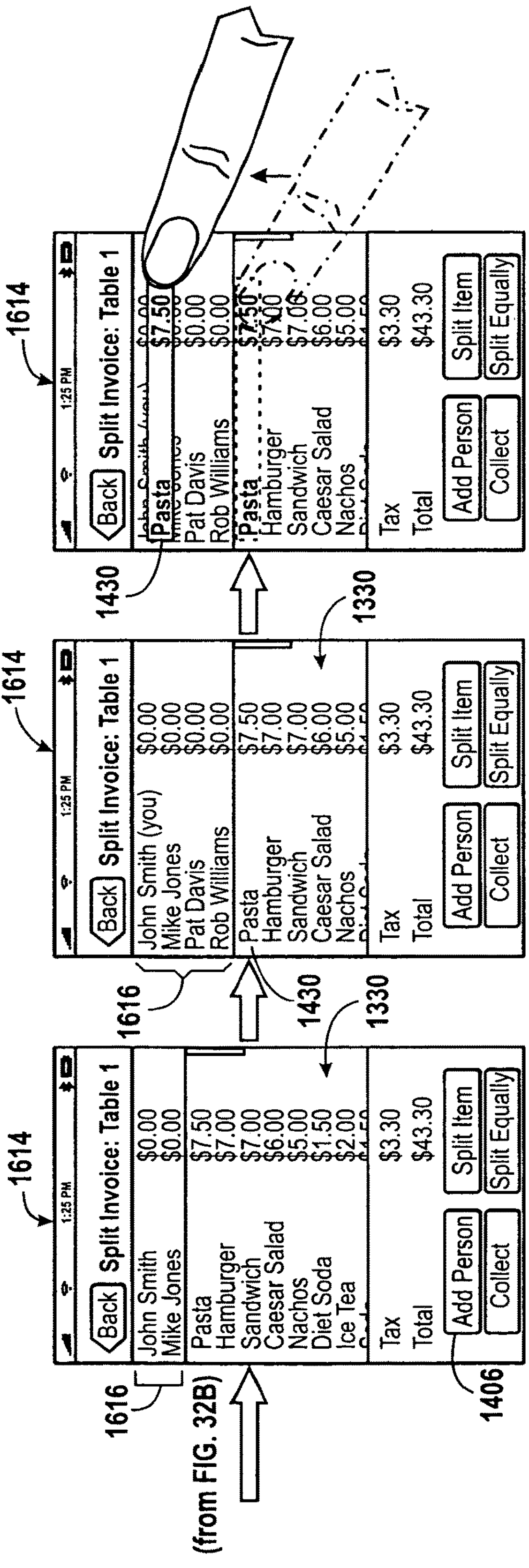
FIG. 32C shows a plurality of screens that may be displayed on an vendor device illustrating a technique for apportioning invoice items to a group transaction member.

Referring now to FIGS. 32A-32D, a series of screen images depicting the operation of the vendor device 1176 in carrying out the transaction 1560 is illustrated in accordance with a further implementation of the presently described techniques. It should be understood that the vendor device 1176 may include a transaction application similar to the transaction application 34 discussed above with reference to the electronic device 10. For example, as shown in FIG. 32A, the screen 110 may be displayed on the vendor device 1176. By selecting the graphical button 114, the vendor may navigate to the screen 476, and further select the graphical button 482 to access the graphical buttons 1272, 1274, and 1276 on the screen 1270. Here, the vendor may initiate the group transaction 1560 by selecting the graphical button 1272, thus advancing to the screen 1278.

As discussed above, the screen 1278 may display several options for performing a group transaction. Here, instead of selecting the graphical button 1280, as discussed above with reference to the transaction 1170 of FIG. 28, the option represented by the check box 1282 may be selected instead. Once selected, the vendor may further select the graphical button 1284 to proceed with the present transaction 1560. For instance, the selection of the graphical button 1284 may navigate the vendor to the screen 1594 depicted in FIG. 32B.

As discussed above, the present transaction may occur in the context of a restaurant bill in which a listing of tables at the restaurant location, referred to here by the reference numeral 1596, is displayed. Each of the displayed tables may include an indicator with regard to the status of the members seated at each table. For instance, a table may be indicated as "ready," meaning that the customers have finished the meal and are ready to pay the bill. Additionally, empty tables may be designated as "empty," and tables in which the customers are still eating may be designated as "pending." For example, the table 1598 in the listing 1596 may indicate that the customers are ready to pay the invoice. As illustrated, by selecting the table 1594, the vendor may navigate to the screen 1600. The screen 1600 may be similar to the screen 1370 discussed above with reference to FIG. 30C, in that the presently illustrated screen may establish an ad-hoc network, by which other capable devices, such as the devices 10 and 92, may join. The screen 1600 may display the identity of the vendor 1602, as well as an identifier for the present transaction 1604. Once all capable devices, such as the devices 10 and 92, have joined the ad-hoc network 1194, as indicated here by the reference numbers 1608 and 1610, the vendor may select the graphical button 1606 to continue to the screen 1614 depicted in FIG. 32C.

As shown in the screen 1614, a listing of the transaction members 1616, which may initially include the first and second NFC payors, may be displayed. The screen 1614 may also display a listing of the group invoice items 1330. By selecting the graphical button 1406, the vendor may perform the functions generally depicted by the screen images in FIG. 30E to add the credit card payor and the smart card payor to the present transaction, thus updating the listing of group transaction members 1616. Next, once all the group transaction members have been added to the present transaction, the vendor may proceed with the apportionment of the group invoice items to the corresponding transaction members. For instance, as discussed above, the various invoice items, such as the invoice item 1430, may be apportioned to the respective group transaction member using a drag/drop operation.

Figure 32D:
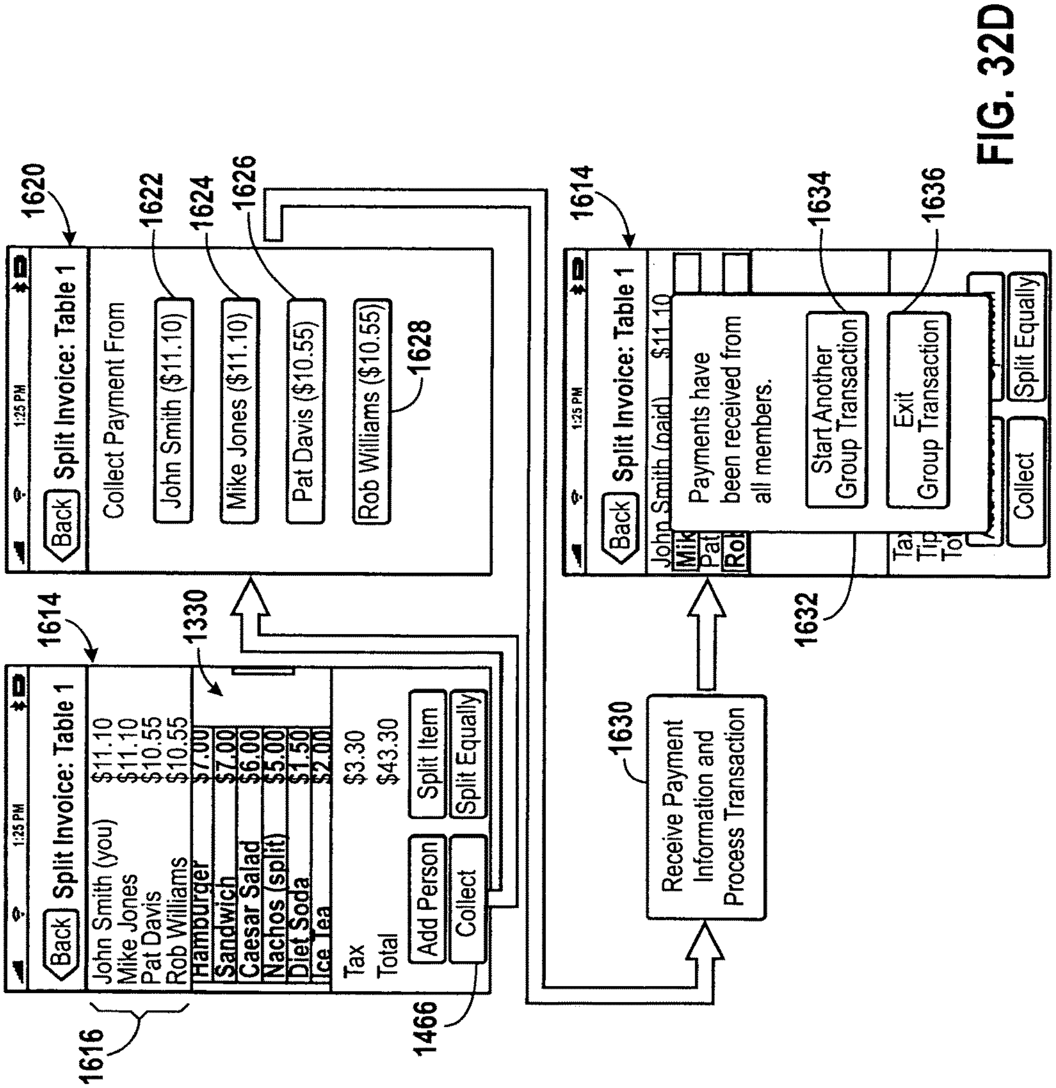
FIG. 32D show a plurality of screens that may be displayed on an vendor device illustrating methods for collecting payments from each of the group transaction members and completing the group transaction of FIG. 31.

Continuing now to FIG. 32D, the vendor may continue to apportion all the remaining group invoice items 1330, as illustrated in the updated screen 1614 of the present figure. Additionally, it should be noted that the amount owed by each of the group transaction members 1616 may be updated during the apportionment process. As discussed above, once the amounts of each partial invoice have been determined, the vendor may select the graphical button 1466 in order to proceed to the screen 1620, in which the vendor may initiate the process of collecting the corresponding payments from each of the group transaction members. For instance, the illustrated screen 1620 may display the graphical buttons 1622, 1624, 1626, and 1628. As discussed above, each of these graphical buttons may correspond to an amount owed by a respective one of the group transaction members 1616. Thus, in a manner similar to the steps depicted by the screens illustrated in FIGS. 30I-30K, the vendor may collect a payment from each of the group transaction members by selecting one of the graphical buttons 1622, 1624, 1626, and 1628.

Upon selection of one of the displayed graphical buttons 1622, 1624, 1626, and 1628, payment information may be received from the selected group transaction member. Thereafter, a corresponding technique for processing each transaction in accordance with the method by which the payment information is obtained may be carried out, as indicated by the reference number 1630. For example, as will be understood, the selection of the graphical button 1622 may initiate an NFC payment request, such as by way of the NFC connection 1566 depicted in FIG. 31, to the first NFC payor on the device 10. Accordingly, the first NFC payor may provide payment information, as represented by the reference number 1570 in FIG. 31, to the vendor device 1176 by way of the NFC connection 1566. As will be understood, the vendor may proceed to collect a payment from each of the group transaction members until all outstanding payments have been received. Additionally, though not illustrated in the present figure, it should be understood that each of group transaction members may have the option of specifying gratuity amounts, if necessary, prior to transmitting the payment information to the vendor device 1176.

Once all outstanding payments are received by the vendor, a popup window 1632 may be displayed on the screen 1614. As shown in FIG. 32D, the pop-up window may indicate to the vendor that all outstanding payments have been received from the group transaction members 1616. Additionally, the pop-up window 1632 may display the graphical button 1634 by which the vendor may initiate a subsequent group transaction, and the graphical button 1636 by which the vendor may select to exit the group transaction application. Although the present group transaction techniques have been described in the embodiments illustrated in FIG. 28 and FIG. 31 specifically in the context of apportioning a restaurant bill, it should be understood that the present techniques may be applicable to any group transaction settings in which multiple payors are included.

As shown in the presently illustrated figures, the various functionalities discussed herein may be provided by way of the transaction application (e.g., represented by the icon 34) stored on a device incorporating one or more aspects of the present disclosure. Indeed, the transaction application may include encoded instructions stored on one or more machine readable media, such as the storage device 54, and configured to be executed by the processor 50 to provide for one or more of the functionalities of the device 10 discussed above. Additionally, it should be appreciated that the transaction application may also include encoded instructions defining the various graphical screen images and user interface functions discussed throughout the present disclosure. However, it should also be understood that the functionalities set forth and described in the above figures may be achieved using a wide variety graphical elements and visual schemes, and that the present disclosure is not intended to be limited to the precise user interface conventions depicted above.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

What is claimed is:

1. A method for receiving a payment in a peer-to-peer transaction between a payee and a payor comprising:

determining, using a processor of a payee handheld electronic device, an amount of a payment to be requested from the payor in response to a first input provided by the payee to a peer-to-peer transaction application executed on the payee handheld electronic device by the processor;

using the processor of the payee handheld device to cause an electronic payment request to be transmitted, via a near field communication-based wireless communication link between the payee handheld electronic device and the payor, from a communication interface of the payee handheld electronic device to the payor, wherein the electronic payment request is configured to indicate the requested payment amount to the payor;

acquiring, via the near field communication-based wireless communication link, payment information provided by the payor, the payment information comprising a default payment account selected by the payor in response to the electronic payment request, and wherein acquiring the payment information comprises acquiring an image of a payment instrument and extracting payment information data from the acquired image;

determining, using the processor of the payee handheld electronic device, a default crediting account for receiving the payment; and transmitting, via a wireless communication link that is different from the near field communication-based wireless communication link, a request from the payee handheld electronic device to obtain authorization for the payment of the requested payment amount from the payor to the payee, wherein transmitting the request to obtain authorization for the payment, comprises transmitting the default payment account and the default crediting account from the payee handheld electronic device to at least one external server that is separate from both the payee handheld electronic device and the payor handheld electronic device, the at least one external server being further configured to determine whether the default payment account and the default crediting account are compatible;

receiving, from the external server, a notification indicating whether the default crediting account of the payee handheld electronic device and the default payment account of the payor handheld electronic device are compatible with one another;

in accordance with a determination, based on the notification, that the default payment account and the default crediting account are compatible with one another:

displaying an indication that the electronic payment request has been successfully completed; and in accordance with a determination, based on the notification, that the default payment account and the default crediting account are incompatible with one another:

displaying an indication that the electronic payment request has not been successfully completed; and while displaying the indication that the electronic payment request has not been successfully completed, receiving, using an interface element of the payee handheld electronic device, a selection of an alternative crediting account that is compatible with the default payment account, wherein the at least one external server is further configured to authorize the payment from the default payment account and to credit the payment to the alternative crediting account if the payment is authorized.

2. The method of claim 1, wherein acquiring the payment information using the payee handheld electronic device comprises receiving the payment information on the communication interface of the payee handheld electronic device, the communication interface of the payee handheld electronic device being configured to establish a communication path with another communication interface on a payor handheld electronic device.

3. The method of claim 2, wherein providing the electronic payment request to the payor comprises transmitting the electronic payment request from the payee handheld electronic device to the payor handheld electronic device using the communication path established by the communication interfaces.

4. The method of claim 3, wherein the communication interface comprises a near field communication (NFC) interface, wherein the communication path comprises an NFC path, and wherein the NFC path is established using an NFC tap operation performed between the payee handheld electronic device and the payor handheld electronic device.

5. The method of claim 4, wherein the NFC path is maintained between receiving, the notification that the default crediting account of the payee handheld electronic device and the default payment account of the payor handheld electronic device that are incompatible with one another and receiving a selection of an alternative crediting account that is compatible with the default payment account such that an additional NFC tap operation does not need to be performed between the payee handheld electronic device and the payor handheld electronic device.

6. The method of claim 3, wherein the payment information provided by the payor in response to the electronic payment request is transmitted from the payor handheld electronic device to the payee handheld electronic device using the communication path.

7. The method of claim 1, wherein the default payment account comprises a smart card, and wherein acquiring the payment information comprises using the payee handheld electronic device to receive payment information stored on the smart card.

8. The method of claim 1, wherein the payment instrument comprises a credit card, and wherein the extracted payment information data comprises at least one of a credit card account number, an expiration date, an identity of a credit card provider, or an identity of a credit card account holder, or any combination thereof.

9. The method of claim 1, wherein the payment instrument comprises a check, and wherein the extracted payment information data comprises at least one of a bank routing number, a bank account number, a payment amount, an identity of the bank account holder, or a check identifier number, or any combination thereof.

10. The method of claim 1, wherein the default payment account comprises a credit card account, and wherein the at least one external server includes a server associated with a credit card provider that maintains the credit card account, wherein the server is configured to authorize payments from the credit card account.

11. The method of claim 1, wherein the default payment account is a bank account, and wherein the at least one external server includes a server associated with a banking provider that maintains the bank account, wherein the server is configured to authorize payments from the bank account.

12. The method of claim 1, wherein the default payment account is a non-cash account.

13. The method of claim 12, wherein the non-cash account comprises an account associated with an online digital media provider, and wherein the at least one external server includes a server associated with the online digital media provider that maintains the noncash account, wherein the server is configured to authorize payments from the non-cash account.

14. A method for providing a payment in a peer-to-peer transaction between a payee and a payor comprising:

selecting, using a processor of the payor handheld electronic device, a payment account stored on the payor handheld electronic device;

using the processor of the payor handheld electronic device to cause a communication interface of the payor handheld electronic device to transmit, via a near field communication-based wireless communication link between the payor handheld electronic device and a separate payee handheld electronic device, payment information, the payment information including the payment account, to the separate payee handheld electronic device configured to transmit, via a wireless communication link that is different from the near field communication-based wireless communication link, the payment information to at least one external server configured to determine that the payment account is not compatible with a crediting account of the payee handheld device, wherein the payment information is at least partially acquired by acquiring an image of a payment instrument and extracting payment information data from the acquired image;

receiving, from the external server, a notification indicating whether the default crediting account of the payee handheld electronic device and the default payment account of the payor handheld electronic device are compatible with one another;

in accordance with a determination, based on the notification, that the default payment account and the default crediting account are compatible with one another:

displaying an indication that the electronic payment request has been successfully completed; and in accordance with a determination, based on the notification, that the default payment account and the default crediting account are incompatible with one another:

displaying an indication that the electronic payment request has not been successfully completed; and while displaying the indication that the electronic payment request has not been successfully completed, receiving, using an interface element of the payor handheld electronic device, a selection of an alternative payment account that is compatible with the default payment account, wherein the external server is further configured to authorize the payment from the payor to the payee using the alternative payment account, and wherein at least one external server is separate from the payor and payee handheld electronic devices.

15. The method of claim 14, wherein the selection of the payment account is performed by the processor of the payor handheld electronic device in response to an electronic payment request transmitted by the payee handheld electronic device to the payor handheld electronic device.

16. The method of claim 15, wherein the electronic payment request is received using the communication interface of the payor handheld electronic device, wherein the communication interface is configured to establish a communication path with another communication interface on the payee handheld electronic device.

17. The method of claim 14, comprising prompting the payor to input an authorization PIN to the payor handheld electronic device prior to transmitting the payment information to the payee handheld electronic device, wherein the payment information is transmitted to the payee handheld electronic device if the correct authorization PIN is provided by the payor.

18. The method of claim 14, wherein the communication interface comprises a near-field communication (NFC) interface, wherein the communication path comprises an NFC path, and wherein the NFC path is established using an NFC tap operation performed between the payor handheld electronic device and the payee handheld electronic device.

19. The method of claim 18, wherein the NFC path is maintained between receiving, the notification that the payment account of the payor handheld electronic device and the crediting account of the payee handheld electronic device that are incompatible with one another and receiving a selection of an alternative crediting account that is compatible with the default payment account such that an additional NFC tap operation does not need to be performed between the payee handheld electronic device and the payor handheld electronic device.

20. The method of claim 14, wherein the payor handheld device stores a plurality of payments accounts, and the payment account is selected based upon a previous configuration performed by the payor in a peer-to-peer transaction application stored on the payor handheld electronic device, wherein the previous configuration identifies a preferred default payment account from the plurality of payment accounts.

21. The method of claim 14, wherein receiving a selection of an alternative payment account comprises:

displaying a listing of the payment accounts stored on the payor handheld electronic device in response to a request by the payor;

receiving a selection input from the payor; and using the processor of the payor handheld electronic device to select the payment account from the listing based on the received selection input.

22. The method of claim 14, wherein the payment account comprises a credit card account, a bank account, or a non-cash account.

23. The method of claim 14, comprising applying encryption to the payment information prior to providing the payment information to the payee handheld electronic device.

24. A handheld electronic device comprising:

a processor;

communication circuitry;

one or more input structures; and a memory device communicatively coupled to the processor and configured to store a plurality of payment accounts and a transaction application executable by the processor, wherein, upon execution of the transaction application, the processor is configured to:

determine an amount of a payment to be requested by a payor in response to a first input provided by a payee operating the handheld electronic device, the first input being indicated by the one or more input structures;

cause an electronic payment request to be transmitted from the communication circuitry to another handheld electronic device operated by the payor, wherein the electronic payment request is transmitted via a near field communication-based wireless communication link between the handheld electronic device operated by the payee and the another handheld electronic device operated by the payor, and wherein the electronic payment request is configured to indicated the requested payment amount to the payor;

acquire, via the near field communication-based wireless communication link, payment information provided by the payor handheld electronic device using the communication circuitry, wherein the payment information comprises a default payment account selected by the payor, and wherein acquiring the payment information comprises acquiring an image of a payment instrument and extracting payment information data from the acquired image;

cause the communication circuitry to transmit, via a wireless communication link that is different from the near field communication-based wireless communication link, a request from the payee handheld electronic device to obtain authorization for the payment of the requested payment amount from the payor to the payee, wherein the transmission of the request to obtain authorization for the payment comprises transmitting the selected payment account and a default crediting account from the payee handheld electronic device to at least one external server that is separate from both the payee handheld electronic device and the payor handheld electronic device and configured to determine that the default payment account and the default crediting account are incompatible;

receive, from the external server, a notification indicating whether the default crediting account of the payee handheld electronic device and the default payment account of the payor handheld electronic device are compatible with one another;

in accordance with a determination, based on the notification, that the default payment account and the default crediting account are compatible with one another:

display an indication that the electronic payment request has been successfully completed; and in accordance with a determination, based on the notification, that the default payment account and the default crediting account are incompatible with one another:

display an indication that the electronic payment request has not been successfully completed; and while displaying the indication that the electronic payment request has not been successfully completed, receive, using an interface element of the payee handheld electronic device, a selection of an alternative crediting account that is compatible with the default payment account and authorize the payment from the default payment account and to credit the payment to the alternative crediting account if the payment is authorized.

25. The handheld electronic device of claim 24, wherein the communication circuitry comprises a first communication interface and a second communication interface.

26. The handheld electronic device of claim 25, wherein the electronic payment request is transmitted and the payment information from the payor handheld electronic device is received using the first communication interface of the communication circuitry, and wherein the request to obtain authorization for the payment of the requested payment amount is transmitted using the second communication interface of the communication circuitry.

27. The handheld electronic device of claim 25, wherein the first communication interface comprises a near-field communication (NFC) interface.

28. The handheld electronic device of claim 27, wherein the NFC path is maintained between receiving, the notification that the payment account of the payor handheld electronic device and the crediting account of the payee handheld electronic device that are incompatible with one another and receiving a selection of an alternative crediting account that is compatible with the default payment account such that an additional NFC tap operation does not need to be performed between the payee handheld electronic device and the payor handheld electronic device.

29. The handheld electronic device of claim 25, wherein the second communication interface comprises at least one of a local area network, a personal area network, or a cellular data network, or a combination thereof.

30. The handheld electronic device of claim 24, comprising a display, wherein the display is configured to display a listing of crediting accounts stored on the payee handheld electronic device for selection by the payee using the one or more input structures.

31. The handheld electronic device of claim 24, wherein the display comprises a touchscreen display, and wherein the one or more input structures comprises a touch-sensitive element of the touchscreen display.

32. The handheld electronic device of claim 24, wherein the processor is configured to encrypt the payment account and the default crediting account prior when transmitting the request to the at least one external server.

33. The handheld electronic device of claim 24, wherein the handheld electronic device comprises at least one of a cellular telephone, a digital media player, a personal digital assistant, or any combination thereof.

34. The handheld electronic device of claim 24, wherein the selected crediting account comprises least one of a credit card account, a bank account, or a non-cash account, or any combination thereof.

35. The handheld electronic device of claim 24, wherein the alternative crediting account is selected in response to a second input provided by the payee, the second input being indicated by the one or more input structures.

36. A method comprising:

determining, using a processor of a first electronic device, a data value to be requested from a second electronic device in response to a first input provided by the first electronic device;

using the processor of the first electronic device to cause an electronic communication to be transmitted from a near field communication interface of the second electronic device to the first electronic device, wherein the electronic communication is transmitted via a near field communication-based wireless communication link between the first electronic device and the second electronic device, and wherein the electronic communication is configured to indicate the requested data value;

acquiring, via the near field communication-based wireless communication link, a second account identification information provided by the second electronic device in response to the request for the data value, wherein acquiring the second account identification information comprises acquiring an image of an account instrument and extracting account identification information data from the acquired image;

determining, using the processor of the first electronic device, a first account identification information;

transmitting a request from the first electronic device, via a wireless communication link that is different from the near field communication-based wireless communication link, to at least one external server that is separate from both the first electronic device and the second electronic device to obtain authorization to conduct an electronic data transaction between the first account and the second account corresponding to the data value;

receiving, from the external server, a notification indicating whether the first account second account are compatible with one another;

in accordance with a determination, based on the notification, that the default payment account and the default crediting account are compatible with one another:

displaying an indication that the electronic payment request has been successfully completed; and in accordance with a determination, based on the notification, that the default payment account and the default crediting account are incompatible with one another:

displaying an indication that the electronic payment request has not been successfully completed; and while displaying the indication that the electronic payment request has not been successfully completed, receiving, using an interface element of the first electronic device, a selection of an alternative to the first account that is compatible with the second account.

* * * * *